US007150015B2

(12) United States Patent
Pace et al.

(10) Patent No.: US 7,150,015 B2
(45) Date of Patent: Dec. 12, 2006

(54) METHOD AND SYSTEM FOR DEPLOYING AN ASSET OVER A MULTI-TIERED NETWORK

(76) Inventors: Charles P. Pace, 70 Smith Farm Rd., North Chittenden, VT (US) 05763; Paolo R. Pizzorni, 84 Business Park Dr., Suite 305, Armonk, NY (US) 10504; Darin S. Deforest, 1418 E. Briarwood Ter., Phoenix, AZ (US) 85048; Shuang Chen, 208 Briarwood Dr., Somers, NY (US) 10589

( * ) Notice: Subject to any disclaimer, the term of this patent is extended or adjusted under 35 U.S.C. 154(b) by 680 days.

(21) Appl. No.: 09/946,438

(22) Filed: Sep. 4, 2001

(65) Prior Publication Data

US 2003/0051066 A1   Mar. 13, 2003

Related U.S. Application Data

(60) Provisional application No. 60/229,685, filed on Sep. 1, 2000, provisional application No. 60/236,864, filed on Sep. 29, 2000, now abandoned, provisional application No. 60/237,179, filed on Oct. 2, 2000, now abandoned, provisional application No. 60/254,377, filed on Dec. 8, 2000, now abandoned, provisional application No. 60/262,288, filed on Jan. 17, 2001, now abandoned.

(51) Int. Cl.
*G06F 9/445* (2006.01)
*G06F 15/16* (2006.01)

(52) U.S. Cl. ............... 717/176; 717/177; 717/178; 709/246; 709/236; 719/310

(58) Field of Classification Search ........ 717/100–178; 709/200–253
See application file for complete search history.

(56) References Cited

U.S. PATENT DOCUMENTS

| 5,937,411 | A  | * | 8/1999  | Becker .................... 707/103 R |
| 6,286,051 | B1 | * | 9/2001  | Becker et al. .............. 709/236 |
| 6,295,645 | B1 | * | 9/2001  | Brewer ........................ 717/178 |
| 6,513,040 | B1 | * | 1/2003  | Becker et al. ................ 707/10 |
| 6,557,100 | B1 | * | 4/2003  | Knutson ..................... 713/100 |
| 6,567,809 | B1 | * | 5/2003  | Santosuosso ................. 707/10 |
| 6,585,779 | B1 | * | 7/2003  | Becker ....................... 715/531 |
| 6,591,272 | B1 | * | 7/2003  | Williams ..................... 707/102 |
| 6,665,861 | B1 | * | 12/2003 | Francis et al. .............. 717/120 |
| 6,684,387 | B1 | * | 1/2004  | Acker et al. ................ 717/126 |
| 6,718,515 | B1 | * | 4/2004  | Conner et al. .............. 715/509 |
| 6,721,777 | B1 | * | 4/2004  | Sharma ....................... 718/101 |
| 6,745,387 | B1 | * | 6/2004  | Ng et al. .................... 718/101 |

OTHER PUBLICATIONS

Monson-Haefel, Richard. "Enterprise JavaBeans." O'Reilly & Associates, Inc. Jun. 1999.*

* cited by examiner

*Primary Examiner*—Lewis A. Bullock, Jr.

(57) ABSTRACT

A method and system for deploying assets to multi-tiered network nodes. An asset may represent network and/or application components (e.g., data, objects, applications, program modules, etc.) that may be distributed among the various resources of the network. In one embodiment, a target node's environment may be adjusted before an asset is deployed to that target node. In an alternative embodiment, a target deployment adapter, associated with the asset, may be selected and deployed with the asset in order to allow the asset to operate in the target node environment. An implementation class, associated with the asset, may be inserted into the target node environment. An altered target deployment descriptor may also be inserted into the target node environment.

50 Claims, 67 Drawing Sheets

Fig. 1A

| Application 108 |
|---|
| Transactional OS 105 |
| Middleware 104 |
| Network OS 102 |
| Hardware 100 |

| Java 118 |
|---|
| Enterprise Java Beans 114 |
| Network OS 102 |
| Hardware 100 |

| Java | C++ | Cobal | Smal l-talk |  120 |
|---|---|---|---|
| CORBA 124 |
| Network OS 102 |
| Hardware 100 |

| Java | C++ | Cobal | Smal l-talk | 120 |
|---|---|---|---|
| Windows DNS (COM/MTS) 134 |
| Network OS 102 |
| Hardware 100 |

| C 146 |
|---|
| TUXEDO 144 |
| Network OS 102 |
| Hardware 100 |

195

Prior Art

| Asset ID 724 | Location 730 | Name 740 | Asset Type 754 | Version 760 | Other 770 |
|---|---|---|---|---|---|
| A1 | | | | | |
| A2 | | | | | |
| A3 | | | | | |

Asset Definition Data Structure

Fig. 5

Deployment Asset Data Structure 800

| Asset ID 820 | Version 830 |
|---|---|
|  |  |
|  |  | ← 810
|  |  |

| Target Node ID 920 | Target Asset ID 930 |
|---|---|
|  |  |
|  |  | ← 910
|  |  |

Target Asset Data Structure

Fig. 7

Target Deployment Queue 1000

| Target Node ID 1020 |
|---|
|  |
|  | 1010
|  |

Fig. 8

| Package ID 1410 | Package Timing 1450 | | | | | Location 1420 | Other 1463 |
|---|---|---|---|---|---|---|---|
| | Immediate 1452 | Delivery Start Time 1454 | Delivery End Time 1456 | Expire Time 1458 | Remove Time 1460 | Refresh Rate 1462 | |
| | | | | | | | |
| | | | | | | | |
| | | | | | | | |

1400

1405

Package Definition Data Structure

| Package ID
1552D | Start Time
1554D |
|---|---|
| 1555D | |
| | |
| | |
| | |

Packaging Queue

Fig. 13D

Asset Packaging Process

Asset Packaging Process

Client Deployment Process

1500G

| Client ID<br><br>1552G | Asset ID<br><br>1554G | Version<br>(Timestamp)<br><br>1556G |
|---|---|---|

Client Asset Table

Fig. 13I

| Client ID 1552H ||||| |
|---|---|---|---|---|
| Asset ID 1554H | Offset 1556H | Asset Type 1558H (Optional) | Cache Name 1578H | Version (Timestamp) 1579H |
| | | | | |
| | | | | |

1553H

1500H

Asset Descriptor Manifest Data Structure

Fig. 13J

Node Registration Process

1500J

| Node ID

1524J | Package ID

1526J |
|---|---|
|  |  |
|  |  |

Node Registration Specification

Fig. 13L

Version Asset Adapter Process - VAM

Export Adapter Method

Client Deploy Adapter Method

Process Adapter Method

Target Adapter Method

Synchronize Asset Adapter Process

Synchronize Asset Adapter Process

Discovery Asset Adapter Method

Adjustment Asset Adapter Process

2100D

| EE 220 | Asset Interface 230 (Optional) | Logic/Data (LD) 210 |
|---|---|---|
| EE 220 | Asset Interface 230 (Optional) | Logic/Data (LD) 210 |
| EE 220 | Asset Interface 230 (Optional) | Logic/Data (LD) 210 |
| EE 220 | Asset Interface 230 (Optional) | Logic/Data (LD) 210 |
| EE 220 | Asset Interface 230 (Optional) | Logic/Data (LD) 210 |
| EE 220 | Asset Interface 230 (Optional) | Logic/Data (LD) 210 |
| EE 220 | Asset Interface 230 (Optional) | Logic/Data (LD) 210 |

2200

```
┌─────────────────────────────────────────────────────────┐
│  Rcv Request and Initiate Discover Process Until Terminate │
│                         2205                            │
└─────────────────────────────────────────────────────────┘
                            │
                            ▼
┌─────────────────────────────────────────────────────────┐
│  Rcv Request and Initiate Version Process Until Terminate  │
│                         2210                            │
└─────────────────────────────────────────────────────────┘
                            │
                            ▼
┌─────────────────────────────────────────────────────────┐
│  Rcv Request and Initiate Export Process Until Terminate   │
│                         2215                            │
└─────────────────────────────────────────────────────────┘
```

Publishing Agent Method

Fig. 20

Subscriber Agent Method

Computational Agent Method

Caching Agent Method

System Asset Distribution Process

Bridging Process

Target/Client Definition

Server Definition

Distributing to Computational Environments

Distribution of Current Assets

Example Network Connections and Asset Distributor

Target/Client Definition

Server Definition

Define Packages/
Applications

Distributed Execution of Assets

Distribution of Current Assets

METHOD AND SYSTEM FOR DEPLOYING AN ASSET OVER A MULTI-TIERED NETWORK

PRIORITY DOCUMENTS & RELATED REFERENCES

This application claims priority to provisional U.S. Patent Application Ser. No. 60/229,685, entitled "Distributed Internet Services Provisional Filing", filed on Sep. 1, 2000 to Chen et al. which is incorporated herein by reference in its entirety.

Priority is also claimed for the following documents for any matter not disclosed in provisional U.S. Patent Application Ser. No. 60/229,685 incorporated by reference above. The following references are related to this patent application and are herein incorporated by reference in their entirety:

provisional U.S. Patent Application Ser. No. 60/236,864, entitled "Distributed Internet Server" to Pace et al., filed Sep. 29, 2000, now abandoned;

provisional U.S. Patent Application Ser. No. 60/237,179, entitled "Business Plan and Business Plan Executive Summary" to Chen et al., filed Oct. 2, 2000, now abandoned;

provisional U.S. Patent Application Ser. No. 60/254,377, entitled "Distributed Internet Services provisional filing II" to Pace et al., filed Dec. 8, 2000, now abandoned;

provisional U.S. Patent Application Ser. No. 60/262,288, entitled "Data Structure, Architecture, Apparatus, and Program Product Capable of Being Distributed to and Executed on Different Network Tiers and on Various Computer Platforms and Environment" to Pace et al., filed Jan. 17, 2001, now abandoned;

U.S. patent application Ser. No. 09/947,140 entitled "Extended Environment Data Structure for Distributed Digital Assets Over Multi-tiered Computer Networks", to Pace et al., filed Sep. 4, 2001, still pending;

U.S. patent application Ser. No. 09/946,410, entitled "Server System and Method for Discovering Digital Assets in Enterprise Information Systems", to Bobick et al., filed Sep. 4, 2001, still pending;

U.S. patent application Ser. No. 09/947,122, entitled "Server System and Method for Exporting Digital Assets in Enterprise Information Systems", to Pace et al., filed Sep. 4, 2001, still pending;

U.S. patent application Ser. No. 09/947,096, entitled "System and Method for Transactional Deployment J2EE Web Components, Enterprise Java Bean Components, and Application Data over Multi-tiered Computer Networks", to Pace et al., filed on Sep. 4, 2001, now abandoned;

U.S. patent application Ser. No. 09/946,980, entitled "Server System and Method for Distributing and Scheduling Modules to be Executed on Different Tiers of a Network", to Pace et al., filed Sep. 4, 2001, still pending;

U.S. patent application Ser. No. 09/946,699, entitled "System and Method for Distributing Assets to Multi-Tiered Network Nodes", to Pizzorni et al. filed on Sep. 4, 2001, now abandoned;

U.S. patent application Ser. No. 09/947,161, entitled "System and Method for Translating an Asset for Distribution Over Multi-Tiered Networks (Processing)" to Pace et al. filed on Sep. 4, 2001, still pending;

U.S. patent application Ser. No. 09/947,163, entitled "System and Method for Synchronizing Assets on Multi-Tiered Networks", to Pace et al. filed on Sep. 4, 2001, still pending;

U.S. patent application Ser. No. 09/947,141, entitled "Method and System for Deploying an Asset Over a Multi-Tiered Network" to Pace et al. filed on Sep. 4, 2001, still pending;

U.S. patent application Ser. No. 09/947,095, entitled "System and Method for Adjusting the Distribution of an Asset Over a Multi-Tiered Network", to Pace et al. filed on Sep. 4, 2001, still pending;

U.S. patent application Ser. No. 09/947,119, entitled "System and Method for Bridging Assets to Network Nodes on Multi-Tiered Networks", to Pace et al. filed on Sep. 4, 2001, now abandoned;

U.S. patent application Ser. No. 09/947,016, entitled "Method and System for Deploying an Asset Over a Multi-Tiered Network", to Pace et al. filed on Sep. 4, 2001, describing asset streaming, now abandoned;

U.S. patent application Ser. No. 09/947,162, entitled "System, Method, and Data Structure for Packaging Assets for Processing and Distribution on Multi-Tiered Networks", to Bobick et al. filed on Sep. 4, 2001, still pending;

U.S. patent application Ser. No. 09/947,148, entitled System and Method for Transactional and Fault-Tolerant Distribution of Digital Assets Over Multi-Tiered Computer Networks, to Bobick et al. filed on Sep. 4, 2001, now abandoned;

U.S. patent application Ser. No. 09/947,149, entitled "System and Method for Collaboration Using Web Browsers", to Chen et al. filed on Sep. 4, 2001, still pending;

PCT Patent Application No. PCT/US2001/027232, entitled "System and Method for Collaboration Using Web Browsers", to Chen et al. filed on Aug. 31, 2001, now abandoned;

PCT Patent Application No. PCT/US2001/027289, entitled "System, Method, Uses, Products, Program Products, and Business Methods for Distributed Internet and Distributed Network Services", to Chen et al. filed on Aug. 31, 2001, now abandoned; and U.S. patent application Ser. No. 09/944,062, entitled "System, Method, Uses, Products, Program Products, and Business Methods for Distributed Internet and Distributed Network Services", to Chen et al. filed on Sep. 4, 2001, now abandoned.

FIELD OF THE INVENTION

The present invention relates to a method and system for deploying an asset over a multi-tiered network.

BACKGROUND OF THE INVENTION

Network applications have evolved over time to take on a multi-tiered client and server arrangement (i.e., architecture). Typically, one or more server computers are connected through their network interfaces by one or more networks to one or more client computers. Networks may include data networks (e.g., Internet), voice networks (e.g., Public Switched Telephone Network—"PSTN"), wired or wireless networks, and any combination of these used to communicate data, voice, programs, general content, and/or other information. Networks may be local to a company or organization, such as a Local Area Network ("LAN") and an intranet, or they may expand over large geographic areas, such as a Wide Area Network ("WAN"), that may even interconnect other networks. One widely used and developing network is the Internet, which includes the World Wide Web ("WWW"). The "WWW" uses Web browser software running on the client computers of the network to execute certain Web-based applications. These Web-based applications may include pages that are served from one or more of the Web servers on the WWW in HyperText Markup Language ("HTML") format.

Many applications on the Internet, and other network environments, use a module or modules of software called "middleware". Broadly, middleware can be any computer software function that is performed between a client and a host system such as a database server and a Web server. However, middleware typically runs on servers that operate between the clients and other servers in a network. For example, these other servers may include an Oracle® Database, IBM® DB2 and IBM® CICS server. Middleware is often used to execute certain computer programs which are meant to off load processing from these other servers, to preprocess information for client computers, and/or to perform a set of functions or services that are commonly needed for certain kinds of applications. Some examples of functions or services that are typically performed by "middleware" would be transaction monitoring and coordination, server load-balancing, host fail-over and other application level services.

A typical Enterprise Information System ("EIS") is comprised of client computers, middleware servers, and database servers. Web servers are included within the EIS when Web browser based clients must be served via the Internet/intranet. EIS's are generally known and may include application programs that perform the functions required by any given business and/or organization. For example, an EIS may include, inter alia: online customer order entry systems; online retail/wholesale sales, marketing, and inventory systems; enterprise supply chain management systems; product and/or content distribution systems (e.g. television, home video); online financial systems (e.g., mortgage applications, investing, stock trading, loan application, and credit card accounts); service providing systems (including medical, legal, real estate, engineering, education, distance leaning, and technical support); online human resource and payroll services; online banking systems (e.g., deployed by a bank or other financial institutions and/or the retail banking systems used internally by bank personnel); airline reservation systems; and any other general way of transacting business over a network.

Often these functions/application programs are made of parts. For example, an application program can be made of components, modules, or functions (see discussion of FIG. 1F below), which in turn are made of objects. The component, module or function may also include either an expressed or implied order in which to execute the respective objects in the component, module, or function. This order can be shown or defined by an execution graph. Restated, the execution graph may be implied by the "calling structure" of the program.

Execution of one or more of these components, modules, functions and/or entire applications can be performed at various locations over a network. This well known type of program execution is called distributed programming. One primary advantage of distributed programming is to more efficiently utilize the distributed computing resources over the network to achieve improved performance. Performance can be gauged using certain criteria such as execution time, and controlled using certain middleware applications such as fault-tolerance and load balancing. Important computing resources such as CPUs, network bandwidth, software functions and data storage must be well managed in order to achieve customary and generally known system requirements usually referred to as reliability, availability and scalability ("RAS").

Distributed computing can allow programs to run faster because the work of the program is divided among multiple computer systems. Also, specific tasks in the program can be executed on a computer that has the facilities to best execute these tasks. For example, a mathematically intensive task could be run on a computer that has a particularly fast processor for executing mathematical problems and application programs that support a large variety of mathematical functions.

However, distributed programming often fails if the communication among the processors involved gets too complicated. Programs have to be developed and installed to insure that data among the processors is coherent. Some systems cannot tolerate noise or spurious signals on the network. Delays in receiving data from one or more processors could slow the entire system. In order to be distributed, application programs must be written so that tasks can be broken apart and the results of these tasks accurately combined. This often greatly adds to project development costs, assuming that these objectives can be accomplished at all. Communication between the various computers on the network and the programs/protocols the computers are using must be compatible.

Often the network is thought of as being divided into tiers where each of these components, modules, or functions is executed. These tiers are commonly divided by functional (or logical) and/or physical computing levels or sub-tiers. The advantage of dividing the network application system into multiple tiers is to facilitate the development and deployment of the various computing resources. Some times tiers are thought of as physical locations where components, modules, or functions of programs are executed. For example, some components, modules or functions can be executed on the EIS tier or middleware tier, while other components, modules, or functions are executed on the client computers (the client tier). Alternatively, tiers of the network can be divided logically, such as on a small human resource system, where the client and server part of the components, modules, or functions are all on one computer, but logically the components, modules, or functions are still developed and deployed based on the client and the server tier being separate tiers.

Network tiers can also be combinations of physical and logical tiers. For example, take an online banking system that is comprised of a client computer, middleware servers, and various backend database systems. Suppose the client, middleware and database systems are physically separate computer systems (tiers). The middleware tier may be subdivided into logical tiers such as a Web server, an application server, and a transaction server tier.

In much of the existing middleware, objects used are highly interdependent and defined by the function(s) of the middleware. Some well-known middleware objects include: Sun Microsystem's Java Server Page™ ("JSP") and Enterprise Java Bean™ ("EJB"). The JSP object executes programs, based on requests from one or more clients. The EJB object executes certain programs that are pre-packaged into an "Enterprise Java Bean" format. Other objects may include, for example, general data files, general programs, and general multimedia content files (e.g., text, video, sound, and voice content).

It is often necessary for various servers and clients to communicate even though they may have different runtime environments (i.e., are running different application programs such as middleware) and are running on different platforms (i.e., have different hardware and operating systems). Generally, servers and clients communicate using well-known protocols like HyperText Transfer Protocol ("HTTP") over TCP/IP. Other network communication protocols include Internet Interoperable Protocol ("IIOP") that permits communication between different computer platforms over a network. One example of a technology that uses IIOP would be the Common Object Request Broker Architecture™ ("CORBA"). At a high-level CORBA specifies many standards involving application level communication among disparate applications and computing platforms.

The prior art discloses some "open" architectures that permit programmers to develop code that will have general use in a networking environment. Some of these architectures permit communication between programs executing on different systems, different platforms or environments, and even using different programming languages over the network (and network tiers.) An open architecture encourages development of applications that can be used generally with a flexibility to interact with any other architecture based program (component, module, function or object) without regard to what, where, or on what system the other application parts exist or execute.

One such open architecture system is called JINI™. JINI uses Java™ technology to wrap these otherwise incompatible programs, particularly driver programs for input/output devices so that these devices can be plugged into a JINI compatible network and operate and communicate with any other device on the network. For example, JINI can be used to permit any pervasive device on a wireless network to communicate with any other JINI compatible pervasive device that comes within the communication range of the wireless network.

FIGS. 1A–1E discussed below are each a block diagram illustrating a prior art middleware computer platform.

FIG. 1A is a block diagram illustrating a general middleware computer system 160 with well-known computer hardware 100, a general network operating system 102 (e.g., Microsoft Windows NT™), a middleware platform 104 (e.g., Microsoft® Commerce Server), a transactional operating system 106 (e.g., Microsoft® Transaction Server—"MTS"), and a given application program 108 (e.g., an online ticketing sales application).

FIG. 1B is a block diagram illustrating a generally known Java middleware platform 170 that has computer hardware 100 and a network operating system 102. A middleware platform which supports Enterprise JavaBeans™ ("EJB") 114 runs on the network operating system 102 that allows Java application programs 118 to run on the system 170.

FIG. 1C is a block diagram illustrating a generally known CORBA middleware platform 180 that has computer hardware 100 and a network operating system 102. The CORBA middleware platform 124 permits general application programs 120 to operate on this platform. For example, these application programs 120 may include Java™, C++, COBOL, and Smalltalk programs.

FIG. 1D is a block diagram illustrating a generally known Windows middleware system 190 that operates on Windows® compatible hardware 100. A Windows® DNS (COM/MTS) or MTS system is a middleware system 134 available from the Microsoft Corporation that permits general application program 120 to run on the platform 190.

FIG. 1E is a block diagram illustrating a generally known system 195 that uses hardware 100, a network operating system 102, and a middleware program 144 called TUX-EDO™ (made by BEA Systems, Inc). This platform 195 runs application programs 146 written in the C programming language.

FIG. 1F is a diagram showing a prior art hierarchical relationship among system and application parts. The largest part is a system 105F that contain one or more complete applications 108. The system 105F also can contain one or more subsystems 106F that each in turn may include one or more applications 108. The application 108 is a group of one or more computer programs. Subapplications 110F are parts of applications 108. Some applications 108 and/or subapplications 110F may include one or more components 120F.

A component 120F may exist at a some significant layer within an application 108. A component 120F may be part of a distributed system that interacts with its environment by exchanging message/information with other components 120F and/or applications (108, 110F). Components 120F may include runnable (i.e., executable) and non-runnable parts. The runnable/executable parts of components 120F are generally called modules 130. Modules 130 in turn comprise one or more functions 140F also known as routines 140F or methods 140F.

Middleware, and for that matter, other prior art programs that function in a network environment, often need to communicate information between logical and/or physical functions in the network. For example, data or programs (e.g. objects) might need to be passed to a program or component, module, or function executing on the same machine as the application program. On the other hand, this information might have to be passed across the network to components, modules, functions, subapplications, or applications that are running on completely different computers. The prior art has various ways of addressing this problem. Some prior art passes information "by value" between components, modules, functions or applications. Thus, information needed is passed, e.g. in a "call statement" or header file to the component, module, function or application requiring the information. Other information, such as the results from a calculation, can be passed back in a same manner. Other prior art uses replication to pass information. In replication, programs and data are copied from one machine (computer) to a second machine where they are executed in an "island" mode.

Some prior art (e.g. Castanet™) is able to package and deploy business applications to computers over the network. Other prior art includes content distribution systems (e.g., those marketed by Akamai, Inc.) that physically locate caching servers throughout the world to cache content from Web sites and provide more local delivery to end user (clients). Similar systems include Digital Island, Ltd's global distribution network, called Footprint, that pushes certain application content through the network to servers located closer to the end-user. Inktomi Traffic Server™ is a network cache platform from Inktomi Inc. that delivers certain application content to servers across the network.

Several terms and concepts are defined in the prior art of software analysis, design, and programming languages. Software systems can be composed of one or more applications. These applications can be assembled from one or more components, modules, functions or objects.

In software written using object-oriented techniques, many modules further have a one-to-one correspondence with a class in the particular object-oriented language. A class or set of classes may also be considered a component if the class or set of classes meets the requirements of a specified component system. Examples of component systems are: COM, CORBA, EJB, ActiveX®, XPCOM, and JavaBeans™.

Classes may be composed of one or more functions or procedures optionally coupled along with one or more variables. The functions or procedures are generally referred to as methods, while the variables are generally referred to as data members.

At runtime, classes are instantiated into objects, which are distinct entities, separate from the definition of the object, that is, the class. The data members represent the data or state of the object. The methods characterize the behavior of the object.

Build systems transform collections of non-runnable computer files into runnable computer modules and assembles them into components and applications. Build systems cannot identify or export required digital assets (hereinafter also termed assets) on an existing Enterprise Information System ("EIS"). Build systems also cannot identify runtime execution and data dependencies in previously installed EIS applications. Build systems generally contain incremental linkers which establish runtime relationships among modules of object code and are an improvement over regular linkers because they re-link only changed modules on command.

Archive utilities (e.g., archive utilities generating Zip, Gzip, and Tar archive files) are used for distributing and storing files. These files may contain one or more program and data files. Usually the archive files are compressed to save space. Archive files make it easy to group files and make transporting and copying these files faster. Typically, archive utilities examine the file types of the files to be zipped and invoke a file type specific compression subroutine to compress the file and add it to the archive.

Other types of software examine computer files and invoke rules based on file type to achieve specific results. Specifically, virus scan software will examine executable programs and based on one or more rules, determine whether there is a virus in the executable routine of the program Virus scan software (e.g., McAfee virus software) can not be used and is not meant to be used to discover particular software, package the software, and then distribute the software over a network.

Software which may be classified as "enhanced" build systems (e.g., Starbase) control versioning of code and static elements of software products during development, as well as deployment of the completed products of development using various transport mechanisms to destination user computing platforms. Such enhanced build systems are designed to control and deploy only work in progress, ancillary products, and the completed products of development, and the inventory of code, static, and ancillary elements managed by such systems is rigorously constrained and must be rigorously constrained to those purposes. Such enhanced build systems cannot be used and are not meant to be used to discover particular software, package the software, and then distribute the software over the Internet.

The prior art also discloses specifications for deployment of Web components (particularly J2EE Web components), Enterprise JavaBean™ ("EJB") components, and J2EE application data. The J2EE specification provides methods of transactional deployment of J2EE Web and EJB components to application server products that otherwise comply with the J2EE specification. There is no provision in the J2EE specification for transactional deployment of J2EE application data.

Using different computing environments and platforms creates many communication and operability problems on the network. For example, many computing environments (including middleware environments) only can operate with programs with which they are specifically designed to operate. Much of the prior art is unable to communicate or share information or programs with any general platform or computing environments. Much of the prior art cannot distribute programs and/or data over one or more networks so that the programs can be executed and the data used on any given platform or environment. Where this distribution occurs, it is only possible with the expenditure of considerable resources and highly trained system designers.

The prior art does not solve the need to be able to distribute data, programs, and portions of programs in a more efficient way over various tiers of a network to operate on any general platform or environment.

Another variation of this problem involves the explanation of middleware's intra-tier distribution versus inter-tier distribution. Middleware application servers are targeted at defining tiers of functionality. These tiers may scale within the tier, but not necessarily utilizing the processing power available in other tiers.

Much of the prior art middleware is constrained. Typically, middleware is only used with a particular EIS and is designed specifically for that EIS's platform and environment. Often this middleware operates in local area networks with 10/100 megabits of bandwidth or less. Most of this middleware cannot effectively function in a wide area network environment, or on the Internet, where bandwidth capabilities are often more restrictive. This middleware cannot communicate with computer systems that do not use the same communication protocols for which the middleware was designed.

Much of the middleware typically operates between the EIS Web server and the EIS database management system ("DBMS"). The result is that the performance of the middleware is limited by the performance of the EIS Web server and/or the EIS DBMS.

Much of the middleware does not work with components, modules or functions that are designed to execute on a platform/environment different than that of the EIS for which the middleware was designed. Therefore, this middleware can't organize, schedule, and/or distribute applications outside of the EIS. This prior art middleware cannot enable the execution of any general component, module, function, and/or application program to be executed on any general computer with any general platform/environment, nor does this middleware suggest how this might be done. The prior art middleware cannot distribute application programs and/or components, modules or functions for execution over different tiers of a network, nor has the prior art recognized the need to do this.

Some prior art architectures (e.g., JINI) permit communication between computers with different platforms/environments. However, much of this communication is used to enable standard interface functions like print, read data, etc. These architectures are not capable of decomposing complex application programs, of the sort found on an EIS, and recomposing these application programs so that they can be executed on any given platform. These prior art architectures cannot organize, schedule, and/or distribute application programs and/or components, modules, or functions across many tiers of a network so that these application programs/components, modules or functions can be executed on any general platform/environment.

Much of the prior art cannot automatically identify and extract subapplications, components, modules, functions, and specific files and data structures from legacy programs located on an EIS in order to export these application parts to other machines connected to the EIS through one or more networks. In addition, the prior art generally fails to identify these application parts by type so that the application parts can be processed in such a manner to include the necessary information and structures particular to the type so that the application part can be transformed and/or executed on various tiers of the network.

SUMMARY OF THE INVENTION

An exemplary embodiment of a component distribution server (CDS) system according to the present invention, connected to at least one network through at least one respective network interface, includes: a package specification process that receives at least one package, the packages being subparts of at least one application program from at least one enterprise information system (EIS), the packages having at least one asset, each asset having an asset type and at least two asset layers, a first asset layer being a logic/data layer and a second asset layer being an extended environment layer, the logic/data layer having information that includes a function of the asset and the extended environment layer being a subset of the EIS and having portions of the EIS necessary to support the respective logic/data layer; a process adapter process that translates at least one of the asset layers so that the asset performs the asset function on at least one target base environment of at least one target computer; and a target process that changes the at least one of the layers of the asset in order to provide specific information for at least one of the specific target computers, whereby a transformed asset is an asset that is translated by the process adapter process and changed by the target process.

An exemplary method executed by a computer server connected to at least one network according to the present invention includes the steps of: receiving at least one package from at least one enterprise information system (EIS), the packages being subparts of at least one application program, the packages having at least one asset, each asset having an asset type and at least two asset layers, a first asset layer being a logic/data layer and a second asset layer being an extended environment layer, the logic/data layer having information that includes a function of the asset and the extended environment layer being a subset of the EIS and having portions of the EIS necessary to support the respective logic/data layer; translating at least one of the asset layers so that the asset can perform the asset function on at least one target base environment of at least one target computer; and changing at least one of the layers of the asset in order to provide specific information for at least one specific target computer.

An exemplary embodiment of a computer server according to the present invention includes: an arrangement configured to receive at least one package from at least one enterprise information system (EIS), the packages being subparts of at least one application program, the packages having at least one asset, each asset having an asset type and at least two asset layers, a first asset layer being a logic/data layer and a second asset layer being an extended environment layer, the logic/data layer having information that includes a function of the asset and the extended environment layer being a subset of the EIS and having portions of the EIS necessary to support the respective logic/data layer; an arrangement configured to translate at least one of the asset layers so that the asset can perform the asset function on at least one target base environment of at least one target computer; and an arrangement configured to change at least one of the layers of the asset in order to provide specific information for at least one specific target computer.

In an exemplary embodiment of a computer memory storage device storing a computer program according to the present invention, the computer program includes the steps of: receiving at least one package from at least one enterprise information system (EIS), the packages being subparts of at least one application program, the packages having at least one asset, each asset having an asset type and at least two asset layers, a first asset layer being a logic/data layer and a second asset layer being an extended environment layer, the logic/data layer having information that includes a function of the asset and the extended environment layer being a subset of the EIS and having portions of the EIS necessary to support the respective logic/data layer; translating at least one of the asset layers so that the asset can perform the asset function on at least one target base environment of at least one target computer; and changing at least one of the layers of the asset in order to provide specific information for at least one specific target computer. An exemplary method and/or exemplary embodiment of the present invention provides an improved system and method for extracting and exporting digital assets of an EIS so that EIS systems, sub systems, applications, sub applications, components, modules, or functions, and/or objects can be packaged, distributed, deployed, executed, synchronized, and/or managed through a lifecycle over a multi-tiered network. Another exemplary method and/or exemplary embodiment of the present invention provides an improved system and method for extracting and exporting as a means of distributing, deploying, and/or executing web applications, components, modules or functions and/or objects over the Internet. Another exemplary method and/or embodiment of the present invention provides an improved system and method for extracting and exporting types of digital assets that are extracted from one or more EIS/source and identifying those digital assets according to their respective type so that the digital asset can be exported, e.g., in packages, from the EIS/source to be distributed, deployed, executed, synchronized, and/or managed through a lifecycle over tiers of the network.

Another exemplary method and/or embodiment of the present invention provides a system, method, article of manufacture, and a computer program product that locates and categorizes identified member objects of one or more computer system parts in an Enterprise Information System (EIS) or other sources for export to either a packaging process or to another computer system over tiers of one or more networks. The exemplary method and/or embodiment begins by traversing an intermediate representation of one or more parts of a computer system while applying one or more context rules to determine a context of the parts. The context may be either a standard specified context or a non-specified context. If a standard specified context is determined, a directed search is performed to acquire any of the set of runnable and/or non-runnable member objects in one or more locations in an Enterprise Information System (EIS) or other sources as identified in the intermediate representation and specified by the context. If a non-specified context is determined, an implicit traversal search is performed for any of the set of runnable and/or non-runnable member objects in one or more locations in an Enterprise Information System (EIS)/source identified in the intermediate representation. One or more of the set of runnable and/or non-runnable member objects are then accessed at their respective locations in the EIS/source. A preliminary package specification may be made for the accessed set of the runnable and/or non-runnable member objects. Digital assets in an asset inventory that correspond to the respective runnable and non-runnable member objects, may be listed in the preliminary package specification and updated by adding one or more export descriptors to the extended environment of the respective digital assets. In another exemplary method and/or embodiment, one or more entries in an asset definition data structure corresponding to each of the respective digital assets are updated.

An exemplary embodiment and/or exemplary method of the present invention provide a computer system and a method for transactional deployment of one or more components over a multi-tier network, which computer system has one or more J2EE application server programs which are stored on one or more memories of the system and which are executed by one or more central processing units (CPUs). One or more J2EE applications can be executed on the J2EE application servers, and one or more J2EE application containers are contained within each J2EE application server. In turn, each J2EE application container contains one or more J2EE application container components, and one or more Java EJB containers or Java web containers are contained within each J2EE application container. One or more J2EE components are delivered to the J2EE application server over one or more tiers of the network. There are one or more logical connections to one or more databases located on the network. The at least one J2EE application server program, the at least one J2EE application, the at least one J2EE application container, the at least one J2EE application container component, the at least one delivered J2EE component and the logical connection define a sphere of control managing a transactional deployment of the at least one delivered J2EE component and an update of the database to keep the data consistent with the J2EE application.

In accordance with the exemplary method of the present invention, the sphere of control achieves the steps of: accessing the database; initiating a deployment of a latest version of a data object to the database; determining whether the deployment of the data object is successful; deploying at least one file containing a latest version of the delivered J2EE component into the at least one J2EE application container; and determining whether the latest version of the delivered J2EE component is successfully deployed into the at least one J2EE application container. In addition, a previous version or the latest version of the delivered J2EE component is stored for rollback in case of subsequent deployment failures involving the data object and/or the delivered J2EE component. Furthermore, the previous version of delivered J2EE component and a previous version of the data object are discarded only if both the deployment of the latest version of the data object and the deployment of the latest version of the delivered J2EE component into the J2EE application container are successful.

An exemplary method and/or exemplary embodiment of the present invention provides for bridging assets over a multi-tiered network. An asset may represent network and/or application components (e.g., data, objects, applications, program modules, etc.) that may be distributed among the various resources of the network. Generally, communications can be maintained between executable assets residing on different network nodes by bridging the execution context of the two nodes. In an embodiment, a mapping layer can be generated for assets that have run-time dependencies; the mapping layer uses a distribution system to bridge the execution context of a first environment with that of a second environment. The asset executing in the first environment is able to access another resource located in the second environment, even though the asset does not have local access to the resource in the second environment. A fault is detected when at least one asset deployed on a local node attempts to access at least one resource on a remote node through an application programming interface. The fault is then be handled appropriately.

An exemplary method and/or exemplary embodiment of the present invention distributes an asset to a multi-tiered network node. An asset may represent network and/or application components (e.g., data, objects, applications, program modules, etc.) that may be distributed among the various resources of the network. In an embodiment, a pending notice is received from a distribution server. If the notice indicates that at least one asset is pending (i.e., awaiting deployment), an asset descriptor manifest is received from the distribution server. The asset descriptor manifest identifies at least one asset to be deployed to the node, and includes an offset associated with the asset identifier. The asset descriptor manifest is stored in a memory on the node. A fragment, associated with the asset, is received and stored in the memory. The offset associated with the asset is marked with the end of the fragment, and another fragment, beginning at the offset, is then received. Additional fragments are received, and the offset updated, until the entire asset is deployed to the node. In an alternative embodiment, the entire asset is received in the first fragment. In another embodiment, multiple assets are received in the first fragment.

The present invention provides a system and method for translating an asset for distribution to a multi-tiered network node. An asset may represent network and/or application components (e.g., data, objects, applications, program modules, etc.) that may be distributed among the various resources of the network. In an embodiment, an asset has a logic/data section and an extended environment section. The logic/data section defines a function of the digital asset along with the asset's type, while the extended environment section supports the function of the logic/data section within at least one source environment. The asset type is determined and a process asset adapter, associated with the asset type and a target environment, is selected. The asset is then translated into a processed asset having a processed extended environment section supporting the function of the logic/data section in the target environment.

An exemplary method and/or exemplary embodiment of the present invention synchronizes an asset over a multi-tiered network. An asset may represent network and/or application components (e.g., data, objects, applications, program modules, etc.) that may be distributed among the various resources of the network. Synchronization addresses the restoration of asset coherency in a distributed system, i.e. bringing changes made to assets on one distributed node into harmonization with changes made to assets on another distributed node. In an embodiment, a synchronization call having a data argument and an asset type is received, an adapter associated with the asset type is selected, and the data argument is passed to the adapter. The asset type is determined, as well as a table associated with the asset type. A synchronization information object is retrieved from a target environment on a target node, and a synchronization asset is created based on the synchronization information. A connection is established between the target node and the asset's original source node, and the synchronization asset is sent from the target node to the source node.

One embodiment of the present invention is a method for distributing changes to digital assets across a network. The method includes determining an asset type of a first digital asset and comparing the first digital asset to a prior digital asset to determine one or more deltas, the prior digital asset being a prior version of the first digital asset and the delta being a difference between the first digital asset and the prior digital asset. The method further includes evaluating the one or more of the deltas with one or more criteria to determine if the one or more delta assets should be created, the delta asset being a second digital asset containing the respective delta, the criteria determined by the asset type. The method further includes that if the delta meets the criteria, creating the delta asset, and marking the delta asset as a first delta asset of the first digital asset.

One embodiment of the present invention is a method of operating a computer system for targeting one or more digital assets on a distribution server connected to one or more networks so that the digital assets are compatible with one or more target nodes connected to the networks. The method includes examining the one or more digital assets to determine an asset type of the digital asset and, if the asset type is Relational Data (RD), retrieving one or more where clauses of the digital asset. The method further includes executing a token replacement operation on the where clause to create a transformed where clause and running a query on one or more tables specified in the digital asset using the transformed where clause, the query returning one or more returned records and the returned records correlating with the target node. The method further includes storing the returned record in the digital asset.

An exemplary embodiment of a system for distributing at least one infrastructure description record (IDR) over at least one tier of a network according to the present invention includes at least one network interface that receives the infrastructure description records (IDRs) and the IDRs being enqueued on at least one incoming, transactional, persistent queue (ITPQ), at least one transactional, persistent store, and at least one transactional process that dequeues the IDR from the ITPQ and accesses the IDR to create an accessed IDR, the accessed IDR being stored in the transactional, persistent store in the system.

An exemplary embodiment of a system that includes a transactional unit of work (TUW) for distributing at least one infrastructure description record (IDR) over at least one tier of a network according to the present invention includes at least one incoming, transactional, persistent queue (ITPQ), at least one first transactional, persistent store, and at least one first transactional process that stores the IDR in the first transactional, persistent store in the system, and produces the IDR by sending the IDR from the transactional, persistent store through the network interface over the network.

An exemplary embodiment of a system that includes a transactional unit of work (TUW) for distributing at least one digital asset over at least one tier of a network according to the present invention includes at least one incoming, transactional, persistent queue (ITPQ), at least one first transactional, persistent store, and at least one first transactional process that stores the digital assets in the first transactional, persistent store in the system, and produces the digital asset by sending the digital asset from the transactional, persistent store through the network interface over the network, the digital assets having a Logic/Data (LD) section and an Extended Environment (EE) section.

An example embodiment of a transactional unit of work chain (TCHAIN) of at least two transactional units of work (TUW) for transactional and fault-tolerant distribution of at least one infrastructure description record (IDR) over at least one tier of a network according to the present invention includes:

a first TUW including:

at least one first incoming, transactional, persistent queue (ITPQ);

at least one first transactional, persistent stores;

at least one first network interface that consumes the infrastructure description records (IDRs) by receiving the IDR and enqueuing the IDR on the first incoming, transactional, persistent queue (ITPQ); and at least one first transactional process that dequeues the IDR from the first ITPQ, accesses the IDR to create an accessed IDR, stores the accessed IDR in the first transactional, persistent store in the system, and produces the accessed IDR by sending the accessed IDR from the first transactional, persistent store through the first network interface over the network; and a second TUW including:

at least one second incoming, transactional, persistent queue (ITPQ);

at least one second transactional, persistent store;

at least one second network interface that consumes the accessed IDR by receiving the accessed IDR from the first TUW and enqueuing the accessed IDR on the second incoming, transactional, persistent queues (ITPQ); and at least one second transactional process that dequeues the IDR from the second ITPQ, accesses the IDR to create a second accessed IDR, stores the second accessed IDR in the second transactional, persistent store in the system, and produces the second accessed IDR by sending the second accessed IDR from the second transactional, persistent store through the second network interface over the network.

An exemplary embodiment of a transactional unit of work matrix (TMATRIX) for transactional and fault-tolerant distribution of at least one infrastructure description record (IDR) and at least one digital asset over at least one tier of a network according to the present invention includes:

a first TUW including:

at least one first incoming, transactional, persistent queue (ITPQ);

at least one first transactional, persistent store;

at least one first network interface that consumes the infrastructure description records (IDRs) by receiving the IDR and enqueuing the IDR on the first incoming, transactional, persistent queues (ITPQ), and consumes the digital assets by receiving the digital assets and enqueuing the digital assets on the first incoming, transactional, persistent queues (ITPQ); and at least one first transactional process that dequeues the IDR from the first ITPQ, accesses the IDR to create a first IDR, stores the first IDR in the first transactional, persistent store in the system, and produces the first IDR by sending the first IDR from the first transactional, persistent store through the first network interface over the network, and the first transactional processes further dequeue the digital assets from the first ITPQ, access the digital assets to create first digital assets, store the first digital assets in the first transactional, persistent store in the system, and produce the first digital assets by sending the first digital assets from the first transactional, persistent store through the first network interface over the network; and a second TUW including:

at least one second incoming, transactional, persistent queue (ITPQ);

at least one second transactional, persistent store;

at least one second network interface that consumes the first IDR by receiving the first IDR from the first TUW and enqueuing the first IDR on the second incoming, transactional, persistent queues (ITPQ), and consumes at least one of the digital assets by receiving the digital assets and enqueuing the digital assets on the second incoming, transactional, persistent queues (ITPQ);

at least one second transactional process that dequeues the first IDR from the second ITPQ, accesses the first IDR to create a second IDR, stores the second IDR in the second transactional, persistent store in the system, and produces the second IDR by sending the second IDR from the second transactional, persistent store through the second network interface over the network, and the second transactional processes further dequeue the digital assets from the second ITPQ, access the digital assets to create second digital assets, store the second digital assets in the second transactional, persistent store in the system, and produce the second digital assets by sending the second digital assets from the second transactional, persistent store through the second network interface over the network;

a third TUW including:

at least one third incoming, transactional, persistent queue (ITPQ);

at least one third transactional, persistent store;

at least one third network interface that consumes the first digital assets by receiving the first digital assets from the first TUW and enqueuing the first digital assets on the third incoming, transactional, persistent queues (ITPQ); and at least one third transactional process that dequeues the first digital assets from the third ITPQ, accesses the first digital assets to create third digital assets, stores the third digital assets in the third transactional, persistent store in the system, and produces the third digital assets by sending the third digital assets from the third transactional, persistent store through the third network interface over the network, and produces third IDRs by sending the third IDR from the third transactional, persistent store through the third network interface over the network;

a fourth TUW including:

at least one fourth incoming, transactional, persistent queue (ITPQ);

at least one fourth transactional, persistent store;

at least one fourth network interface that consumes the second digital assets by receiving the second digital assets from the second TUW and enqueuing the second digital assets on the fourth incoming, transactional, persistent queues (ITPQ), and that consumes third IDRs by receiving the third IDR from the third TUW and enqueuing the third IDR on the fourth incoming, transactional, persistent queues (ITPQ), at least one fourth transactional process that dequeues the second digital assets from the fourth ITPQ, accesses the second digital assets to create fourth digital assets, stores the fourth digital assets in the fourth transactional, persistent store in the system, and produces the fourth digital assets by sending the fourth digital assets from the fourth transactional, persistent store through the fourth network interface over the network, the fourth transactional processes further dequeue the third IDR from the fourth ITPQ, access the third IDR to create a fourth IDR, store the fourth IDR in the fourth transactional, persistent store in the system.

An exemplary method for distributing at least one infrastructure description record (IDR) over at least one tier of a network according to the present invention includes the steps of receiving at least one of the infrastructure description records (IDRs), enqueuing the IDRs on at least one incoming, transactional, persistent queue (ITPQ), dequeuing the IDR from the ITPQ, accessing the IDR to create an accessed IDR, and storing the accessed IDR in a transactional, persistent store.

An exemplary embodiment of a system for distributing at least one infrastructure description record (IDR) over at least one tier of a network according to the present invention includes an arrangement configured to receive at least one of the infrastructure description records (IDRs), an arrangement configured to enqueue the IDRs on at least one incoming, transactional, persistent queue (ITPQ), an arrangement configured to dequeue the IDR from the ITPQ, an arrangement configured to access the IDR to create an accessed IDR, and an arrangement configured to store the accessed IDR in a transactional, persistent store.

An exemplary embodiment of a computer program product stored on a memory includes the steps of receiving at least one infrastructure description record (IDR), enqueuing the IDRs on at least one incoming, transactional, persistent queue (ITPQ), dequeuing the IDR from the ITPQ, accessing the IDR to create an accessed IDR, and storing the accessed IDR in a transactional, persistent store.

An object of an exemplary embodiment and/or exemplary method of the present invention is directed to an improved data structure for defining digital assets.

Another object of an exemplary embodiment and/or exemplary method of the present invention is directed to an improved data structure for defining digital assets for packaging, distribution, deployment, execution, synchronization, and/or lifecycle management over multi-tiered networks.

Exemplary embodiments and/or exemplary methods of the present inventions concern a data structure, program product, and product of manufacture that has an extended environment (EE) data structure that is part of a digital asset. The digital asset is transmittable over one or more multi-tiered networks. The data structure has one or more common descriptors to provide a unique identification of the digital asset on the networks. There are also one or more asset dependency descriptors to identify one or more associated digital assets. Associated digital assets are associated with the digital asset by a joint membership as parts of a whole. The asset further has one or more target server dependencies descriptors to identify a base execution environment on one or more target computers. (The base execution environment is required to execute the digital asset on the respective target computer. The base execution environment comprises zero or more other digital assets deployed to the respective target computer from one or more of the Enterprise Information Systems (EIS) or other sources.) In another exemplary embodiment and/or exemplary method, one or more EIS server dependencies descriptors are included to identify an EIS execution environment on the respective EIS/source from which the asset resides. In still other exemplary embodiments and/or exemplary methods, other descriptors are included in the extended environment data structure.

An exemplary embodiment and/or exemplary method of the present invention is directed to an extended environment data structure that is part of a digital asset, the digital asset being transmittable over one or more multi-tiered networks, the data structure including: one or more common descriptors to provide a unique identification of the digital asset on the multi-tiered networks; one or more base environment descriptors to identify a required base execution environment on one or more target computers, the base execution environment being required to execute the digital asset on a respective target computer, in which the base execution environment includes zero or more other digital assets deployed to the respective target computer from one or more Enterprise Information Systems (EIS).

Another exemplary embodiment and/or exemplary method of the present invention is directed to the extended environment data structure, in which the common descriptors include at least one of: a digital asset name of the digital asset, a unique fully qualified name of the digital asset, an address of the digital asset, a size of the digital asset, a volatility descriptor of the digital asset, a common runnable descriptor of the digital asset, a user type descriptor of the digital asset, a security descriptor of the digital asset, a price descriptor of the digital asset, an independent deployment of the digital asset, and a priority of the digital asset.

Another exemplary embodiment and/or exemplary method of the present invention is directed to the extended environment data structure, in which the base execution environment includes at least one of: one or more DBMS, one or more application servers, one or more Web servers, one or more JMS implementations, one or more J2EE application servers, one or more browsers, one or more Java Virtual Machine™ (JVM) instantiations, one or more operating systems, systems, sub-systems, applications, sub-applications, components, modules, and functions.

Another exemplary embodiment and/or exemplary method of the present invention is directed to the extended environment data structure, in which the whole is defined by at least one of: a graph, a containment graph, a tube graph, a call graph, a pure representation expressible as a graph.

Yet another exemplary embodiment and/or exemplary method of the present invention is directed to an extended environment data structure that is part of a digital asset, the digital asset being transmittable over one or more multi-tiered networks, the data structure including: one or more common descriptors to provide a unique identification of the digital asset on the multi-tiered networks; one or more asset dependency descriptors to identify one or more associated digital assets, the associated digital assets being associated with the digital asset by a joint membership as parts of a whole; and one or more base environment descriptors to identify a base execution environment on one or more target computers, the base execution environment being required to execute the digital asset on a respective target computer, in which the base execution environment includes zero or more other digital assets deployed to the respective target computer from one or more Enterprise Information Systems (EIS).

Another exemplary embodiment and/or exemplary method of the present invention is directed to the extended environment data structure, in which the asset dependency descriptors include at least one of: one or more names of other digital assets on which the digital asset is dependent, an asset identifier, and one or more unique fully qualified names of other digital assets on which the digital asset is dependent.

Yet another exemplary embodiment and/or exemplary method of the present invention is directed to an extended environment data structure that is part of a digital asset, the digital asset being transmittable over one or more multi-tiered networks, the data structure including: one or more common descriptors to provide a unique identification of the digital asset on the multi-tiered networks; one or more asset dependency descriptors to identify one or more associated digital assets, the associated digital assets being associated with the digital asset by a joint membership as parts of a whole; one or more base environment descriptors to identify a base execution environment on one or more target computers, the base execution environment being required to execute the digital asset on a respective target computer; and one or more EIS server dependencies descriptors to identify an EIS execution environment on a respective EIS on which the digital asset resides.

Another exemplary embodiment and/or exemplary method of the present invention is directed to the extended environment data structure, in which one or more EIS server dependencies descriptors identify an EIS execution environment on a respective EIS from which the digital asset is transformed into a neutral environment form.

Another exemplary embodiment and/or exemplary method of the present invention is directed to the extended environment data structure, in which one or more EIS server dependencies descriptors identify an EIS execution environment on a respective EIS from which the digital asset is prepared for transformation into a neutral environment.

Another exemplary embodiment and/or exemplary method of the present invention is directed to the extended environment data structure, in which the base execution environment includes zero or more other digital assets deployed to a respective target computer from one or more of the Enterprise Information Systems (EIS).

Another exemplary embodiment and/or exemplary method of the present invention is directed to the extended environment data structure, in which one or more EIS server dependencies identified by one or more of the EIS server dependencies descriptors include at least one of: EIS operating systems, EIS database management systems (DBMS), EIS servers, EIS application servers, EIS web application servers, one or more general business applications, one or more accounting applications, customer relationship management systems (CRM), business to business (B2B) systems, supply chain management systems, business to customer (B2C) system, order fulfillment systems, electronic shopping systems, one or more Enterprise Application Integration systems, one or more legacy interfaces, one or more Java Connector Framework™ (JCF) connectors, one or more JCF connectors for legacy interfaces, and message oriented middleware applications.

Another exemplary embodiment and/or exemplary method of the present invention is directed to the extended environment data structure, in which the EIS server dependencies include at least one of: one or more DBMS products, one or more Oracle® DBMS, one or more Sybase DBMS, and one or more DB2 DBMS.

Another exemplary embodiment and/or exemplary method of the present invention is directed to the extended environment data structure, in which zero or more of the base environment descriptors and zero or more of the EIS server dependencies descriptors are capable of being compared independently to a neutral form to determine whether a transform of the digital asset is required for the digital asset to be deployed on a respective target computer.

Another exemplary embodiment and/or exemplary method of the present invention is directed to the extended environment data structure, in which one or more of the environment base descriptors and one or more EIS server dependencies descriptors are capable of being compared to determine whether a transform of the digital asset is rewired for the digital asset to be deployed on a respective target computer.

Another exemplary embodiment and/or exemplary method of the present invention is directed to the extended environment data structure, in which the transform of the digital asset includes a transformation of data in a logic/data section of the digital asset.

Another exemplary embodiment and/or exemplary method of the present invention is directed to the extended environment data structure, further including one or more reference descriptors.

Another exemplary embodiment and/or exemplary method of the present invention is directed to the extended environment data structure, in which the reference descriptors include at least one of: a reference link descriptor, a reference file descriptor, and a reference directory descriptor.

Another exemplary embodiment and/or exemplary method of the present invention is directed to the extended environment data structure, in which the reference link descriptor provides a world-wide-web (WWW) address having contents used for processing of the digital asset.

Another exemplary embodiment and/or exemplary method of the present invention is directed to the extended environment data structure, in which the reference link descriptor provides a world-wide-web (WWW) address having contents used during execution of the digital asset.

Another exemplary embodiment and/or exemplary method of the present invention is directed to the extended environment data structure, in which the reference file descriptor is a unique fully qualified name of a file required for reference by the digital asset.

Another exemplary embodiment and/or exemplary method of the present invention is directed to the extended environment data structure, in which the reference directory descriptor provides an additional address information for locating one or more of the associated digital assets.

Another exemplary embodiment and/or exemplary method of the present invention is directed to the extended environment data structure, further including one or more transform descriptors to enable a transform of the digital asset from an EIS execution environment to the base execution environment.

Another exemplary embodiment and/or exemplary method of the present invention is directed to the extended environment data structure, in which the transform descriptor includes a properties descriptor to provide information required for use of the digital asset on an operating system of the base execution environment.

Another exemplary embodiment and/or exemplary method of the present invention is directed to the extended environment data structure, in which the transform descriptor includes a format descriptor to provide information required for use of the digital asset on an operating system of the base execution environment.

Another exemplary embodiment and/or exemplary method of the present invention is directed to the extended environment data structure, in which the transform descriptor includes a registry descriptor to provide information required for use of the digital asset on a Windows operating system o n the base execution environment.

Another exemplary embodiment and/or exemplary method of the present invention is directed to the extended environment data structure, further including one or more asset type descriptors.

Another exemplary embodiment and/or exemplary method of the present invention is directed to the extended environment data structure, in which the asset type descriptors include at least one of: static content (SC), dynamic content (DC), Enterprise JavaBeans™ (EJB), reference data (RD), session bean (SB), entity bean (EB), entity data (ED), Java™ class (JC), JavaBeans™ beans (JB), Java™ Connector Framework (JCF), and Java™ applet (JA).

Another exemplary embodiment and/or exemplary method of the present invention is directed to the extended environment data structure, further including one or more asset category descriptors.

Another exemplary embodiment and/or exemplary method of the present invention is directed to the extended environment data structure, in which the asset category descriptors include at least one of: a presentational descriptor, a transactional descriptor, an integration connector descriptor, and a relational data descriptor.

Another exemplary embodiment and/or exemplary method of the present invention is directed to the extended environment data structure, in which the asset category descriptors include at least one of: a content descriptor, a presentational component descriptor, a transactional component descriptor, an integration connector component descriptor, an object data descriptor, and a relational data descriptor.

Another exemplary embodiment and/or exemplary method of the present invention is directed to the extended environment data structure, further including one or more asset class descriptors.

Another exemplary embodiment and/or exemplary method of the present invention is directed to the extended environment data structure, in which the asset class descriptors include at least one of: base, Java™, non-Java™, language, and non-language.

Another exemplary embodiment and/or exemplary method of the present invention is directed to the extended environment data structure, further including one or more package relationship descriptors representing a part-whole relationship between the digital asset and one or more packages containing the digital asset.

Another exemplary embodiment and/or exemplary method of the present invention is directed to the extended environment data structure, in which the package relationship descriptors represent at least the following three relationships in the part-whole relationship: a mandatory part-whole relationship, a shared part-whole relationship, and a root part-whole relationship.

Another exemplary embodiment and/or exemplary method of the present invention is directed to the extended environment data structure, further including one or more security descriptors.

Another exemplary embodiment and/or exemplary method of the present invention is directed to the extended environment data structure, in which the security descriptors include at least one of the following functions: encryption, authentication, authorization, and access control.

Another exemplary embodiment and/or exemplary method of the present invention is directed to the extended environment data structure, further including one or more runnable descriptors.

Another exemplary embodiment and/or exemplary method of the present invention is directed to the extended environment data structure, further including one or more of the runnable descriptors that include a neutral format to enable deferment of an assignment to a target execution environment for the digital asset.

Another exemplary embodiment and/or exemplary method of the present invention is directed to the extended environment data structure, further including one or more of the runnable descriptors that include a target execution environment for the digital asset.

Another exemplary embodiment and/or exemplary method of the present invention is directed to the extended environment data structure, further including one or more of the runnable descriptors that include an EIS execution environment and a target execution environment for the digital asset.

Another exemplary embodiment and/or exemplary method of the present invention is directed to the extended environment data structure, further including one or more non-runnable descriptors.

Another exemplary embodiment and/or exemplary method of the present invention is directed to the extended environment data structure, further including one or more non-runnable descriptors that include a description of the base execution environment for the digital asset.

Another exemplary embodiment and/or exemplary method of the present invention is directed to the extended environment data structure, further including one or more of the non-runnable descriptors that include a neutral format to enable deferment of an assignment to a target execution environment for the digital asset.

Another exemplary embodiment and/or exemplary method of the present invention is directed to the extended environment data structure, further including one or more non-runnable descriptors that include description of the EIS execution environment and the base execution environment for the digital asset.

Another exemplary embodiment and/or exemplary method of the present invention is directed to the extended environment data structure, further including one or more personalization descriptors to enable the digital asset to be customized upon delivery to one or more of the base execution environments.

Another exemplary embodiment and/or exemplary method of the present invention is directed to the extended environment data structure, in which the personalization descriptors include one or more data keys, being derived from a directory service, to establish a linkage among data elements in the EIS execution environment.

Another exemplary embodiment and/or exemplary method of the present invention is directed to the extended environment data structure, in which the directory service is one or more of the following in combination or a federated hierarchy: an LDAP server, Single-Sign-On service, and/or JNDI service.

Another exemplary embodiment and/or exemplary method of the present invention is directed to the extended environment data structure, in which a linkage of data elements resolve to a DBMS query in which one or more EIS databases are partitionable specifically for the needs of one or more target environments.

Another exemplary embodiment and/or exemplary method of the present invention is directed to the extended environment data structure, in which a linkage of data elements resolve to one or more content related assets that are partitionable specifically for the needs of one or more target environments.

Another exemplary embodiment and/or exemplary method of the present invention is directed to the extended environment data structure, in which a linkage of data elements resolve to one or more application related assets that are partitionable specifically for the needs of one or more target environments.

Another exemplary embodiment and/or exemplary method of the present invention is directed to the extended environment data structure, in which the application related assets include at least one of: presentational components and transactional components.

Another exemplary embodiment and/or exemplary method of the present invention is directed to the extended environment data structure, in which the application related assets include at least one of: JSP, Java™ Servlet, and Java™ EJB.

Another exemplary embodiment and/or exemplary method of the present invention is directed to the extended environment data structure, in which the personalization descriptors include one or more data keys to establish a linkage among data elements in an EIS execution environment.

Another exemplary embodiment and/or exemplary method of the present invention is directed to the extended environment data structure, in which the personalization descriptors include one or more data keys to establish a linkage among logic elements in an EIS execution environment.

Another exemplary embodiment and/or exemplary method of the present invention is directed to the extended environment data structure, further including one or more pricing descriptors.

Another exemplary embodiment and/or exemplary method of the present invention is directed to the extended environment data structure, in which the pricing descriptors describe information about at least one of: a price, a price scheme, a subscription price scheme, a pay to own price scheme, a pay to use price scheme, a one time payment price scheme, a payment detail, payment method, a check description, a credit card description, and a credit card number.

Another exemplary embodiment and/or exemplary method of the present invention is directed to the extended environment data structure, further including one or more target information descriptors.

Another exemplary embodiment and/or exemplary method of the present invention is directed to the extended environment data structure, in which the target information descriptors describe at least one of: a well known user, an anonymous user, one or more user groups, an entire user group, a target machine, an identifiable segment of target machines a collection of target machines, an internet protocol address mask, and a group of target computers in a node collection structure.

Another exemplary embodiment and/or exemplary method of the present invention is directed to the extended environment data structure, further including one or more schema descriptors.

Another exemplary embodiment and/or exemplary method of the present invention is directed to the extended environment data structure, in which the schema descriptors provide information to describe at least one of: database table names and definitions, database column names and definitions, database key identifiers and value ranges, database view names and definitions, and other well known database schema elements.

Another exemplary embodiment and/or exemplary method of the present invention is directed to the extended environment data structure, further including one or more metadata descriptors.

Another exemplary embodiment and/or exemplary method of the present invention is directed to the extended environment data structure, in which the metadata descriptors provide information to describe any or more of: repository object definitions, scope object definitions, module object definitions, operation object definitions, exception object definitions, constant object definitions, properties object definitions, attribute object definitions, relationship object definitions, type object definitions, and other well known metadata object definitions.

Another exemplary embodiment and/or exemplary method of the present invention is directed to the extended environment data structure, further including one or more distribution logic descriptors, each having one or more transactions rules and one or more concurrency rules.

Another exemplary embodiment and/or exemplary method of the present invention is directed to the extended environment data structure, in which the transactions rules specify any of a number and a frequency of times that the digital asset is distributable to one or more of the target computers.

Another exemplary embodiment and/or exemplary method of the present invention is directed to the extended environment data structure, in which the concurrency rules specify whether there are any restrictions on distribution of the digital asset with respect to the distribution of one or more other digital assets.

Another exemplary embodiment and/or exemplary method of the present invention is directed to the extended environment data structure, in which the data structure is received from one or more network connections.

Another exemplary embodiment and/or exemplary method of the present invention is directed to the extended environment data structure, in which the data structure is sent over one or more network connections.

Another exemplary embodiment and/or exemplary method of the present invention is directed to the extended environment data structure, in which the data structure is stored on one or more memories.

Another exemplary embodiment and/or exemplary method of the present invention is directed to the extended environment data structure, in which information in the data structure is modified at one or more locations on one or more of the multi-tiered networks as the digital asset is distributed over the multi-tiered networks.

Yet another exemplary embodiment and/or exemplary method of the present invention is directed to an extended environment data structure that is part of a digital asset, the digital asset being transmittable over one or more multi-tiered networks, the data structure including: one or more common descriptor apparatus, arrangement or structure for providing a unique identification of the digital asset on the networks; one or more asset dependency descriptor apparatus, arrangement or structure for identifying one or more associated digital assets, the associated digital assets being associated with the digital asset by a joint membership as parts of a whole; and one or more base environment descriptor apparatus, arrangement or structure for identifying a base execution environment on one or more target computers, the base execution environment being required to execute the digital asset on a respective target computer, in which the base execution environment includes zero or more other digital assets deployed to the respective target computer from one or more Enterprise Information Systems (EIS).

Yet another exemplary embodiment and/or exemplary method of the present invention is directed to a computer program product having an extended environment data structure that is part of a digital asset, the digital asset being transmittable over one or more multi-tiered networks, the data structure including: one or more common descriptors to provide a unique identification of the digit asset on the multi-tiered networks; one or more base environment descriptors to identify a base execution environment on one or more target computers, the base execution environment being required to execute the digital asset on a respective target computer, in which the base execution environment includes zero or more other digital assets deployed to the respective target computer from one or more Enterprise Information Systems (EIS).

Another exemplary embodiment and/or exemplary method of the present invention is directed to the computer program product having the extended environment data structure, further including: one or more asset dependency descriptors to identify one or more associated digital assets, the associated digital assets being associated with the digital asset by a joint membership as parts of a whole.

Yet another exemplary embodiment and/or exemplary method of the present invention is directed to a memory structure having an extended environment data structure that is part of a digital asset stored on the memory structure, the digital asset being transmittable over one or more multi-tiered networks, the data structure including: one or more common descriptors to provide a unique identification of the digit asset on the multi-tiered networks; one or more base environment descriptors to identify a base execution environment on one or more target computers, the base execution environment being required to execute the digital asset on a respective target computer, in which the base execution environment includes zero or more other digital assets deployed to the respective target computer from one or more Enterprise Information Systems (EIS).

Another exemplary embodiment and/or exemplary method of the present invention is directed to the memory structure having an extended environment data structure, further including: one or more asset dependency descriptors to identify one or more associated digital assets, the associated digital assets being associated with the digital asset by a joint membership as parts of a whole.

Another exemplary embodiment and/or exemplary method of the present invention is directed to the extended environment data structure, in which the transform of the digital asset includes a transformation of data in a logic/data section of the digital asset.

An object of an exemplary embodiment and/or exemplary method of the present invention is directed to providing an improved system and method for discovering and/or identifying and extracting digital assets from an EIS or other sources so that EIS/source systems, sub systems, applications, sub applications, components, modules, or functions, and/or objects can be packaged, distributed, deployed, executed, synchronized, and/or managed through a lifecycle in a distributed manner.

Another object of an exemplary embodiment and/or exemplary method of the present invention is directed to providing an improved system and method for discovering and/or identifying, extracting, packaging, distributing, deploying, and/or exporting, web applications, components, modules or functions and/or objects over the Internet.

Another object of an exemplary embodiment and/or exemplary method of the present invention is directed to providing an improved system and method for discovering and/or identifying types of digital assets that are extracted from one or more EISs and identifying those digital assets according to their respective type so that the digital asset can be exported, e.g., in packages, from the EIS as a means of distribution, deployment, and/or execution over tiers of the network.

Exemplary embodiments and/or exemplary methods of the present inventions concern a system, method, article of manufacture, and a computer program product that identifies (discovers) member objects of one or more computer system parts in an Enterprise Information System (EIS) or other sources while establishing at least one relationship (e.g., topographical) among the member objects. This involves traversing one or more computer file systems of the EIS/ source to find one or more of the member objects. For each member object found, a digital asset identifier of the found member object is placed in an intermediate representation. The intermediate representation is a graph with nodes and edges. Each of the digital asset identifiers corresponds to one of the nodes of the graph. The edges represent the relationship. A digital asset is created from the member object by placing the member object in a logic/data section of the digital asset and attaching an extended environment data structure to the logic/data section. The digital asset is stored in an asset inventory container object. This may be repeated for each found member object until the intermediate representation fully describes the computer system part and the asset inventory container object is a complete inventory of the digital assets of interest in the computer system part. Additional structures describing attributes of the digital asset created can also be constructed. Further, the descriptive information related to the digital asset may be placed in the respective extended environment data structure.

An exemplary embodiment and/or exemplary method of the present invention is directed to a discovery method for identifying member objects of one or more computer system parts in an Enterprise Information System (EIS) and for establishing at least one topographical relationship among the member objects, the discovery method being executable by one or more computers, each of the computers having one or more memories and one or more central processing units (CPU), the method including the steps of: (a) traversing one or more computer file systems of the EIS to find one or more of the member objects, the member objects meeting one or more selection criteria; (b) for each member object found, placing a digital asset identifier of the member object in an intermediate representation, the intermediate representation being a graph with nodes and edges, each of the digital asset identifiers corresponding to one of the nodes of the graph, the edges representing the topographical relationship; (c) creating a digital asset from the member object by placing the member object in a logic/data section of the digital asset and attaching an extended environment data structure to the logic/data section; (d) storing the digital asset in an asset inventory container object; and (e) repeating steps (a) through (d) until the intermediate representation sufficiently describes the computer system part, in which the asset inventory container object is a sufficiently complete inventory of the digital assets of the computer system part that meet the selection criteria.

Another exemplary embodiment and/or exemplary method of the present invention is directed to the discovery method, further including the inserted step (d1) of creating an entry in an asset definition data structure, the entry having descriptions of one or more digital asset attributes of the digital asset, the asset definition data structure being a complete list of the digital assets of the computer system part that meet the selection criteria.

Another exemplary embodiment and/or exemplary method of the present invention is directed to the discovery method, in which the computer system parts include at least one of the following: a computer system, a computer subsystem, an application, a sub-application, a module, and a function.

Another exemplary embodiment and/or exemplary method of the present invention is directed to the discovery method, further including the step of storing one or more descriptors in the extended environment data structure after the extended environment data structure is created in step c.

Another exemplary embodiment and/or exemplary method of the present invention is directed to the discovery method, in which the descriptors include one or more common descriptors to provide a unique identification of the digital asset on the multi-tiered networks.

Another exemplary embodiment and/or exemplary method of the present invention is directed to the discovery method, in which the common descriptor includes at least one of: a digital asset name of the digital asset, a unique fully qualified name of the digital asset, an address of the digital asset, a unique hash value for the digital asset, a checksum for the digital asset, and a size of the digital asset.

Another exemplary embodiment and/or exemplary method of the present invention is directed to the discovery method, in which the descriptors include one or more asset dependency descriptors.

Another exemplary embodiment and/or exemplary method of the present invention is directed to the discovery method, in which the asset dependency descriptors include any at least one of: at least one names of other digital assets on which the digital asset is dependent, an asset identifier, and one or more unique fully qualified names of other digital assets on which the digital asset is dependent.

Another exemplary embodiment and/or exemplary method of the present invention is directed to the discovery method, in which the descriptors include one or more reference descriptors.

Another exemplary embodiment and/or exemplary method of the present invention is directed to the discovery method, in which the reference descriptors include at least one of: a reference link descriptor, a reference file descriptor, and a reference directory descriptor.

Another exemplary embodiment and/or exemplary method of the present invention is directed to the discovery method, in which the reference link descriptor provides a world-wide-web (WWW) address having contents used for processing of the digital asset.

Another exemplary embodiment and/or exemplary method of the present invention is directed to the discovery method, in which the reference link descriptor provides a world-wide-web (WWW) address having contents used during execution of the digital asset.

Another exemplary embodiment and/or exemplary method of the present invention is directed to the discovery method, in which the reference directory descriptor provides an additional address information for locating one or more of the associated digital assets.

Another exemplary embodiment and/or exemplary method of the present invention is directed to the discovery method, in which the reference file descriptor is a unique fully qualified name of a file required for reference by the digital asset.

Another exemplary embodiment and/or exemplary method of the present invention is directed to the discovery method, in which the descriptors include one or more runnable descriptors for indicating that the digital asset is a runnable digital asset.

Another exemplary embodiment and/or exemplary method of the present invention is directed to the discovery method, in which one or more of the runnable descriptors include a description of a neutral execution environment, enabling dynamic targeting of the digital asset for one or more target environments.

Another exemplary embodiment and/or exemplary method of the present invention is directed to the discovery method, in which one or more of the runnable descriptors include a description of an EIS execution environment.

Another exemplary embodiment and/or exemplary method of the present invention is directed to the discovery method, in which the descriptors include one or more non-runnable descriptors for indicating that the digital asset is a non-runnable digital asset.

Another exemplary embodiment and/or exemplary method of the present invention is directed to the discovery method, in which one or more of the non-runnable descriptors include a description of an EIS execution environment.

Another exemplary embodiment and/or exemplary method of the present invention is directed to the discovery method, in which one or more of the non-runnable descriptors include a description of a neutral execution environment, enabling the dynamic targeting of the digital asset for one or more target environments.

Another exemplary embodiment and/or exemplary method of the present invention is directed to the discovery method, in which the asset definition data structure includes at least one of: an asset identification, an asset location, a URL, a name, an asset type, and a version.

Yet another exemplary embodiment and/or exemplary method of the present invention is directed to a discovery system for identifying one or more member objects of one or more computer system parts of an Enterprise Information System (EIS) and for establishing at least one topographical relationship among the member objects, the system including: a traversor to traverse one or more computer file systems to find one or more of the member objects, the member objects meeting one or more selection criteria; an intermediate representation builder to place, for each member object found by the traversor, a digital asset identifier in an intermediate representation, the intermediate representation being a graph with nodes and edges, the digital asset identifier corresponding to one of the nodes of the graph, the edges representing the topographical relationship; a digital asset creator to create a digital asset from the member object by placing the data object in a logic/data section of the digital asset and attaching an extended environment data structure to the logic/data section; and an inventory function to store the digital asset in an asset inventory container object.

Yet another exemplary embodiment and/or exemplary method of the present invention is directed to a discovery system for identifying member objects of one or more computer system parts of an Enterprise Information System (EIS) and for establishing at least one topographical relationship among the member objects, the system including: an apparatus, arrangement or structure for traversing one or more computer file systems to find one or more of the member objects, the member objects meeting one or more selection criteria; an apparatus, arrangement or structure for placing a digital asset identifier in an intermediate representation for each member object found, the intermediate representation being a graph with nodes and edges, the digital asset identifier corresponding to one of the nodes of the graph, the edges representing the topographical relationship; an apparatus, arrangement or structure for creating a digital asset from the member object by placing the member object in a logic/data section of the digital asset and attaching an extended environment data structure to the logic/data section; and an apparatus, arrangement or structure for storing the digital asset in an asset inventory container object.

Yet another exemplary embodiment and/or exemplary method of the present invention is directed to a computer program product having a computer program for performing the steps of: (a) traversing one or more computer file systems to find one or more of the member objects, the member objects meeting one or more selection criteria; (b) for each member object found, placing a digital asset identifier of the respective member object in an intermediate representation, the intermediate representation being a graph with nodes and edges, the digital asset identifier corresponding to one of the nodes of the graph, the edges representing the topographical relationship; (c) creating a digital asset from the data object by placing the member object in a logic/data section of the digital asset and attaching an extended environment data structure to the logic/data section; and (d) storing the digital asset in an asset inventory container object.

Yet another exemplary embodiment and/or exemplary method of the present invention is directed to a computer memory storing a computer program for performing the steps of: (a) traversing one or more computer file systems to find one or more of the member objects, the member objects meeting one or more selection criteria; (b) for each member object found, placing a digital asset identifier of the member object in an intermediate representation, the intermediate representation being a graph with nodes and edges, the digital asset identifier corresponding to one of the nodes of the graph, the edges representing the topographical relationship; (c) creating a digital asset from the member object by placing the member object in a logic/data section of the digital asset and attaching an extended environment data structure to the logic/data section; and (d) storing the digital asset in an asset inventory container object.

Yet another exemplary embodiment and/or exemplary method of the present invention is directed to a discovery method executable by a computer with one or more memories and one or more central processing units (CPUs), the method including the steps of: (a) determining a starting point in a sub part of one or more application programs, the sub part of the application program having a path of execution; (b) determining one or more edges of the path of execution and one or more elements of the sub part of the application program, each of the elements connected by at least one of the edges; (c) placing the elements in an asset candidate list; (d) classifying one or more of the elements in the asset candidate list according to an asset type; and (e) determining one or more of the elements in the asset candidate list that is to be included in an asset package.

Another exemplary embodiment and/or exemplary method of the present invention is directed to the discovery method, in which the path of execution is at least one of: a call graph, an execution call graph, a dependency tree, a set of one or more hyperlinks, an expressed call graph, and an implied call graph.

Another exemplary embodiment and/or exemplary method of the present invention is directed to the discovery method, in which the edges are identified as at least one of: a hyperlink, a method call, a program call, a sub routine call, a program name in an execution list, and a call to an external program.

Another exemplary embodiment and/or exemplary method of the present invention is directed to the discovery method, in which the sub part is an entire application program.

Another exemplary embodiment and/or exemplary method of the present invention is directed to the discovery method, in which the application program is in a form of at least one of: Perl, PHP, Java™, Microsoft® C##, C++, ASP, Visual Basic®, Delphi™, Fortran™, a web page, and a JavaServer Page™ (JSP).

Another exemplary embodiment and/or exemplary method of the present invention is directed to the discovery method, in which the edges are determinable by a text search of the part of the application program.

Another exemplary embodiment and/or exemplary method of the present invention is directed to the discovery method, in which the edges are determinable by a text search of the part of a reverse engineered application program.

Yet another exemplary embodiment and/or exemplary method of the present invention is directed to a discovery method executable by a computer with one or more memories and one or more central processing units (CPUs), the method including the steps of: (a) determining a top level page in a set of web pages, the set of web pages related to one another by a path of execution; (b) determining one or more hyperlinks as edges of the path of execution and one or more elements of the sub part of the application program, each of the elements connected by at least one of the hyperlinks; (c) placing the elements in an asset candidate list; (d) classifying one or more of the elements in the asset candidate list according to an asset type; and (e) determining one or more of the elements in the asset candidate list that is to be included in an asset package.

Another exemplary embodiment and/or exemplary method of the present invention is directed to the discovery method, in which the top-level page is a JavaServer Page™ (JSP).

Another exemplary embodiment and/or exemplary method of the present invention is directed to the discovery method, in which the top-level page includes at least one of: HTML and Java™ source code.

Another exemplary embodiment and/or exemplary method of the present invention is directed to the discovery method, in which the hyperlinks are identified by a text search of the top-level page.

Another exemplary embodiment and/or exemplary method of the present invention is directed to the discovery method, in which the elements are java Java™ objects that the top-level page will instantiate.

Another exemplary embodiment and/or exemplary method of the present invention is directed to the discovery method, in which the asset types are determined by which classes of Java™ objects are loaded by a servlet and the classes are mapped by a Java Servlet™ specification.

Another exemplary embodiment and/or exemplary method of the present invention is directed to the discovery method, in which one or more of the elements ha s a static HTML asset type.

Another exemplary embodiment and/or exemplary method of the present invention is directed to the discovery method, in which static HTML text of the static HTML asset type has one or more image tags and an additional element is created in the asset candidate list for one or more of the image tags.

Another exemplary embodiment and/or exemplary method of the present invention is directed to the discovery method, in which the image tag includes at least one of: IMG and A.

Another exemplary embodiment and/or exemplary method of the present invention is directed to the discovery method, in which one or more of the elements has an asset type of a Java™ class file (JC).

Another exemplary embodiment and/or exemplary method of the present invention is directed to the discovery method, further including the step of: generating an external call graph for the JC, the external call graph for the JC being a list of method calls made within a class representation of the JC.

Another exemplary embodiment and/or exemplary method of the present invention is directed to the discovery method, in which the external call graph for the JC is generated by at least one of: byte code examination and de-compilation technology.

Another exemplary embodiment and/or exemplary method of the present invention is directed to the discovery method, in which one or more of the method calls of the external call graph for the JC creates an element in the asset candidate list.

Another exemplary embodiment and/or exemplary method of the present invention is directed to the discovery method, in which one or more of the elements has a JAR file asset type.

Another exemplary embodiment and/or exemplary method of the present invention is directed to the discovery method, in which the JAR file has at least one of the following file extensions: "JAR", "WAR", and "EAR".

Another exemplary embodiment and/or exemplary method of the present invention is directed to the discovery method, further including the step of generating an external call graph for each java class in the JAR file, the external call graphs for the Java™ classes in the JAR file being a list of JAR method calls made within a class representation of the JAR file.

Another exemplary embodiment and/or exemplary method of the present invention is directed to the discovery method, in which the external call graph for the JAR file is generated by at least one of: byte code examination and de-compilation technology.

Another exemplary embodiment and/or exemplary method of the present invention is directed to the discovery method, in which one or more of the elements has an EJB asset type.

Another exemplary embodiment and/or exemplary method of the present invention is directed to the discovery method, further including the steps of: (f) matching a method signature against an interface of one or more of the EJB asset types; and (g) adding an EJB digital asset to the asset candidate list if there is no match.

BRIEF DESCRIPTION OF THE DRAWINGS

FIGS. 1A–1E, are block diagrams illustrating various prior art middleware systems.

FIG. 5 is a block diagram illustrating an asset definition data structure according to one embodiment of the present invention.

FIG. 6 is a block diagram illustrating a deployable asset data structure according to one embodiment of the present invention.

FIG. 7 is a block diagram illustrating a target asset data structure according to one embodiment of the present invention.

FIG. 8 is a block diagram illustrating a target deployment queue data structure according to one embodiment of the present invention.

FIG. 12 is a block diagram illustrating a package definition data structure according to one embodiment of the present invention.

FIG. 13D is a block diagram of a packaging queue according to one embodiment of the present invention.

FIG. 13I is block diagram illustrating a client asset table according to one embodiment of the present invention.

FIG. 13J is a block diagram illustrating the asset descriptor manifest data structure according to one embodiment of the present invention.

FIG. 13L is a block diagram of a node registration specification data structure according to one embodiment of the present invention.

FIG. 20 is a flowchart of a publishing agent method according to one embodiment of the present invention.

DETAILED DESCRIPTION

Figure 1F:
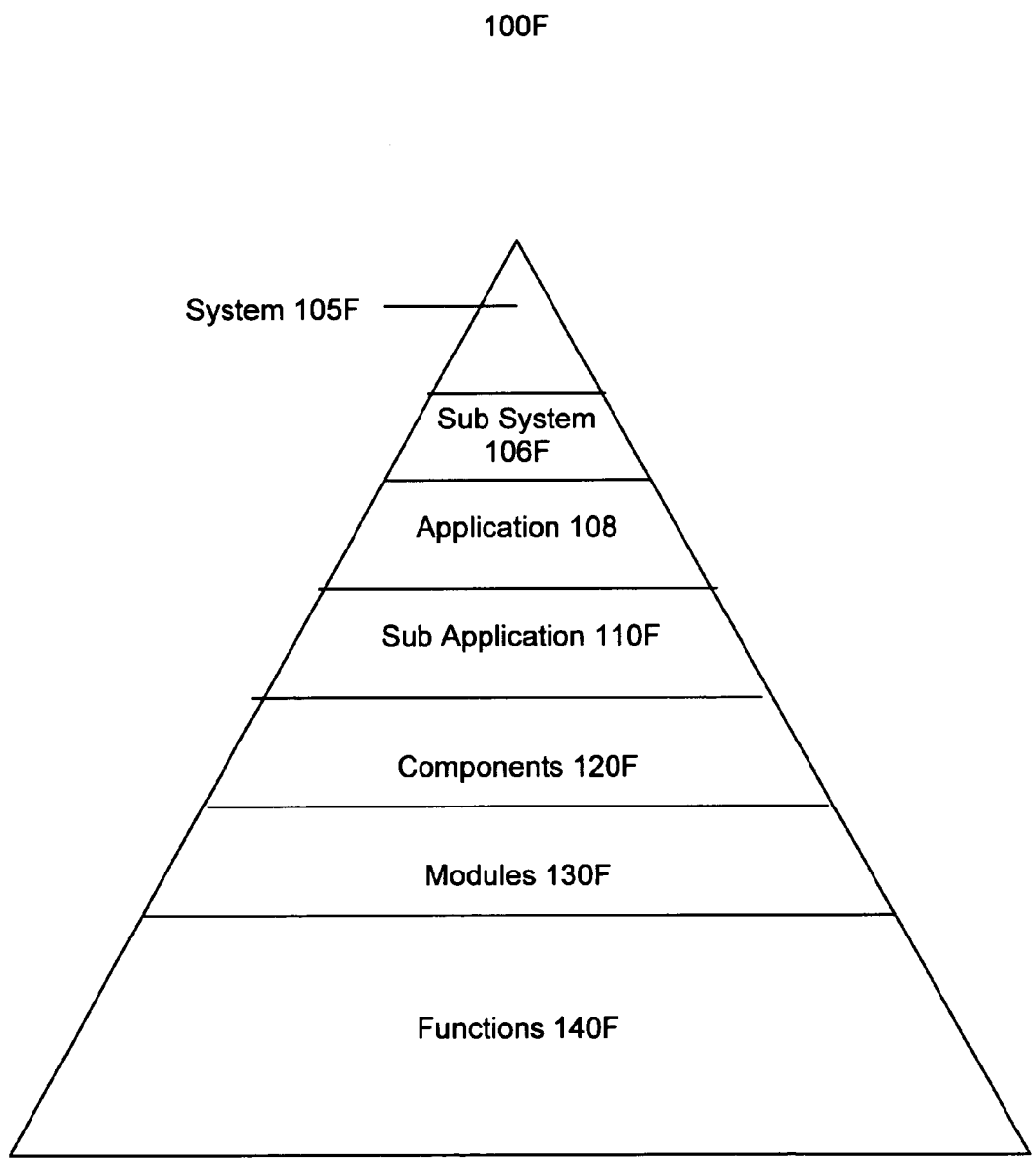
FIG. 1F is a diagram showing a prior art hierarchical relationship among system and application parts.

In an example embodiment of the present invention, a subapplication (hereinafter also referred to as a "package") of a larger parent application, such as, for example, an Enterprise Information System ("EIS"), may be distributed and/or transformed over two or more tiers (discussed below) of a communications network. According to this embodiment, after the distribution and/or transformation of the package, the package may be distributed, cached, and/or executed on one or more target computer nodes. As discussed below, a computer node may be targeted by computer and/or other related hardware, the software environment, and/or platform (e.g., computer and/or network operating system).

The example embodiment of the present invention may organize all or part of an application into one or more packages because packages may be more easily and rapidly distributed over a communications network than the entire application from which the package originates. Package distribution over a communications network, according to the example embodiment, may use fewer network resources and may use those resources more efficiently.

Additionally, the size and/or proprietary nature of an application may limit its distribution and/or execution on a target computer node (also referred to as a target node). In the example embodiment of the present invention, essential (i.e., relevant) and/or non-proprietary part(s) of an application (e.g., an EIS) may be distributed over a communications network and executed on one or more target odes. According this embodiment, these distributed packages may execute under a more desirable client-specific environment closer to or on the end destination computer node.

In a one embodiment, the relevant system parts (i.e., packages) are distributed so that they are physically closer to the intended target(s) (i.e., target nodes and clients). Since only the packages are distributed close to the target(s), less storage is need at, or near, the target as compared to the case where the entire system (e.g., an EIS) is distributed. Distributing only the essential portions of the system required by the target and placing those essential portions in closer physical proximity to the target results in a faster and more reliable execution at the target. This is because network errors and delays are reduced because much less of the network is used during the execution of the packages on the target.

A benefit of distributing these packages is that the integrity (i.e., the security, transactions, and coherence) of the source environment (e.g., EIS) may be maintained at one or more of the targets (e.g., target nodes and/or clients) while the original package (i.e., subapplication or system part) remains on the source (EIS). Therefore, the infrastructure to maintain the packages can be reduced by locating the distributed packages at one or more of the clients since more of the client resources are used to support the source resources allowing the resources of the source to be used more efficiently.

In one embodiment of the present invention, a package may be transformed in order to operate on a target computer node. A target computer node may consist of a hardware and software environment/platform different from the environment/platform for which the application is designed and/or programmed. For example, if an application is designed and/or programmed to execute on Sun®'s Solaris™ operating environment running IBM®'s DB2™ database software and using the BEA WebLogic Server™, a package (i.e., subapplication) of the application may be transformed to run on Microsoft®'s Windows NT™ operating system running Hypersonic SQL™ database software using the JBoss™ Web application server and Apache's Jakarta Tomcat™ software. In another example, an application designed and/or programmed to execute on the HP-UX operating environment running Oracle®'s database software using Netscape Enterprise Server software may be partitioned into a package transformed for a computer node using the Macintosh operating system ("MacOS") running W3C®'s Jigsaw Web server platform using Microsoft®'s FoxBASE+™ database software. These examples illustrate the transformation of a package from the original application environment/platform to the suitable environment/platform for the target computer node to which the package will be distributed according to one embodiment of the present invention.

Figure 1G:
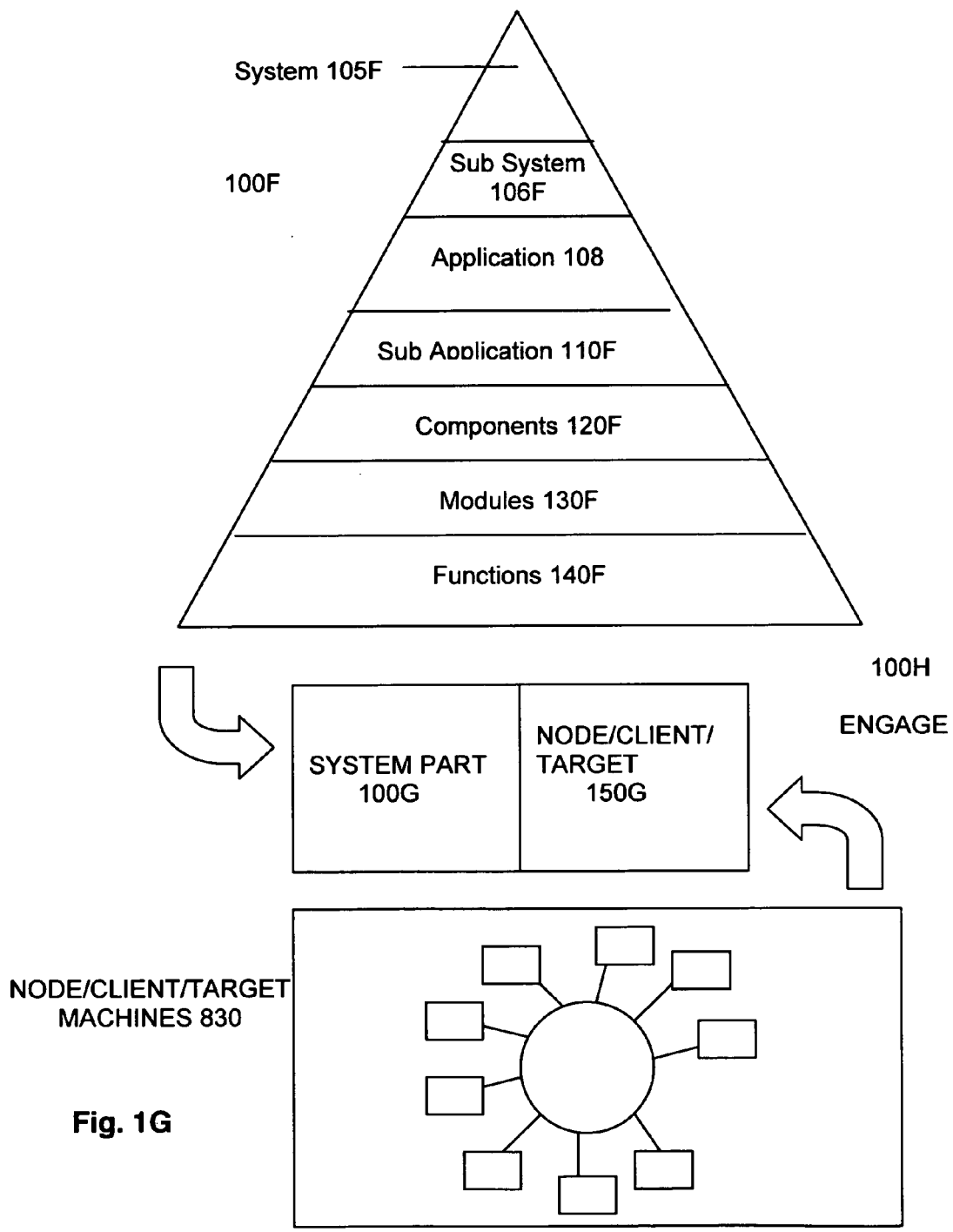
FIG. 1G is a diagram illustrating the conceptual association of one or more system parts to one or more target nodes (e.g., nodes, clients, and other targets) using an engagement table.

FIG. 1G is a diagram illustrating the conceptual association of one or more system parts to one or more target nodes (e.g., nodes, clients, and other targets) using an engagement table. The association of a system part 100G with a target node 150G in an engagement table may facilitate the distribution of that system part 100G to the proper destination—the target node 150G. This association, also described as an "engagement", can take many embodiments. In its most simple embodiment, one system part 100G is engaged to one target node 150G (e.g., a computing device). In another embodiment, one system part 100G is engaged to more than one target node 150G. In another embodiment, many system parts 100G are engaged to one target node 150G. In another embodiment, many system parts 100G are engaged to many target computing devices 150G.

In an alternative embodiment, one or more target nodes (e.g., target computing devices) may be identified, addressed, and/or organized into classes. Such classes may reflect geographic, logical, business category-based, and/or any other general class relationships. These classes may contain subclasses in a hierarchical relationship. The target nodes 110G in these classes may be engaged together to one or more system parts 100G.

In an alternative embodiment, one or more system parts 100G can be identified, addressed, and/or organized into classes. Such classes can reflect technical requirement, business purpose, or any other general class relationships. These classes may contain subclasses in a hierarchical relationship. The system parts 100G in these classes may be engaged together to one or more target computing devices 150G.

In the example embodiment, these engagements are achieved through use of an engagement table data structure.

Figure 1H:
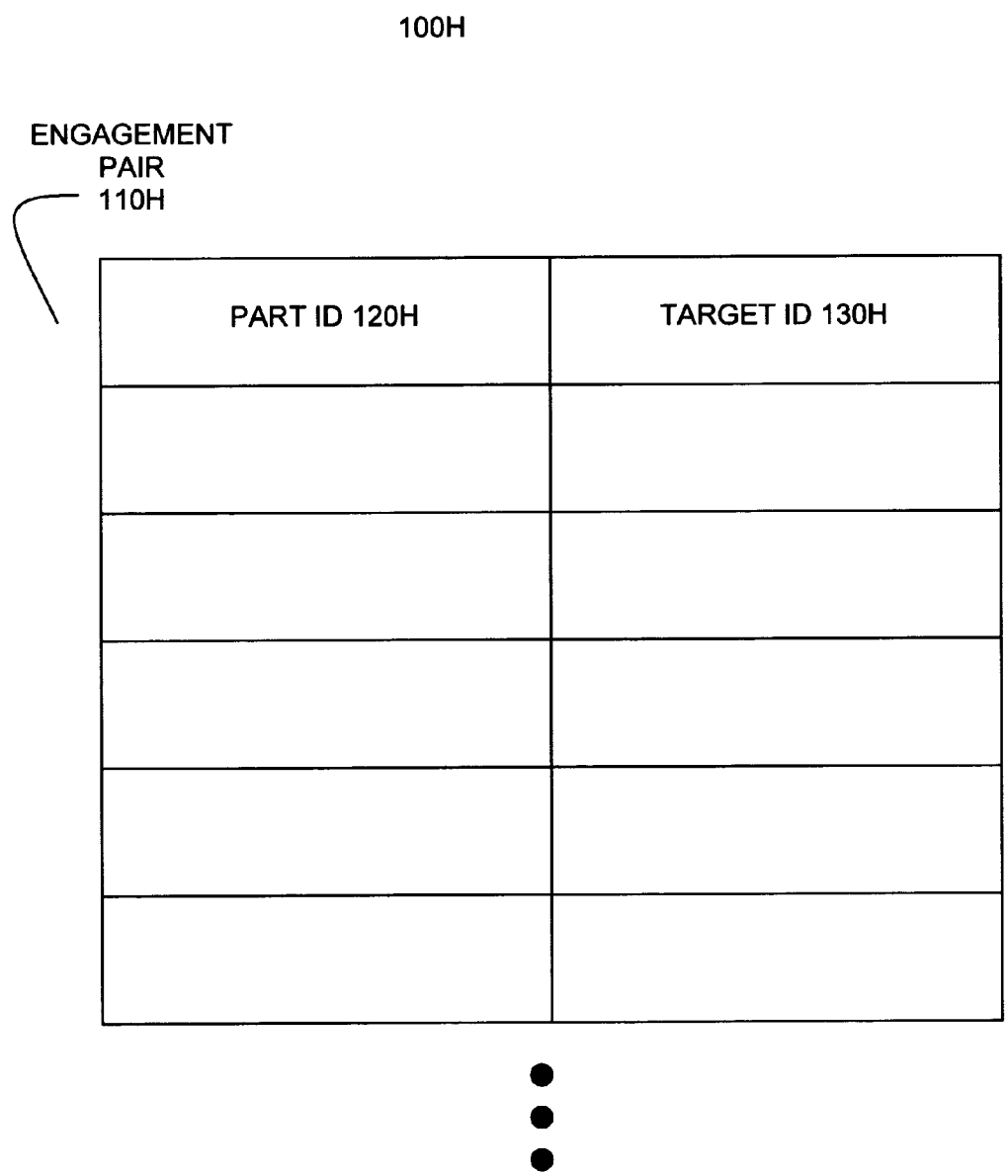
FIG. 1H is a block diagram illustrating an engagement table according to one embodiment of the present invention.

FIG. 1H is a block diagram illustrating an engagement table according to one embodiment of the present invention. The engagement table 100H may contain a plurality of system part 120H to target node 130H pairs called engagement pairs 110H. Each engagement pair 110H may represent a relationship between one system part and one target node (e.g., computing device). One to many relationships may be defined using multiple engagement pairs 110H. Each engagement pair may contain a unique part identifier 120H of the system part. For example, a part identifier 120H include system name, subsystem name, application name, component name, module name, function name, a fully qualified address, and any other identifier capable of uniquely identifying the respective system part on the network. Each engagement pair may also contain a target identifier 130H of the target node. For example, a target identifier 130H may include a target ID, a client ID, an internet protocol address (IP address), a network name address, node ID, and/or any other identifier capable of uniquely identifying the respective target node on the network.

In the example embodiment of the present invention, a package may be a portion of an application partitioned according to some package boundary. This package boundary may be defined according to, for example, an Application Programming Interface ("API"), an application component boundary, an Internet protocol boundary, and/or any other logical program/software division in the parent application (e.g., an edge of an application program call graph).

According to one embodiment of the present invention, a package boundary may be defined according to at least one of an open API, a proprietary API made available to a user/developer, or some other extension framework. For example, a TCP/IP standard library, a C/C++ library, a CORBA library, Java™ Servlets, JavaServer Pages™ ("JSP"), Enterprise JavaBeans™ ("EJB"), Java™ DataBase Connectivity ("JDBC"), Java™ Messaging Service ("JMS"), Hypertext Markup Language ("HTML"), HyperText Transfer Protocol ("HTTP"), and Wireless Markup Language ("WML") may all be examples of an open API that may serve as part or all of a package boundary according to one embodiment of the present invention. A Java 2 Platform Enterprise Edition™ ("J2EE"), a Microsoft® Foundation Class ("MFC"), a Component Object Model ("COM"), a Distributed Component Object Model ("DCOM"), an Oracle® Call Interface ("OCI"), an Oracle® Pro*C library, and an Informix® ESQL C library may all be examples a proprietary API that may serve as part or all of a package boundary according to one embodiment of the present invention. Examples of an extension framework that may serve as part or all of a package boundary according to one embodiment of the present invention may include a Unix® shell script, a Windows® batch file, an IBM® Customer Information Control System ("CICS") transaction processing program, an IBM® Job Control Language ("JCL") file, a Visual Basic® script, and a Visual Basic® program and/or procedure.

An asset may be a logical organization of information (e.g., software and data) that may serve as all or part of a package according to one embodiment of the present invention. A package structure may be composed of one or more assets (further described below) and a package boundary may be defined according to the boundaries of these component assets according to one embodiment of the present invention. An asset boundary, like a package boundary, may be defined according to, for example, an open API, a proprietary API, an extension framework, an application component boundary, an Internet protocol boundary, a logical program/software division in the application, and an edge of an application program call graph for the given application according to an example embodiment of the present invention.

According to one embodiment of the present invention, various kinds of assets may be used in a package. For example, as described below, static content assets, dynamic content assets, Enterprise JavaBeans™ assets, relational data assets (including reference data assets and entity data assets), Java™ class assets, and Non-Java™ assets are all possible types of assets that may be used according to one embodiment of the present invention.

A static content ("SC") asset may include information that remains constant over time according to one embodiment of the present invention. For example, an SC asset may include a distinct file that may be transferred from an HTTP server (e.g., a Web server) to an HTTP client (e.g., a Web browser) according to one embodiment of the present invention. According to this example, the asset boundary of the static content asset may be the HTTP protocols necessary to move the SC asset from the HTTP server to the HTTP client. These boundaries may define an asset as a SC asset. According to one embodiment of the present invention, an SC asset may include, for example, an HTML file for a Web page, an image (e.g., a JPEG image), a movie, an animation, and/or an audio file (e.g., an MP3 file).

A dynamic content ("DC") asset may include information that changes over time according to one embodiment of the present invention. For example, a DC asset may include a Java servlet and/or a JavaServer Page™ ("JSP"). A Java™ servlet may be a single class file that may produce an HTML response to an HTTP request. The asset boundaries of a Java™ servlet may be the boundaries defined by the Java™ Servlet API for the servlet components such as, for example, the class (i.e., the class file), the Java™ servlet code, and deployment descriptor information. A JSP may be an eXtensible Markup Language ("XML") file compiled at runtime into a servlet according to one embodiment of the present invention. Therefore, the asset boundary of a JSP may also be defined by the Java™ Servlet API and/or the JSP specification. According to the one embodiment of the present invention, a DC asset may include, for example, a JSP, a Java™ servlet, a Microsoft® Active Server Page ("ASP"), deployment descriptor information (e.g., optional information that may be associated with a JSP and/or Java™ servlet), PHP (Hypertext Preprocessor), a Common Gateway Interface ("CGI") progranilscript, and/or a Cold Fusion program.

An Enterprise JavaBean™ ("EJB") asset may include a JavaBean™ such as a Session Bean ("SB") and an Entity Bean ("EB") according to one embodiment of the present invention. The asset boundaries of an EJB asset may be the boundaries defined by the EJB specification. The EJB specification describes home class files (e.g., skeletons), remote class files (e.g., stubs), and implementation class files which may associated with each other and incorporated in an EJB. The EJB specification also describes deployment descriptor information associated with these class files. The deployment descriptor information may also be included in an EJB. An EJB may be used, for example, as part of or in support of the business logic in a work flow system; a pricing algorithm; an inventory management system; a purchasing system; dynamic customer, inventory, and/or pricing data; and/or other e-business systems according to one embodiment of the present invention.

A relational data asset may include relational database related information such as a reference data ("RD") asset and an entity data ("ED") asset according to one embodiment of the present invention. According to this embodiment, the data in a relational data asset may contain a complete set or a subset of the data in one or more tables of a relational database at some given time. This relational data may be obtained through a database query such as, for example, an SQL query. A relational data asset may include data relating to inventory, pricing, product, customer, weather, raw materials, employees, other business data, and/or other personal data according to one embodiment of the present invention.

A Java™ Class ("JC") asset may include a Java™ class according to one embodiment of the present invention. The asset boundaries of a JC asset may be the boundaries defined by the Java™ class creator according to the Java™ specification. A JC asset may be used for any purpose permitted by the Java™ specification according to one embodiment of the present invention.

A Non-Java™ ("NJ") asset may include non-Java based software code such as, for example, a program, procedure, subprogram, and/or script, according to one embodiment of the present invention. The asset boundaries of an NJ asset may be determined by the control paths (e.g., edges) of the call graph for the software code (e.g., a program). According to one embodiment, an NJ asset may include software code (e.g., a program, subprogram, procedure, and/or script) written, for example, using the C, C++, Smalltalk, Visual Basic®, Perl, and/or other programming language.

Assets may be categorized by their purpose according to one embodiment of the present invention. For example, an asset that is used to present information to a user (e.g., display or print information at a targeted destination computer) may be categorized as a presentation component asset. The presentation component asset category may include DC, EJB, EB, and SB assets according to one embodiment of the present invention. In another example, an asset that operates on information to cause some change to the information may be categorized as a transaction component asset. The transaction component asset category may include DC, EJB, EB, and SB assets when they are used for transaction purposes according to one embodiment of the present invention. In a third example, an asset that contains and/or manages data (e.g., data from a database) may be categorized as a relational data asset. The relational data asset category may include RD and ED assets according to one embodiment of the present invention. Other asset categories may exist in other embodiments of the present invention.

A package may or may not be capable of a complete execution without the rest of the application. After distribution, the package may execute on its own, may execute on its own and exchange information with the rest of the application or other packages, or may execute in conjunction with the application (or other packages of the application) that are executing at different locations (e.g., different sources, targets, middleware servers, proxy servers, etc.) on the network, i.e. in a distributed execution over the network.

A package may be categorized by type and/or a set of types according to one embodiment of the present invention. A package may include one or more assets and a package may have a package type defined by the type or types of the package's component assets. An asset type is an identifier of an asset, typically determined by a boundary of the asset, as described above. The asset type of the asset may also determine what information (e.g. extended environment) that the asset, and hence the package, need to execute on any given remote target environment. A package specification includes a description of the package structure, including the package type(s).

One novel feature of this disclosure is that packages are structures containing one or more assets each of a particular asset type. In a one embodiment, a package may contain data assets with one or more data asset types (e.g., a relational database asset type) along with one or more other assets that are not of a data asset type. In an alternative embodiment, a package may contain one or more dynamic content (DC) assets, with one or more assets that are not dynamic content (DC) assets. In other embodiments, assets of different asset types may be included in the same package. For example, an asset in the presentation component category (e.g., a DC asset) or a relational data category (e.g., a reference data asset) could be included with an asset not in those respective categories. In another example, a package may include static content assets and presentation component assets. According to the example embodiment of the present invention, a package, even with assets of dissimilar (category) asset types, may be distributed across a network and execute and/or function on any given target that contains a base environment suitable for the package.

Figure 2A:
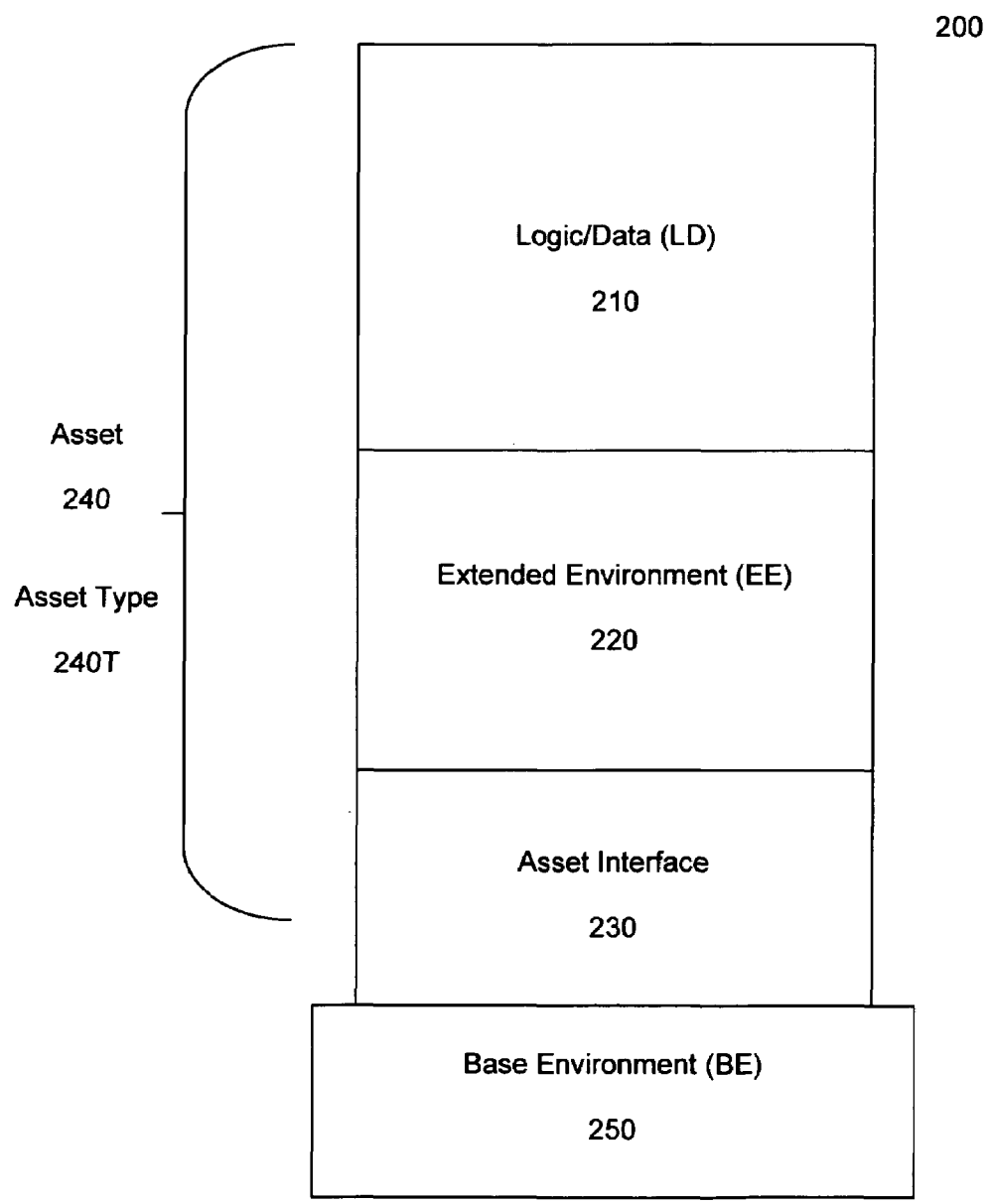
FIG. 2A is a block diagram depicting a conceptual structure of an asset according to one embodiment of the present invention.

FIG. 2A is a block diagram depicting a conceptual structure of an asset according to one embodiment of the present invention. FIG. 2A depicts an asset 200 along with a Base Environment ("BE") layer 240 with which the asset 200 interacts according to one embodiment of the present invention. In the example embodiment, an asset 200 may include two layers: a logic/data layer ("LD") 210 and an extended environment ("EE") layer 220. According to the example embodiment, an optional Asset Interface ("AI") layer 230 (discussed below) may also be included for an asset. In one embodiment, the asset type may determine what the minimum requirements are for the EE layer 220 so that the asset 200 can properly function on any given BE 250 of any given target. In alternative embodiments (as described below) the EB 220 is a data structure containing descriptors and/or other information required during one or more steps in the life cycle of the asset.

The logic/data layer 210 may include software code (e.g., the algorithmic logic) and/or data that embodies the asset purpose or function. In one embodiment, the LD layer 210 may include subsystems, applications, subapplications, components, modules, functions, variables, and data in any language. In another embodiment, the LD layer 210 may use an object-oriented language that may include a components, a module, a function, a class, a method, and a data member. In another embodiment, where the object-oriented language is Java™ language based, the LD layer 210 may include a Java™ Archive File ("JAR"), a Java™ package, and a Java™ class. In another embodiment, where the object-oriented language is Java 2 Platform Enterprise Edition™ ("J2EE") based, the LD layer 210 may further include a JSP, a Java™ servlet, and an EJB. LD layer 210 data may include any type of data structure including that data stored in a relational database, an object-oriented database, serialized objects, hierarchical database, and/or flat file. The LD layer 210 may be any combination of logic (e.g., software) and data such as, for example, logic and no data, logic and data, or data and no logic. In the example embodiment, the LD layer 210 may be a subset of one or more EIS.

In one embodiment, the EE layer 220 may be a subset of an application, such as an EIS, and may include those portions of the application that may be necessary to support the LD layer 210 of an asset 200. According to this embodiment, the content of the EE layer 220 for an asset 200 may depend on the content of the LD layer 210 for that asset 200. For example, if the LD layer 210 contains an EJB, the corresponding EE layer 220 may contain the proxy skeletons and stubs, J2EE deployment descriptors, DataSource references, and JNDI entries associated with the EJB. In another example, if the LD layer 210 contains data, the EE layer 220 may contain relational database data.

The EE layer 220, by supporting the LD layer 210, may also enable the LD layer 210 to operate on different hardware, software, and/or environment (collectively "environment") according to the example embodiment. For example, the EE layer 220 may include a sufficient amount of the application (e.g., the EIS) to allow the LD layer 210 to operate in a target environment.

Where differences exist between a source and target environment, the EE layer 220 may be transformed in order for the asset 200 to operate appropriately in the target environment according to one embodiment of the present invention. In another embodiment, the EE layer 220 may be transformed into an intermediate "neutral" format that is not specifically tailored to a source and/or target environment. This intermediate neutral format of the EE layer 220 may facilitate further transformation of the EE layer 220 for a target environment.

The intermediate neutral format may be an intermediate transformation of the EE layer 220 between a proprietary source format and a proprietary target format according to one embodiment. For example, an EJB asset 200 may be in an intermediate neutral format when the EE layer 220 of the asset 200 has neither the proprietary parts of the source environment nor the proprietary parts of the target environment. For instance, J2EE deployment descriptors may have proprietary sections that may be vendor specific and they may also include other nonproprietary (e.g., publicly defined) sections as well. In an intermediate neutral format, the EE layer 220 may contain nonproprietary information associated with the J2EE deployment descriptors that is used in the transformation of the EE layer 220.

According to another embodiment of the present invention, the EE layer 220 may include a data structure containing one or more descriptors that may be used during one or more steps of the asset life cycle discussed below.

In one embodiment, a distinct EE layer 220 may be associated with each unique BE layer 240.

An AI layer 230 may exist between the EE layer 220 of an asset 200 and the BE layer 240 according to one embodiment of the present invention. The AI layer 230 may enable the passing of information between the EE layer 220 and the BE layer 240. In one embodiment, the AI layer 230 may provide a standard interface between the asset 200 and/or asset adapter (discussed below) and the BE layer 240. In the example embodiment, the AI layer 230 may be a common interface available to the asset 200. According to one embodiment, a distinct AI layer 230 may be associated with each unique BE layer 240 and an AI layer 230 may exist for each BE layer 240 that corresponds to an asset adapter.

The BE layer 240 is not part of an asset but may enable an asset to operate in a target environment other than the source environment of the application (e.g., EIS) from which the asset derives according to the one embodiment of the present invention. For example, the BE layer 240 may include Web tier services, middleware component services, and/or database services. In another example, the BE layer 240 may include all or part of a Java™ Virtual Machine, a Web server engine, a Java™ servlet engine, an EJB container, a database management system ("DBMS"), and/or a relational database management system ("RDBMS").

An asset 200 may be defined as some meaningful partitioning (logic/data layer 210) of an application from the source environment combined with part of the source environment (the extended environment layer 220) that is needed to run that partition of the application. Thus, in this case, both the LD layer 210 and the EE layer 220 are parts of the source environment (e.g. an EIS) that are selected so that the asset 200 can be distributed across a network, particularly across network tiers, and so that the asset 200 can perform the asset purpose or function (the purpose or function that the asset/LD layer 210 was designed to perform on its respective source environment) on any given target (e.g. remote, computer environment and/or platform).

As previously stated, an asset may be categorized by the content and/or purpose of the asset according to one embodiment of the present invention. This asset categorization or asset type may be used to correlate an asset with an asset adapter (described below).

An asset adapter may be a logical designation for a set of functions that enable an asset to progress through an asset lifecycle (described below) according to one embodiment of the present invention. The asset lifecycle is a set of transformations of the asset 200 as it moves from the source environment (e.g. one or more EIS), into the distribution environment (e.g. one or more distribution servers), to one or more target environments (e.g. one or more clients/nodes), and optionally back to the source environment (possibly back through the distribution environment) according to one embodiment of the present invention. These transformations may be caused by several asset adapters and may depend on the type of the asset 200. (See below for further description of asset adapters.)

A single asset 200 may contain all the elements, such as data or information, necessary to package, move, transport, and restore the asset to its original state (that state in its source location) while and/or after moving the asset from the source location to the one or more target locations (and optionally back) so that the asset can perform the asset purpose or function on the target. Thus an asset 200 is able to maintain its relationship with the environment in which the asset is expected to perform the asset purpose or function across different environments or platforms. In one embodiment, the asset 200 may have the minimal application logic and extended environment (e.g., execution/transaction/security context and state) necessary to perform the asset purpose or function on one or more targets.

As previously stated, an asset has an asset boundary used to define the asset, as in the example of a JavaBean™ or EJB. Additionally, the asset may represent the state behind a well-known functional interface, such as data that would be accessed through a standard set of calls (e.g., JDBC interface calls). If the JDBC interface is viewed as a discrete set of objects, the state may correspond to the relational data in the data source (e.g. a relational database).

The following table provides example of different types of assets along with examples of the possible constituent parts for each asset type according to one embodiment of the present invention. The "algorithmic logic & data" content of the asset may correspond to the LD layer of the asset. The "extended environment" content of the asset may correspond to the EE layer 220 of the asset. The "base environment" may correspond to content in the BE layer 250 when a BE layer 250 is provided for the asset. As previously stated, a BE layer 250 may be provided on a target computer for the asset in order to allow the asset to properly operate according to the example embodiment of the present invention. In one embodiment, a BE layer 250 may be sent to a target computer as one or more assets.

Examples of asset types and their constituent parts.

| Asset Type | Algorithmic Logic & Data | Extended Environment | Base Environment |
|---|---|---|---|
| Base CDS Adapter | Adapter Class Files | Version Information Licensing Information | CDS Client Agent JVM |

-continued

Examples of asset types and their constituent parts.

| | Asset Type | Algorithmic Logic & Data | Extended Environment | Base Environment |
|---|---|---|---|---|
| Java | Static Content | HTML Page | Web Server Aliases | Web Server |
| | Static Content | GIF Image | | Web Server |
| | JSP | JSP Page | JNDI Entries | JVM Servlet Engine |
| | Java Class File | Class File | JNDI Entries | JVM |
| | Session Bean | EJB Implementation | EJB Stub and Skeleton Deployment Descriptor JNDI Entries | JVM EJB Application Server |
| | Entity Bean | EJB Implementation Data based on query | EJB Stub and Skeleton Deployment Descriptor JNDI Entries Table Schema | JVM EJB Application Server DBMS |
| | Reference Data | Data based on query | Table Schema | DBMS |
| | Entity Data | Data based on query | Table Schema | DBMS |
| Non-Java | SmallTalk | Image | Image | SmallTalk VM |
| | C++ | Executable, or Dynamic Library | Registry Entries Environment Variables | Operating System or Platform Emulator |
| | Perl | Perl Script | Environment Variables | Perl Interpreter |
| Non-Language | Music | MP3 File | Album and track information. | MP3 Player |
| | Video | MPEG File | Production Notes | MPEG Player |
| | Documents | PDF File | Authentication Certificate | PDF Viewer |

Assets 200 may comprise many types (asset types), including: static content (SC), dynamic content (DC), JavaBeans™ (JB), session bean (SB), entity bean (EB), reference data (RD), entity data (ED), naming directory, and many more according to one embodiment of the present invention.

Static content ("SC") assets may include information that doesn't change in a program and/or display according to one embodiment of the present invention. SC assets may be cached in a local, e.g. client memory, for re-use so that the asset doesn't have to be resent over the network each time it is used. Examples of static content assets may include html files, gif files, and jpeg files.

Dynamic content ("DC") assets may include information that changes over time according to one embodiment of the present invention. Often this information is displayed/provided with SC assets. Typically, the DC and DC asset is produced in real-time or at the time of use. For example, a weather map of the United States might be locally cached as SC out the temperature in New York City is DC that is continually updated in time as numeric data that is displayed on the map near the location of NYC. In a financial application, forms or format for accounts (e.g. loan applications, mortgage applications, stock/financial instrument portfolios, bank statements, a service or product advertisement, etc.) may be provided as SC in an SC asset while the offerings and/or value of particular financial assets is provided as changing DC (e.g., interest rate, stock price, an account balance, or a cost of service or product) in a DC asset. The DC asset could be a presentation component asset type category, a transactional component asset type category, and/or another asset type category depending on the function performed by the DC.

A JavaBean™ ("JB") is a well-known Java™ class file that follows the convention for Java Beans. The convention specifies how to name the methods in order for third party tools to provide automated processes for the class. In this disclosure, "JavaBeans™" and JB asset may be used to sometimes indicate a general Java™ class.

A Session Bean ("SB") is a well-known Enterprise JavaBean™ that is intended to be coupled with a client session. The SB is well defined in many books and the EJB specification. An SB asset could be a presentation component asset type category, a transactional component asset type category, and/or another asset type category depending on the function performed by the SB asset.

An Entity Bean ("EB") is an Enterprise JavaBean™ that is intended to represent a unique piece of data that can only be accessed by one client at a time. The EB is well defined in many books and the EJB specification. The EB asset could be a presentation component asset type category, a transactional component asset type category, and/or another asset type category depending on the function performed by the EB.

The term Reference Data ("RD") refers to a set of database records that are intended to be accessed in a read-only manner according to one embodiment of the present invention. These records are intended for "reference" purposes, and may be sent to the client or an intermediate target in order to be accessed as an application executes. The same RD asset may be sent to several targets without worrying about the overlap in data that different targets have. This safety is due to the fact that the data will not change.

The term Entity Data ("ED") describes data that is like RD except that the ED is expected to change according to one embodiment of the present invention. ED assets may be treated differently than RD assets because of the problems inherent in the synchronization of data that has been replicated to different targets. It may not be apparent how changes in the same data should be synchronized on the back-end database from several targets. For example, do you allow target 1 to update a record, then allow target 2 to update the same record, even when target 2 did not have the changes made by target 1 when it made its update on the remote node? Therefore, by creating a distinct asset type, the integrity of the data as it moves through the system may be enforced.

Both the ED asset and RD asset are relational data, e.g. in the relational data asset type category. In one embodiment of the present invention, a package may contain both assets of a relational data type and assets other than relational data assets. In another embodiment, one or more RD assets and/or ED asset may be combined with any combination of SB, EB, and JSP assets.

As stated above, a package structure may contain one or more assets of a first asset type or category of asset type and one or more assets of a second asset type that are not of the first type or category according to one embodiment of the present invention. Assets with third, forth, etc. asset types or category of asset types may also be included in the package structure according to other embodiments of the present invention. For example, a package may include one or more first assets from the relational data asset category (e.g., ED and/or RD assets) and one or more second assets from the presentation component asset type category (e.g., DC, JB, SB, and/or EB assets). In another example, one or more third assets from the transactional component asset type category may also be added (e.g. DC, JB, SB, and/or EB assets). In another example, one or more SC assets may be added to the package structure or may replace the transactional component asset type category asset in the package structure.

In an alternative embodiment, the package structure can be a combination of first assets with a static content asset type and second assets having a presentation component asset type (e.g., DC, JB, SB, and/or EB asset). Furthermore, an optional third asset may have a relational data asset type (e.g., ED and/or RD asset) and an optional forth asset may have a transaction component asset type (e.g., DC, JB, SB, and/or EB asset) according to one embodiment.

According to one embodiment of the present invention, the presentation component asset type may be used to generate content and/or perform algorithmic logic (e.g., execute program code) associated with the manipulation and/or validation of user interface data and/or content. This content may include: HTML, Gif, JPEG, WML, and XML, and any other general markup language content. In one embodiment, the presentation component asset type is a dynamic content asset.

Figure 2B:
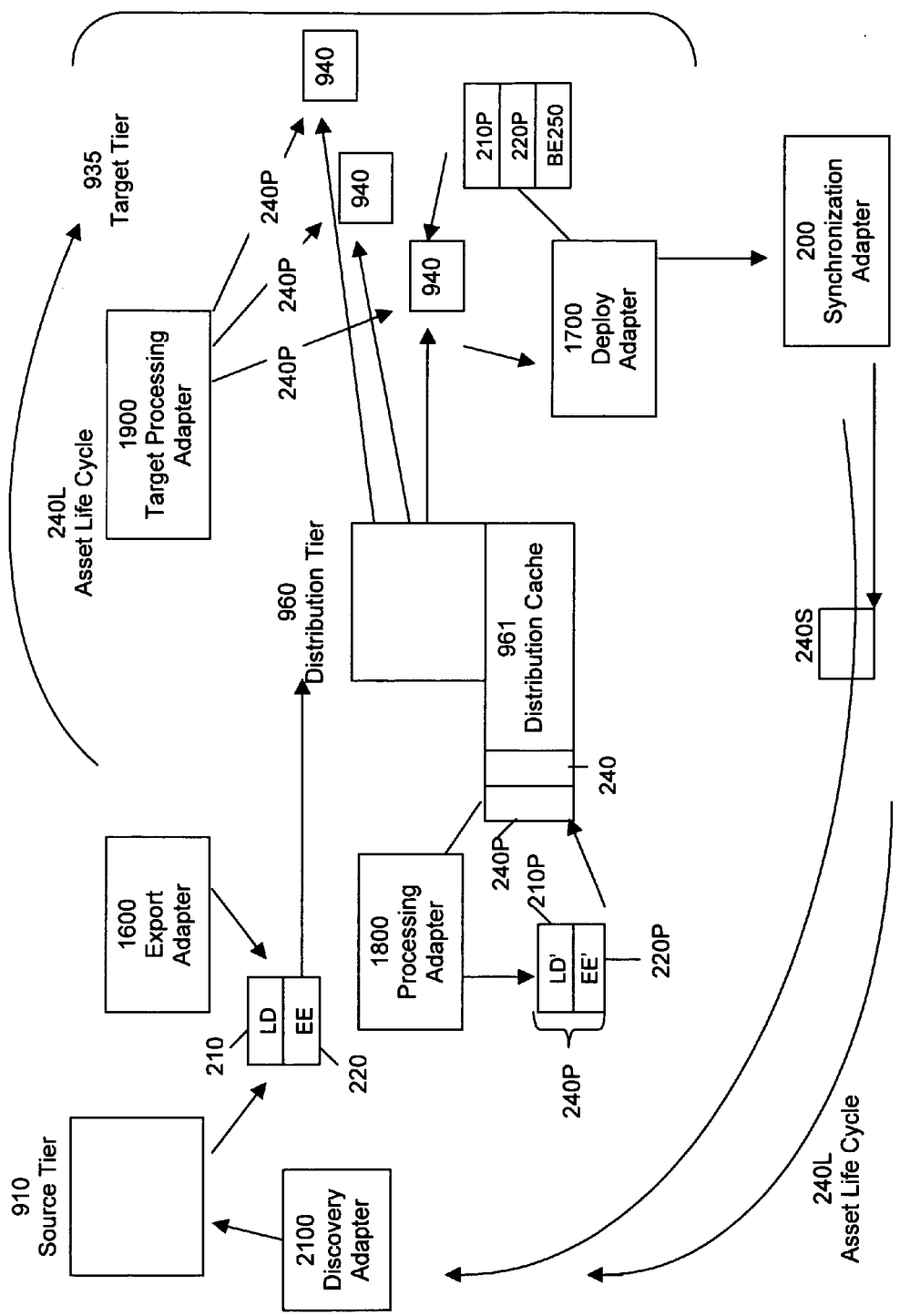
FIG. 2B shows a preferred description of an asset life-cycle 240L.

FIG. 2B shows a preferred description of an asset lifecycle 240L. The asset lifecycle is a description of the asset, and changes to the asset, as the asset moves across tiers of the network onto different computer platforms and environments.

The asset goes through a lifecycle 240L starting in the source tier, moving through the deployment tier, into the target tier, and then optionally back through the deployment tier to the source tier and/or can move to any other node or nodes in the network if required. The asset adapter methods are used in one or more of the steps in this lifecycle. In one embodiment, an asset type specific processing is required for the asset to continue through the lifecycle. In some preferred embodiments, information contained in the EE 220 is modified by one or more of these adapters to enable the asset to continue through the life cycle.

In a preferred embodiment, assets 240 are "discovered" in the source environment (tier) 910 by an asset adapter called the discovery asset adapter method 2100 (see FIGS. 19A–19B below). In alternative embodiments (FIG. 19D) the discovery asset adapter method identifies and creates the digital asset 240, creates an intermediate representation 2100C of a computer system part 100F, adds the asset to an Asset Inventory 2100D, and writes asset descriptors into the EE 220. Optionally, an asset description data structure 1170 is created.

In a preferred embodiment, an "export asset adapter method" (see FIG. 14B) identifies and exports candidates for classification as assets 240 and together as packages. In this preferred embodiment, the export asset adapter method 1600 (see FIG. 14B below) is used to obtain the actual current version of assets in the source tier that needs to be distributed to the target tier. After the assets are exported, the assets are moved to the deployment or distribution tier 960 and typically stored in an asset cache 961. When exporting assets, the export asset adapter method captures the logic, data, 210 and extended environment information 220 for an asset 240 and puts it into an asset data structure 240 where the asset type is also identified.

In another preferred embodiment, the export asset adapter method (see FIGS. 14C–14D) takes the Asset Inventory 2100D and the intermediate representation 2100C and prepares a preliminary package specification 1650B. The asset data structure and EE 220 of the digital asset 240 are also updated.

A package specification 1400 (see FIG. 12 below) is created that in turn contains asset specifications 700 (See FIG. 5). In a preferred embodiment, the asset specification 700 is stored in the deployment tier until a package 1400 is scheduled to be delivered.

In an alternative embodiment, a packaging agent takes the preliminary package specification 1500A and creates a finalized package specification data structure. In a preferred embodiment, both the preliminary package specification 1500A and the finalized package specification 1500A have the same data structure, comprising an Extended Environment-Package data structure 1120A and one or more Asset Identifiers 1514 (see FIG. 13A).

The optional version asset adapter method 1660 (see FIG. 14A below) is used to determine the current version information of the assets 240 in the source tier. In a preferred embodiment, this version information is compared with the target tier asset version information in the deployment tier to determine if assets need to be deployed from the source tier to the target tier.

If an asset requires processing the processing may be done when the asset is stored in the asset cache 961 or at any time before the asset is distributed to either a secondary cache in the deployment/distribution tier 960 or the target tier. The processing is primarily performed on the asset's extended environment 220, in an attempt to translate the extended environment 220 to run in harmony with the base environment 250 in the target tier. However, the processing process (see FIG. 16 below) may also change the logic/data portion of the asset or both the logic/data and the extended environment portion of the asset.

An agent 1400 in the target environment requests the assets that are pending in the CDS/ADS cache for delivery to the target tier are in fact delivered to the respective target.

In a preferred embodiment, the target processing asset adapter method 1900 (see FIG. 17 below) is executed on the CDS/ADS tier against any asset 240, (typically cached in the CDS/ADS cache) that requires targeted processing before being sent to the target tier 935. Target processing is intended primarily to change the Logic/Data section 210 of the asset data structure 240 in order to provide a unique asset that can create or has personalized information for one or more specific targets (typically 940) on the target tier 935 on which the asset 240 is being deployed. The processed asset 240P therefore can have a changed Logic/Data section 210P. However, the processed asset 240P could have a changed extended environment section 220P or both parts (210P and 220P) can be changed. In other cases, neither the Logic/Data section (210, 210P) nor the extended environment (220, 220P) will be changed. The processed asset 240P is typically stored in the CDS/ADS cache 961.

In some embodiments, a targeting process adapter 1900 can target to an intermediate target (a server that will in turn server many users) or a final target (a single node that will serve a single user).

When the asset is sent to the target tier, the deploy asset adapter method 1700 (see FIG. 15A below) is invoked to deploy the asset (240, 240P) into the computational environment, i.e., the base environment 250, in the target tier. The extended environment 220P from the asset's data structure 240P is used to set the base environment 250 and extended environment 220P in the target tier to run the asset 240P in a correct manner. The asset's logic and data 210 are then deployed into the base environment 250, and since the environment has been adjusted, the logic 210 will function correctly and the data 210 will be accessible.

When changes happen in the target tier 935 that warrant synchronization, the synchronization asset adapter method 2000 (see FIGS. 18A–18B below) is executed to create a synchronization asset 240S that is propagated back through the deployment/distribution tier 960 (optionally) and then into the source tier 910. The source tier resource (asset) that corresponds to the synchronization asset is synchronized with the information in the synchronization asset 240S.

Figure 2C:
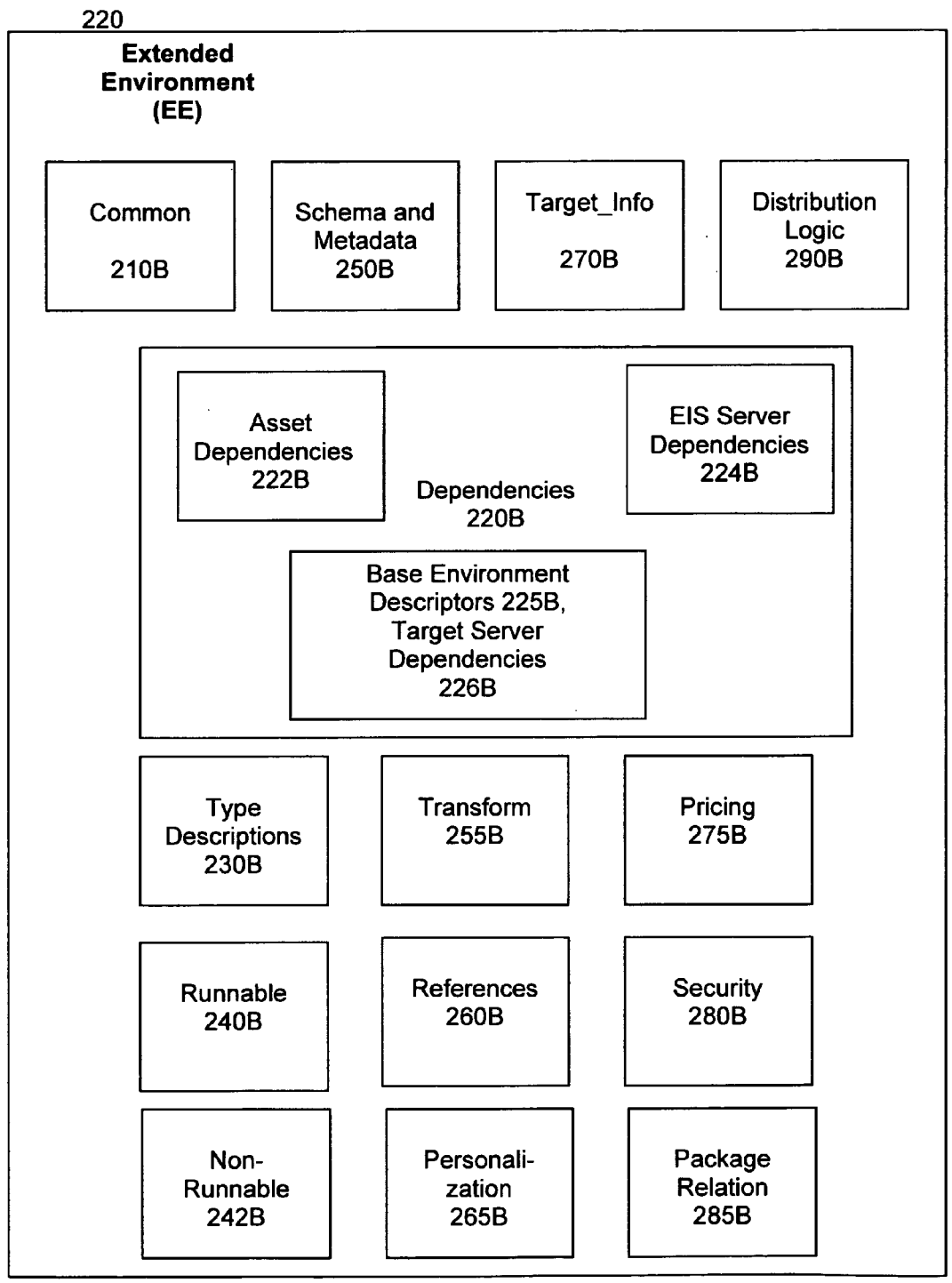
FIG. 2C is a block diagram of a preferred extended environment (EE) 220 of any general digital asset 240.

FIG. 2C is a block diagram of a preferred extended environment (EE) 220 of any general digital asset 240. The extended environment data structure 220 is part of the digital asset 240 that is capable of being transmitted over one or more multi-tiered networks. A preferred embodiment of the EE 220 is written in XML (extended markup language). An example of a preferred EE 220 written in XML is given below with associate reference numbers that refer to FIG. 2C.

The EE 220 has one or more common descriptors 210B, one or more asset dependency descriptors 222B, and one or more target server dependencies 226B. In an alternative preferred embodiment, the EE 220 additionally has one or more EIS server dependencies 224B. In other preferred embodiments, additional descriptors are added as described below.

The common descriptors 210B provide a unique identification of the digital asset 240 on the networks. Examples of common descriptors 210B include any one or more of the following: a digital asset name of the digital asset, a unique fully qualified name of the digital asset, an address of the digital asset, a size of the digital asset, a volatility descriptor of the digital asset, a common runnable descriptor of the digital asset, a user type descriptor of the digital asset, a security descriptor of the digital asset, and a price descriptor of the digital asset.

The asset dependency descriptors 222B identify one or more associated digital assets 240. The associated digital assets are those digital assets 240 that are associated with the digital asset 240 that contains the subject EE 220. In a preferred embodiment, this association defines a joint membership of the digit asset 240 and the associated digital assets as parts of a whole. See above.

Examples of the asset dependency descriptors 222B include any one or more of the following: one or more names of the other digital assets on which the respective digital asset is dependent; any general asset identifier, and/or one or more unique fully qualified names of other digital assets on which the digital asset is dependent.

The associate digital assets 240 and the digit asset 240 have joint membership in a whole that defines a part-whole relationship. In a preferred embodiment, the whole is defined by a graph. Graphs are well-known in the computer arts and define physical and/or logical associations among the digital assets 240 in the whole. In a more specific preferred embodiment, the graph is any one or more of the following: a containment graph, a tube graph, a call graph, and a pure representation expressible as a graph.

In some preferred embodiments, the whole is embodied as a package. This is a physical and/or logical association. In a preferred embodiment, the EE 220 has package relationship descriptors 285B that represents a part-whole relationship between the digital asset 240 and one or more packages containing the digital asset.

In some embodiments, the package relationship descriptors represent at least the following three relationships in the part-whole relationship: a mandatory part-whole relationship, a shared part-whole relationship, and a root part-whole relationship.

A mandatory part-whole relationship is defined here as an invariant relationship between a specific digital asset and a specific package. That is, the specific package does not possess the property of correctness unless the specific digital asset is included. In an alternative embodiment, this relationship can further imply the existence of the other digital assets that are members of the specific package at a given location on the network when the specific digital asset is established to exist at that location.

A shared part-whole relationship is defined here, in a preferred embodiment, as a component-integral relationship between a specific digital asset and one or more specific packages. That is, the specific digital asset may be included in one or more packages. The component-integral relationship indicates that the digital asset bears a particular functional or structural relationship with each of the one or more specific packages. The shared relationship descriptor indicates the component-integral form of the relationship. In an alternative embodiment, the shared relationship descriptor can indicate that the specific digital asset has a member-collection relationship with one or more specific packages. That is, the digital asset may be included in a collection of digital assets comprising one or more specific packages.

A root part-whole relationship is defined here as a non-mandatory "base" or "foundation" relationship between a specific digital asset and one or more specific packages of varying composition.

See Winston, M. E., et al., "A Taxonomy of Part-Whole Relations", Cognitive Science, 11, 1987, pp. 417–444, which is herein incorporated in its entirety, and other well-known works on this topic.

The EE 220 includes one or more base environment descriptors 225B (e.g., target server dependencies descriptors 226B) that identify a base execution environment on one or more target computers. The base execution environment 250 is required to execute the digital asset 240 on any given target computer 830 to which the digital asset 240 is distributed. The base execution environment 250 has zero or more other digital assets 240. In one embodiment, one or more of the other digital assets 240 are deployed to the respective target computer from one or more or the Enterprise Information Systems (EIS) 810 to create the base environment 250. In one preferred embodiment, the minimum complement of other digital assets required to utilize the respective digital asset at the target are deployed to create the base environment on the target.

In a preferred embodiment, the digital assets deployed to the target computer from the EIS to create the minimum base environment are named as the target server dependencies in the EE 220. These target server dependencies can include any one or more of the following: one or more database management systems (DBMS), one or more browsers, one or more Java™ Virtual Machine (JVM) instantiations, one or more operating systems, and other systems 105F, sub-systems 106F, applications 108, sub-applications 110F, components 120F, modules 130F, and/or functions 140F. When such system part is named in one of the target server dependencies descriptors 226B for the digital asset, the packaging process (see below) will perform a lookup of a pre-prepared manifest for that respective system part and incorporate digital assets to deploy the respective system part 100F.

In an alternative embodiment, the EE 220 has one or more EIS server dependencies descriptors 224B. The EIS server dependencies descriptors 224B identify an EIS execution environment required on the EIS 810 in order to ensure correct utilization of the digital asset on the EIS. The EIS execution environment is that set of EIS systems 105F, EIS sub-systems 106F, EIS applications 108, EIS sub-applications 110F, EIS components 120F, EIS modules 130F, and EIS functions 140F that the digital asset 240 requires on the EIS 810 in order to ensure correct utilization of the digital asset on the EIS. The EIS server dependencies descriptors 224B can be used to ensure that digital assets that reside on the EIS will be correctly synchronized (see synchronization below) with digital assets deployed to one or more of the target systems.

Examples of EIS server dependencies 224B include one or more of the following: EIS operating systems (in rare cases), EIS database management systems (DBMS), EIS servers, EIS application servers, EIS Web application servers, one or more accounting, customer relationship management (CRM) systems, business to business (B2B) systems (e.g., supply chain management, etc.), business to customer (B2C) system (e.g. order fulfillment systems, electronic shopping systems, etc.), and one or more message oriented middleware applications. Specific EIS server dependencies 224B include one or more of the following: one or more Oracle® DBMS, one or more Sybase DBMS, and one or more DB2 DBMS.

Further, one or more of the target server dependencies and one or more of the EIS server dependencies can be compared to determine whether a transform of the digital asset is required for the asset to be deployed on the respective target computer (see below).

In one preferred embodiment, the EE 220 has one or more transform descriptors 255B that facilitate and/or enable a transform of the digital asset 240 from its form in the EIS execution environment to a form utilizable in the base execution environment 250. In a preferred embodiment, the transform descriptors 255B may include a properties descriptor, a format descriptor, and a registry descriptor (e.g. primarily for Windows 32® systems).

The properties descriptor that provides information required for use of the digital asset on an operating system of the base execution environment 250. For example, the Sun Microsystem EJB API call, EJBContext.getEnvironment( ) method is optional in EJB version 1.1, which means that it may or may not be supported in a different base execution environment (i.e. a base execution environment supporting EJB 1.0). In this example, a properties descriptor could indicate an action to take (typically in the form of an exception) if the digital asset was required to execute in an EJB 1.0 base execution environment. In this example embodiment, the values in the properties descriptor would be used to modify the base execution EJB 1.0 environment to handle this API call.

The format descriptor provides information required for use of the digital asset on an operating system of the base execution environment 250. For example, in order to perform one of the example transforms described below, that is the transform of a UNIX plain text file to a form usable in a MS-DOS® or Windows® system, a key-word, such as UNIX-TEXT would be set as the format descriptor, identifying the file as being in UNIX text format.

The registry descriptor provides information required for the digital asset that is being deployed from (to) a non-Windows® EIS (base execution environment) to (from) a Windows® environment on the base execution environment (Windows EIS environment). A "registry" is a Windows 32® operating system feature that is used by Windows® to manage hardware and software under its control. The registry is presented, and can be manipulated as a list of registry entries (e.g., text, etc.). Many Windows® programs require specific entries be inserted into the registry for correct program operation.

The transformation of the digital asset could be a transformation of data in a logic/data section 210 of the digital asset 240. For example, if the digital asset 240 is a standard text file (see transform 255B format descriptors above), and if the EIS server dependency descriptors 224B indicate the EIS has a UNIX environment, and if the target server dependencies descriptors 226B indicate that the target has a DOS environment, then, the transformation would include insertion of the "^M" character into the LD section 210 at the end of each line. This transformation can be initiated by a rule base system that has rules that apply to these conditions. See below.

The transformation of the digital asset could be a transformation of logic in a logic/data section 210 of the digital asset 240.

For example, one method to transform logic in a logic/data section 210 of the digital asset 240 is to send the Java™ source code statements for the logic digital asset to the target environment (or, alternatively on the CDS, DIS, below). In order to execute the Java™ language statements of a Java™ language program, the statements are interpreted and executed by a Java™ Runtime Compiler specific to a particular execution environment, e.g. an EIS environment or a target environment. If the common runnable descriptor is set (indicating that the digital asset 240 is runnable), and if the runnable descriptor 240B (below) are set to values that indicate that the EIS and target environments are different (for example, Solaris® and Windows®), then a transform is effected by means of the two Java™ Runtime Compiler instances, respectively on the EIS and target environment. The runnable object created by the Java™ Runtime Compiler on the EIS is not the same as the runnable object created by the Java™ Runtime Compiler on the target.

In another example, the Sun Microsystem EJB API call, EJBContext.getEnvironment( ) method is optional in EJB version 1.1, which means that it may or may not be supported in a different base execution environment (i.e. a base execution environment supporting EJB 1.0). In this example, the properties descriptor is used as described above to realize the transform of the logic digital asset from a form that could only run on EJB version 1.1 to a form that could run on EJB version 1.0.

In an alternative preferred embodiment, the EE 220 also has one or more reference descriptors 260B. In a preferred embodiment, the reference descriptors 260B include any one or more of the following: a reference link descriptor, a reference file descriptor, and a reference directory descriptor. The reference link descriptor provides a World Wide Web ("WWW") address that has contents used for processing of the digital asset. The reference link descriptor provides a WWW address that has contents used during execution of the digital asset. The reference file descriptor is a unique fully qualified name of a file required for reference by the digital asset. The reference directory descriptor provides an additional address information that is used to locate one or more of the associated digital assets. For example, the additional address information could include root or parent level directory names, which would, following well-known format, be combined with the leaf directory level identification given in the common name descriptor to locate and fully qualify the path information for the digital asset.

In an alternative preferred environment, the EE 220 further comprises one or more asset type descriptors 230B. As a non-limiting example, the asset type descriptors 230B may describe any one or more of the following asset types: static content (SC), dynamic content (DC), Enterprise Java-Beans™ (EJB), reference data (RD), session bean (SB), entity bean (EB), entity data (ED), Java™ class (JC), and JavaBeans™ (JB). See above.

In an alternative preferred environment, the asset type descriptors 230B can be one or more asset category descriptors. Example asset category descriptors may include any one or more of the following: a presentational descriptor, a transactional descriptor, and a relational data descriptor. See above.

In an alternative preferred embodiment, the asset type descriptors 230B can be one or more asset class descriptors. Example asset class descriptors may describe any one or more of the following: base, Java™, non-Java™, language, and non-language digital asset classes.

In an alternative preferred embodiment, the EE 220 further comprises one or more package relationship descriptors 285B that represent a part-whole relationship between the digital asset 240 and one or more packages (see below) containing the digital asset. The package relationship descriptors 285B represent at least the following three relationships in the part-whole relationship: a mandatory part-whole relationship, a shared part-whole relationship, and a root part-whole relationship.

In an alternative preferred embodiment, the EE 220 further comprises one or more security descriptors 280B. The security descriptors are well-known and may describe any one or more of the following functions: encryption, authorization, and access control.

In an alternative preferred embodiment, the EE 220 further comprises one or more runnable descriptors 240B. The runnable descriptors need only include a target execution environment for the digital asset 240. In an alternative embodiment, the runnable descriptors 240B may include an EIS execution environment and a target execution environment for the digital asset 240. In an alternate embodiment, as described above, if both the EIS execution environment runnable descriptor and the target execution environment runnable descriptor are both set, and their values are different, the transform process may be invoked on the runnable digital asset.

In an alternative preferred embodiment, the EE 220 further comprises one or more non-runnable descriptors 242B. The non-runnable descriptors need only include a target execution environment for the digital asset 240. In an alternative embodiment, the non-runnable descriptors 242B may include a EIS execution environment and a target execution environment for the digital asset 240. In an alternate embodiment, as described above, if both the EIS execution environment non-runnable descriptor and the target execution environment non-runnable descriptor are both set, and their values are different, the transform process may be invoked on the non-runnable digital asset.

In an alternative embodiment, the EE 220 further comprises one or more personalization descriptors that enable the digital asset to be customized upon delivery to one or more of the base execution environments. In a preferred embodiment, the personalization descriptors include one or more data keys that establish a linkage among data elements in the EIS execution environment. Alternatively, the personalization descriptors include one or more data keys that establish a linkage among logic elements in the EIS execution environment.

In an alternative embodiment, the EE 220 further comprises or more pricing descriptors 275B. The pricing descriptors describe information about any well-known general pricing information including one or more of the following: a price, a price scheme (subscription, pay to own, pay to use, one time payment), a payment detail, and payment method (check, credit card, card number).

In an alternative embodiment, the EE 220 further comprises one or more target information descriptors 270B. Target information descriptors 270B can give any general information about the targets and, by example, may include any one or more of the following: a well-known user, an anonymous user, one or more user groups, an entire user group, a target machine, an identifiable segment of target machines, a collection of target machines, an internet protocol address mask, and a group of target computers in a node collection structure.

In an alternative embodiment, the EE 220 further comprising one or more schema descriptors 250B. The schema descriptors provide information that describes any or more of the following examples: database table names and definitions, database column names and definitions, database key identifiers and value ranges, database view names and definitions, and other well-known database schema elements.

In an alternative embodiment, the EE 220 further comprises one or more metadata descriptors 250B. The metadata descriptors 250B provide information that describe any or more of the following examples: repository object definitions, scope object definitions, module object definitions, operation object definitions, exception object definitions, constant object definitions, properties object definitions, attribute object definitions, relationship object definitions, type object definitions, and other well-known metadata object definitions.

In one preferred embodiment, the EE 220 further comprises one or more distribution logic descriptors 290B. The distribution logic descriptors 290B describe or point to one or more transaction rules and one or more concurrency rules. The transactions rules specify any of a number and a frequency of times that the digital asset can be distributed to one or more target computers. The concurrency rules specify whether or not there are any restrictions on distribution of the digital asset with respect to the distribution of one or more other digital assets.

For an example of a transaction rule, a well-known practice in the distribution of priced digital assets is that buyers of such assets are permitted up to some number of download attempts in the course of realizing internet-based delivery of a priced digital asset. This practice has been put in place to protect buyers from internet infrastructure failures that result in a failure of the buyer to receive all of the digital assets the buyer has purchased. Purchases of digital assets are regarded as transactions in the well-known sense. The "up to [number]" practice represents a transaction rule to govern that purchase.

For an example of a concurrency rule, a well-known practice in the internet-based distribution of software programs is that a user is blocked from downloading a certain version (for example, a "Release 4" version) of a software program while simultaneously downloading an incompatible version (for example, a "Release 5" version) of a sub-component of such software program.

Other EE 220 descriptors are envisioned.

As the digital asset 240 is distributed over tiers of the network(s), the EE 220 can be sent over one or more network interfaces, received over one or more interfaces, and stored on one or more memories through out the network. Various processes (e.g., discover, export, process, target, etc. below) will operate on the EE 220 or use information in the EE to perform their respective functions.

The following is an example preferred embodiment of the EE defined in FIG. 2C as an XML document:

```
<?xml version="1.0" encoding="ISO8859_1"?>
<!DOCTYPE dis-ee PUBLIC '-//International Interactive Commerce,
LLC//DTD Extended Environment//EN'
'http://www.iic-ltd.com/dis/dtds/iic_ee_1_1.dtd'>
<extended_environment>
    <common> 210B
        <name></name>
        <address></address>
        <size></size>
        <volatile></volatile>
        <runnable></runnable>
        <version></version>
        <user_type></user_type>
        <security></security>
        <priced></priced>
    </common>
    <dependencies> 220B
        <asset_dependencies> 222B
            <asset></asset>
        </asset_dependencies>
        <eis_server_dependencies> 224B
            <dbms></dbms>
        </eis_server_dependencies>
        <base_environment> 225B
            <target_server_dependencies> 226B
                <dbms></dbms>
                <browser></browser>
                <jvm></jvm>
            </target_server_dependencies>
        </base_environment>
    </dependencies>
    <type_descriptors> 230B
        <type></type>
        <category></category>
        <class></class>
    </type_descriptors>
    <runnable> 240B
        <eis_execution_environment></eis_execution_environment>
        <target_execution_environment></target_execution_environment>
    </runnable>
    <non_runnable> 242B
        <eis_execution_environment></eis_execution_environment>
        <target_execution_environment></target execution_environment>
    </non_runnable>
    <schema_and_metadata> 250B
        <database>
            <process_granularity_level></process_granularity_level>
            <object_granularity></object_granularity>
        </database>
        <metadata></metadata>
    </schema_and_metadata>
    <transform> 255B
        <properties></properties>
        <registry_entries></registry_entries>
        <format></format>
    </transform>
    <references> 260B
        <reference_links></reference_links>
        <reference_files></reference_files>
        <reference_directories></reference_directories>
    </references>
    <personalization_keys>    265B
    </personalization_keys>
    <target_info> 270B
        <target_type></target_type>
    </target_info>
```

-continued

```
    <pricing> 275B
        <actual_price></actual_price>
        <price_scheme></price_scheme>
        <payment_details>
            <payment_method></payment_method>
            <credit_card_info></credit_card_info>
        </payment_details>
    <pricing>
    <security> 280B
    </security>
    <package_relation> 285B
        <mandatory></mandatory>
        <shared></shared>
        <root></root>
    </package_relation>
    <distribution_logic> 290B
        <transaction_rule></transaction_rule>
        <concurrency_rule><concurrency_rule>
    </distribution_logic>
</extended_environment>
```

Figure 3:
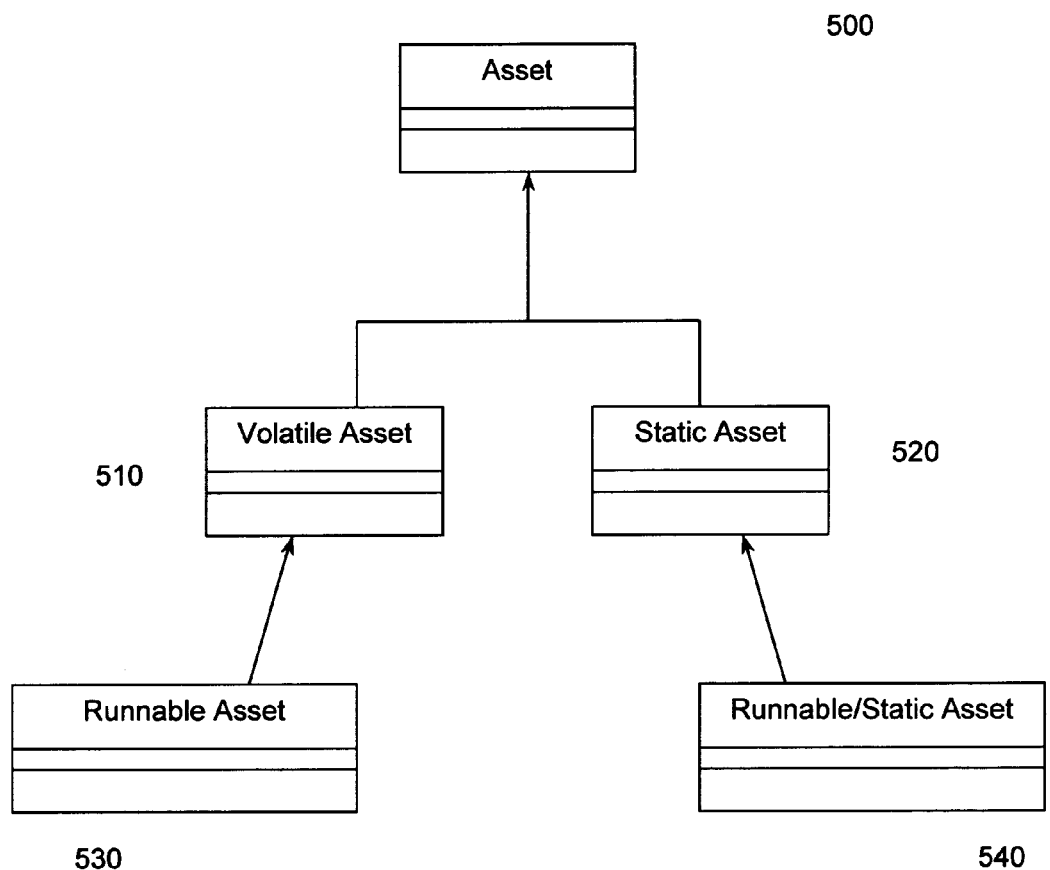
FIG. 3 is a Unified Modeling Language ("UML") diagram of an asset class object according to one embodiment of the present invention.

FIG. 3 is a Unified Modeling Language ("UML") diagram of an asset class object according to one embodiment of the present invention. Assets 500 may have intrinsic properties such as, for example, volatile, runnable, nonvolatile, and nonrunnable according to one embodiment of the present invention.

The UML diagram shows the inheritance hierarchy of an asset 500. According to the embodiment depicted in FIG. 3, an asset 500 is a superclass from which two subclasses are derived. These two subclasses include the class of volatile assets 510 and static assets 520. In turn, the volatile asset class 510 is the superclass of a runnnable asset class 530 and the static asset class 520 is a superclass of a runnable static asset class 540. When the class hierarchy shown in FIG. 3 is adhered, object-oriented design benefits may be realized. The properties of volatile, static, and runnable are intrinsic properties of the respective classes described above. Objects that contain or are concrete instances of these classes will assume the transitive intrinsic properties of these classes. Therefore, concrete data structures (e.g., packages below) can be created to have these same intrinsic properties.

A volatile asset 510 may be identified in a computing environment when two successive reads of the asset 500 may return different results according to one embodiment of the present invention. In a distributed application environment (e.g., with a client/server software application), a volatile asset 510 may further be identified when the working copies of the volatile asset (typically located on a target computer) need be reconciled with the master copy of the asset at the source (e.g., an EIS) only at one or more prescribed synchronization points.

A runnable asset 530 may be identified in a computing environment because instances of this asset 500 are capable of and intended to execute on an operating system thread according to one embodiment of the present invention.

A nonvolatile asset 520 (herein also referred to as a static content asset or static asset) may be identified in a computing environment by the existence of a single representation or view of the asset regardless of the number of instances of the asset existing according to one embodiment of the present invention. A nonvolatile asset may appear immutable regardless of the asset's location in the network.

A nonrunnable asset 286C can be universally distinguished in any computing system because instances of this Digital Asset are not intended to be, and are not capable of being executed by any operating system thread.

The properties of Runnable, Volatile, Non-Volatile, and Non-Runnable are well-known in the prior art, for example, see:

Java Language Specification, 2$^{nd}$ Edition, Draft Gosling, et. al., Copyright 2000 by Sun Microsystems, Inc., Page 165.
C++ Programming Language, 3$^{rd}$ Edition, Bjarne Stroustrup, Copyright 1997 by AT&T, Page 808.

Which are herein incorporated by reference in their entirety.

A whole is an association of one or more digital assets 240. This association can be a physical association (e.g., where the whole is a well-known container of digital assets 240) or a logical association (e.g., where the whole is a system 105F, sub-system 106F, application 108, sub-application 110F, components 120F, modules 130F, or a function 140F).

Certain of the intrinsic properties 240I of digital assets 240 are transitive to any whole of which the respective digital assets 240 are members. Specifically, if a whole contains or has a composition of one or more runnable digital assets 284C, the entire whole has a runnable intrinsic property. If the whole contains or has a composition of one or more volatile digital assets 240, the entire whole has a volatile intrinsic property. However, all of the digital assets 240 contained in the whole must be static 282C for the whole to have an intrinsic static property. Similarly, all of the digital assets contained in the whole must be non-runnable for the whole to have an intrinsic property of non-runnable.

The whole can contain or have a composition of digital assets 240 that are either homogeneous or heterogeneous. Here homogeneous or heterogeneous is with respect to the intrinsic property of the digital assets contained in or being members (composition) of the whole. Examples include homogeneous runnable wholes or a heterogeneous runnable wholes. Runnable wholes can be homogenous or heterogeneous.

Association can be a physical association or a logical association or both. A physical association can be defined from any grouping of two or more digital assets, e.g. a file containing two or more records (objects, structures, etc.) is a physical association. A logical association of digital assets 240 describes discrete connections among the respective digital assets 240 in the respective whole. A logical association carries information about relationships among the digital assets in the whole, e.g. two or more runnable objects logically associated by a call graph. Another example of a logical association is the HTML code of a Web page that identifies and logically associated a number of executable digital assets 240 (e.g., JavaScript™) and one or more static content component (e.g. a way file). A logical association can also be define by one or more rules, e.g. specifications of the association. These rules could describe group/role associations; business, marketing, and/or pricing associations; or any general association that can be specified or defined in this way.

An example of a logical and a physical association is a containment graph representing all executable and data files in an application 108 and their topology that may physically reside in a single data structure in memory, such as a package (see below). Another example of a logical and physical association is a collection object such as a vector collection object in C++, which may store one or more homogeneous digital assets 240 in memory, with the basis of their joint association preserved externally from the collection. Here it becomes apparent that logical associations can be internal (within the whole) or external (external to the whole).

A digital asset 240 shares a joint membership with other associated digital assets 240 in a whole. Generally, if the whole contains at least one runnable digital asset, this whole is any of the following parts 100F: a system 105F, a sub-system 106F, application 108, a sub-application 110F, a component 120F, a module 130F, or a function 140F. (See the description of FIG. 1F.) Typically, whole that contain at least one runnable asset also have other associated digital assets associated with the runnable digital asset. Often these wholes contain non-runnable digital assets as well so the whole is heterogeneous.

A composition is an assembly of parts that forms a whole. The composition part-whole relationship is well-known, and generally, the system parts 100F are well-known instantiations of compositions.

Figure 4:
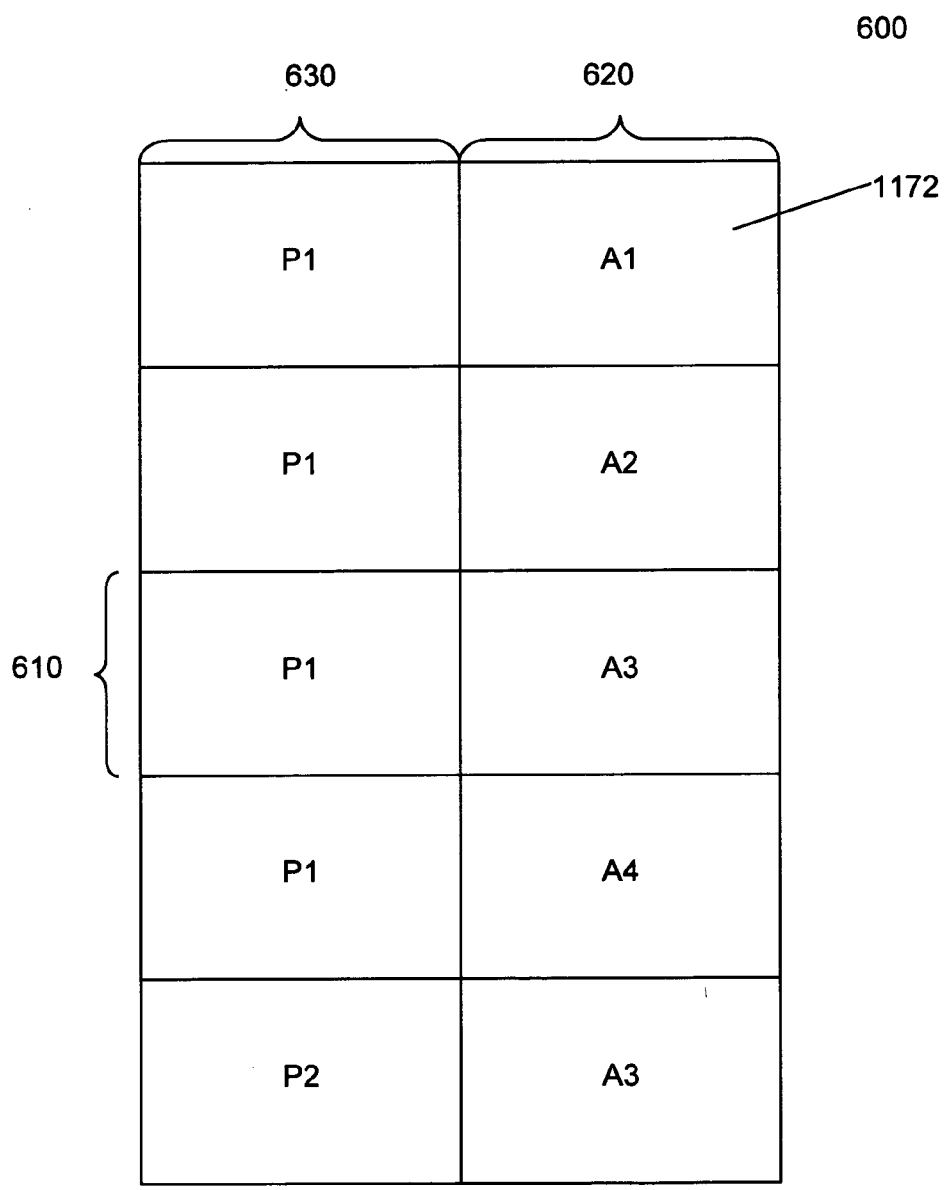
FIG. 4 is a block diagram of a package data structure (i.e., a package structure) showing the assets associated with a package according to one embodiment of the present invention.

FIG. 4 is a block diagram of a package data structure (i.e., a package structure) showing the assets associated with a package according to one embodiment of the present invention. The package data structure 600 identifies the assets that are grouped together in a package according to the embodiment shown in FIG. 4. In an alternative embodiment of the present invention, where a package consists of only a single asset, the block diagram shown in FIG. 4 is less relevant as each package is associated with a single row or record 610 in the package data structure.

According to the embodiment illustrated in FIG. 4, each record 610 of the package structure 600 may contain an asset field 620 and a package field 630 associating one or more assets in the asset field 620 with a package in a package field 630. A unique package identifier may be stored in the package field 630 and a unique asset identifier may be stored in the asset field 620. As previously stated, a package structure 600 (i.e., a package) may be a subapplication of an application on one or more Enterprise Information Systems ("EIS"). A package structure 600 may be a non-proprietary subapplication of a proprietary application on one or more Enterprise Information Systems (EIS). Alternatively, a package structure 600 may be a smaller subapplication of the EIS that may be run on a target node or system with less capability that the EIS. A package structure 600 may also be any subset of the EIS that the enterprise chooses to distribute over the network to be executed on a remote target node or system.

As stated above, a package structure may include a novel combination of assets including, for example, a relational data asset and a present component asset in the same package. In another example, a transaction component asset and/or a static content asset may also be included in the previous package structure example. In an alternative embodiment, a package structure 600 may include at least one static content asset and at least one presentation component asset. In another embodiment, a package structure 600 may include at least one asset from the static content asset category (i.e., a static content asset type) with at least one asset from the presentation component asset category (i.e., a presentation component asset type). In this embodiment, additional assets from the relational data category and/or the transaction component asset category may be further included in the package structure 600. In one embodiment, a legacy system asset may be included in a package structure 600.

According to one embodiment, an asset in a package structure 600 may belong to the presentation component asset category or to the transaction component asset category. Such an asset may have a logic/data layer including a subsystem, an application, a subapplication, a component, a module, a function, a variable of an EIS program, and/or a data structure. In one embodiment, the logic/data layer may use an object-oriented language. Where the logic/data layer is embodied in an object-oriented language, the logic/data layer may include a Java™ Archive File ("JAR"), a Java™ package, and/or a Java™ class. Where the logic/data layer uses a Java Platform 2 Enterprise Edition™ ("J2EE") object-oriented language, the logic/data layer may further include a JSP, a Java™ servlet, and/or an EJB.

In another embodiment, a package structure 600 may include a relational data asset which may incorporate other elements in addition to relational data. For example, these elements may include a data structure, a set of relational database data, a set of object-oriented database data, one or more serialized objects, a set of hierarchical database data, a subset of EIS data, one or more data sets extracted from one or more XML structures, and a flat file. In another embodiment, the package structure 600 may include an asset with an extended environment layer that is a subset of a respective EIS application, a target environment, and/or an intermediate server environment.

In one embodiment, a package structure 600 may include one or more assets that are a part or all of a base environment. For example, these assets may include: a Web server for an SC asset, a Java™ servlet engine for a JSP, a Java™ Runtime Environment for a Java™ class asset, an application server for an EJB asset (including SB and EB assets), and a DBMS for a data assets (e.g., an RD, ED, and EB asset). According to one embodiment, a Minimum Application Server ("MAS") may be used in the base environment. The MAS may provide the minimal services that an application needs when distributed to a client. This may include, for example, naming, Web, servlet, transactional, and database services. These services are termed minimal because they may not have the extended and/or proprietary features of similar services that may be provided in an EIS environment.

According to one embodiment, a package structure 600 may include an asset that comprises one or more of the following agents: a publishing agent, a subscriber adapter, a caching agent, and a computational agent.

In another embodiment, a package structure 600 may include an asset that comprises any one or more of the following adapters: a discovery adapter, a versioning adapter, an export adapter, a process adapter, a target adapter, a client deployment adapter, a synchronization adapter, a bridging adapter, an adjustment adapter, a streaming adapter, a quality of service (QoS) adapter, and an asset packaging process.

In another embodiment, a package structure 600 may include an asset of a reference data and/or entity data asset type with a logic/data layer that includes data based on one or more queries and with an extended environment layer that is database table schema.

In one embodiment, a package structure 600 may include one or more transaction component assets. A transaction component asset may perform business logic functions and/or manipulation of data in relational databases. Examples of transaction component assets may include: an EJB entity bean, EJB session beans, dynamic content used to access a database, and/or a Java™ class that has business logic and/or is used to access a database. A transaction component asset type may include:

a. an asset having an asset adapter based on a CDS/ADS adapter asset type, with a logic/data layer that is one or more asset adapter class files that each support one of the respective asset types, and with an extended environment layer containing licensing information.

b. an asset having a JSP asset type, with a logic/data layer that is a JSP and with an extended environment layer that is one or more JNDI entries.

c. an asset having a Java™ class file asset type, with a logic/data layer that is Java™ class file and an extended environment layer that is one or more JNDI entries.

d. an asset having a session bean asset type with a logic/data layer that is an enterprise JavaBean™ (EJB) implementation and with an extended environment layer that includes an EJB stub and an EJB skeleton deployment descriptor and at least one JNDI entry.

e. an asset having a Java™ entity bean asset type with a logic/data layer that is an EJB implementation based on a query and the extended environment layer that is an EJB stub and an EJB skeleton deployment descriptor and at least one JNDI entry.

f. an asset having a Smalltalk asset type with a logic/data layer containing a Smalltalk image.

g. an asset having a C++ asset type with a logic/data layer that is an executable file and with an extended environment layer that is one or more registry entries or environment variables.

h. an asset having a C++ asset type with a logic/data layer that is a dynamic link library ("DLL") and with an extended environment layer that is one or more registry entries or environment variables.

i. an asset having a Perl asset type with a logic/data layer that is Perl script and with an extended environment layer that includes at least one environment variable.

In one embodiment, the package structure 600 may include one or more static content assets. For example, a static content asset may be included where:

a. the static content asset type is an HTML page.

b. the static content asset type is an HTML page with an extended environment layer that includes a Web server alias.

c. the static content asset type is at least one of a JPEG file, a GIF file, a Java Applet, a Scalable Vector Graphics ("SVG") file, a Portable Document Format ("PDF") file, a Tag Image File Format ("TIFF") file, an Encapsulated Postscript ("EPS") file, a Portable Network Graphics ("PNG") file, an eXtensible Markup Language ("XML") file, a Wireless Markup Language ("WML") file, a Bitmap ("BMP") file, an eXtended HTML ("EHTML") file, a Dynamic HTML ("DHTML") file, a Motion Picture Experts Group ("MPEG") file, an AVI file, and any static content transferable via an HTTP protocol.

d. the static content asset type has an extended environment layer that contains a Web server alias.

e. one or more of the assets in the package has a music asset type with a logic/data layer that is an MP3 file and with an extended environment layer that is one or more sets of album and track information.

f. one or more of the assets in the package has a video asset type with a logic/data layer that is an MPEG file and with an extended environment layer that is one or more production notes.

g. one of the assets in the package has a document asset type with a logic/data layer that is a PDF file and with an extended environment layer that is one or more authentication certificates.

According to another embodiment, a package structure 600 may include a relational data asset (e.g., an RD asset and/or an ED asset) and a presentation component asset. In particular, a presentation component asset may can be a DC asset, a EJB asset, an SB asset, and an EB asset. The package structure, according to this embodiment, may further include a transaction component asset. For example, a transaction component asset may include an EB asset, an EJB asset, an SB asset, and a DC asset.

In another embodiment, a package structure may include an asset that is an asset adapter based on a CDS/ADS adapter asset type. The logic/data layer of the this asset adapter asset may include an asset adapter class file supporting a particular asset type. The extended environment layer may contain versioning information.

FIG. 5 is a block diagram illustrating an asset definition data structure according to one embodiment of the present invention. In an example embodiment, the asset definition data structure 700 illustrated in FIG. 5 may be a database table. In alternative embodiments of the present invention, the asset definition data structure 700 may take alternative forms other than a database table.

According to the example embodiment, each record or row 710 of the asset definition data structure 700 may contain a number of fields. An asset identificer field 720 may uniquely identify the asset for a particular application and may serve as the key or part of the key for the asset definition data structure 700. A location field 730 may contain information identifying where to obtain the asset. For example, the location field 730 may contain a Uniform Resource Locator ("URL") or Uniform Resource Identifier ("URI") for the asset. Other machine identification and/or location information (including memory location information) may be also used in the location field. A name field 740 may further identify an asset by providing, for example, a name and/or textual description of the asset. An asset type field 750 may identify the type of asset. For example, an asset may be one of the following types: SC asset, DC asset, EJB asset, SB asset, EB asset, JSP asset, RD asset, and ED asset. A version field 760 may identify the version or a time stamp for the asset and/or asset information. These aforementioned fields of the asset definition data structure 700 are exemplary. In alternative embodiments, some or all of these fields may be omitted and other fields 770 may be included.

In one embodiment where the asset definition data structure 700 incorporates information about a plurality of applications, an application identifier field (not shown) may also be included to uniquely identify the application for which the asset and/or asset definition applies. The application identifier field, when included, may also serve as part of the key for the asset definition data structure 700.

FIG. 6 is a block diagram illustrating a deployable asset data structure according to one embodiment of the present invention. The deployable asset data structure 800 may identify the current version of an asset. In an example embodiment, the deployable asset data structure 800 illustrated in FIG. 6 may be a database table. In alternative embodiments of the present invention, the deployable asset data structure 800 may take alternative forms other than a database table.

According to the example embodiment, each record or row 810 of the deployable asset data structure 800 may contain a number of fields. An asset identifier field 820 may uniquely identify the asset for a particular application and may serve as a key for the deployable asset data structure 800. A version field 830 may identify the latest version or latest update by, for example, a time stamp for the asset. An asset identifier 820 and a version 830 may correspond to a similar asset identifier and a version, respectively, in other data structures. For example, the asset identifier field 820 may be associated with the asset identifier field 720 in the asset definition data structure 700 illustrated in FIG. 5. Similarly, the version field 830 may be associated with version field 760 of the asset definition data structure 700 illustrated in FIG. 5, if that version field 760 is used in the asset definition data structure 700. These aforementioned fields in the deployable asset data structure 800 are exemplary and other fields may be included and/or substituted in other embodiments of the present invention.

FIG. 7 is a block diagram illustrating a target asset data structure according to one embodiment of the present invention. The target asset data structure 900 may associate a target node 920 with a target asset 930. In an example embodiment, the target asset data structure 900 illustrated in FIG. 7 may be a database table. In alternative embodiments of the present invention, the target asset data structure 900 may take alternative forms other than a database table.

According to the example embodiment, each record or row 910 of the target asset data structure 900 may contain a number of fields. A target node identification field 920 may uniquely identify a target node and may serve as part of the key for the target asset data structure 900. A target node may be one or more pieces of hardware (e.g., a computer) on a communications network and may include associated software according to one embodiment. For example, a target node may include a proxy server, an application server, a CDS/ADS server, an EIS, a computer running all or part of an EIS, and/or an application running on a computer. An target asset identifier field 930 may uniquely identify an asset for a particular application and may also serve as part of the key for the target asset data structure 900. For example, if a target node 920 subscribed to a particular Quality of Service ("QoS") or was associated with a particular program (e.g., a movie), the target asset(s) 930 that may be used to provide the target node 920 with the QoS or program may be associated with target node 920 in the target asset data structure 900. A target node identifier 920 and an target asset identifier 930 may correspond to similar node and asset identifiers, respectively, in other data structures. Both these fields in the target asset data structure 900 are exemplary and other fields may be included and/or substituted in other embodiments of the present invention.

FIG. 8 is a block diagram illustrating a target deployment queue data structure according to one embodiment of the present invention. The target deployment queue data structure 1000 may list the target nodes 1020 to which packages and/or assets are to be deployed (e.g., distributed). In an example embodiment, the target deployment queue data structure 1000 illustrated in FIG. 8 may be a database table. In alternative embodiments of the present invention, the target deployment queue data structure 1000 may take alternative forms other than a database table.

According to the example embodiment, each record or row 1010 of the target deployment queue data structure 1000 may contain at least one field—a target node identifier field 1020—identifying the target nodes to which one or more packages and/or assets are to be deployed. For example, the target nodes in the target deployment queue data structure 1000 may include clients, servers, proxy servers, localized servers, slave servers, forefront servers, source EIS systems, and/or target EIS systems. The target node identifier field 1020 may contain any designation uniquely identifying the target node. For example, the target node identifier field 1020 may contain a node name, a node machine address, a node Lightweight Directory Access Protocol ("LDAP"), and/or a node network name.

According to the example embodiment, the target deployment queue data structure 1000 may include only a target node identifier field 1020. In alternative embodiments of the present invention, the target deployment queue data structure 1000 may include one or more additional fields with additional information about the target node. In another embodiment, the target node identifier field 1020 may be a pointer and/or link or direct access to an eXtensible Markup Language ("XML") file containing information about the target node including a unique identification of the target node. In the example embodiment, the target deployment queue 1000 may be located on the CDS/ADS (discussed in greater detail below).

Figure 9:
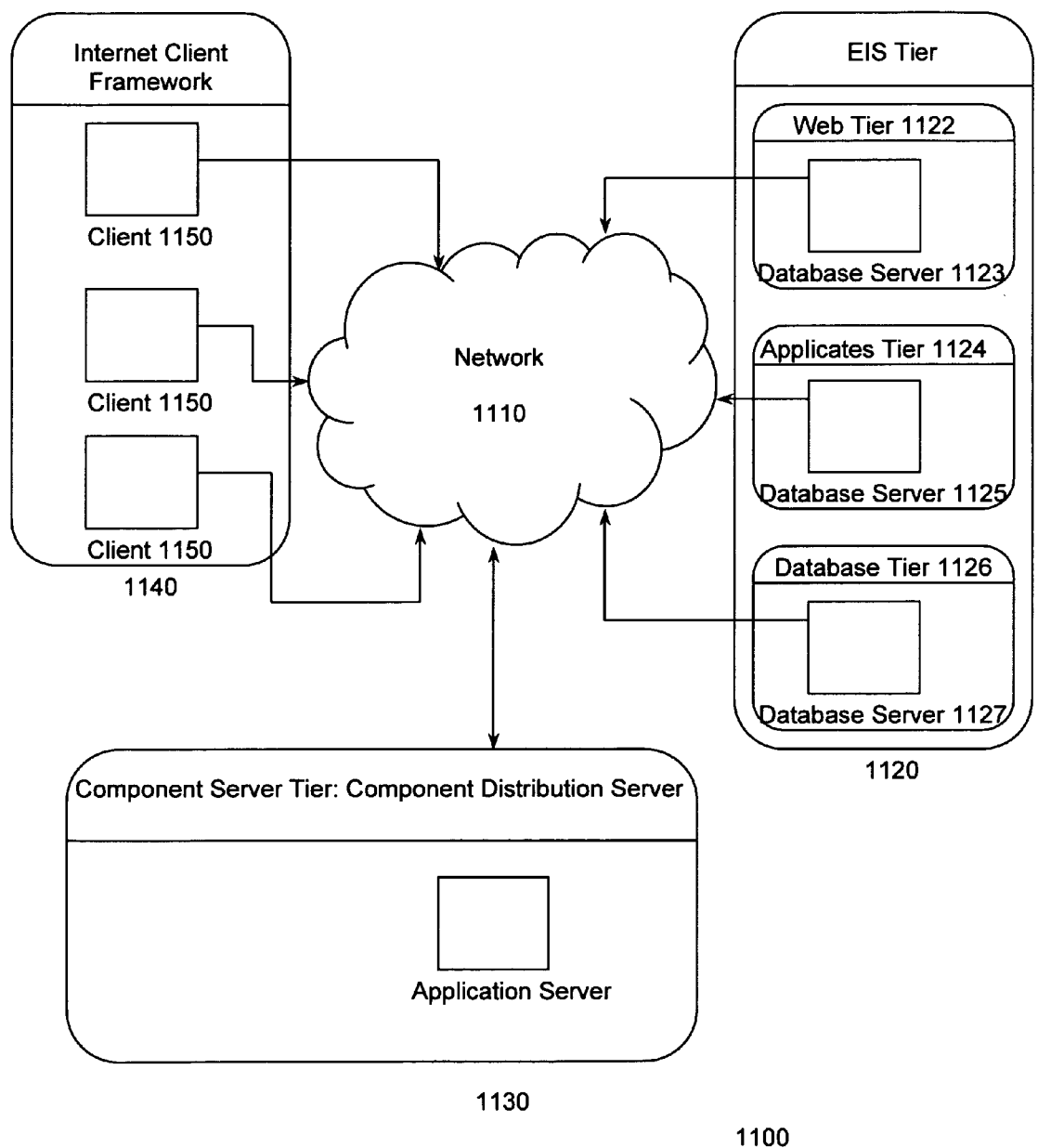
FIG. 9 is a block diagram illustrating a physical network architecture of a system according to one embodiment of the present invention.

FIG. 9 is a block diagram illustrating a physical network architecture of a system according to one embodiment of the present invention. According to the embodiment depicted in FIG. 9, the network architecture 1100 may involve one or more communication networks 1110 (e.g., the Internet) connected to at least one EIS tier 1120, at least one component distribution server ("CDS")/asset distribution server ("ADS") tier 1130, and at least one client tier 1140 of one or more target nodes 1150. The EIS tier 1120, CDS/ADS tier 1130, and client tier 1140 may be further divided into sub-tiers.

The EIS tier 1120 may be further divided into one or more sub-tiers according to the example embodiment of the present invention. For example, the EIS tier 1120 may include a Web tier 1122 consisting of at least one Web server 1123, an application tier 1124 consisting of at least one application server 1125, and a database tier 1126 consisting of at least one database server 1127. The Web tier 1122 may produce a Web page that may be served to a Web client (i.e., a target node) over the communication network 1110. The application tier 1124 may run an application program that may be specific to an EIS and/or client (i.e., target node). The results (e.g., the output) of and/or the input to the application may be communicated with a target node 1150 over the communications network 1110. The database tier 1126 may contain information that may be used by the application tier 1124 and may be accessed by the client tier 1140. According to one embodiment, the database tier 1126 may contain EIS data, such as legacy data, and may also contain non-EIS data available over the network 1110.

The EIS tier 1120 may be any computer application used by a business according to one embodiment of the present invention. For example, a business may be a traditional business and/or an electronic business (e.g., Web/Internet based). A business computer application (e.g., an EIS) may deal with business functions relating to, for example, raw material acquisition and handling, research and development, product manufacturing, product distribution and storage, marketing, retail and wholesale sales, customer relations, advertising, accounting, finance, taxes, business-to-business transactions, media, maintenance, equipment control, and/or inventory management.

The CDS/ADS tier 1130 may provide the facilities for identifying and/or extracting sections of a program and/or other software code and assembling these sections into assets and/or packages. The CDS/ADS tier 1130 and its component CDS/ADS servers may distribute these assets and/or packages to another tier, platform, and/or environment for execution.

According to the embodiment depicted in FIG. 9, a target node 1150 may be located in the client tier 1140 and may include any target (e.g., hardware or client) that can receive data over the communications network 1110. In the example embodiment, a target node 1150 may include a client agent (a software program) and/or a client (i.e., target node) architecture that allows for the remote execution of portions of an application (e.g., an EIS) business logic (e.g., EIS software elements) on a target node 1150. The client tier 1140 may include any target computer/hardware 1150 connected to the communications network 1110. For example, the client tier 1140 may include as a target node a personal computer of a client/customer, a point of sale computer for providing customer information, a kiosk-based computer, a Local Area Network ("LAN") server, a proxy server, a controller on a piece of equipment, a second EIS tier, and any other server connected to the communications network 1110.

Figure 10:
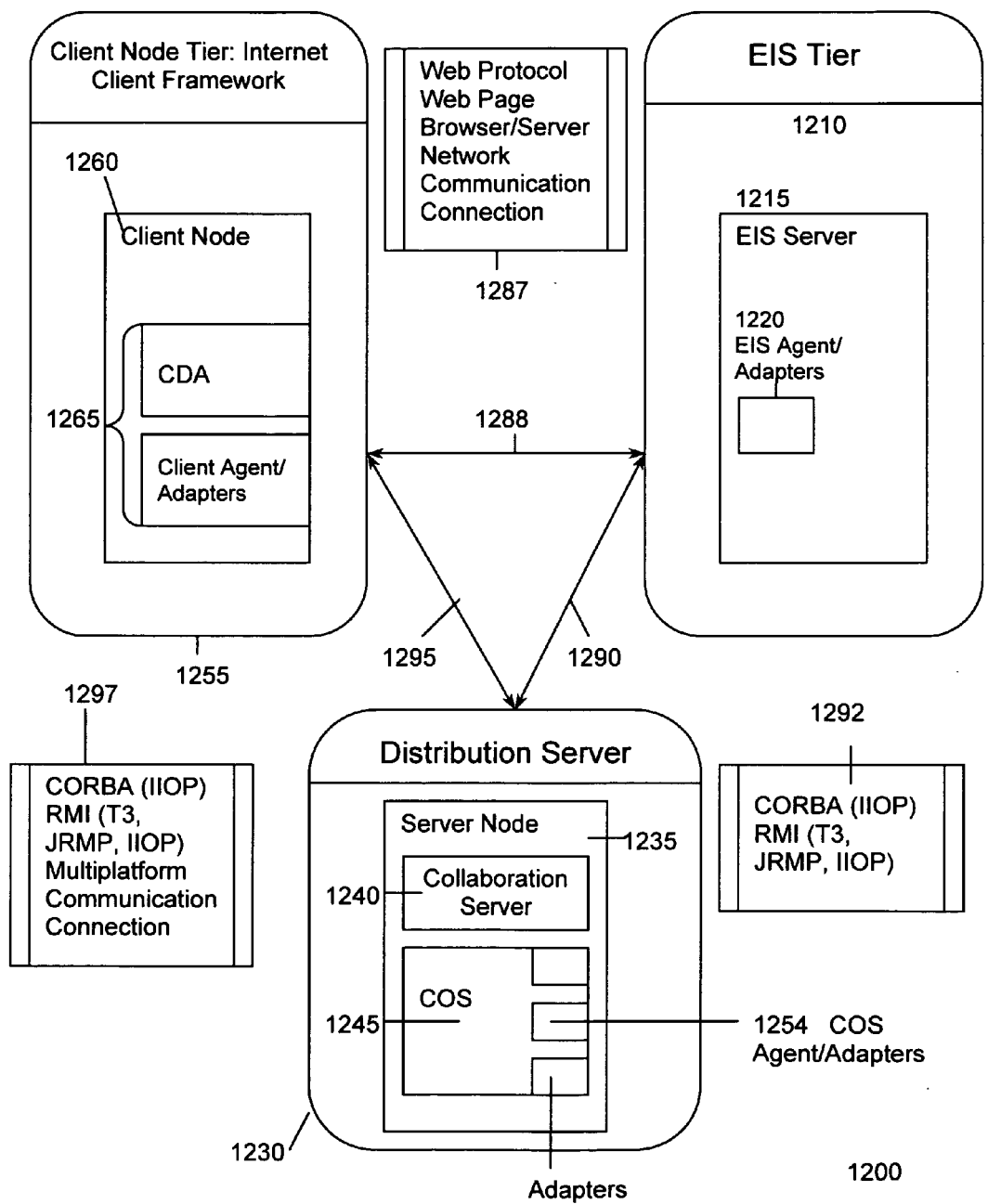
FIG. 10 is a block diagram illustrating a logical network architecture of a system according to one embodiment of the present invention.

FIG. 10 is a block diagram illustrating a logical network architecture of a system according to one embodiment of the present invention. The embodiment of a logical network architecture illustrated in FIG. 10 may be referred to as Distributed Internet Services ("DIS") 1200.

The EIS tier 1210 may include at least one EIS server 915 incorporating various configurations of EIS agents and/or adapters 1220 according to one embodiment of the present invention. An EIS agent and/or adapter 1220 may process an asset and/or other element of a software application program. According to one embodiment, an EIS agent and/or adapter 1250 may be part of the CDS/ADS tier 1230 and may be distributed to a respective EIS so that the EIS agent and/or adapter may operate. The EIS tier 1210 may be further divided into sub-tiers and may include at least one EIS and/or other application (i.e., software application program). The EIS tier 1210 may communicate with the client tier 1255 over a network connection 1285 using an appropriate network protocol 1287. These protocols 1287 may include, for example, Web and/or Internet protocols, browser/client protocols, network communication protocols, and connection protocols.

According to the example embodiment, the EIS tier 1210 may communicate over a network connection 1290 with one or more CDS/ADS servers 1235 in the CDS/ADS tier 1230. The communication between an EIS residing on an EIS server 1215 in the EIS tier 1210 and a CDS/ADS server 1235 in the CDS/ADS tier 1230 may be made using an appropriate protocol 1292. For example, an appropriate protocol 1292 for this communication may include the Common Object Request Broker Architecture™ ("CORBA"), Interoperable Internet Object Protocol ("IIOP"), and Remote Method Invocation ("RMI") such as, for example, for T3, Java™ Remote Interface Protocol ("JRMP"), and IIOP. The CDS/ADS tier 1230 may also communicate with the client tier 1255 through a network connection 1295 using an appropriate protocol 1297. These protocols may include, for example, CORBA (with IIOP), RMI (with T3, JRMP, and/or IIOP), and Multiplatform Communication Connection.

The CDS/ADS tier architecture may include one or more asset server nodes 1235 that may be distributed across two or more sub-tiers of the CDS/ADS tier according to one embodiment of the present invention. An asset server node 1235 may include a package specification process (not shown) that may involve various combinations of CDS/ADS agents and/or adapters 1250. In the example embodiment, the CDS/ADS agents and/or adapters 1250 may identify assets in respective tiers across a network and may package these assets for distribution to a target node 1260 on a client tier 1255 and/or other network tier.

In the example embodiment, an asset server node 1235 may perform a collaboration function provided by a collaboration server 1240. The collaboration function may be any collaboration function such as, for example, the collaboration function specified in pending U.S. Pat. No. 6,240,444, entitled "Internet Web page Sharing" to Fin et al. Issued on May 29, 2001 or U.S. patent application Ser. No. 09/947, 149, entitled "System and Method for Real-Time Collaboration Using Web Browsers" to Pace et al., filed on Aug. 31, 2001, that are both incorporated herein by reference in their entirety. The collaboration function may be performed in one embodiment by handling the TDS 1245 like any other asset that is packaged, distributed, executed, synchronized, and/or managed through an asset life cycle.

As stated above, the client tier 1255 architecture may include one or more target nodes 1260. A target node 1260 may include many different types of clients such as, for example, a personal computer, a workstation, a pervasive device, a local server (e.g. a LAN server), a proxy server, a general network server, and an EIS system. A target node 1260 and a client tier 1255 may be distributed throughout the network and may be divided into sub-tiers. A target node 1260 and a client tier 1255 may include a general network server and/or an EIS system functioning as a target node 1260 for a particular application, subapplication, component, module, and/or function. A target node 1260 may include one or more Client Distribution Agents/Adapters ("CDA") 1265, in various configurations (discussed below), that handle the communication between the target node 1260 and either the CDS/ADS tier 1230, another client tier 1255, and/or an EIS tier 1210.

Figure 11:
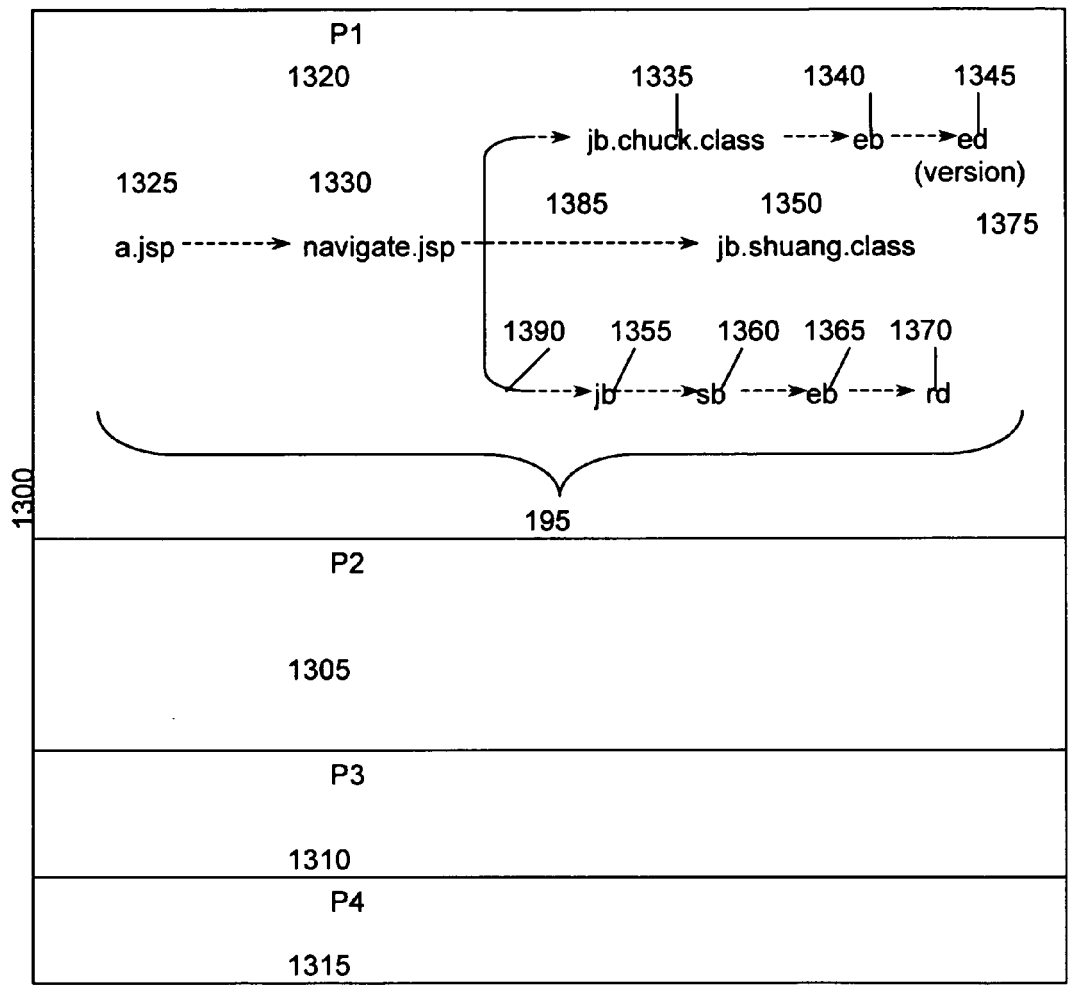
FIG. 11 is a block diagram of a data structure showing a plurality of packages according to one embodiment of the present invention.

FIG. 11 is a block diagram of a data structure showing a plurality of packages according to one embodiment of the present invention. An application program 1300 may be divided into one or more packages 1305, each of which may represent a portion of the application 1300. In turn, a package 1305 may be composed of one or more assets. The data structure illustrated in FIG. 11 shows several packages 1305–1320 designated P1–Pp. Each package may be composed of one or more assets according to the example embodiment. For example, package P1 1320 may include several assets 1325–1370. According to one embodiment, the assets in a package 1320 may have an expressed or implied logical relationship, e.g., shown by a call graph. For example, in package P1 1320, asset a.jsp 1325 may call an asset navigate.jsp 1330. The navigate.jsp asset 1330 may in turn call a "chuck.class" object 1335 via call graph edge 1380, a shuang.class object 1350 via call graph edge 1385, or a JavaBean™ 1355 via edge 1036. The chuck.class object 1335 may call an entity bean 1340 that may access entity data 1345 in a relational database. The JavaBean™ 1355 may call a session bean 1360 which may call an entity bean 1365 which may access reference data 1370 in a relational database.

In the context of a CDS/ADS according to one embodiment of the present invention, a package 1305 may refer to a logical collection assets. These assets may be grouped according to different criteria such as, for example, the locus of execution and/or the generation of a particular output. According to one embodiment and within the context of a Web application, a package may be a grouping of assets used to generate the output for at least one Web page. It may.

In the context of the CDS/ADS, the term package 1305 refers to a logical collection of assets. These assets can be grouped following different criteria, such as locality of execution or the generation of some output. Within the context of one embodiment of a Web application, a package is a grouping of the assets that are needed to generate the output for one or more Web pages. It is convenient to refer to these packages based on the URL associated with the request for the Web page the assets generate.

The aforementioned structure might be used through a Web page. The Web page would allow a user to see the balance of various accounts, such as checking, savings, and retirement accounts. The page would need to access the JSP pages to build the user interface. Those JSP's would access the class files in order to perform some intermediate functionality, such as sorting account entries in the summary. The session bean 1360 would be required for managing the data associated with the user's connection, and possibly accessing data in the relational database, such as the account balances. The entity bean 1365 would store information that represents a single data entity, such as a stock price table that provides the current value of stock prices used to calculate the balances of the retirement account.

Any one of the assets in this package may have a version 1375 according to one embodiment. The version 1375 may be any known way of distinguishing the asset 1395. In a preferred embodiment, the version is a time stamp. Other examples of versions 1375 include locations, machine/node number, source, destination, checksum, differencing algorithm, file name, file system extended attributes, other versioning information, etc., or combination of these. While packages 1305 can include the actual assets 1395 of the package 1305, in a preferred embodiment, this is not done. Rather, some identifier of the asset 1395 may be included in a list.

FIG. 12 is a block diagram illustrating a package definition data structure according to one embodiment of the present invention. In an example embodiment, the package definition data structure 1400 illustrated in FIG. 12 may be a database table. In alternative embodiments of the present invention, the package definition data structure 1400 may take alternative forms other than a database table.

According to the example embodiment, each package specification record or row 1405 of the package definition data structure 1400 may contain at least one field. A package identifier field (package ID) 1410 may uniquely identify a package and may serve as part of the key for the package definition data structure 1400. A package identifier field (package ID) 1410 may contain a package name and/or any other information that may uniquely identify a package such as, for example, a package number, an address of the package, an object identifier, and a URL/URI. In the example embodiment, the package ID field 1410 may contain the URL/URI associated with the package (or asset as discussed below) on an EIS.

The package definition data structure 1400 may also include timing information 1450 according to one embodiment of the present invention. The timing information 1450 may include any information that when a respective package is delivered to one or more locations over the network. Timing information 1450 may be designated in various forms according to different embodiments of the present invention. For example, an "immediate" designation 1452 specifies that the package should be delivered over the network as soon as the package is available for delivery (i.e. when the package is specified). In an alternative embodiment, a delivery start time 1454 may be provided in the package definition data structure 1400 to provide a time for the package to be delivered over the network. According to this alternative embodiment, the "immediate" designation field 1452 may be omitted or alternatively, provided with a value equal to "not immediate."

In another embodiment, if no package timing 1450 information is included in the package definition data structure 1400, the package can be immediately sent out.

In one embodiment, a delivery end time 1456 of a package may be given. According to this embodiment, the package may be scheduled for distribution over the network at any time prior to the delivery end time 1456.

Other variations of package timing are possible according to other embodiments of the present invention. An expire time field 1458 may be provided to indicate a time beyond which the particular package 1405 should not be sent. A remove time field 1460 may be provided to indicate a time beyond which the package specification record 1405 should be deleted, or marked unusable in the package definition data structure 1400. In another embodiment, a refresh rate field 1462 may be provided designating how often the package specification record 1405, or table 1400, should be updated. Variations on the combination of these above fields 1452, 1454, 1456, 1458, 1460, and/or 1462 may be used for the package timing information 1450 in other embodiments of the present invention.

Information about the location 1420 of a particular package may also be included in the package definition data structure 1400 according to one embodiment of the present invention. This location information 1420 may identify the location on the network where the package may be found. In one embodiment, the location information may include the URL and/or URI of the package. In another embodiment, a network host name may also be used to identify the location of a package.

In an alternative embodiment of the present invention, the package definition data structure 1400 may not need to define packages of potentially multiple assets. According to this embodiment, the data structure 1400 may describe individual assets each as a package where the package ID field 1410 may be replaced by an asset ID field. This may be the equivalent of describing packages containing a single asset where the package description data structure 1400 may also be thought of as an asset description data structure.

In one embodiment, the package definition data structure 1400 may be specified as an XML document. There may be an XML DTD (Document Type Definitions) associated with the document that specifies the allowed structure. An Application Markup Language ("AML") may refer to any XML document that adheres to the XML DTD defined for the package definition data structure 1400. HTML may be defined in a similar manner as XML and may support the specification of resources (e.g. text, other HTML documents, images) that are to be gathered and displayed within the document. AML may be used as a greatly expanded version of HTML. Since HTML covers only a small number of resources, the capability to define plug-in modules for both the browser and the Web server have allowed HTML to handle a greater range of applications.

Utilizing AML, the DIS may be able to support many more capabilities than the plug-ins that may otherwise be allowed. In some embodiments, the AML may specify the assets (i.e., resources) an application may need to display on a single page in a Web browser. The distribution of these assets to the target environment may be analogous to the downloading of assets using the HTTP protocol. However, using AML, any general Web and/or enterprise application (especially those defined by the J2EE specification) may be distributed from a server to a client (i.e., target) and may be executed in the target (e.g., client) environment without the need for additional plug-ins. Furthermore, using the infrastructure disclosed herein, a supporting environment may be provided for the deployment of any of these general assets on any given client without the need for specialized adapters/plug-ins according to one embodiment of the present invention. In addition, using this AML infrastructure, which may be designed from the ground up to support Web and/or enterprise applications, any general enterprise application may be discovered, processed, and distributed over any tier of the network so that these enterprise applications may be deployed on any given client on the network and the coherency of the applications and/or data at the enterprise system remains intact.

Figure 13A:
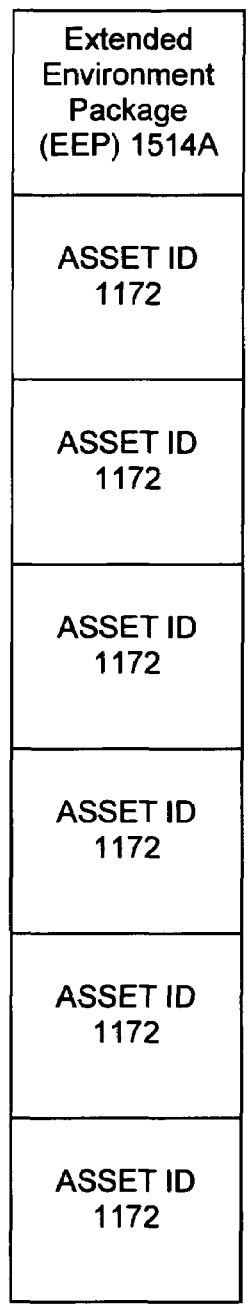
FIG. 13A is a block diagram illustrating an alternative package data structure with an Extended Environment for Packages ("EEP") according to one embodiment of the present invention.

FIG. 13A is a block diagram illustrating an alternative package data structure with an Extended Environment for Packages ("EEP") according to one embodiment of the present invention. According to this embodiment, a package structure 1500A may include an extended environment package ("EEP") 1510A and at least one asset which may be designated by an asset identifier 1520A. In one embodiment, an EEP 1510A may be an XML file as described above for the asset EE layer. An EEP 1510A may also include descriptors which may describe common features shared by the assets in the package structure 1500A according to one embodiment. For example, the following may be one potential EEP 1510A defined using XML:

```
<extended_environment package>
    <common> 1530A
        <name></name>
        <address></address>
        <size></size>
        <volatile></volatile>
        <runnable></runnable>
        <version></version>
        <user_type></user_type>
        <security></security>
        <priced></priced>
    </common>
    <dependencies> 1540A
        <package_dependencies> 1545A
            <package></package>
        </package_dependencies>
    </dependencies>
    <references> 1550A
        <reference_links></reference_links>
        <reference_files></reference_files>
        <reference_directories></reference_directories>
    </references>
    <pricing> 1560A
        <actual_price></actual_price>
        <price_scheme></price_scheme>
        <payment_details>
            <payment_method></payment_method>
            <credit_card_info></credit_card_info>
        </payment_details>
    <pricing>
    <security> 1570A
    </security>
</extended_environment package>
```

In an alternative embodiment, an EEP 1510A may have one or more common descriptors (e.g., 1530A in the XML code above). These common descriptors may include a package name, address, and/or size. The common descriptors may provide information common to all the assets in a package 1500A. For example, are all of the assets in the package volatile, runnable, the same user type, and/or the same version. Common descriptors may also indicate package level security or pricing information.

The EEP dependency descriptors (e.g., 1540A in the XML code above) may include package dependencies (e.g., 1545A in the XML code above) that describe other packages with which the package data structure 1500A is associated. In an alternative embodiment, an EEP 1510A may have one or more reference descriptors (e.g., 1550A in the XML code above). In one embodiment, the reference descriptors (e.g., 1550A in the XML code above) may include any one or more of the following at a package level: a reference link descriptor, a reference file descriptor, and a reference directory descriptor. The reference link descriptor may provide a World-Wide-Web ("WWW") address that has contents used for processing of the package. The reference link descriptor may also provide a WWW address that has contents used during execution of all the digital assets in the package. The reference file descriptor may be a unique fully qualified name of a file required for reference by the package. The reference directory descriptor provides additional address information that may be used to locate all the associated digital assets in the package. For example, the additional address information may include root or parent level directory names, which may be combined with the leaf directory level identification given in the common name descriptor to locate and fully qualify the path information for the digital asset.

In an alternative embodiment, the EEP 1510A may further include pricing descriptors (e.g., 1560A in the XML code above). The pricing descriptors may describe information about any well-known general pricing information at a package level including one or more of the following: a price, a price scheme (subscription, pay to own, pay to use, one time payment), a payment detail, and payment method (check, credit card, card number).

In another embodiment, the EEP 1510A may further include one or more security descriptors (e.g., 1570A in the XML code above). The security descriptors may be well-known and may describe any one or more of the following functions at a package level: encryption, authorization, and access control. Other EEP 1510A descriptors may be included in other embodiments of the present invention.

Figure 13B:
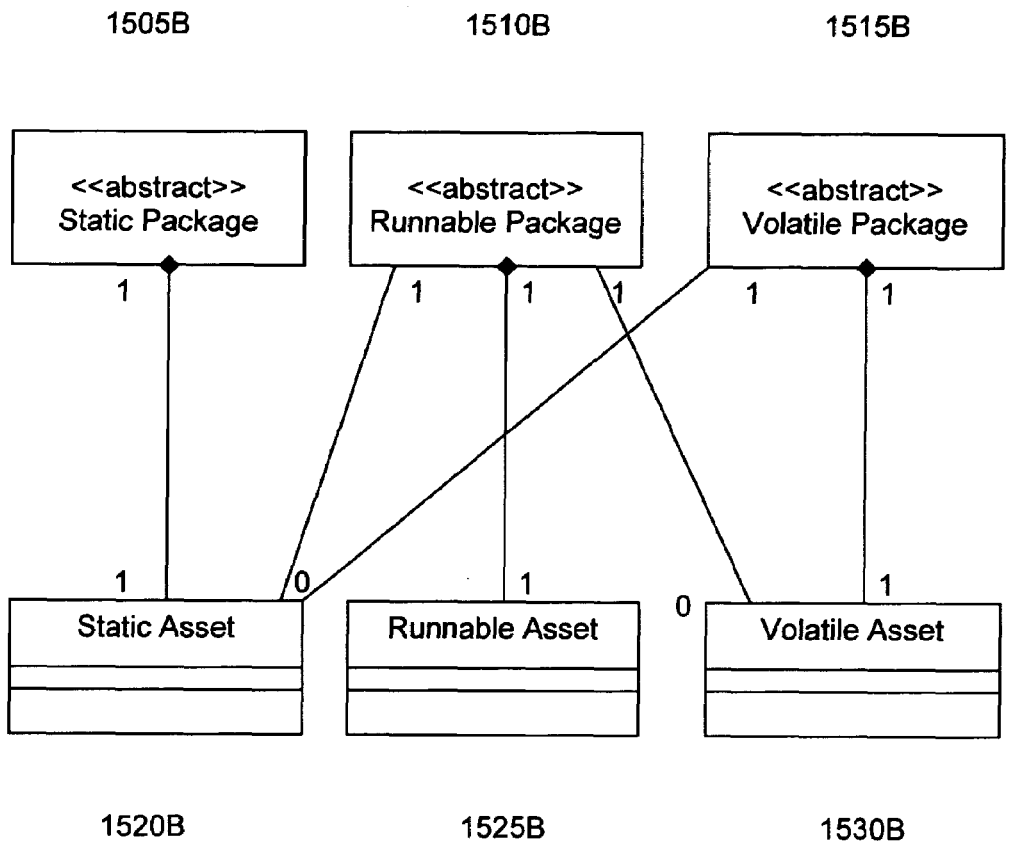
FIG. 13B is a UML diagram showing the transitive part-whole associations between certain digital assets and certain packages according to one embodiment of the present invention.

FIG. 13B is a UML diagram showing the transitive part-whole associations between certain digital assets and certain packages according to one embodiment of the present invention. According to this embodiment, a Static-Package class 1505B may include at least one StaticAsset 1520B as a member but may not include assets of other types. A RunnablePackage class 1510B may include least one RunnableAsset 1525B as a member and may also include a StaticAsset 1520B and a VolatileAsset 1530B. A VolatilePackage class 1530B may include at least one VolatileAsset 1515B and may also include a StaticAsset 1520B.

Figure 13C:
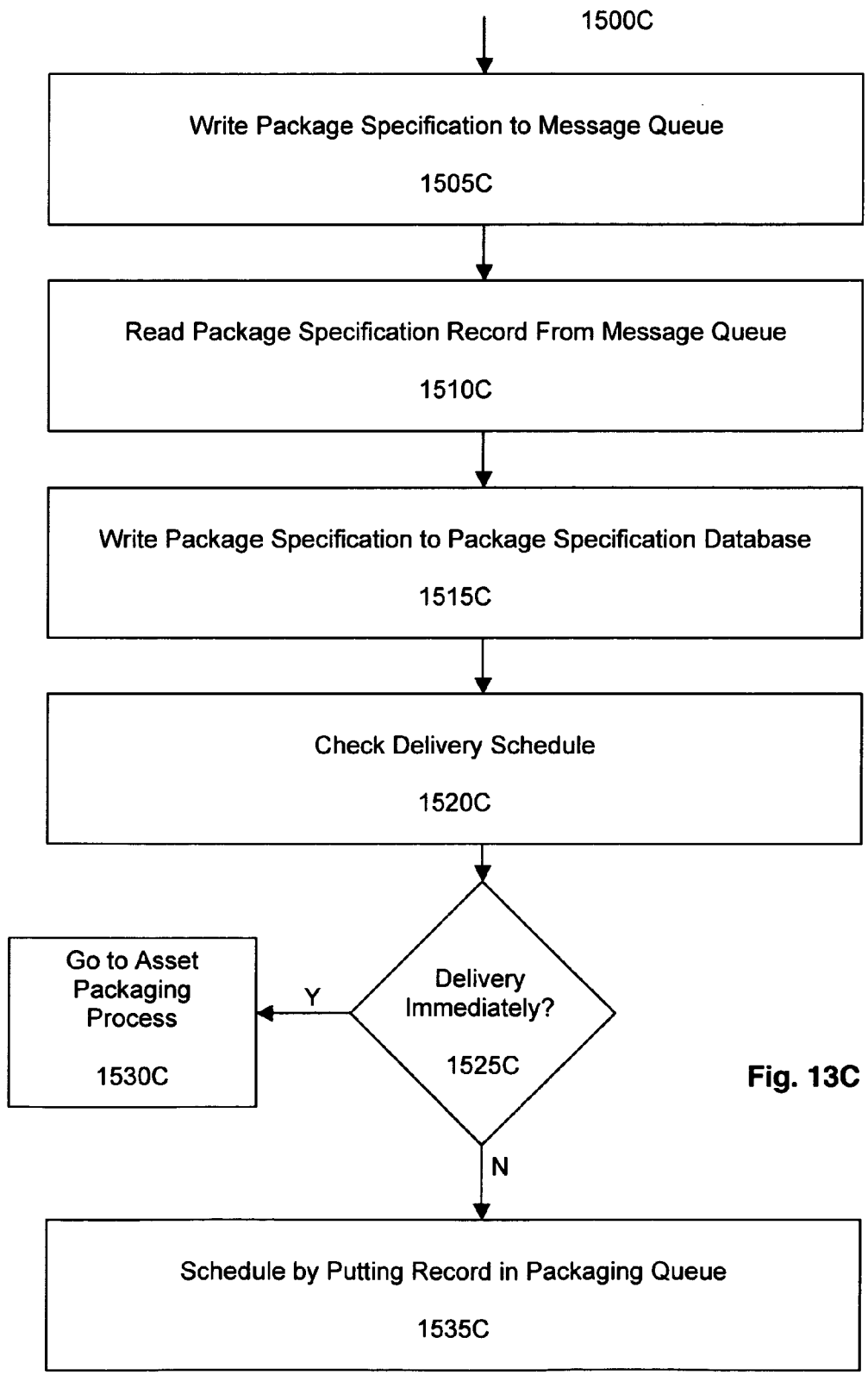
FIG. 13C is a flowchart of a package specification process according to one embodiment of the present invention.

FIG. 13C is a flowchart of a package specification process according to one embodiment of the present invention. The package specification process 1500C may determine whether a given package is ready for immediate delivery, in which case the assets in the package are packaged and delivered, or if the package needs to be scheduled for later delivery. In the example embodiment, the delivery/schedule process 1500C may use a message queue to "decouple" the schedule and delivery of one or more of the packages from other functions of the system.

Steps 1505C, 1510C, and 1515C of the delivery/schedule process 1500C, are an optional set of steps that may use the message queue of the system to place package specification records into a system database. These steps permit the system to do other functions without regard for the time used for receiving or storing the package specification records in the database—i.e., the decoupling. First, the package specification record may be written 1505C to the message queue. As the system processes the message queue, the package specification record 1505C is read 1510C from the message queue and then written 1515C to a package specification database record (in the system database) of the same format as the package definition data structure.

In the example embodiment, the package specification record may be written to the message queue by some automated process, or, using a tool to aid in the specification. For example, the export process described below may be one such automated process.

Step 1520C examines the copy of the package specification records in the system database to determine if the package specified by the package specification record is ready for immediate delivery. This can be done in various ways. In one embodiment, the immediate field of the package definition data structure may be examined. If the immediate field has a value of "immediate", the package specified by the package specification record may be sent 1530C to an asset packaging process (see below). If not, the specified package may be scheduled 1535C. In the example embodiment, the specified package may be scheduled by identifying the package in a packaging queue.

In alternative embodiments, delivery readiness 1520C, 1525C, may be determined by comparing the current time to various fields in the timing information of the package definition data structure discussed in FIG. 12. For example, if the current time is greater than a delivery start time, the package may be sent to the asset packaging process 1530C—if not, the package may be scheduled 1535C. Alternatively, if the current time is greater than a delivery start time and less than a delivery end time for a package, the package may be sent to the asset packaging process 1530C—if not, the package may be scheduled 1535C. If the current time is less than a delivery end time for the package, the package may be sent to the asset packaging process 1530C—if not, the package may be scheduled 1535C or deleted. Other "delivery immediate" checks 1525C may be incorporated in other embodiments of the present invention. In the example embodiment, the package may be scheduled by placing the package in a packaging queue 1535G. In an alternative embodiment, the packaging process may be performed before the package timing information is examined, leaving that examination for deployment time.

FIG. 13D is a block diagram of a packaging queue according to one embodiment of the present invention. In an example embodiment, the packaging queue 1550D illustrated in FIG. 13D may be a database table. In alternative embodiments of the present invention, the packaging queue 1550D may take alternative forms other than a database table. The packaging queue 1550D may have one or more packaging queue records or rows 1555D. Each of these packaging queue records 1555D may have a package ID 1552D and a packaging queue start time 1554D. In the example embodiment, step 1535C in FIG. 13C places data into the package ID field 1552D. In one embodiment, the queue start time 1554D may be determined by a deployment engineer. The packaging queue may contain and hold requests for the deployment of packages until they are scheduled for deployment at which time the package queue record 1555D may be deleted.

According to the example embodiment of the present invention, the data structures discussed herein, such as the packaging queue, may be embodied as tables or views in a database management system such as, for example, a relational database management system ("RDBMS"). This may permit operations on the data structures using known database techniques, for example SQL queries in any known relational database manager.

Figure 13E:
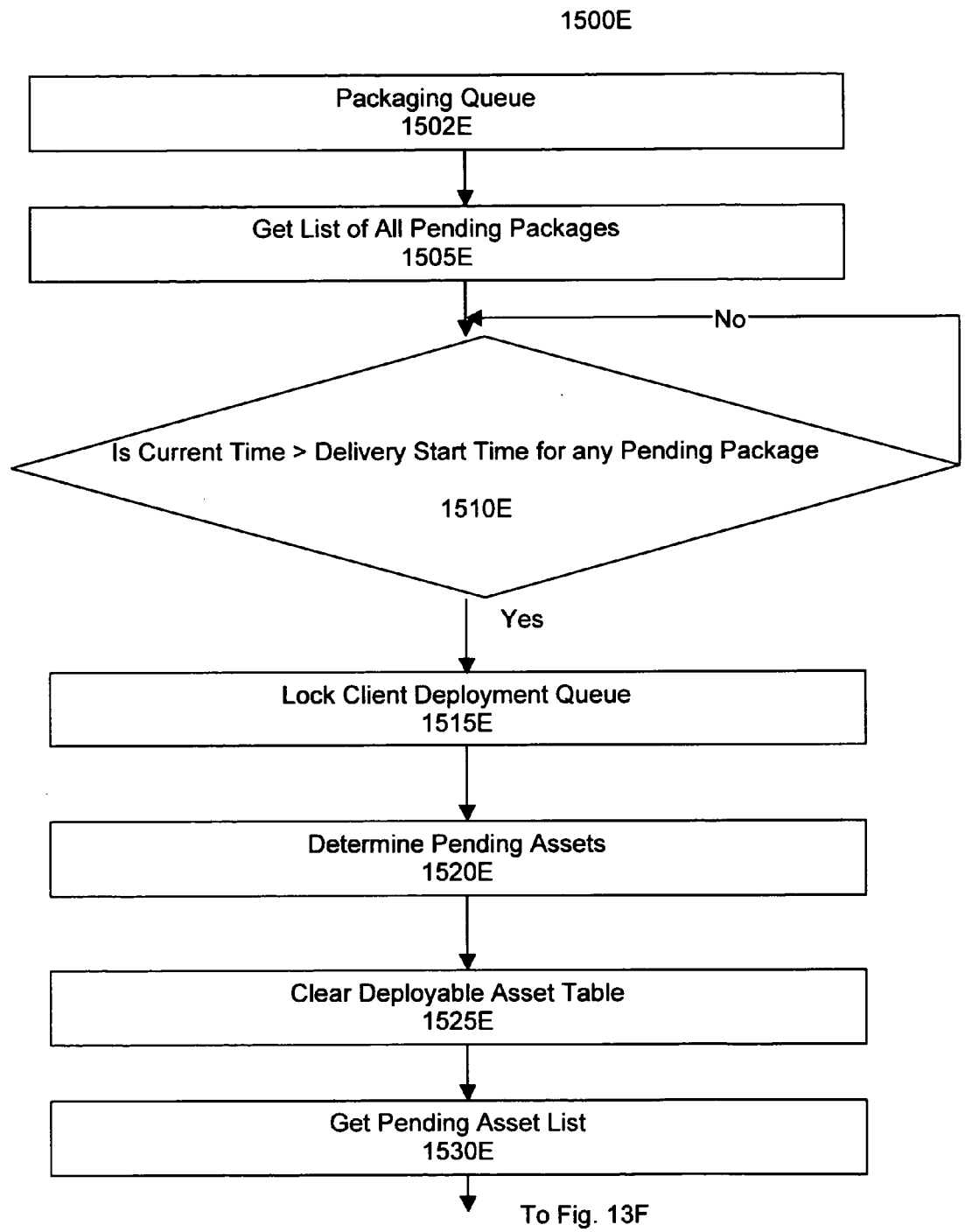
FIGS. 13E–13F are a flowchart of an asset packaging process according to one embodiment of the present invention.

FIG. 13E is a flowchart of an asset packaging process according to one embodiment of the present invention. The asset packaging process 1500E packages (i.e., groups) the assets making up a packages that needs to be delivered immediately or that is scheduled for later delivery if the start time is less than or equal to the current time, or if any other delivery requirements are met according to one embodiment of the present invention. The asset packaging process 1500E may use as input a record from the packaging queue (e.g., in the case of the "later" delivered packages) or the package ID of a package specification record for a package that is being delivered immediately.

The asset packaging process 1500E may first identify 1505E the pending packages (or assets, if a "single asset package"). A pending package may be any package on the packaging queue whose start time may be less than or equal to the current time, any package that may be known to need immediate delivery, or any package meeting any other delivery requirement.

Optional step 1510E determines which of the pending assets needs to be delivered at the current time. A pending asset may be any asset in a pending package. In a preferred embodiment, the pending asset may be any asset in a pending package that is not already located at any node/client requiring the respective asset.

If there are no pending assets, the process 1500E waits for a period of time and then performs the check 1510E again. This period of time may be determined by application requirements. In the example embodiment, the period of time may be the time between the current time and the time of delivery for the asset closest in time for scheduled delivery, e.g. listed in the packaging queue.

If it is determined that there are pending assets, the process proceeds to step 1515E which makes the process 1500E consistent while the assets are being packaged for delivery. In one embodiment, the client/target deployment queue (e.g., 1000 in FIG. 8) may be locked to achieve consistency. In an alternative embodiment, a distributed lock may be used to support clustering of the CDS/ADS. In other embodiments, any standard known contention resolution method may be used, e.g. transactional locks, synchronization, semaphores, mutual exclusion, etc.

In an alternative embodiment, if there are pending packages/assets that need to be distributed, any changes in the nodes (e.g. clients) that are to receive these packages/assets have to be fixed for a while in order to maintain consistency. In the example embodiment, the "lock" 1515E on a client/target deployment queue may accomplish this. The "lock" 1515E prevents any writing to or deleting from the client/target deployment queue until the lock is removed.

In step 1520E, the pending assets may be determined. The assets may be determined for the pending packages. In one embodiment, only those assets that are in a pending package that are not included in one or more node/client registers for the respective asset are determined as being pending assets. In the example embodiment, only those assets that are in a pending package that are not included in one or more nodes/clients registered for the respective asset, and are not in an asset cache, e.g. accessible by the server, are determined as pending.

In one embodiment, this determination may be done by logical intersections between the set of assets in pending packages and a set of registered assets (associated with specific nodes). This can be done by using well-known database techniques, for example SQL queries in any relational database manager.

In one embodiment, some of the information in the package definition data structure may be specified by an external system in the form of a text based data structure such as XML. Additionally, the information contained in the package record, the package content data structure, and the asset definition data structure may be represented in relational database tables for the purpose of performing set operations on this and other data in the CDS/ADS data store (i.e., the database). For example:

The reference numbers in the following SQL create statements correspond to the reference numbers in FIGS. 4, 5 & 12:

```
CREATE TABLE PACKAGEDESCRIPTOR (              1400
    PACKAGE_ID     VARCHAR(32)   NOT NULL,    1410
    IMMEDIATE      CHAR(1)       NOT NULL,    1452
    URL            VARCHAR(200)  NOT NULL,    1420
    REFRESH_RATE   INTEGER,                   1462
    START_DT       TIMESTAMP     NOT NULL,    1454
    STOP_DT        TIMESTAMP,                 1456
    EXPIRED_DT     TIMESTAMP,                 1458
    REMOVE_DT      TIMESTAMP,                 1460
    PRIMARY KEY (PACKAGE_ID)
CREATE TABLE PACKAGEASSETS (                   600
    PACKAGE_ID     VARCHAR(32)   NOT NULL,     630
    ASSET_ID       BIGINT        NOT NULL,     620
    PRIMARY KEY (PACKAGE_ID,ASSET_ID)
CREATE TABLE ASSETDESCRIPTOR (                 700
    ASSET_ID       BIGINT        NOT NULL,     720
    ASSET_TYPE     VARCHAR(3)    NOT NULL,     750
    ASSET_NAME     VARCHAR(100)  NOT NULL,     740
    TIMESTAMP      TIMESTAMP,
    PRIMARY KEY (ASSET_ID)
```

The use of primary keys as in the above tables is a well-known way of defining how a table may be stored and accessed.

For the purpose of this embodiment, two relational database views, VIEW_S1 and VIEW_S2, are created. Step 1520E uses these views to determine which assets are candidates for client deployment. These views are described as follows:

CREATE VIEW VIEW_S1 (PACKAGE_ID, URL) AS
  SELECT PACKAGE_ID, URL FROM PACKAGEDE-SCRIPTOR
  WHERE START_DT<CURRENT TIMESTAMP
CREATE VIEW VIEW_S2 (ASSET_ID) AS
  SELECT DISTINCT ASSET_ID FROM PACKAGE-ASSETS
  WHERE PACKAGE_ID IN
  (SELECT PACKAGE_ID FROM VIEW_S1)

VIEW_S1 may be a subset of the data contained in the PACKAGEDESCRIPTOR table (e.g. 1400). The subset may be obtained by selecting those package ID's that correspond with start dates later than the current date.

VIEW_S2 may be a subset of the data contained in the PACKAGEASSETS table (e.g. 600). The subset may be obtained by selecting those asset ID's in the PACKAGE-ASSETS table that have package ID's contained in view VIEW_S1.

Optional step 1525E clears a deployable asset data structure. This may be done to prevent duplicate entries in the table and to prevent the table from over filling.

In an alternative embodiment, only the entries in the deployable asset data structure associated with the package or packages being distributed are cleared. This may be done to prevent duplicate entries in the table and to prevent the table from over filling.

Step 1530E may retrieve a list of pending assets (e.g., result of intersection, selecting the contents of the VIEW_S2 view into the ASSETDESCRIPTOR table 700). Step 1535E may send a request to an EIS for the current version of the assets on the list. In an application where the version of the asset may be unimportant, step 1535E may be omitted in one embodiment of the present invention. The version/timestamp field 760 of the asset definition data structure may be left empty.

In an alternate embodiment, the SQL queries used to define the views could be combined into a single SQL query. Such a query could be executed to obtain the results and insert those results into, for example, the final ASSETDESCRIPTOR table.

In the example embodiment, step 1535E may send the list of pending assets to the EIS distribution agent. The EIS distribution agent may then update 1540E the list with the current version. In one embodiment, the EIS distribution agent compares the asset IDs (e.g. file names) on the list to the current versions in the EIS. The EIS distribution agent may then write the current version of the respective asset (asset ID) to the list in the version field of the asset definition data structure (760 in FIG. 5). The list may be then returned 1340 to the CDS/ADS by the EIS export agent (see the description in FIG. 16B, 1600, below).

The CDS/ADS uses the list with the current version of the assets to update the deployable asset data structure (800 in FIG. 6). In one embodiment, the CDS/ADS then determines the "final" deployable assets, which are the current versions of the assets in the deployable asset table minus the assets in the CDS/ADS asset cache that match. This may be done by subtracting those assets in the deployable asset data structure that are available to the CDS/ADS in a cache memory. This final deployable asset list may be sent to the appropriate EIS. For each asset on the list, an export asset adapter (discussed below) may be called for that asset, based on the asset type. The asset adapter persists the respective asset to a data structure that the EIS distribution agent sends to the CDS/ADS. The data structure may be determined by the asset type specific to the asset that is being used.

In step 1545E, the CDS/ADS may make a request of the EIS export adapter/agent to provide the assets listed on the current deployable asset data structure. Once these assets are received from the respective EIS, the CDS/ADS may store 1550E these assets in memory available to the CDS/ADS.

In the example embodiment, a cache may be used to store the assets on disk or in memory. The CDS/ADS may then write the deployable asset data structure to the asset cache data structure in the CDS/ADS. The CDS/ADS may write 1555E the target node IDs that require assets to the client/target deployment queue (1000 in FIG. 8). According to the example embodiment, the CDS/ADS may now have cached in one or more available memories all of the assets required by all of the target nodes at a given time. At this point, any locking step may be reversed 1560E, e.g. the client/target deployment queue may be unlocked. In other embodiments, the client locks may also be removed 1560E at this time.

In the context of the CDS/ADS, the term agent refers to a process or set of processes executing on a node, responding as a server and tasked with completing some significant job on behalf of the requesting process.

Figure 13F:
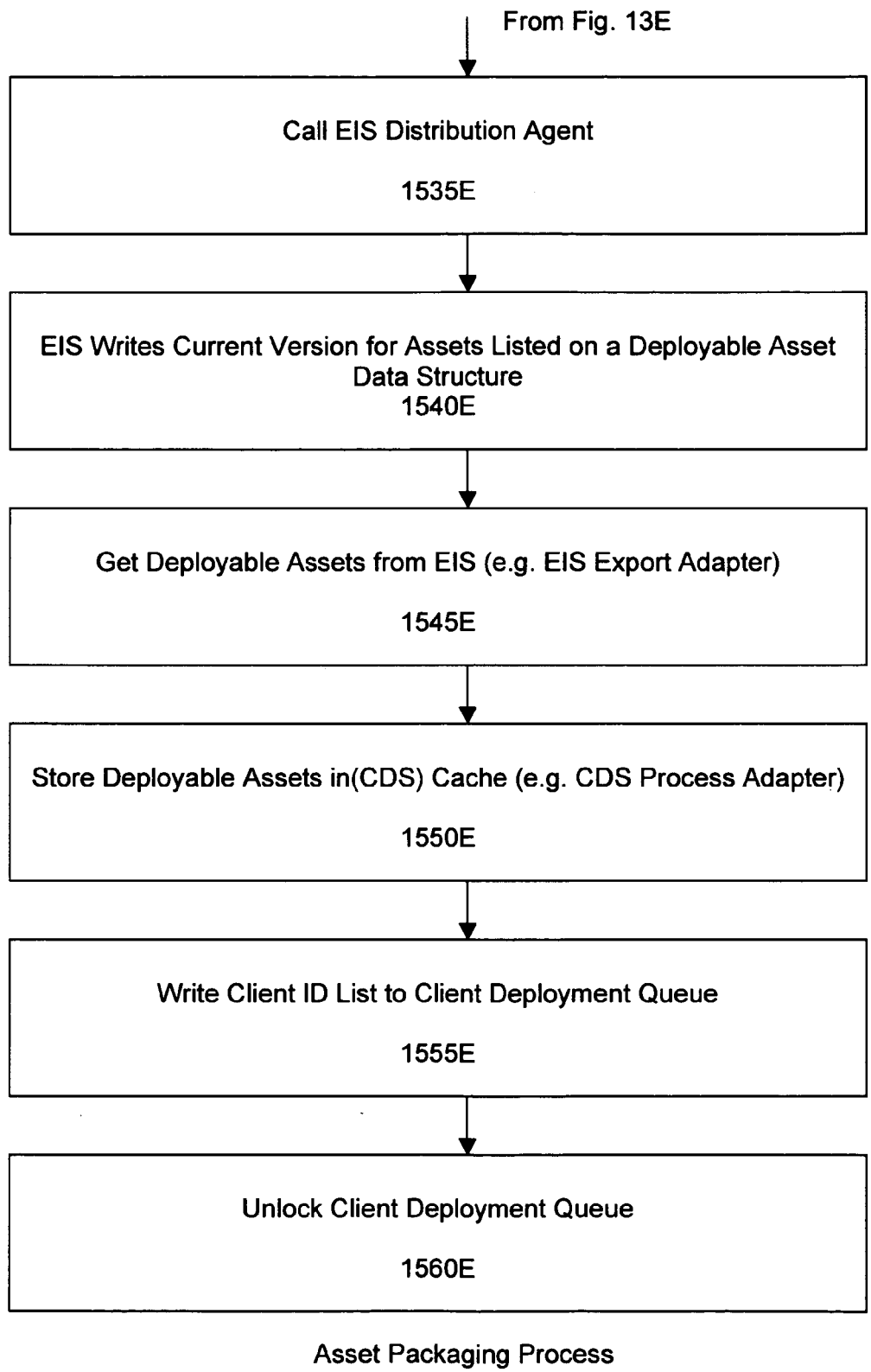

FIG. 13F is a flowchart of a client deployment process ("CDP") according to one embodiment of the present invention. The client deployment process 1500F may be used to deploy assets from the CDS/ADS, or distribution tier, to a respective client node. These assets, or asset fragments (as described below), are moved from the CDS/ADS to the client node as data structures, and the movement may be achieved through well-known network programming methods. In one embodiment, a client distribution agent ("CDA"), e.g. deploy, runs on a respective client/target node in order to determine whether assets need to be obtained from the CDS/ADS.

The client deployment process first 1500F determines if there are any assets pending for delivery to a specific target node. In one embodiment, the client deployment process 1500F queries 1520F the client/target deployment queue for its client identifier. If the identifier is on the queue, this indicates that the CDS/ADS has assets pending for delivery to the respective target node. Here, a pending asset may be any asset that has been identified and moved from the EIS to the CDS/ADS in steps 1520E–1555E of FIG. 13E. In a preferred embodiment, the asset may be associated with a package that has a delivery timestamp equal to or less than the current time, and which has not already been deployed to the client. The process may be able to determine if the asset has been delivered to the client by checking the list of assets and their timestamps, which may be stored in the client asset table (discussed below) which resides on the server.

Figure 13G:
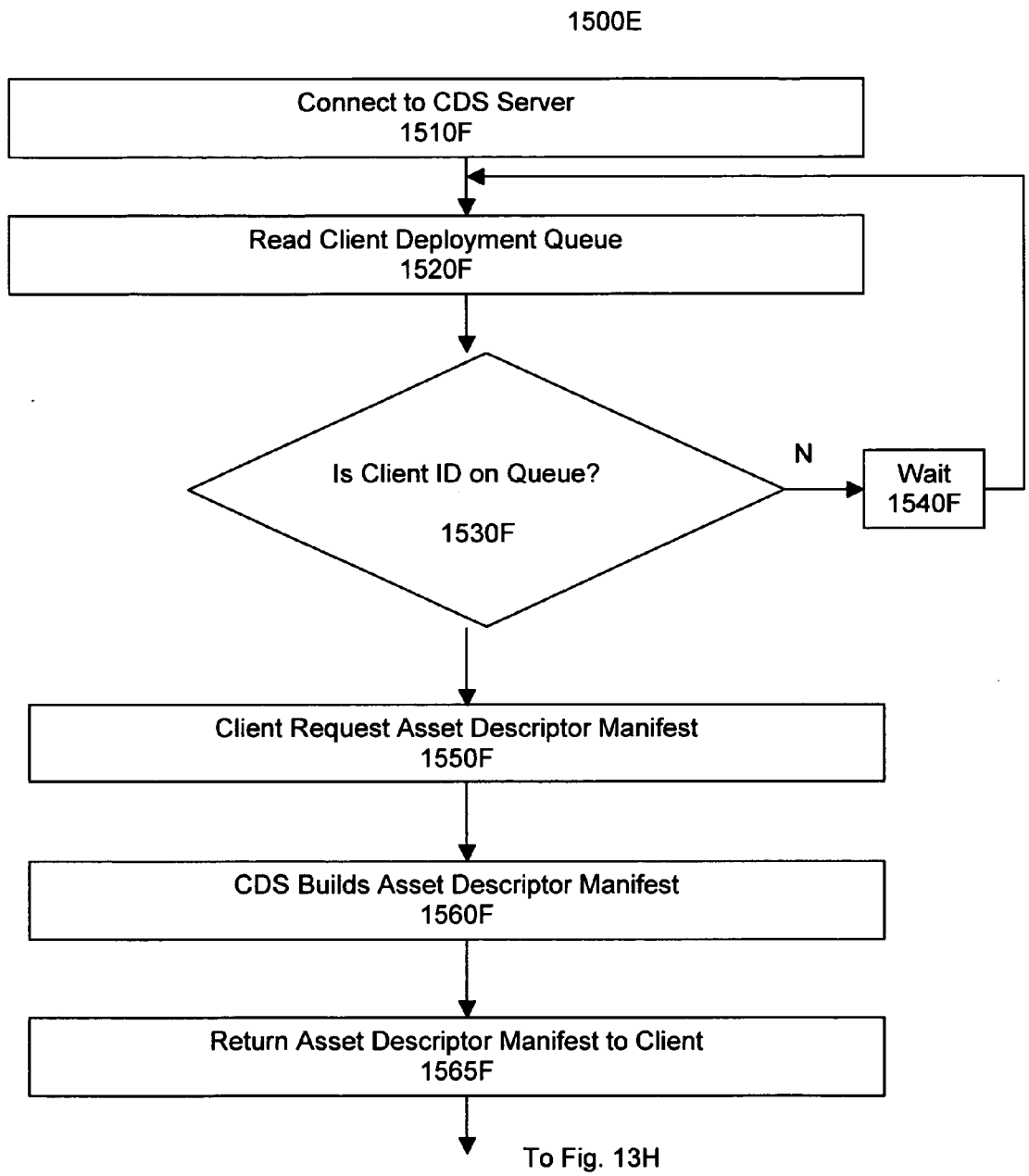
FIGS. 13G–13H are a flowchart of a client deployment process ("CDP") according to one embodiment of the present invention.

FIG. 13G is block diagram illustrating a client asset table according to one embodiment of the present invention. The client asset table 1500G may reside on the CDS/ADS and, in the example embodiment, as a database table structure as defined in the table create statement, below.

```
CREATE TABLE CLIENTASSETS (
    CLIENT_ID    VARCHAR(32)   NOT NULL,   1452
    ASSET_ID     BIGINT        NOT NULL,   1454
    TIMESTAMP    TIMESTAMP     NOT NULL,   1479
PRIMARY KEY (CLIENT_ID, ASSET_ID)
```

The client deployment process 1500F contacts the CDS/ADS in step 1510F in order to determine if there are assets pending for the target node in step 1520F. Each target node (e.g., client) has a target/client ID (e.g., 1020 in FIG. 8) associated with the. The target node may ask 1520F the CDS/ADS if there is a message corresponding to the target/client ID in the client/target deployment queue.

In step 1530F the target node agent residing on the client 1500F may determine if a message was pending in the client/target deployment queue. If a message is not pending, the client deployment process 1500F proceeds to step 1540F. If a message is found (is indicated) in the client/target deployment queue for the respective client/target node, the client deployment process 1500F proceeds to step 1550F.

If there are no entries in the client/target deployment queue for the respective client/target node, the process 1500F, may proceed to step 1540F. In step 1540F, the client deployment process 1500F waits for a message to appear in the client/target deployment queue. The client deployment process may wait a predetermined amount of time before checking the client/target deployment queue. In one embodiment, the predetermined amount of time can be calculated by determining when the next package that needs to be delivered.

In an alternative preferred embodiment, the client deployment process 1500F, will be given a hint as to how long the agent should wait 1540F before polling the CDS/ADS for the status of the client/target deployment queue. The hint could be algorithmically derived based on the performance requirements of the application that is being deployed.

In Step 1550F, the CDA requests an asset descriptor manifest (ADM) from the CDS/ADS (described below in FIG. 15H). The asset descriptor manifest (ADM) may be used by the CDA to communicate with the CDS/ADS about which assets or fragments of assets are yet to be transferred from the CDS/ADS to the respective client/target node via the CDA (distribution tier).

Figure 13H:
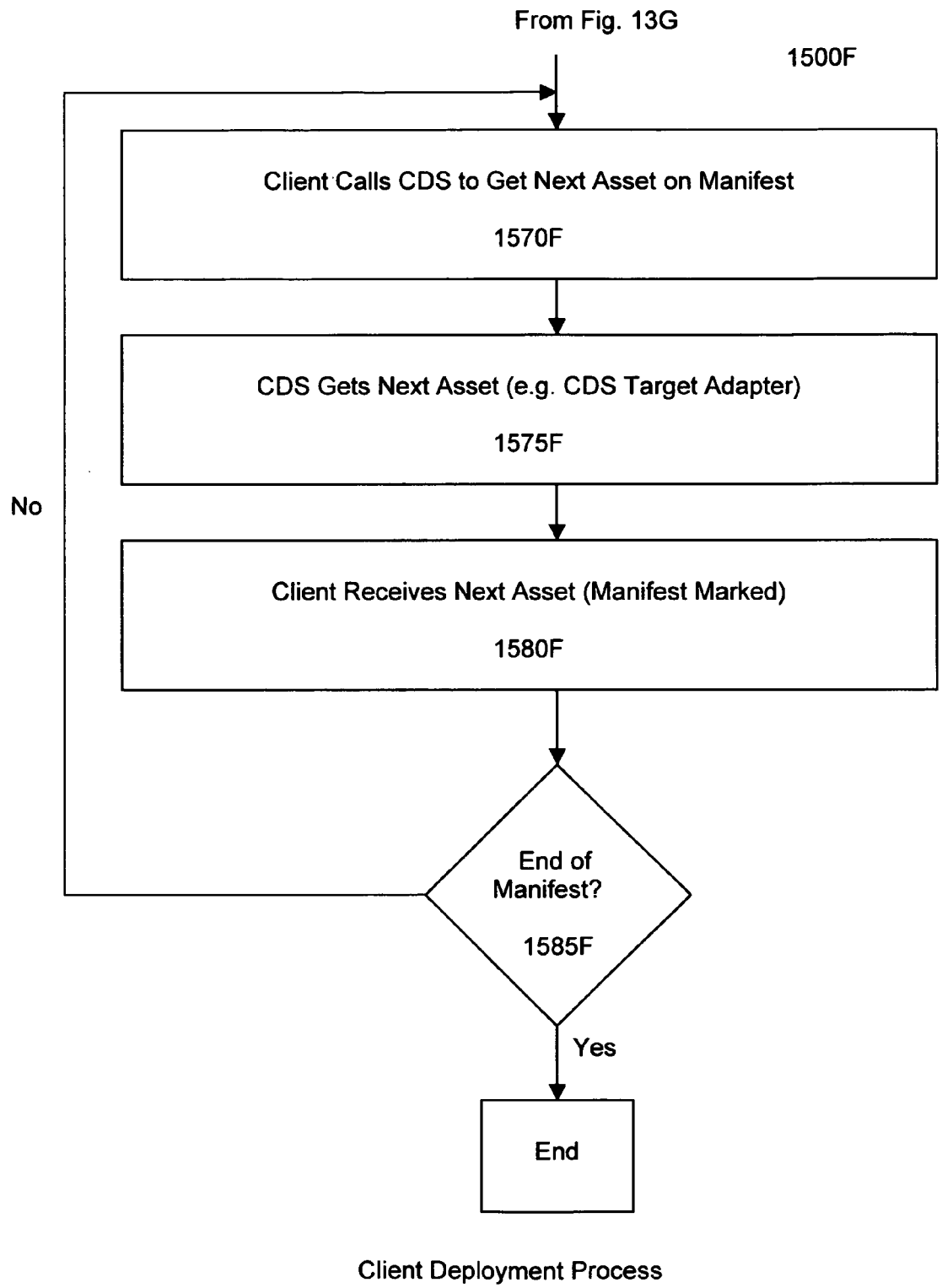
Figure 13K:
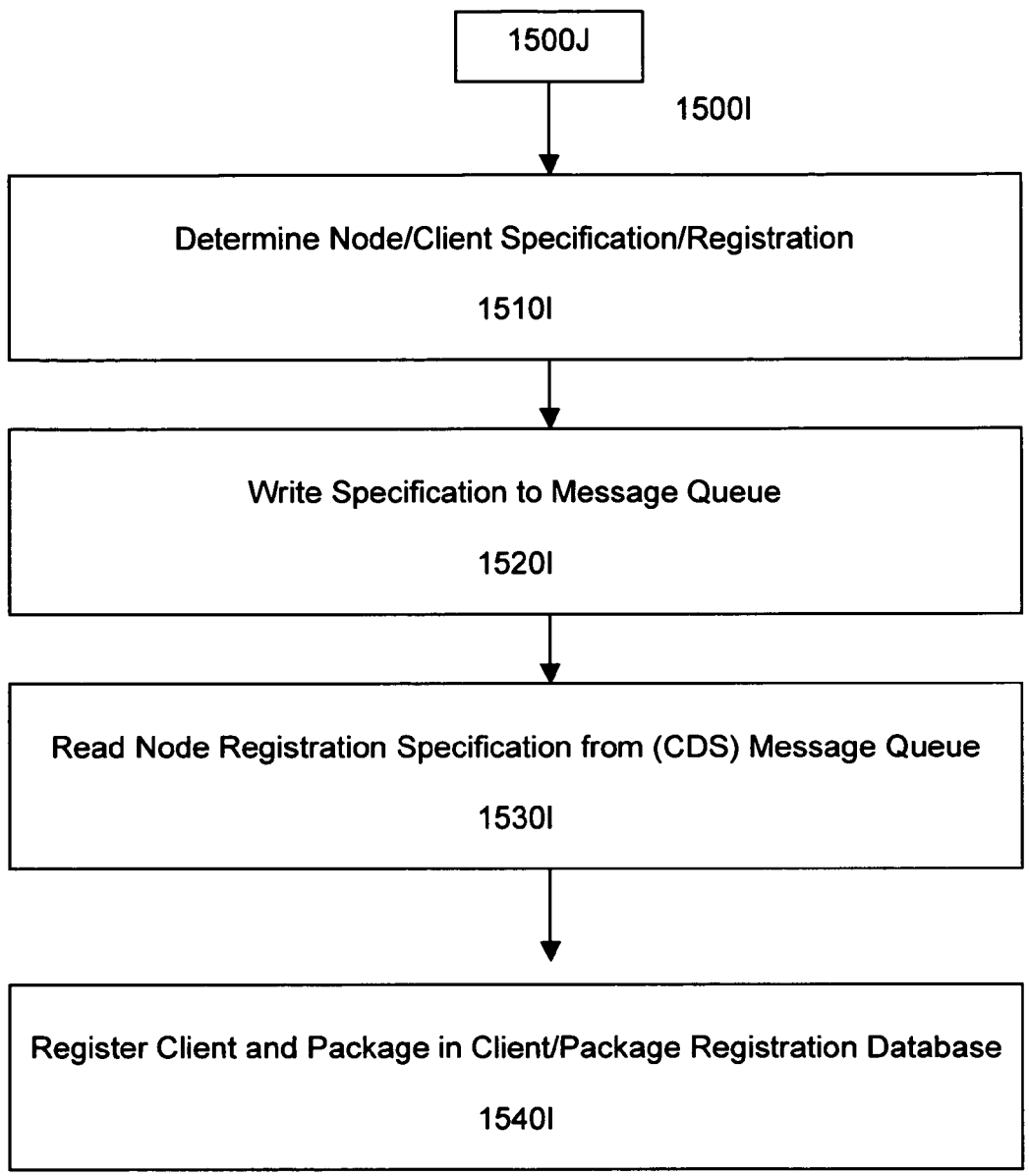
FIG. 13K is a flowchart of the node registration process (NRP) according to one embodiment of the present invention.

FIG. 13H is a block diagram illustrating the asset descriptor manifest data structure according to one embodiment of the present invention. The asset descriptor manifest may be a data structure that associates asset IDs 1554H and offsets 1556H and is used in a one embodiment of the invention. The ADM has records 1553H that may contain an asset ID field 1554H, an offset field 1556H, and, in a one embodiment, an asset type field 1558H.

See FIG. 12. The Asset Descriptor Manifest (ADM) 1490 may be made of a list of Asset Manifest Entries (AME, one per asset) 1453. A preferred AME 1453 has the following fields:

Offset 1556H: offset into file containing cached asset, e.g. the "boundaries of the asset fragment".
Cache name 1578H: name of cache file containing the asset.
Asset_Id 1554H: uniquely identifies an asset.
Timestamp 1579H: set to asset timestamp (or version).
Asset Type 1558H: In one embodiment, this field is not included in the ADM 1500H but the information may be obtained from other data structures for this embodiment.

The following describes how these fields are used. The CDA requests an ADM from the CDS/ADS when it finds an entry for it in the client/target deployment queue. The CDS/ADS initializes the ADM with a list of AMEs, one per asset to be deployed to the client. Each AME may be initialized as follows:

Offset=0
Cache name=name of cache file containing the asset.
Asset_Id=asset ID.
Timestamp: set to asset timestamp (or version).

The CDA then-starts requesting the archive containing the assets. The cache name, timestamp, and asset Id field in the AMEs don't change. The "offset" field reflects the offset into the cache file containing the asset. When all of the asset has been transferred, the offset for its AME may be set to −1. When all assets on the ADM have been transferred, all AMEs should have a −1 in their offset field.

In a preferred embodiment, the CDA doesn't interpret any fields in the AME and the AME is used by the CDS/ADS only. The CDA monitors the entries in the archive file it gets from the CDS/ADS. An asset may spread across several consecutive calls to the CDS/ADS. When the CDA detects that an archive entry name has changed, then it knows that an asset transfer has completed. The clients keeps track of when archive entries change to be able to reconstruct the archive on the client side. However, in a preferred embodiment, the assets are not deployed until the complete archive has been transferred to the client. Once the client detects that the archive transferred has been completed, it deploys the assets.

In a preferred embodiment, the process uses the views below. They are similar to those views used to determine what assets need to be cached (this is, brought over from the EIS), described elsewhere in this disclosure. However, the views below are used to determine what assets need to be deployed.

VIEW_S3A returns client assets that are up to date with respect to ASSETCACHE table.

CREATE VIEW VIEW_S3A (CLIENT_ID, ASSET_ID, TIMESTAMP) AS SELECT CLIENTASSETS.CLIENT_ID, CLIENTASSETS.ASSET_ID, CLIENTASSETS.TIMESTAMP FROM ASSETCACHE JOIN CLIENTASSETS ON CLIENTASSETS.ASSET_ID=ASSETCACHE.ASSET_ID WHERE CLIENTASSETS.TIMESTAMP=ASSETCACHE.TIMESTAMP AND CLIENTASSETS.ASSET_ID IN SELECT ASSET_ID FROM VIEW_S6 WHERE CLIENTASSETS.ASSET_ID=VIEW_S6.ASSET_ID

VIEW_S7A may be similar to VIEW_S7, but with respect to ASSETCACHE: it returns a list of assets to be deployed per client.

CREATE VIEW VIEW_S7A (CLIENT_ID, ASSET_ID) AS SELECT CLIENT_ID, ASSET_ID FROM VIEW_S6 WHERE ASSET_ID NOT IN (SELECT ASSET_ID FROM VIEW_S3A WHERE VIEW_S3A.CLIENT_ID=VIEW_S6.CLIENT_ID) AND ASSET_ID IN SELECT ASSET_ID FROM VIEW_S2)

VIEW_S9A may be similar to VIEW_S9 but with respect to ASSETCACHE table: it returns list of assets to be deployed per client (with respect to ASSETCACHE table with extra information about cache jar.

CREATE VIEW VIEW_S9A (CLIENT_ID, ASSET_ID, JAR, TIMESTAMP) AS SELECT VIEW_S7A.CLIENT_ID, VIEW_S7A.ASSET_ID, ASSETCACHE.JAR, ASSETCACHE.TIMESTAMP FROM ASSETCACHE, VIEW_S7A WHERE ASSETCACHE.ASSET_ID=VIEW_S7A.ASSET_ID

In Step 1560F, the CDS/ADS performs the set operations on the CDS/ADS data store tables (see below in this flowchart description) that are needed to determine which assets need to be sent to the CDA. These set of operations involve determining which assets are registered (in the CLIENTREGISTRY table) for the client ID, yet are not already on the client node. These asset ids are assembled (by inserting them into a list) into an ADM and returned to the CDA as step 1565F.

In step 1570F, the CDA calls the CDS/ADS to get the next asset, set of assets, or asset fragment from the CDS/ADS. The specification of the required assets may be achieved by sending the ADM to the CDS/ADS along with request for assets.

In some cases the asset may be very large and can spread across more than one client/target call to the CDS/ADS. In these cases, the CDS/ADS will send only part of the asset, i.e. an asset fragment to the client/target. The CDS/ADS marks the manifest so that the exact fragments sent to the client/target are precisely known. In this way, the CDS/ADS knows which fragments of the asset it needs to send to the client. In some preferred embodiments, the client/target (CDA) keeps track of the asset ID on the fragment, typically provided on a header. When the CDA detects a change in the asset ID, the CDA knows that a new asset is beginning. In some embodiments, the asset may be deployed (placed in the appropriate client/target environment depending on the asset type) as soon as the entire asset is received by the client/target. In other embodiments, the client/targets waits for all the assets on the manifest to arrive at the client/target before deploying all these assets at one time.

In step 1575F, the CDS/ADS examines the ADM and returns a data structure to the CDA. The examination of the ADM involves finding the next asset entry for which offset=0. The CDS/ADS then looks up the asset ID in the CDS/ADS database (e.g. cache) to find where the asset resides in the CDS/ADS asset cache. The CDS/ADS then reads the asset from the cache and builds a data structure for transferring the asset to the CDA. If the asset is large, the CDS/ADS may only read the asset partially, recording an offset indicating the position the CDS/ADS was at when it completed, in this way, the CDS/ADS could continue sending the asset from the offset where it stopped. If there are more assets, the CDS/ADS repeats the reading and recording process until it has read a sufficient number of assets, either meeting the order specified in the manifest or until the data structure is of a sufficiently large size. The CDS/ADS then proceeds to send the data structure containing the manifest and assets (and/or asset fragments) to the CDA.

In step 1580F, the CDA receives the data structure that is the result of the request in step 1575F, and proceeds to interpret the data structure. The CDA examines the ADM for the next entry that does not have an offset of −1. If a non-zero entry is the result, the client writes the asset associated with the asset in the entry to local storage and runs the deploy asset adapter corresponding to the asset type indicated in the ADM entry for the current asset. See the description of FIG. 15C below. Note that this way of determining offset may be one preferred embodiment and that there are many ways of performing this function known to those skilled in the art having the benefit of this disclosure.

If there are entries remaining in the manifest that have an offset of zero 1585F, the CDA proceeds to step 1570F. The reference numbers in the following SQL create statement correspond to the reference numbers in various locations in this description:

```
CREATE TABLE ASSETCACHE (
    ASSET_ID   BIGINT  NOT NULL, 1372, 1172, 1194,
                                 1454
    TIMESTAMP  TIMESTAMP  NOT NULL, 1374, 1179,
                                    1479
    JAR  VARCHAR( 100 ) NOT NULL,
    PRIMARY KEY (ASSET_ID)
```

The primary key in the above tables are a well-known way of defining how a table may be stored and accessed.

For the purpose of this embodiment, two relational database views, VIEW_S9, VIEW_S7, VIEW_S5A, VIEW_S3, VIEW_S6 and VIEW_S4, are created. Step 1560F uses these views to determine which assets are candidates for client deployment. These views are described as follows:

```
CREATE VIEW VIEW_S9 ( CLIENT_ID ASSET_ID,
    JAR) AS
        SELECT VIEW_S7.CLIENT_ID VIEW_S7.ASSET_ID,
ASSETCACHE.JAR FROM
        ASSETCACHE, VIEW_S7 WHERE ASSETCACHE.
           ASSET_ID=
VIEW_S7.ASSET_ID
    CREATE VIEW VIEW_S7 (CLIENT_ID, ASSET_ID,
    ACTION) AS
        SELECT CLIENT_ID, ASSET_ID, 'ADD' ACTION
        FROM VIEW_S6
            WHERE
            ASSET_ID NOT IN
            (SELECT ASSET_ID
              FROM VIEW_S3
              WHERE VIEW_S3.CLIENT_ID=
                 VIEW_S6.CLIENT_ID)
            AND                ASSET_ID IN
            (SELECT ASSET_ID
                FROM VIEW_S5A)
    CREATE VIEW VIEW_S5A (ASSET_ID,
    TIMESTAMP) AS
        SELECT ASSET_ID, TIMESTAMP FROM
        DEPLOYABLEASSETS WHERE ASSET_ID NOT IN
        (SELECT ASSET_ID FROM VIEW_S4)
```

-continued

```
    CREATE VIEW VIEW_S3 (CLIENT_ID, ASSET_ID,
    TIMESTAMP) AS
        SELECT CLTENTASSETS.CLIENT_ID, CLIENTASSETS.
        ASSET_ID,
        CLIENTASSETS.TIMESTAMP FROM
        DEPLOYABLEASSETS
        JOIN CLIENTASSETS ON
        CLIENTASSETS.ASSET_l ID = DEPLOYABLEASSETS.
        ASSET_ID
        WHERE CLIENTASSETS.TIMESTAMP=
DEPLOYABLEASSETS.TIMESTAMP
            AND CLIENTASSETS.ASSET_ID IN
              (SELECT ASSET_ID FROM VIEW_S6 WHERE
              CLIENTASSETS.ASSET_ID = VIEW_S6.
              ASSET_ID)
    CREATE VIEW VIEW_S6 (ASSET_ID, CLIENT_ID) AS
        SELECT DISTINCT ASSET_ID, CLIENT_ID FROM
PACKAGEASSETS JOIN
        CLIENTREGISTRY ON
        PACKAGEASSETS.PACKAGE_ID=
CLIENTREGISTRY.PACKAGE_ID
    CREATE VIEW VIEW_S4 (ASSET_ID, TIMESTAMP) AS
        SELECT ASSET_ID, TIMESTAMP FROM VIEW_S3
        GROUP BY ASSET_ID, TIMESTAMP
        HAVING COUNT(ASSET_ID)=
        (SELECT COUNT(DISTINCT CLIENT_ID)
        FROM VIEW_S6
        WHERE view_s6.asset_id = view s3.asset_id)
```

VIEW_S6 may be used to determine the asset ids that the client is registered to receive during client deployment. VIEW_S6 determines the assets id's from the CLIENTREGISTRY table whose package ids match those in the PACKAGEASSET table.

VIEW_S3 may be the embodiment of the set operations that determine which assets are up to date. The asset ids specified in the DEPLOYABLEASSET table are intersected using asset id with the asset ids and matching timestamp in the CLIENTASSETS table. The result of this intersection may then intersected with the CLIENTASSET table assets ids that are also contained in the VIEW_S6 view.

VIEW_S4 may be the embodiment of the set operations that determine the assets that will not be delivered to any client. The records from the VIEW_S3 view are grouped by distinct asset ids and timestamps. The resulting values are counted and compared for equality with the count of distinct client ids in VIEW_S6 that have matching asset ids in VIEW_S3.

VIEW_S5A may be the embodiment of the set operations that determine the deployable assets that are not included in the asset cache. Records from the DEPLOYABLEASSETS table are retrieved based on their asset ids not being found in the VIEW_S4 view.

VIEW_S7 may be the embodiment of the set operations that determine the assets that need to be deployed to each client based on client id. Records from the VIEW_S6 view are selected based on their asset ids that are not found in an intersection of the records found in VIEW_S3 whose client ids are also in the VIEW_S6 view. The results are then intersected with the VIEW_S6 asset ids that are in the VIEW_S5A view.

VIEW_S9 may be the embodiment of the set operations that determine which assets are contained in the asset cache on the CDS/ADS. Records in the VIEW_S7 view are selected based on whether their asset ids match those in the ASSETCACHE table.

When step 1560F performs the select operation on the VIEW_S9 view, the dependency chain implicit between the VIEWS may be traversed creating a single set operation when executed in an optimized relational database management system.

In an alternate embodiment, the SQL queries used to define the views could be combined into a single SQL query. Such a query could be executed to obtain the results indicating which assets need to be added to the ADM.

FIG. 13I is a flowchart of the node registration process (NRP) according to one embodiment of the present invention. FIG. 13J is a block diagram of a node registration specification data structure according to one embodiment of the present invention. The NRP 1500I covers the specification of the node registration specification data structure 1500J and the committing of this node registration specification data structure 1500J to the data store on the CDS/ADS.

In step 1510I, the node registration specification (NRS) data structure 100J may be specified through either manual or automated processes. The NRS may be comprised of a node id 1524J and a package id 1526J. The structure 1500J represents the packages that should be delivered to a particular node. For example, this(ese) package(s) would represent the package(s) needed to provide the client/target one or more goods (e.g. movies) and/or services (e.g. financial account) information that the client/target expects (e.g. signs up for, subscribes to, etc.).

In one embodiment, the NRS data structure 1500J may be specified as an XML document.

In step 1520I, the NRS data structure 1500J may be placed on the specification message queue on the CDS/ADS.

In step 1530I, the CDS/ADS reads the NRS data structure 1500J from the message queue.

In step 1540I, the CDS/ADS creates a record in the CLIENTREGISTRY table below.

The reference numbers in the following SQL create statement correspond to the reference numbers in FIG. 13J:

```
CREATE TABLE CLIENTREGISTRY ( 1522
    CLIENT_ID       VARCHAR(32)    NOT NULL, 1524J
    PACKAGE_ID      VARCHAR(32)    NOT NULL, 1526J
    PACKAGE_STATUS  VARCHAR(32)    NOT NULL,
    PRIMARY KEY (CLIENT_ID,PACKAGE_ID)
```

The primary key used in the above tables is a well-known way of defining how a table may be stored and accessed.

In the context of the CDS/ADS, the term adapter refers to a "component-ized" utility program that provides some standardized interface for any given asset type. In this way, the adapter can allow the CDS/ADS to handle any asset type that needs to be distributed over the network. Examples of novel adapters used with this invention include: client deployment, export, version, client deployment, process, target, synchronize, discovery, adjustment, publishing, and subscriber. Each of these adapters is further described herein.

Figure 14A:
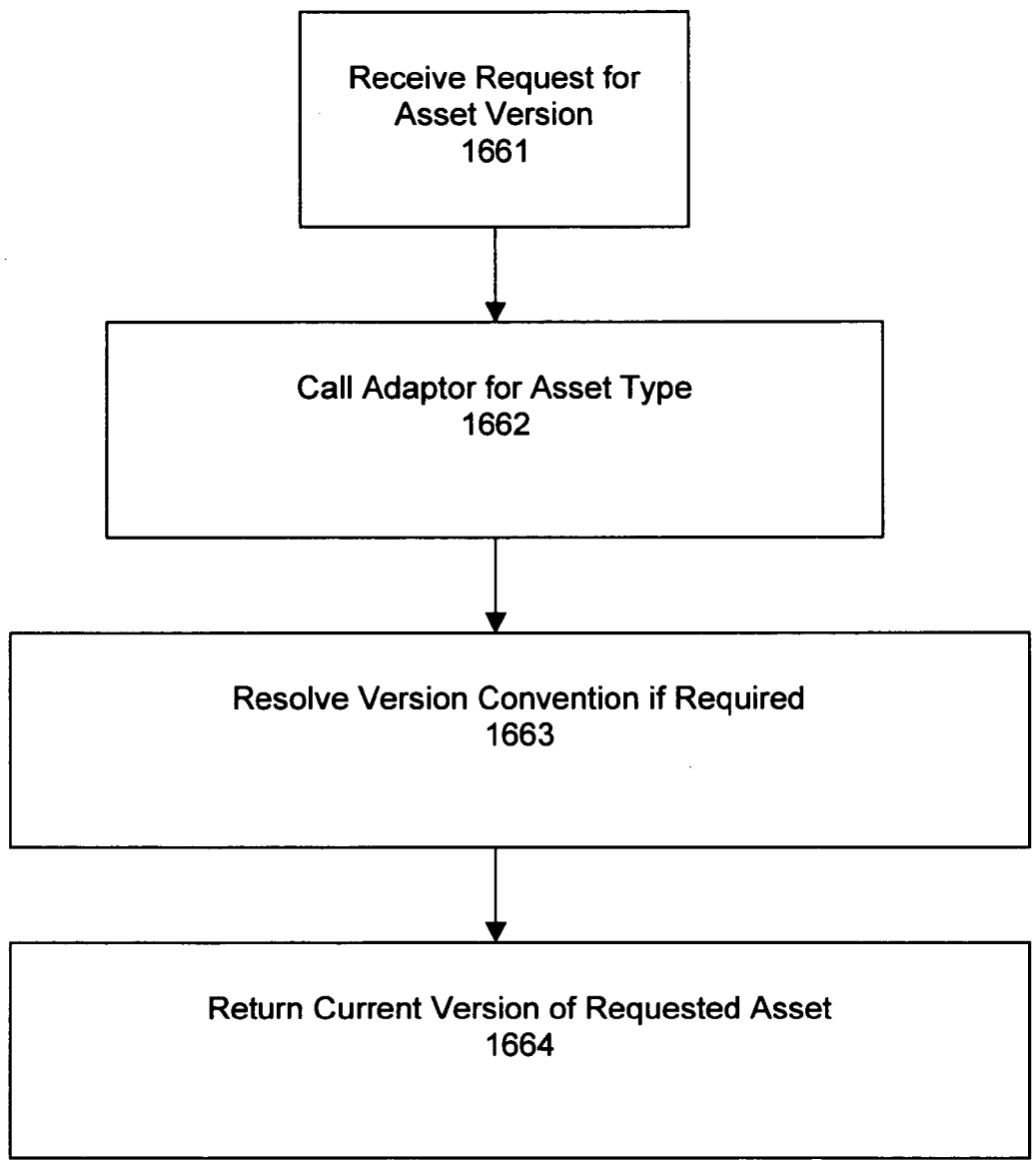
FIG. 14A is a flowchart of the version asset adapter process/method (VAM) according to one embodiment of the present invention.
Figure 14B:
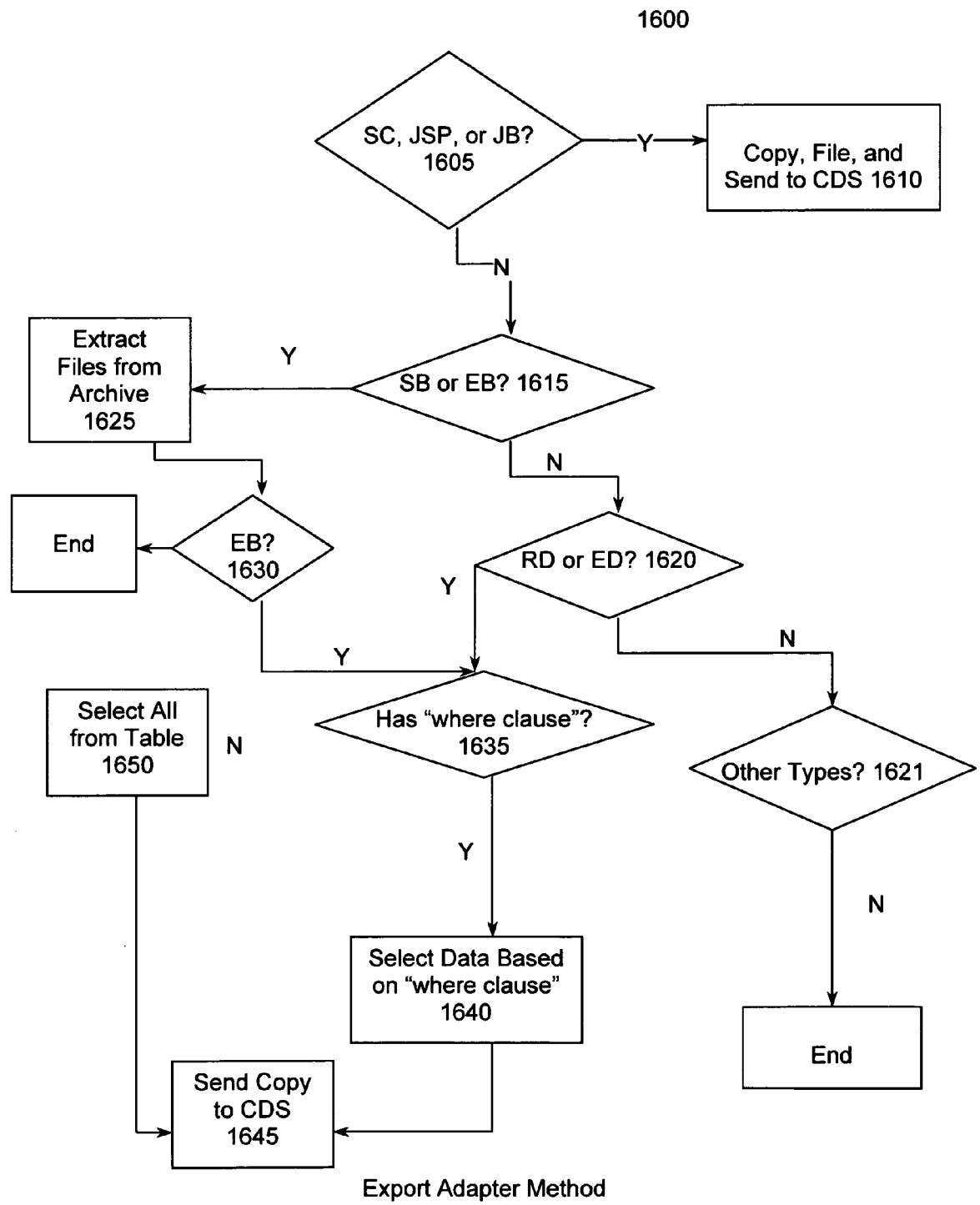
FIG. 14B is a flowchart of the EIS export asset adapter process/method (VAM) according to one embodiment of the present invention.

FIG. 14A is a flowchart of the version asset adapter process/method (VAM) according to one embodiment of the present invention. The VAM defines the process of generating version information for an assets based on the asset type. Note that the VAM may need to retrieve version information in different ways based on the type of asset. In a preferred embodiment, the VAM receives a request 1661 for an asset version that typically comprises an asset name, an asset type, an argument string, and a version, e.g. a timestamp. The VAM then calls a Version Asset Adapter (VAA) 1662 associated with the asset type. The VAA then provides current version information of the asset (named by the asset name) that conforms to the versioning convention of the version in the request.

For example, if the versioning convention of the asset type in the EIS is a timestamp like the version convention of the request, the VAA looks for the most current version of the asset (asset name) in the EIS and returns 1664 the current timestamp for that respective asset. For instance, if the asset type is generally associated with an individual file, the timestamp of the file may be used to represent the version of the asset.

However, if the asset (having the asset name) in the EIS does not follow the same version convention, e.g. does not use a timestamp for version information when a timestamp is in the request, the VAA has to resolve 1663 the difference by converting or determining indirectly the EIS version information into the convention of the version in the request.

For example, if the asset type is data, a timestamp is not used in the EIS and must be converted 1663 by the VAA based on some other versioning scheme. In a preferred embodiment, the VAA generates a checksum for the data that needs to be extracted. Note that the asset was previously provided with a check sum that was used in the version information in the request. Therefore, the VAA can compare these two check sums to determine if changes have occurred in the data. Thus, check sum information may be used as a "timestamp" to determine the most current version of the data asset. Other techniques used for versioning are envisioned.

Specifically, the EIS VAA can perform a query and write the results to a data structure 1664. A simple checksum can be run on the resulting data as if it were a contiguous stream of bytes. The checksum can be sent to and stored on the CDS/ADS. Subsequently, when the CDS/ADS queries the VAA for version information, the VAA can use the checksum to determine if the data has changed. If the data has not changed, the older timestamp may be returned or some other indication may be made that the data has not changed. Otherwise, if the data has changed, a new timestamp may be returned. Thus, the returned timestamp may be changed or not depending on whether the checksum has changed or not. In this manner, a timestamp may be used to determine the most current version of the data, even though another means, e.g. the check sum, may really be used to determine the version of the data.

FIG. 16B is a flowchart of the EIS export asset adapter process/method (EAM) according to one embodiment of the present invention. The EAM defines the process of creating a generalized data structure from any number of assets based on the asset type. In a preferred embodiment, the data structure is that of FIG. 2A described above, and will be referred to as such in the description below without loss of generality.

The process selects the appropriate export asset adapter (EAA), the implementation specific construct for this adapter method, based on the asset type the adapter will create a data structure appropriate for distribution. The data structure will depend on the asset type. Examples of these structures are described in the table above in the description of FIG. 2A.

In step 1605, the EIS deployment agent (EDA) determines if the asset is any one of the following types: static content, JSP (JavaServer Page™), or JavaBean™. This determination may be done by looking at the asset type field in the asset specification data that was sent with the request for exportation. If the asset is one of the above types, the EDA tasks the appropriate EAA to perform step 1610. Otherwise, the EDA proceeds to step 1615. In a preferred embodiment, the asset type may be provided with the request for exporting the respective asset that initiates the EAM.

In step 1610, the EAA copies the file specified by the asset specification. The EDA then copies the file into an appropriate data structure and proceeds to step 1645. Other asset types that can be processed by copying without an extended environment also would be handled this way.

In step 1615, the EDA determines if the asset type is either SB (Session Bean) or EB (Entity Bean). If the asset is one of these types, the EDA tasks the appropriate EAA to perform step 1625. Otherwise, the EDA proceeds to step 1620. In a preferred embodiment, asset types are defined in any of the package specifications (e.g. 1190, 1100); therefore, the CDS/ADS specifies the appropriate asset type in the request for the EIS assets.

In step 1620, the EDA determines if the asset type is either RD (Reference Data) or ED (Entity Data). If the asset is one of these types, the EDA tasks the appropriate EAA to perform step 1635.

In step 1625, the EAA extracts implementation class files for an EJB, and then extracts the EJB deployment descriptor and the stubs and skeletons (J2EE/EJB deployment descriptor and the stubs and skeletons well know part of the EJB specification) from an archive specified by the asset specification. The EDA then copies the EJB implementation class file, as specified by the asset name field and dependent on the EJB implementation on the EIS node, into the LD layer of the asset data structure. EDA copies the J2EE/EJBdeployment descriptor and stubs and skeletons into the extended environment part of the asset data structure. The EAA then proceeds to step 1630.

In step 1630, the EAA determines if the asset type is SB, if so, the EAA proceeds to step 1635, otherwise, the EAA proceeds to step 1645. The type may be determined by examining the specification.

In step 1635, the EAA determines if the asset specification has a specification of a "where clause". The "where clause" is a string that specifies information that may be used to perform an SQL query. If a "where clause" is specified the EAA proceeds to step 1640, otherwise the EAA proceeds to step 1650. Where clauses are well-known in SQL.

In step 1640, the EAA selects data from a table in a database on the EIS node. The table for the selection may be specified in the asset specification and the "where clause" for specifying a subset of the data may be from step 1635. The EAA places the records resulting from the database record selection in the respective LD layer.

In step 1645, the EDA takes the data structure created in the proceeding step and sends the data structure to the CDS/ADS.

In step 1650, the EAA selects all the records from the table specified in the asset specification. Then the EAA proceeds to step 1645.

Figure 14C:
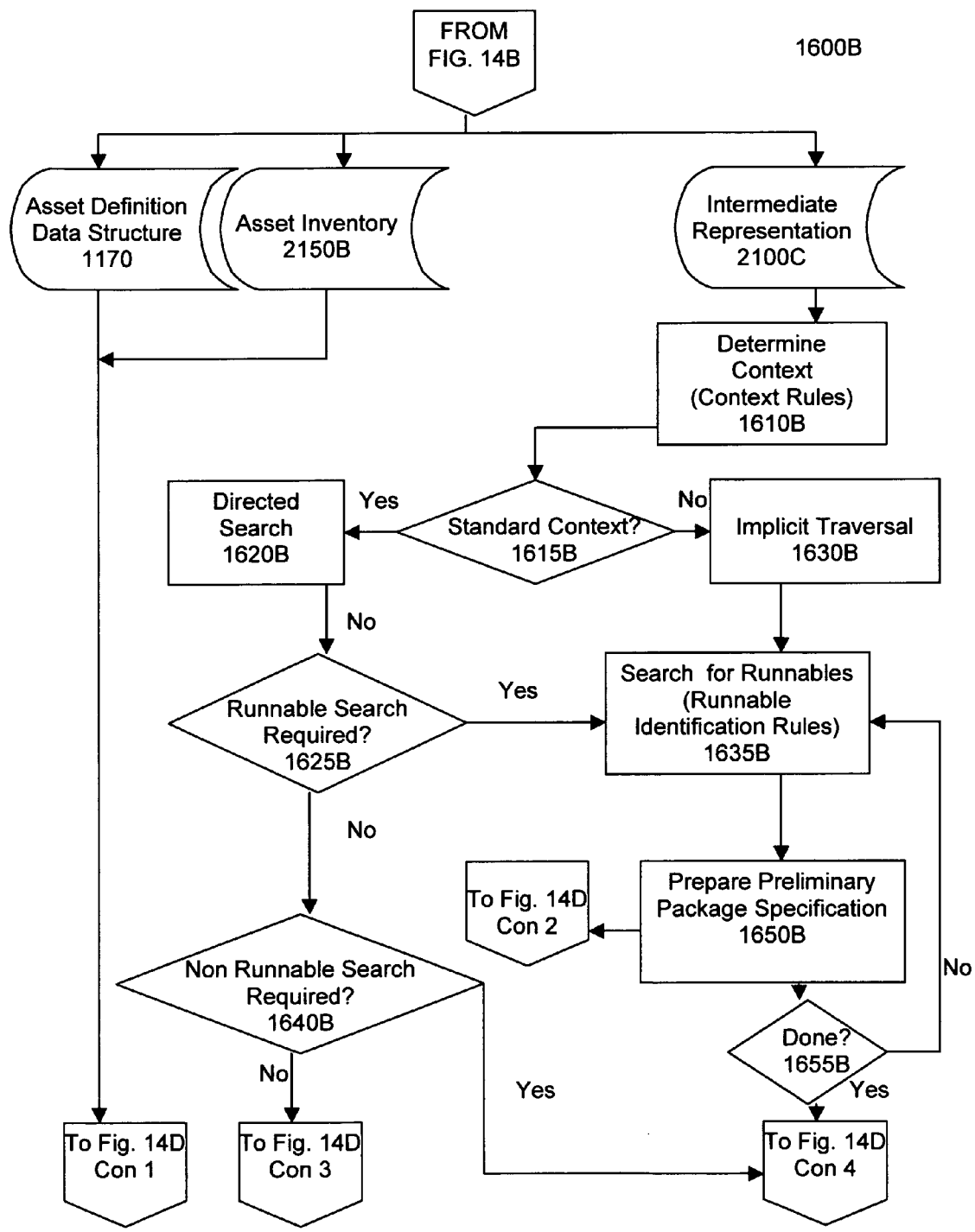
FIGS. 14C–14D are a flowchart of an alternative preferred EIS export adapter process according to one embodiment of the present invention.
Figure 14D:
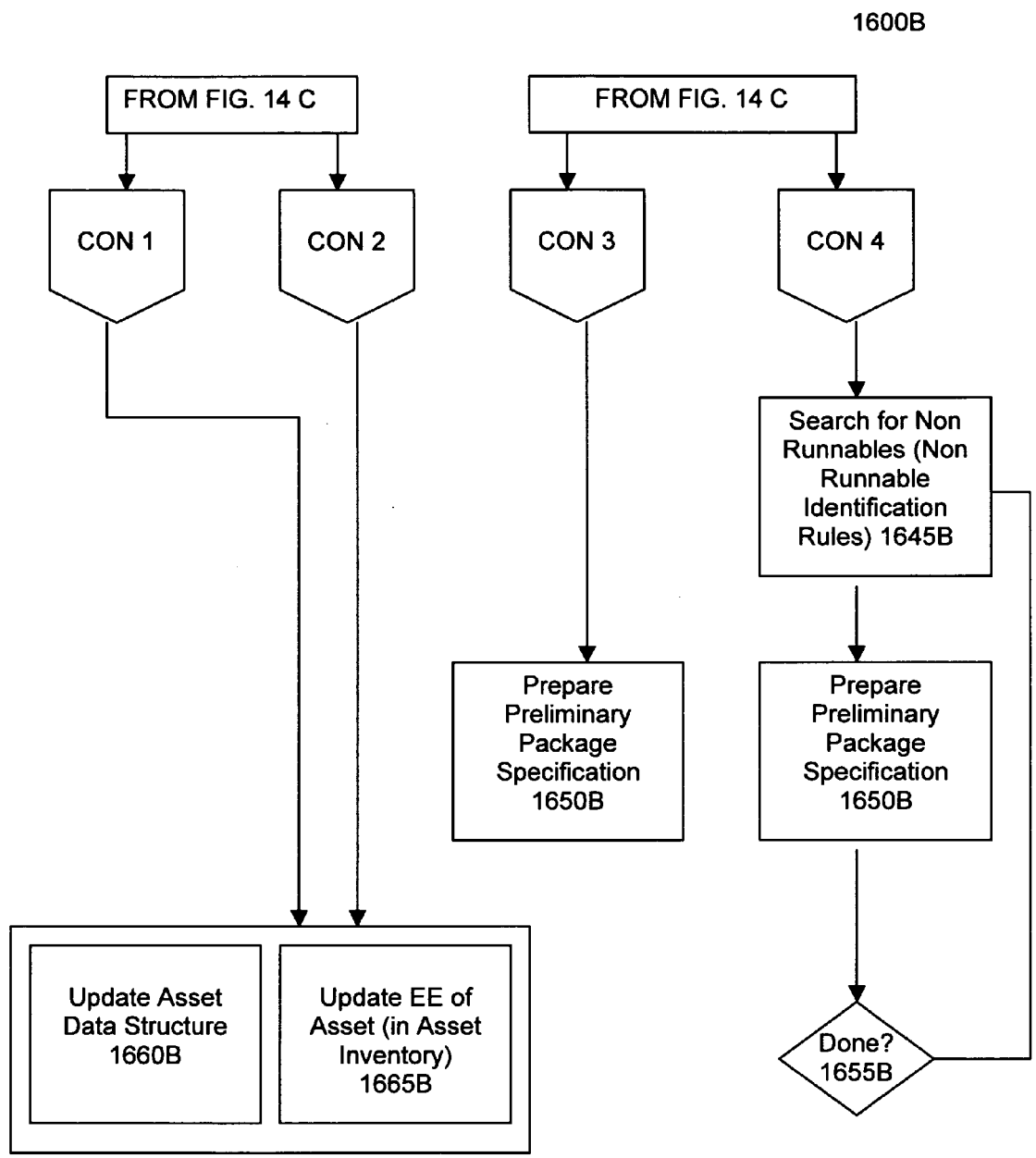

FIGS. 14C–14D are a flowchart of an alternative preferred EIS export adapter process according to one embodiment of the present invention.

While process 1600 creates a package data structure (above), in an alternative embodiment, the export adapter process 1600B creates 1650B one or more preliminary package specifications of one or more digital assets. In this preferred embodiment, a packaging adapter process 1600C may be used to create the final package of digital assets.

The process 1600B starts by traversing an intermediate representation 2100C (below) of one or more parts 100F of a computer system created by the discovery process while applying one or more context rules 1610B to determine a context of the parts 100F. Processes for traversing graphs are well-known. For example, see well-known works by Prim, Kruskal, Dijkstra, et. al. In step 1615B, the process 1600B determines if the context is a standard specified context.

A standard specified context describes a common topological deployment pattern of EIS files and data throughout the file systems of a computer or network of computers. In addition, a context contains other rules and information (described below). Deployment patterns covering the files and data for many computer system parts 100F, and particularly, for most complex business application software products such as EIS application servers, EIS Web servers, DBMS products, CRM products, etc, have become standardized over time due to the formal recommendations of standards bodies, through popular acceptance become industry custom, or through the stated requirements of the providers of such system part or software.

For example, when the Sun Microsystems product Java Web Server™ is installed, a specific directory on the computer must be identified as the directory where HTML files are placed. Through custom, this directory has been named "public_html". Other, later Web and application server software products followed this custom, and now, most Web and application server products require or recommend placement of HTML files in a directory named "public_html". Other directory names have become standard locations for specific files or types of files in Web and application servers. These include "cgi-bin" as the location of various script files, and "servlet" for Java™ language servlet files. Web/application server products which follow one or more of these directory naming customs include Inprise AppServer, BEA's Weblogic application server, and the Tomcat Web server.

More generally, a directory named "lib" may be utilized by many complex business software products as a location for callable methods, sub-programs, and functions. Examples of software products that use a "lib" directory for this purpose include IBM Corp's DB2 DBMS, Ghostgum Software's GSView (a product for viewing postscript documents), the Inprise AppServer, Oracle® DBMS, and TogetherJ from ObjectInternational, Inc. (a product for authoring, viewing and managing UML diagrams). Other directory names that are in common use as locations for specific files or types of files are "bin", "users" and "docs". All of the above are examples of common topological deployment patterns of system part 100F files and data, which can be described by a context. A standard specified context describes a common topological deployment pattern of EIS files and data throughout the file systems of a computer or network of computers.

The process 1600B executes a rule-based data-driven analysis (such as that performed by an expert system) of the containment graph or other intermediate representation 2100C of the subject system part 100F to determine the context for the subject system part 100F. This rule following analysis compares the topological deployment pattern of the system part 100F as manifest in the intermediate representation 2100C against a repository of candidate standard specified reference contexts to determine if the topological deployment pattern matches one of the referenced standards in the repository.

Given well-known topological deployment patterns of system part 100F files and data (as described above), such an analysis can identify the context of the subject system part 100F (i.e. Win32® application, J2EE application, BEA Weblogic, etc.) without being provided with an explicit map of the files and data for every individual system part on the EIS. By determining that the topological deployment pattern is one of a standard reference context, the process 1600B may be able to locate all the required member objects of the system part 100F without having detailed information (e.g. an explicit map) of the files and data of the subject EIS system part.

Once a context is determined, and the context is determined to be a referenced, standard specified context, the process will perform a directed search 1620B constrained to context-established locations on the EIS. The term "directed search" indicating a goal-oriented search utilizing a priori knowledge of the search domain is well-known. However, the directed search performed by the export process 1600B utilizes the context to constrain searches to specific EIS directories and may be considered novel.

The other information contained in a context (as mentioned above) may be in addition to the description of a topological deployment pattern. This other information specifies whether 1625B an actual search 1635B of the specific EIS (as above) directories may be required. For example, the software Java language decompiling program SourceAgain (a product of Ahpah Software), requires that only a single runnable member object, "srcagain.exe" be deployed for proper use of the product. No search of the EIS file systems for other runnable member objects need be performed in order to utilize the software, once the "srcagain.exe" member object has been acquired.

Alternatively, some system parts 100F might require a search 1635B for runnable member objects. An example of this case would be a system part with a plurality of dynamic link libraries (DLLs), where only certain of the DLLs are of interest. The limitation of interest may be due to that fact that generally, individual DLLs provide discrete functionality. For instance, one DLL may provide only the functionality required for local printing, while another DLL may provide the functionality required for wireless communication. If the purpose of the discovery and export processes is to enable wireless communication, the DLL to enable local printing may be not of interest. Therefore, a rule would identify only the wireless communication DLL. Specifically, within the context of the system part 100F the wireless communication DLL would have unique features that would be used to apply the rule during the search 1635B.

Apart from determining the context of the system part 100F and apart from the context itself, the process 1600B uses a separate set of rules in order to identify runnable member objects in the locations of EIS specified in 1620B.

Once the search 1635B for runnable member objects is complete, and the runnable member objects are identified, an identifier consisting of the asset id corresponding to the respective runnable member object (member object by member object) may be placed in a preliminary package specification. In one preferred embodiment is a simple list, and the asset id may be used to access the respective digital asset in the Asset Inventory 2150B created by the discovery process 2100B (below).

When the process 1600B accesses the digital asset in the asset inventory 2150B, the process 1600B updates the extended environment of the respective digital asset as described in detail below, the updating done by adding one or more export descriptors to an extended environment of the respective updated digital assets.

If it is determined 1625B that a runnable search is not required, it may be then determined whether 1640B a search 1645B for non-runnable member objects needs to be performed. If, by the context, it may be determined that only one (or a fix number) of identified non-runnable member object constitutes all non-runnable member objects of the system part 100F, no search 1640B needs to be performed. Identifiers for these identified non-runnable member objects are then placed 1650B in the preliminary package specifications and the process 1600B performs any other updates to the preliminary package specification required.

Alternatively, some system parts 100F might require a search 1645B for non-runnable member objects. An example of this case would be a system part with a plurality of image files (e.g., .GIF files), where only certain of the image files are of interest. The limitation of interest may be due to that fact that generally, image files are used by specific function areas of a system part 100F. For instance, in the SourceAgain application 108 mentioned above, there are GIF files supporting product and sales HTML pages. These product and sales HTML pages might not be of interest in user applications that solely require de-compilation. Therefore, rules for selection would exclude these non-runnable member objects from selection.

In alternative embodiment, the asset id (for runnable and/or non-runnable member objects) may be used to access and update information about the respective digital asset from the asset definition data structure. In this embodiment, the process 1600B can provide process 1600 with the preliminary package specification listing 1100A, to the table in step 1650 of process 1600 (above).

In an alternative preferred embodiment, the process 1600B can determine that the system part 100F has no standard context 1615B. If it is determined that no standard context exists, an implicit traversal of the EIS files and data structures must be performed 1630B. Implicit traversal 1630B requires traversal of the entire intermediate representation 2100C as opposed to the directed search 1620B.

In this alternate preferred embodiment, the search for runnables 1635B that may be performed during the implicit traversal of the intermediate representation utilizes a number of well-known techniques. The most well-known technique may be examination of member object file extensions. Generally, those member objects that meet the definition of a runnable (as described above) have file extensions that are named using a well-known finite set of file extensions. For example, in a Windows NT® 4.0 environment, ".EXE", ".JS", ".DLL", and ".CLASS" are common and well-known file extensions for (respectively) executable, JavaScript™, dynamic link library, and java class runnable member objects. Likewise, in an Sun Microsystems Solaris 8.0 environment, a ".SO" file extension indicates that the file may be a runnable member object. An example rule for the search 1635B Windows NT® 4.0 environment would be that if a file extension is ".EXE" then select the file as a runnable member object. In one preferred embodiment, all files that are not runnable member objects are treated as non-runnable member objects 1645B.

During the execution of the searches for runnable 1635B and non-runnable 1645B member objects during the implicit traversal 1630B, the identification of each newly identified member object may be followed by a new attempt to determine a context for the subject system part 100F. Rule sets are examined and sorted in the form of a diagnostic or pattern-matching algorithm similar to the rule-based, data-driven operation of an expert system. At any time the process has sufficient confidence in a conclusion, the implicit traversal may be suspended, and an execution of a directed search 1620B using the candidate context may be performed. If the results of that directed search 1620B are successful, the implicit traversal 1630B may be abandoned. If the directed search 1620B fails, the implicit traversal 1630B may be resumed. If the implicit traversal of the intermediate representation 2100C performs a complete traversal of the implicit representation without identifying a matching context, the implicit traversal may be considered a failure, and a human deployment engineer may be needed.

In these cases, the human deployment engineer could develop additional rules to place in the expert system's rulebase so that future invocations of the expert system would succeed in locating all files and completing all searches called for in the rulebase. Although the use of an expert system for export of assets is believed to be new, expert system technology is well-known in the art.

As before, the preliminary package specification may be updated 1650 each time a runnable and/or non-runnable member object is identified by the process 1600B. In alternative embodiments, the asset inventory and asset definition data structure are also updated as required and described above.

The extended environments of the digital assets corresponding to the respective selected runnable and/or non-runnable member objects are also updated 2150B.

At the end 1685B of the process 1600B, an updated asset inventory 1665B with updated extended environments 220 may be completed for the system part 100F. In alternative embodiments, an updated asset data structure 1660B.

A description of alternative ways to update the EE 220 may be now presented.

In one preferred embodiment, the descriptors include one or more common descriptors that provide a unique identification of the digit asset on the networks. These common descriptors include one or more of the following: a common security export descriptor and a common runnable descriptor.

In one preferred embodiment, the export descriptors include one or more dependency descriptors. The dependency descriptor includes one or more asset dependency descriptors.

In one preferred embodiment, the dependency descriptor includes one or more EIS server dependency descriptors. These EIS server dependencies may include one or more of the following: EIS database management systems (DBMS), EIS servers, EIS application servers, EIS Web application servers, one or more business applications, and one or more accounting application. The EIS server dependencies also may include one or more of the following: one or more Oracle® DBMS, one or more Sybase DBMS, and one or more DB2 DBMS.

In a preferred embodiment, the export descriptors include one or more type descriptors. The type descriptors may include any one or more of the following examples: static content (SC), dynamic content (DC), Enterprise JavaBeans™ (EJB), reference data (RD), session bean (SB), entity bean (EB), entity data (ED), Java™ class (JC), Java™ Connector Framework connectors (JCF), Java™ applet (JA), and JavaBeans™ (JB).

In one preferred embodiment, the export descriptors include one or more asset category descriptors. These asset category descriptors may include any one or more of the following examples: a content descriptor, a presentational descriptor, a transactional descriptor, and a relational data descriptor.

In one preferred embodiment, the descriptors comprising one or more asset class descriptors. The asset class descriptors include any one or more of the following examples: base, Java™, non Java™, language, and non language.

In one preferred embodiment, the descriptors comprise one or more schema descriptors. The schema descriptors provide information that describe any or more of the following examples: database table names and definitions, database column names and definitions, database key identifiers and value ranges, database view names and definitions, and other well-known database schema elements.

In one preferred embodiment, the descriptors further comprise one or more metadata descriptors. The metadata descriptors provide information that describe any or more of the following examples: repository object definitions, scope object definitions, module object definitions, operation object definitions, exception object definitions, constant object definitions, properties object definitions, attribute object definitions, relationship object definitions, type object definitions, and other well-known metadata object definitions.

In one preferred embodiment, the descriptors comprise one or more transform descriptors. The transform descriptor may describe a transformation of data in a logic/data section of the digital asset. The transform descriptor may also describe a transformation of logic in a logic/data section of the digital asset. The transform descriptor may include the following:

- a properties descriptor that provides information required for use of the digital asset on an operating system of the base execution environment.
- a format descriptor that provides information required for use of the digital asset on an operating system of the base execution environment.
- a registry descriptor that provide information required for use of the digital asset on a Window's operating system on the base execution environment.

In one preferred embodiment, the descriptor comprises one or more reference descriptors. The reference descriptor may include any one or more of the following: a reference link descriptor, a reference file descriptor, and a reference directory descriptor. The reference link descriptor may provide a World Wide Web ("WWW") address that has contents used for processing of the digital asset. The reference link descriptor may also provide a WWW address that has contents used during execution of the digital asset. The reference file descriptor may be a unique fully qualified name of a file required for reference by the digital asset. The reference directory descriptor may provide additional address information that may be used to locate one or more of the associated digital assets.

In one preferred embodiment, the descriptors comprise one or more security descriptors. The security descriptor may include any one or more of the following functions: encryption, authorization, and access control.

In one preferred embodiment, the descriptor comprises one or more package relationship descriptors that represent a part-whole relationship between the digital asset and one or more packages containing the digital asset. The package relationship descriptor may represent at least the following three relationships in the part-whole relationship: a mandatory part-whole relationship, a shared part-whole relationship, and a root part-whole relationship.

In one preferred embodiment, the descriptor comprises one or more distribution logic descriptors, each having one or more transactions rules and one or more concurrency rules. The transactions rules specify any of a number and a frequency of times that the digital asset can be distributed to one or more target computers. The concurrency rules specify whether or not there are any restrictions on distribution of the digital asset with respect to the distribution of one or more other digital asset.

Figure 15A:
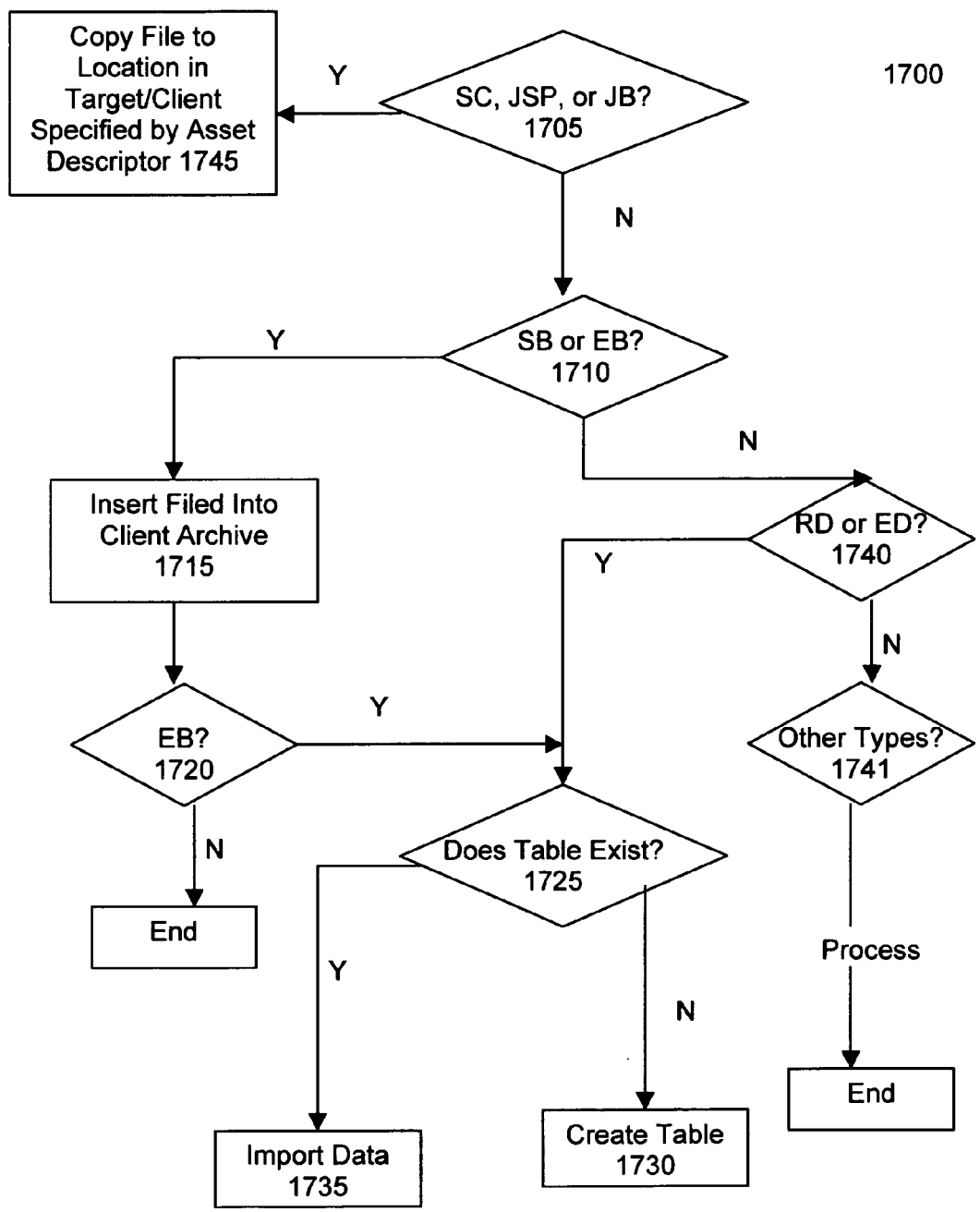
FIG. 15A is the flowchart of the client deployment asset adapter (DAM) method/process according to one embodiment of the present invention.

FIG. 15A is the flowchart of the client deployment asset adapter (DAM) method/process according to one embodiment of the present invention. The DAM 1700 defines the process for taking the data structure 240 created by another asset adapter method (e.g., export 1600, process 1800, or target 1900) and adjusting the local environment based on the extended environment 220 of the respective data structure 240. The data structure 240 provides the extended environment 220. The Client Distribution Agent (CDA) selects an appropriate client deployment asset adapter (DAA), the implementation specific construct for the DAM, based on the respective asset type being deployed. The CDA tasks the DAM with creating the necessary changes to the local (i.e., target 940) environment to allow for the asset 240 to be deployed and to execute properly. In other words, the DAM 1700 deploys the asset 240 on the respective client environment by changing and/or adding to the client environment, if needed, as determined by information in the extended environment 220 of the asset 240.

In a preferred embodiment, in step 1705, the CDA 944 use the DAM 1700 to determine if the asset is any one of the following types: static content, JSP (JavaServer Page™), or JavaBean™. If the asset is one of these types, the CDA tasks the appropriate DAA to perform step 1745. Otherwise, the CDA proceeds to step 1710.

In step 1710, the CDA determines if the asset type is either SB (Session Bean) or EB (Entity Bean). If the asset is one of these types, the CDA tasks the appropriate DAA to perform step 1715. Otherwise, the CDA proceeds to step 1740.

In step 1715, the DAA (associated with SB's or EB's) inserts the EJB classes for the respective SB/EB into the client archive appropriate for the local environment. In other words, the DAA inserts the EJB implementation class (on the respective asset 240) into an archive where the other EJBs are stored on the client, along with the stubs and skeletons of the respective EJB. The DAA also inserts the altered the client deployment descriptor from the extended environment 220 portion of the asset data structure 220 into the client EJB environment. The DAA then proceeds to step 1720.

In step 1720, the DAM determines whether the asset is an EB, if so, the DAM proceeds to step 1725. If not, the DAM process 1700 ends.

In step 1725, the DAM determines if the table specified in the asset logic/data (LD) 210 exists in the local (client) database. If the table exists, the DAM proceeds to step 1735. Otherwise, the DAM proceeds to step 1735.

In step 1730, the DAM creates the table specified in the asset data structure 240, then proceeds to step 1735. In a preferred embodiment, the table specification may be contained in the extended environment section 220 of the asset data structure 240.

In step 1735, the DAM imports the data from the data structure 240 into the database table located on the client. In a preferred embodiment, the imported data may be extracted from the LD section 210 of the asset 240.

In step 1740, the DAM determines if the asset type is either RD (Reference Data) or ED (Entity Data). If the asset is one of these types, the DAM proceeds to step 1725. In a preferred embodiment, the DAM would also write an entry in a system database table indicating that a certain set of data was written to the database (e.g. a directory reference), permitting any other process to be notified as to what data has been added.

In step 1745, the DAM copies the file specified by the asset 240 from the data structure 240 into the location appropriate for that asset type in the file system. Each asset adapter was configured to know where to store the assets of certain asset types.

After the deploy adapter method is run for a given asset 240, the particular target 940 has incorporated the necessary data, interfaces, and/or control functions to enable the asset purpose on the respective target 940.

Figure 15B:
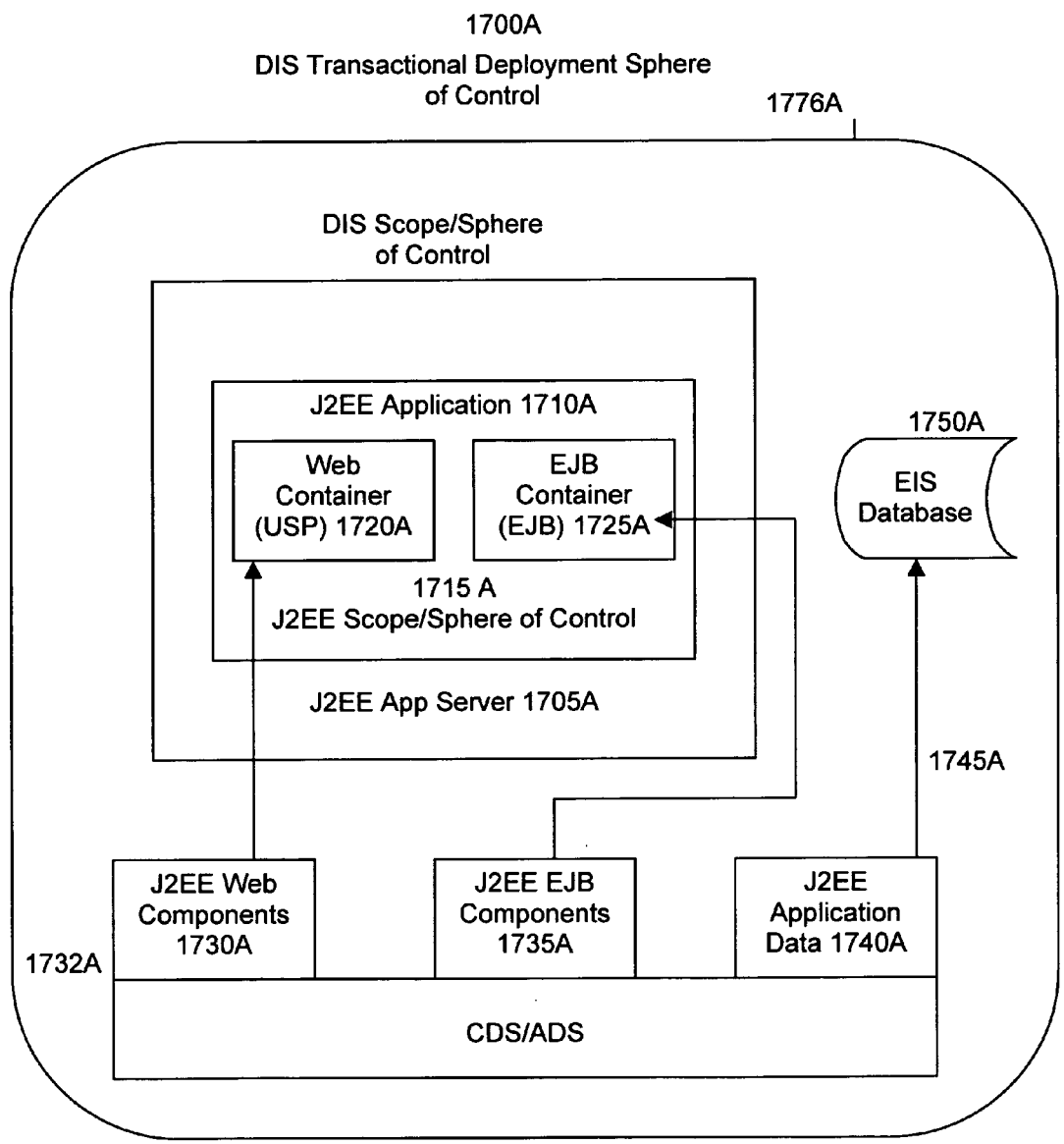
FIG. 15B is a block diagram of one preferred J2EE transactional deployment sphere of control according to one embodiment of the present invention.

FIG. 15B is a block diagram of one preferred J2EE transactional deployment sphere of control according to one embodiment of the present invention.

At any given node on the network a transaction deployment of assets can be enabled. In one preferred embodiment, the transaction deployment applies to J2EE assets, i.e. components. FIG. 15B shows any given network node with the J2EE transactional deployment sphere of control 1700A.

The node contains a well-known J2EE application server 1705A. The J2EE application server contains one or more well-known J2EE applications 1710A. The J2EE application has a Web container 1720A and possibly an Enterprise Java Bean™ (EJB) container 1725A that are also well-known and referred to as J2EE application containers. Note that the J2EE standard specifies a J2EE deployment transactional sphere of control 1715A that encompasses only the Web container 1720A and the EJB container 1725A. Further note that the J2EE standard does not explicitly apply transactional semantics to the deployment into a Web container or a transactional container (EJB container). For more complete description, see "Designing Enterprise Applications with the Java™ 2 Platform, Enterprise Edition" Nicholas Kassem and the Enterprise Team Version 1.0.1 Final Release Oct. 3, 2000 which is herein incorporated by reference in its entirety.

The Web container 1720A can contain static content, Java™ Servlets, JavaServer Pages™ (JSP), HTML pages, and XML pages. The EJB container can contain enterprise beans. All of these can be referred to as container components.

The CDS/ADS can deliver and deploy container components, called delivered J2EE components to the respective Web container 1720A or EJB container 1725A. Delivered J2EE components include delivered J2EE Web components 1730A, delivered J2EE EJB components 1735A, and delivered J2EE application data 1740A. These delivered components 1732A are well-known and part of the specification incorporated above.

In this preferred embodiment, system parts 100F are deployed via under the control of the CDS/ADS to the J2EE application server 1705A and any participating database 1750A, typically, on one or more EISs or other sources. Therefore, there may be a logical connection 1745A through the CDS/ADS by which J2EE application data 1740A may be migrated from the original source of the data to the database 1750A.

In this preferred embodiment, a novel sphere of control 1776A encompasses the J2EE application server 1705A, the J2EE applications 1710A, the J2EE application containers (1720A and 1725A), the Web container, the EJB container, the J2EE application container components (not shown), the delivered J2EE components (1730A, 1735A, and 1740A, typically 1732A), and the logical connections 1745A. The sphere of control 1776A manages a transactional deployment of the delivered J2EE components 1732A and an update of the databases 1750A to have data consistent with the J2EE application 1710A. While spheres of control are well-known in the prior art, the scope of this sphere of control 1776A encompassing the database 1750A as well as the J2EE application 1710A and other aspect defined here, may be considered novel. See Davies, C. T., "Data Processing Spheres of Control", IBM Systems Journal 17(2): pages 179–198, which are herein incorporated by reference in their entirety.

Figure 15C:
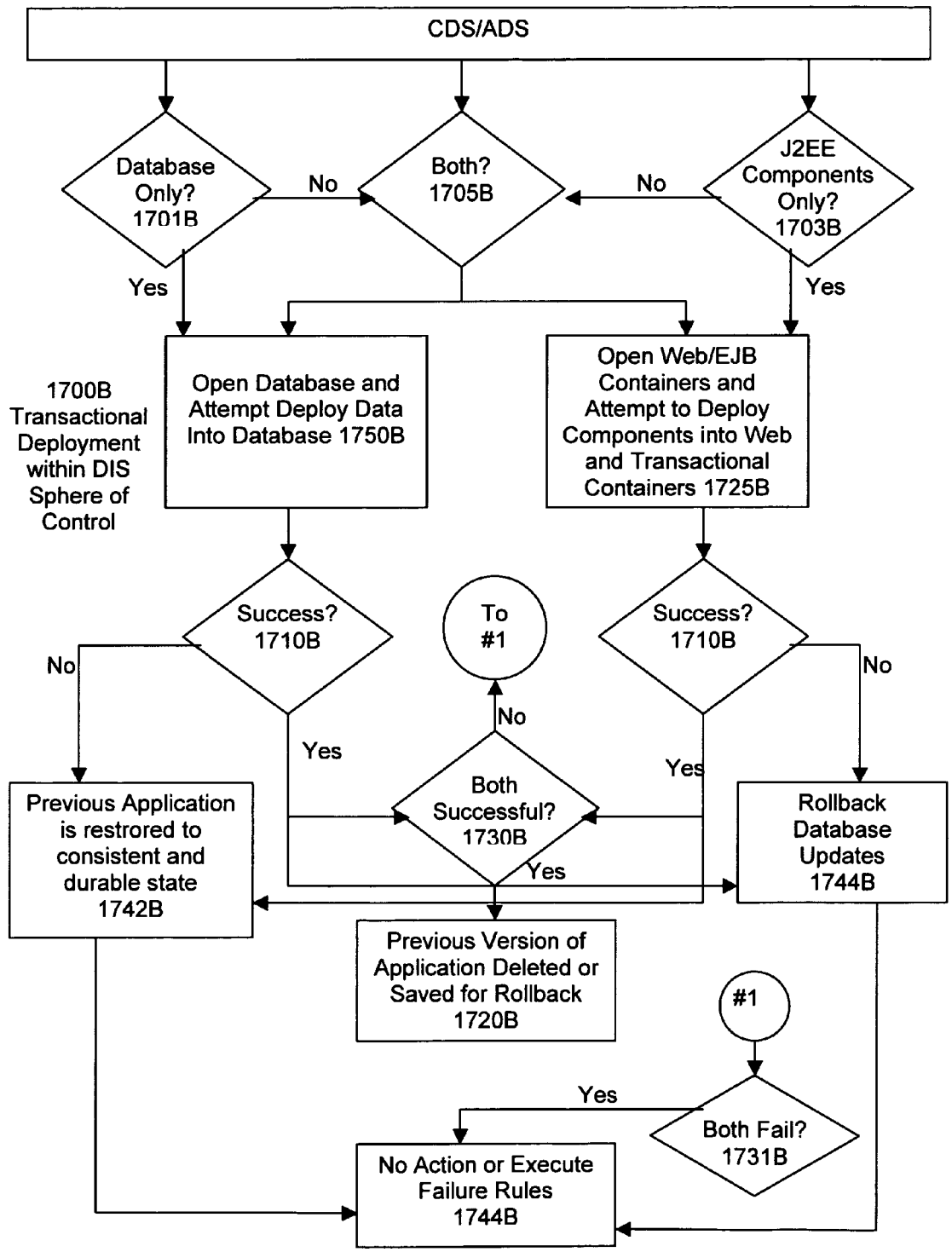
FIG. 15C is a flowchart of the implementation process of one preferred J2EE transactional deployment within the sphere of control according to one embodiment of the present invention.

FIG. 15C is a flowchart of the implementation process of one preferred J2EE transactional deployment within the sphere of control according to one embodiment of the present invention.

The process 1700B begins with the CDS/ADS having acquired and delivered the following components in any combination: J2EE EJB components, J2EE Web components, and/or J2EE application data.

Step 1701B tests if database only information is received or not. If only database information is received, the process 1700B goes to step 1750B.

Step 1703B tests if only J2EE components are received or not. If only J2EE components are received, the process 1700B goes to step 1725.

If both 1705B database information and J2EE components are received, the process goes to both steps 1725B and 1750B.

Step 1750B of the process 1700B attempts to open 1750B the database 1750A. Step 1750B also attempts to deploy the J2EE application data 1740A into the database 1750A. If this deployment fails (succeeds), the database 1750A provides the process 1700B notification that the database deployment failed (succeeded).

Step 1725B communicates with the J2EE application server 1705A and requests the server 1705A attempt to deploy the J2EE Web component 1730A into Web container 1720A. Step 1725B also/alternatively can request the server 1705A attempt to deploy the J2EE EJB components 1735A into the EJB container 1725A. If either or both of these attempts fail or succeeds, the J2EE application server 1705A provides the process 1700B notification of the respective failure or success.

In the event that there is either only a database available to open, or, only one of a J2EE Web container or J2EE EJB container to open, the process 1700B handles these events using prior art methods, (not shown in FIG. 15C) and returns any result codes from those prior art methods.

Database vendors provide this functionality to report failures and successes in accessing data in their databases 1750A.

While the deployments and notifications are J2EE application server are vendor specific, in general, the deployment and notification of failure or success are defined by the J2EE specification incorporated above.

However, deployment and notification of failure for the database 1750A external to the server 1705A are not disclosed or recognized in the J2EE specification. Reasons for this failure to disclose are based upon the intentionally partitioned design of J2EE applications between presentation, business logic, and external (backend) databases 1750A. For further elaboration of those reasons see page 15 of the specification incorporated above.

Applications deployed using our invention preserve the flexibility in choice of database 1750A and application server 1705A which the J2EE architecture has been designed to provide, but, in addition, provide a level of deployment management above either the application server 1705A or database 1750A alone. This level of deployment management may be exercised at the scope of the sphere of control 1776A described in 1700A.

Step 1710B determines if the opening of the database 1750A and the attempt to deploy data into the database 1750A was successful or not.

Step 1715B determines if the opening of the containers (1720A and/or 1725A) and the attempt to deploy the respective J2EE Web components and J2EE EJB components into the containers (1720A, 1725A) was successful or not.

In one preferred embodiment, the prior version of the delivered J2EE components 1732A including the J2EE application data 1740A are deleted (disposed of) 1720B only if both the deployment of the J2EE application data 1740 and the deployment of the J2EE Web components 1730A and the J2EE EJB components 1735A into the respective Web container 1720A and the EJB container 1725A is successful 1730B. In another preferred embodiment, the manifest specifies the exact components/assets to be removed, and the purge operation may be performed on those components/assets.

If the opening of the database 1750A and the attempt to deploy that data into the database 1750A is unsuccessful but the deployment of the J2EE Web 1730A and EJB 1735A components is successful, the previous application running on the J2EE server 1705A may be restored 1742B. This provides a durable and consistent state for the server 1705A.

In a preferred embodiment, the current state of the database and application containers may be stored before attempting to deploy. This may be done via a combination of the synchronization lifecycle step and export adapters for the container. The synchronization step sends new DBMS updates back to the distribution server, if there is a conflict with backend data, it will be resolved and sent back to the target node. The export of application container state allows for the successful restoration of the application containers without completely reverting to the last distribution.

Optionally, additional actions can be taken that are governed by failure rule execution 1744B. For example, notifications could transmitted to a system administrator, or written to a system log or monitor.

Conversely, if opening the containers (1720A and/or 1725A) and/or the attempt deploy the respective J2EE Web 1730A or EJB 1735A component is unsuccessful and the opening and access of the database 1750A to deploy data 1725B is successful 1715B, the database 1750A updates are rolled back 1744B.

Optionally, additional actions can be taken that are governed by failure rule execution 1744B. For example, notifications could transmitted to a system administrator, or written to a system log or monitor.

If both 1731B the opening/deployment 1750B into the database and the opening/deployment 1725B into the containers fail (1710B, 1715B, 1730B), either no action is taken or one or more failure rules are applied 1740B.

Failure rules govern the behavior of the process 1700B in the event of both (1710B, 1715B) failures.

Examples of failure rules include: a retry of the data object deployment, a retry of the delivered J2EE component deployment, a retry of the failing deployment, an accessing of an alternative source for the data of the failed data deployment, and an accessing of an alternative source for the component of the fail component deployment.

Figure 16:
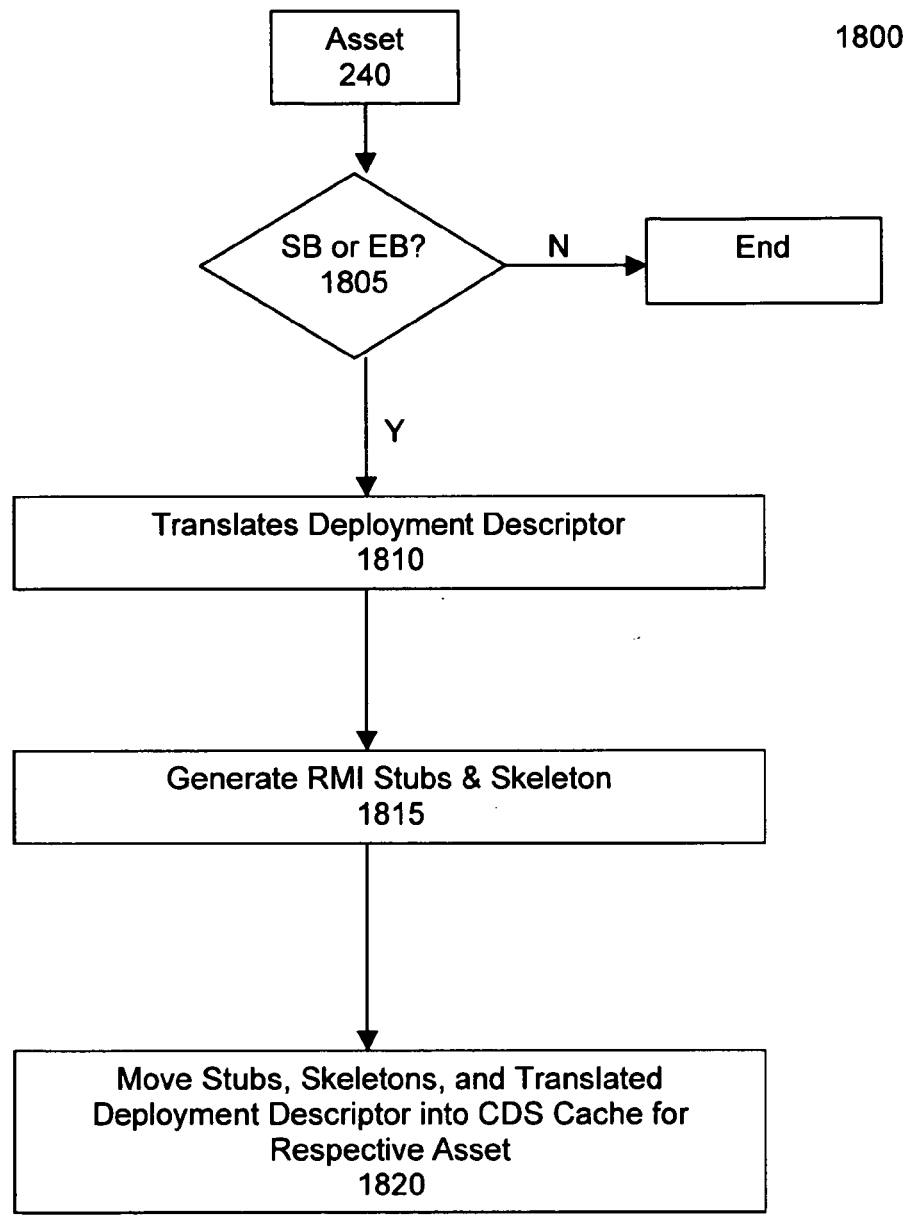
FIG. 16 is the flowchart of the CDS/ADS process asset adapter method/process (PAM) according to one embodiment of the present invention.

FIG. 16 is the flowchart of the CDS/ADS process asset adapter method/process (PAM) according to one embodiment of the present invention. The PAM defines the process of creating a version of the asset 240 that may be appropriate for the target's (e.g. client) base environment. More specifically, the asset's logic/data portion 210 and/or extended environment 220 may be translated in such a way that it can allow the asset to perform its functions in the target's base environment.

For example, the asset 240 may have come from a source's base environment such as a Weblogic EJB. The target's base environment may be OpenEJB (or JBOSS). Therefore, the asset's extended environment would need to be converted from Weblogic to OpenEJB (or JBOSS).

In step 1805, the CDS/ADS determines if the asset type is either SB (Session Bean) or EB (Entity Bean). If the asset is one of these types, the CDS/ADS tasks the appropriate process asset adapter (PAA), the implementation specific construct for this adapter method, to perform step 1810.

The PAA may be selected on the basis of both the asset type (LD portion) and the target format/environment. In alternative embodiments, the PAA may be selected on the basis of the extended environment (EE) and/or the LD and the target format/environment. In other preferred embodiments the PAA may be selected on the basis of descriptors contained in the EE 220.

In step 1810, the PAA translates the deployment descriptor (The word "descriptor" can refer to the descriptors that actually comprise the type of EJB asset 240 discussed in this section and is well-known in the EJB specification. These descriptors are explicitly differentiated from the descriptors that comprise the EE 220 and are described in FIG. 2C.) into the target (client) format. The EJB deployment descriptor may be obtained from the data structure 240 corresponding to the asset id located in the asset cache; more specifically, it is the extended environment 220 portion of the asset. PAA also removes the EJB implementation from the LD 210 portion of the asset 240. The PAA then proceeds to step 1815.

In step 1815, the PAA generates the EJB stubs and skeletons for the target environment. The PAA places the EJBs from the asset cache onto the file system. Then the PAA executes the appropriate utilities to generate the classes that the default EJB environment (at the client) will require to execute the EJB (these are the stubs and skeletons). The PAA then proceeds to step 1820.

In step 1820, the PAA moves the new stubs, skeletons, and translated deployment descriptor back into the asset data structure 240. More specifically, the stubs, skeletons, and translated deployment descriptor are moved into the extended environment 220 section of the asset. The PAA then moves the data structure 240 back into the asset cache.

In a preferred embodiment, the Process Adapter Method Process (PAM) 1800 may be performed on one more assets 240 before the assets 240 are cached in the CDS/ADS cache memory. In this embodiment, the process method performs any intermediate processing required. For example, the EJB adapter's process method could create the appropriate EJD proxies, so this processing does not occur at the client.

Figure 17:
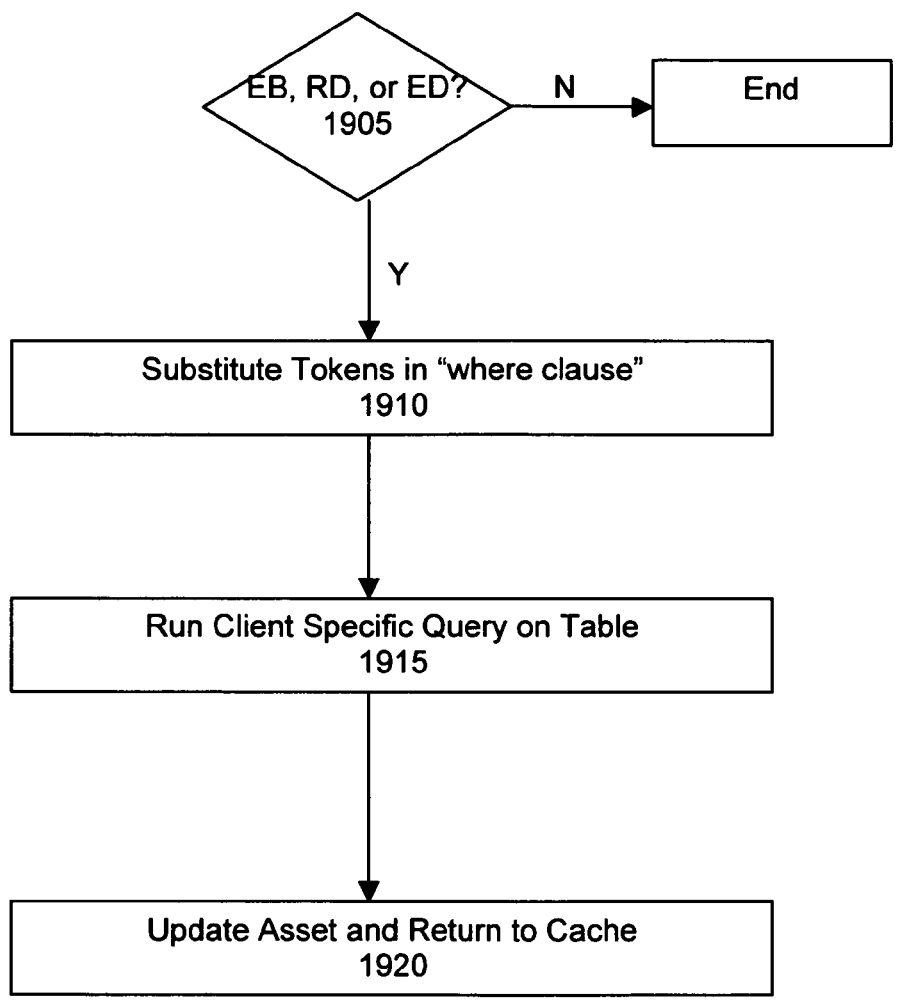
FIG. 17 is a flowchart of the CDS/ADS target asset adapter method (TAM) according to one embodiment of the present invention.

FIG. 17 is a flowchart of the CDS/ADS target asset adapter method (TAM) according to one embodiment of the present invention. The TAM defines the process of creating a targeted data structure from any number of assets 240 based on the asset type and other asset information. The process 1900 selects the appropriate target asset adapter (TAA), the implementation specific construct for this adapter method, based on the asset type and tasks the adapter with creating a data type appropriate targeted for distribution to a particular client node.

The process method may be performed for an asset for all respective target environments that are registered for the package(s) that contain the respective asset. The target method may be processing that is required for an asset for one or more particular target/client that may be registered for the respective asset.

In step 1905, the CDS/ADS determines if the asset type is either RD (Reference Data) or ED (Entity Data). If the asset is one of these types, the CDS/ADS tasks the appropriate TAA to perform step 1910.

In step 1910, the TAA retrieves a "where clause" specified in the asset data structure 240, typically in the extended environment 220. The TAA then does a token replacement operation on the "where clause". In a preferred embodiment, the token replacement may be a basic string replacement operation, retrieving the replacement value from the node specification corresponding to the targeted node. The TAA proceeds to step 1915.

In step 1915, the TAA runs a query on the table specified in the asset data structure 240 using the "where clause" from step 1910. The TAA proceeds to step 1920.

In step 1920, the CDS/ADS takes the records returned from the TAA in step 1915 and puts the records into a simple data structure. The CDS/ADS then puts the data structure into the LD section 210 of the asset 240 and returns the asset to the asset cache.

For example, an asset of type Reference Data (RD) might need to be targeted for each client node. The RD's "where clause" would have tokens that need to be replaced using information in the node's registry. The asset adapter would perform an SQL query using the transformed where clause. The data resulting from this query would be placed in the LD 210 section of the asset. The asset would then be placed back into the asset cache.

Another example of the TAA would be for the Entity Data (ED) asset type. The asset specification might indicate that a targeted query has to be performed for each target client node. For the case of an eCommerce application, the ED adapter might query the status of the current orders for an individual customer. The data would then be distributed to that client. If the client's name were John Smith, only the order status information would be downloaded to John Smith. He would receive his order status information, and no one else's. Likewise, other clients would not receive John Smith's order status information. The query is specific to John Smith and may be performed when the John Smith's client node is ready to receive the information.

In one preferred embodiment, the data resides on the EIS tier. In an alternative preferred embodiment, the data may be replicated to the CDS/ADS tier and the targeted query may be performed on the CDS/ADS tier as explained in the paragraphs above.

Figure 18A:
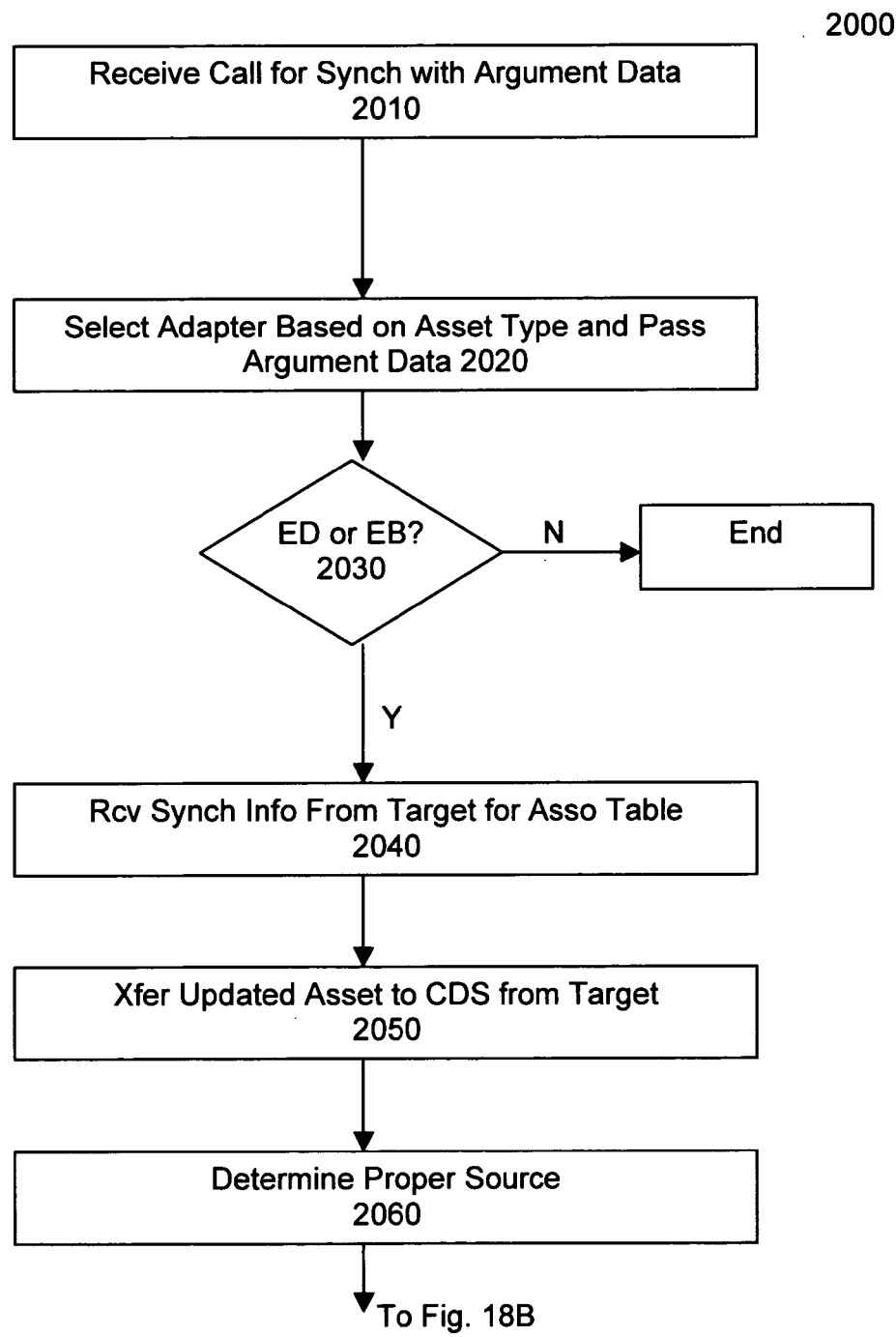
FIGS. 18A–18B are a flowchart of the synchronize asset adapter method (SAM) according to one embodiment of the present invention.
Figure 18B:
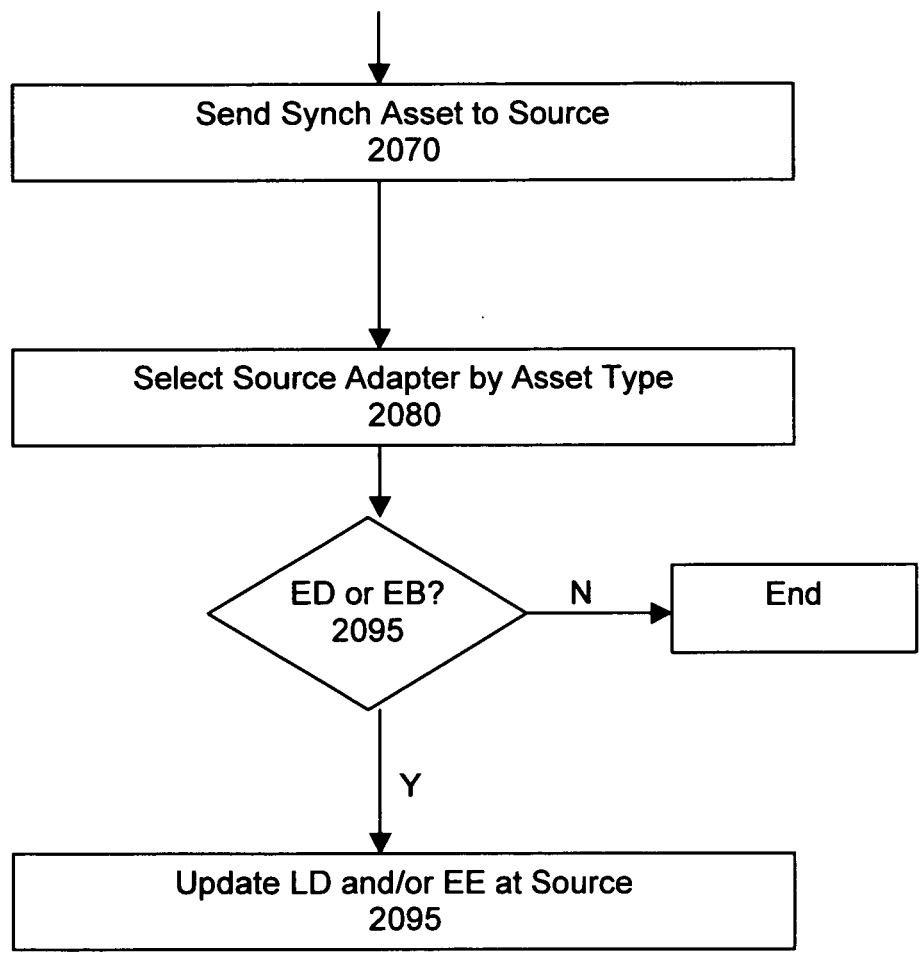

FIGS. 18A–18B is a flowchart of the synchronize asset adapter method (SAM) according to one embodiment of the present invention. One function of the SAM 2000 may be to move a "synchronization asset" from one or more targets to one or more sources. (A synchronization asset 240S may be an asset 240 that is moved from a target environment to a source environment.)

The SAM typically defines the process by which one or more source environments (910, 915) can be synchronized with the target environment. However, note that in a general case, synchronization can be used to update information, e.g. changes in assets, on any node 940 in the network—including server nodes or other target nodes. Synchronization can also be used to update assets in the CDS/ADS server (or target and/or EIS nodes performing a distribution function) so that the updated assets in turn can be distributed to other nodes of the network. While, the description below refers to moving information "back" to a source environment in order to update the respective source environment, synchronization can be used to move required information any where on the network to any given network node to provide new information and/or updated information without loss of generality.

Note that in some embodiments, the synchronization process could be the export process 1600 with the source and target roles reversed. However, a preferred embodiment, uses process 2000 for synchronization.

The first step involves the target environment creating a synchronization asset. The synchronization asset may be subsequently moved to the CDS/ADS, then onto the source environment. The source environment may be synchronized with the synchronization asset. Synchronization means that the source environment will be changed to reflect a change in one or more of the target environments.

In step 2010, the CDA may be called by an external process (e.g., in the base environment of one or more targets or any other process external to the CDS/ADS) indicating that a synchronization should happen. The SAM proceeds to step 2020. The call includes argument data that the CDA will pass on to the synchronization asset adapter (SAA) in an hidden fashion. The SAA may be an implementation of the SAM 2000 for a particular respective asset type. See step 2020.

For example, the asset specification, e.g. 1175, for an ED type may have argument data that indicates that a synchronization should happen every time that a database record in the table corresponding to the ED is changed. The client DBMS would be notified when the ED was deployed into the target/client environment in which this event needs to occur. The client DBMS would then call the CDA when the database record had changed, passing arguments to indicate the asset type, ED, and arguments that allow the SAA (for the respective ED) to know how to build the synchronization asset (or the change in information).

In step 2020, the CDA selects the appropriate synchronization asset adapter (SAA) for the asset type indicated by the caller of the process. The CDA passes the hidden arguments to the SAA, which proceeds to step 2030.

In step 2030, the SAA determines if the asset type is ED or EB. If not, the method ends, if so, the method proceeds to step 2040.

In step 2040, the SAA determines which table is associated with the asset by examining the arguments. The SAA then retrieves the synchronization information from the client environment for the respective asset. In the case of an ED or EB, the retrieval information constitutes the insertion, deletion, and updating of database records which constitute the changes that the data has undergone at client since being deployed into the client target environment for this respective asset.

In step 2050, the SAA contacts the CDS/ADS, and transfers the asset data structure 240S to the CDS/ADS. For example, this part of the SAA, running on the client environment, can update the LD 210 and/or the EE 220 parts of the respective asset 240 to covert the asset 240 to a synchronization asset 240S.

In step 2060, the CDS/ADS determines which (source) EIS node is associated with the asset. The CDS/ADS does this by retrieving data from the asset specification 1175, e.g. machine location 1174. Note that this step, the SAA (i.e. step 2060) in this example may be running on the CDS/ADS.

In step 2070, the CDS/ADS initiates a connection to the appropriate EDA on the EIS (source) node determined in step 2060, and sends the synchronization asset 240S to the EDA/source node.

In step 2080, the EDA examines the asset data structure 240S to determine the asset type. The EDA then selects the appropriate synchronization asset adapter (SAA) 2000 for that asset type. Note that this SAA may be running on the source node/EIS.

In step 2090, the SAA determines if the asset type is ED or EB. If not, the method ends, if so, the method proceeds to step 2095.

In step 2095, the SAA applies the synchronization information (e.g. LD 210 and/or EE 220) in the synchronization asset 240S of the source environment. Since this is an ED or EB, the changes involve the insertion, deletion, and updating of database records against the source database for the respective asset.

In one embodiment, the synchronization for data assets, ED & EB, are achieved by recording the SQL queries that are applied to the database table. The queries are recorded in a data structure that may be written to a file. The file can then be transferred to the database server node, via one or more CDS/ADS nodes. Once the file is on the (source) EIS node with the database table the data originated, the SQL queries are applied to the database table. If the database table has been partitioned well, the queries will synchronize the sub-partition of the table to the state of the table on the client node.

In alternative embodiments, the source node can be updated with the entire synchronization asset 240S or with just the necessary changes that are to be made to the respective asset.

The routing of the data from the client node to the EIS node is achieved due to the CDS/ADS nodes keeping the routing information for the data. When it comes time to synchronize the data, the CDS/ADS nodes know where the originally received data came from and the CDS/ADS sends the data back through those respective nodes.

Note that the SAM/SAA 2000 is a process that may be typically distributed over several tiers of the network. The SAM/SAA provides processing support for the synchronization asset on its "life cycle" 240L journey back to the source (EIS) node. On this journey the synchronization asset 240S carries information reflecting the changes made to the associated asset deployed on its respective remote client environment. These changes are then updated at the source.

In a preferred embodiment, the SAM/SAA 2000 can combine synchronization assets 240 from multiple targets/clients into a "coalesce synchronization asset" that in sent by itself back to the source (EIS). In this manner, changes for many assets deployed over many client/targets can be updated at the source/EIS by processing the single coalesced synchronization asset. This can decrease throughput requirements to the source (increasing speed) and decrease processing at the EIS.

Figure 19A:
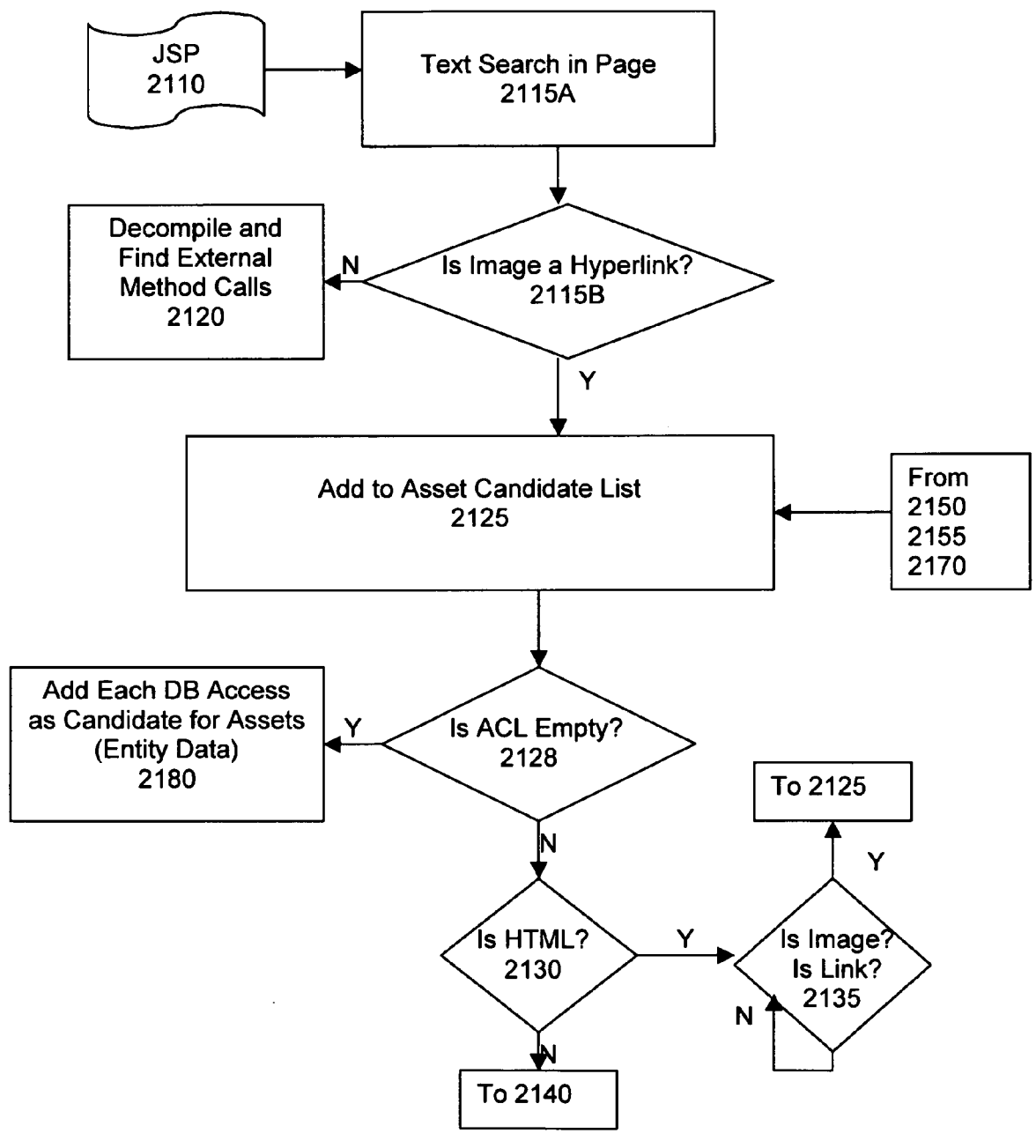
FIGS. 19A–19B are a flowchart of the EIS discovery asset adapter method/process (DAM) according to one embodiment of the present invention.
Figure 19B:
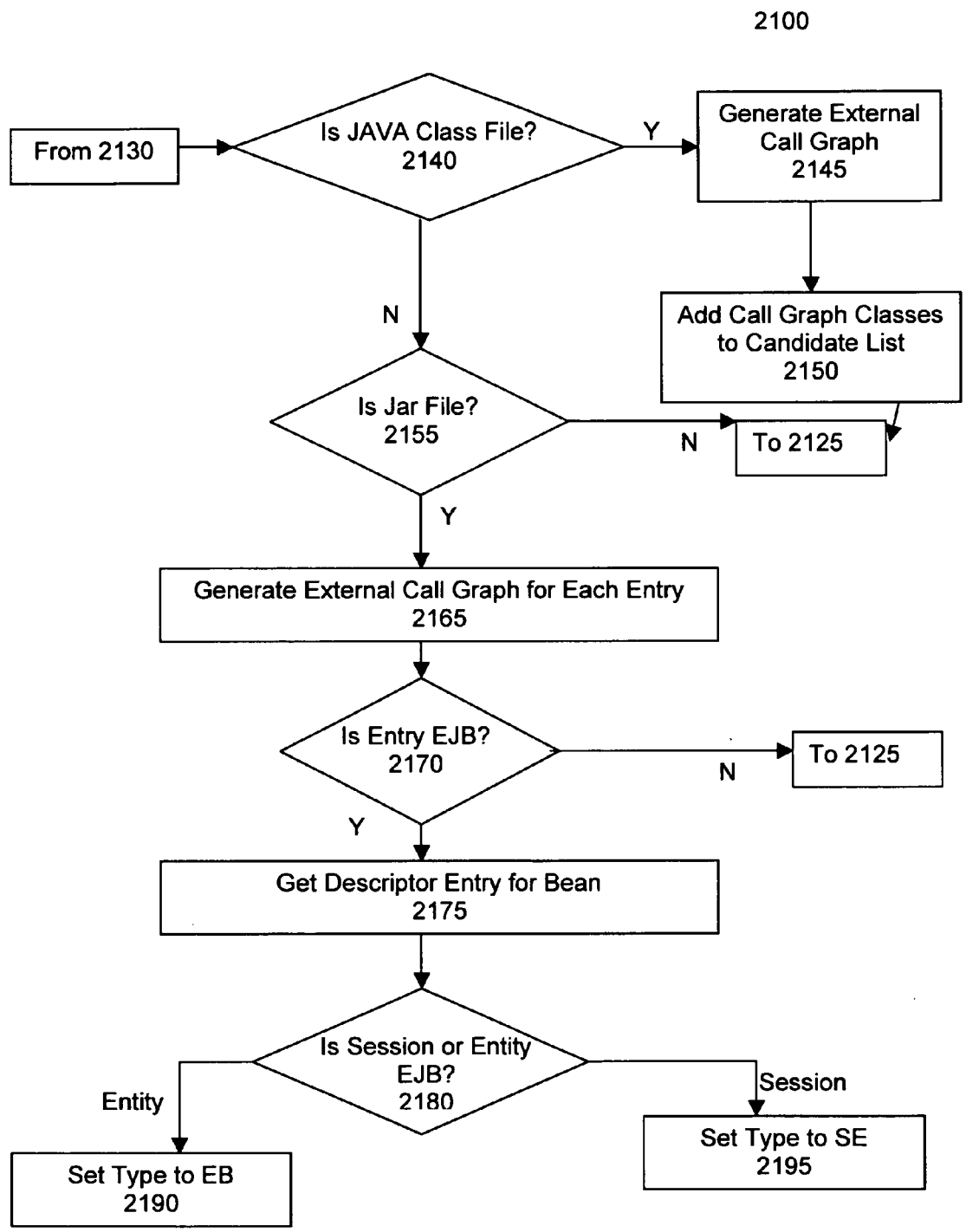

FIGS. 19A–19B is a flowchart of the EIS discovery asset adapter method/process (DAM) according to one embodiment of the present invention. The DAM defines the process of discovering the assets 240 that need to be combined into a package 1100, also referred to as an execution unit. An execution unit has an execution graph (expressed or implied) associated with it, describing the path of execution as one process calls another. The DAM identifies each asset type, then identifies dependent assets that are candidates for inclusion in the same package.

In step 2110, the EIS calls the DAM to start the asset determination process. In a preferred embodiment, the DAM begins with the top-level page, typically a Java Server Page (JSP). The JSP is a server side script that may be executed to create a Web page. The choice of the Web page as the starting point for determining the dependency graph for the application may be based on the utility of such a starting point. In other situations it may be appropriate to use a different starting point for determining the execution graph or dependency tree. Typically, the JSP may be an XML based document that has both HTML and Java source code mixed together.

In step 2115, the DAM attempts to generate other asset candidates by identifying the HTML hyperlinks 2125b. Identification of these hyperlinks may be based on a text search 2115a for image or navigation links in the JSP document. Once these elements are identified, their name may be added to the asset candidate list. After identifying each candidate from the HTML, the DAM proceeds to step 2120. In other embodiments, the "edges" of the call graph are determined. This can be done by doing a text search for method calls in the program. See below.

In step 2120, the DAM identifies the Java™ objects that the JSP will instantiate. The DAM generates the servlet class corresponding to the JSP. The class is generated by a well-defined mapping in the Java™ Servlet specification. The class may be then compiled into Java byte codes. The byte codes are then examined to determine which classes are loaded by the servlet. In this way, the DAM determines which Java™ classes are used by the JSP. Once these classes are identified, the DAM includes those classes as asset candidates and proceeds to step 2125.

In step 2125, the DAM retrieves the next asset candidate off of the asset candidate list (ACL). The DAM then proceeds to step 2130. If the ACL is empty, the DAM proceeds to step 2180. Note that the ACL can be a data structure that is identical to the data structure of the asset definition data structure 1175.

In step 2130, the DAM determines if the asset is static HTML. This determination may be based on the file extension being either "HTML" or "HTM". If the file extension is a match, the DAM proceeds to step 2135, otherwise, the DAM proceeds to step 2140.

In step 2135, the DAM searches through the HTML text looking for either "IMG" or "A" tags. These tags represent portions of the HTML document that would cause a Web Browser to initiate a load of an image or another HTML document. For each of the tags that match, the DAM creates another entry in the ACL. When the HTML document has been completely searched, the DAM proceeds to step 2125.

In step 2140, the DAM determines if the asset is a java class file (JCF). If the asset is not identified as a JCF, the DAM proceeds to step 2155. Otherwise, the DAM proceeds to step 2145.

In step 2145, the DAM generates an external call graph (ECG) for the JCF. The ECG may be a list of the method calls that are made within the class represented by the JCF. The ECG may be generated using decompilation technology. Decompilation technology is the capability of taking a compiled program and recreating the original source code. After the class has been decompiled, those methods made against external classes are placed in the ECG. The DAM then proceeds to step 2150.

Note that both in steps 2120 and 2145, the method calls are determined by either byte code examination or decompilation. Either method can be used in either step.

Decompilation is the inverse of compilation, translating an executable file into a higher level language. Examples of decompilation technology would include the following products: Mocha, DejaVu, WingDis, Jad, Jasmine, SourceAgain, GuavaD, and HomeBrew.

In step 2150, the DAM transforms the ECG into asset candidates. The DAM iterates through the ECG adding an entry in the ACL for each call that results in a unique asset descriptor. The DAM then proceeds to step 2125.

In step 2155, the DAM determines if the asset is a JAR file. If the extension of the file is not "JAR", "WAR", or "EAR", the DAM proceeds to step 2125. Otherwise the DAM proceeds to step 2165.

In step 2165, the DAM generates an external call graph (ECG) for the for each java class in the JAR file. The ECG may be a list of the method calls that are made within the classes contained in the JAR file. The ECG may be generated using de-compilation technology (see 2150).

In step 2170, the DAM determines if the assets from 2165 are EJBs. The DAM matches the method signature against that of the interface for EJB'S. If there is a match, the DAM then proceeds to step 2175. Otherwise, the DAM adds the assets to the ACL and proceeds to step 2125.

In step 2175, the DAM determines the assets' EJB type. In a preferred embodiment, this is done by examining the descriptor entry for the bean. The DAM reads the XML deployment descriptor in the JAR file that contained the EJB. Searching through the XML deployment descriptor, the DAM finds the entry matching the filename of the EJB. There is an entry that specifies the EJB type. This type determines the asset type for the EJB. The DAM then proceeds to step 2180.

In step 2180, the DAM determines the data assets that are required for the assets that were identified. A search through the de-complied code for common database access methods yields table names, operations, and "where clauses". These are all common elements of database operations. These elements are each identified as an entity data asset type. It is expected that the database assets will need to be altered by a deployment engineer. If there is a "where" clause, the asset is an entity bean and the process 2100 proceeds to step 2190 where the type of the asset is set to "entity bean" (EB). However, if there is no "where" clause, the asset is a session bean and the process 2100 proceeds to step 2195 where the type of the asset is set to "session bean" (SB).

In a preferred embodiment, property files are searched for SQL queries. It is a common practice to store resource strings in property files. The strings associated with database statements would be likely candidates for being stored as resources.

In a preferred embodiment, additional assets would be discovered through the tracing of JSP chaining. JSP documents have the ability to specify other JSP documents that will be called from the current document.

In an alternative preferred embodiment, the byte codes for the Java™ classes would be disassembled and examined for SQL statements and external method calls. The disassembly of the Java™ byte codes contains a string pool. The string pool contains all the static strings that are declared in the class file. These strings provide candidates for SQL statements. The external calls in the disassembly are identified by the "invoke" mnemonic. Such calls that cannot be resolved to the current class are asset candidates.

In a preferred embodiment, the log of the Web server may be examined to determine which URLs are accessed. These URLs provide candidates for the start of call graphs for different packages.

In a preferred embodiment, the SQL statements are examined to determine tokens for targeting. The 'where' clause may contain column names that are accompanied by some binary operator with a literal string as the other operand. The configuration entry that specifies the Entity Data (ED) and/or Reference Data (RD) 'where' clause can be assembled from the 'where' clause by substituting the string literals with tokens. These tokens will later be replaced by the target asset adapter 1900. Existence of string literals indicates that the query should be part of an ED asset rather than a Reference Data asset.

In a preferred embodiment, the DAM determines if there are secondary tables that should be asset candidates. If the DAM determines that a table is a candidate for an ED asset, the DAM will examine the schema for the table referenced. From the schema information, foreign key (FK) relationships are determined. These relationships indicate secondary tables that are dependent on the current table, and show the relationship as indicated by the columns specified in the FK. If the Primary Key (PK) in the secondary table contains columns that match those columns that had tokens assigned during the previous embodiment, those tables become candidates for being Reference Data assets. Otherwise, any table that does not meet the previous condition is specified as an ED asset candidate. In a preferred embodiment, the union of the columns specified in the where clauses for a particular table specify those columns that need to be selected and created in the target environment.

This invention is not limited to Web based applications. In alternative embodiments, other types of programs, e.g. C++, ASP, Visual Basic®, Delphi®, Fortran®, etc. can be processed by the discovery method 2100 by generally searching through the program in the Execution Call Graph defined sequence and identifying all calls to external programs that need to be listed on the ACL. In alternative embodiments, the user can provide their own DAM.

Figure 19C:
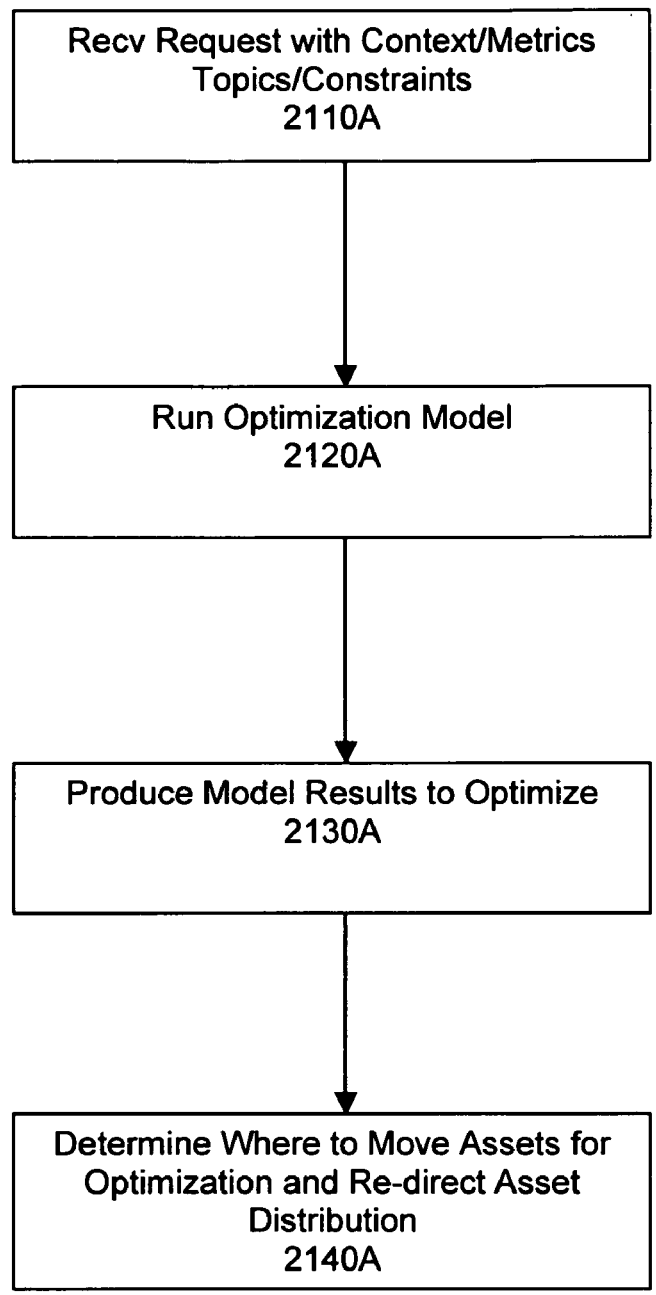
FIG. 19C is a flowchart of the EIS adjustment asset adapter method/process (AAM) according to one embodiment of the present invention.

The adjustment asset adapter method 2100A, in FIG. 19C, may be used to determine on optimal way to process an asset, e.g. if an asset needs to be routed differently or executed on a different environment. When the adjustment method is called, it may be given a context to examine. The context allows the adjustment method to determine specific information about the environment in which the adjustment asset adapter method is running within. The context contains topics and/or constraints such as: routing, network load, CPU load, local license server location and/or availability, local certificate server, costing, and other topics that might allow the adjustment asset adapter to make decisions about how its assets 240 should be distributed in a more optimal manner. If the topic/constraint does not exist, the adjustment asset adapter method may add a query entry that will prompt various agents for the type of information that the adjustment asset adapter method needs in order to adjust the distribution of assets.

Some topics/constraints include load balancing, optimal distribution pathway on the network, closest ISP or local server, service level agreements, and migration.

One constraint that can be handled by the adjustment asset adapter may be load balancing. In one preferred embodiment, statistics based on the computational environment are fed back into the CDS/ADS. Theses statistics are then used to determine which computational environments are most available for executing program functionality. A common algorithm would be a round robin.

When providing asset distribution, it may be useful to differentiate between the possible different routes an asset can take from source to target, and even the source from which the asset originates. The ability to track network load and determine optimal routing on the network can support Service Level Agreements in that a better load profile and routing path can be sold at a premium.

Migration occurs when assets that are deployed in one physical area of a network move to cause local areas of over or under use ("growth and shrinkage.") As an application is executed, or as a target moves through a network topology (e.g. a wireless device or other pervasive device physically moving with respect to the network), the actual asset distribution across the tiers of the network could change. If there is a greater demand for an application, the distribution system should move the appropriate assets toward the area of demand in order to reduce communication distances and to increase reliability in that smaller portions of the network will be used. However, the distribution of these assets might need to conform to constraints such as load balancing and service level agreements. Furthermore, as the demand lessens in parts of the network, it might be optimal to move assets from locations of heavy activity to those locations with less activity in order to free up resources for applications that have a higher demand. The same "growth and shrinkage" also can occur when a location of a target environment moves through a network topology, e.g. from a large city to a rural area. In this case, optimization can only occur if the target environment is tracked in a dynamic fashion and the assets can be physically moved to meet the changing criteria as enabled by the processes in this disclosure. In a preferred embodiment, the distribution of the assets may be reconfigured over the network topology based on the demand caused by the execution of the application and/or or other criteria.

Another significant use of the Adjustment Asset Adapter Method can be to determine from where and through which route which asset is obtained or is executed if an application execution requires assets that are not in the local server. This function may need to invoke other adapter methods to query the available options regarding to the source, route and the choice of either executing remotely through bridging or transporting the asset into local server in order to execute its own logic to optimally select the asset arrangement for the application. This function along with other functions makes each of the nodes into a truly distributed server.

FIG. 19C is a flowchart of the EIS adjustment asset adapter method/process (AAM) according to one embodiment of the present invention. The AAM defines the process of adjusting and measuring the distribution of assets. Adjusting the distribution may be achieved by changing the package specification 1100. In a preferred embodiment, measurement uses the synchronization 2000 facility to pass metrics back through the system, e.g. back to the source (e.g., EIS). The adjustment system can enable or disable a certain set of functionality to optimize the system based on external factors/criteria.

In step 2100A, various elements produce metrics, which are fed into the adjustment method's models (see below). (Elements are inputs to the performance models that can be provided by a user, designer, and/or some executing process, e.g. an adapter method.) Performance metrics include, but are not limited to: data transfer between agents, transaction per second for computational environments, condition of a secure network connection, the number of clients per second that have been accessing a distribution server, or simply distance of assets from their target.

In step 2120A, different models that define some network optimization are run. For example, to optimize load balancing, a load-balancing model determines which servers have the capability to facilitate distribution of assets. To optimize quality of service, a QoS model determines the security and performance of the network paths for asset distribution. To optimize asset routing, a routing optimization model calculates the best path for asset distribution. Many of these models are well-known in the prior art.

In step 2130A, the model produces results indicating the changes that need to be made to optimize the criteria the model is designed to optimize. In many preferred embodiments, this optimization requires the re-location, movement, and/or re-routing of assets and/or computational requests. These changes may result in an asset being moved to another cache, closer to a target environment or on a more secure network path. Other possible changes might include the choice of an alternate target environment for asset delivery, or the selection of an alternate computational environment in which to fulfill a request for execution.

These changes are applied to the distribution of the assets. In other words, step 2130A determines where assets should be in order to produce the optimization of the model.

For example, with a load-balancing model, each node can keep track of how many requests it can generate and how long each request takes. There would be some adaptive grouping of different requestors into groups for load balancing, the request statistics would determine which intermediate computational environment would service a request. For distribution, we would keep track of the CDS/ADSs that were providing the assets to each computational environment. If one CDS/ADS was providing an inordinate number of assets, that CDS/ADS might refer the requesting CDA to a peer CDS/ADS.

In another example, with the Service level agreement model, a service token may be added to all transfers. When a package needs to be transferred or processed, the service token is examined. If there are other packages that have a higher service token, those packages are transferred or processed before the lower level tokens or process on an environment with better resources.

In another example, the network routing optimization would have a goal of asset migration. Request statistics are kept for each asset based on the number of times the asset was distributed and how many times the deployed asset was accessed in the client environment. Those assets that are deployed frequently in a target environment would be distributed physically closer to the client and perhaps even deployed at the client/target. As the target demand for a particular asset decreased, the physical location of that asset could be moved further from the target.

In step 2140A the process determines where the assets to be moved are, and redirects the distribution of these assets to the location determined in step 2130A. In a preferred embodiment, step 2140A re-directs these assets by changing the node ID 1524 in the node registration specification 1522. Note that the node ID can refer to a CDS/ADS, EIS, proxy server, or any other computer on the network in addition to any target. In some embodiments, one or more of the assets may be directed through a route that meets certain routing criteria, e.g. routing under a certain speed threshold or through certain nodes. This route determination and criteria are well-known.

Now that the adapters of the invention have be disclosed and explained, a more detailed explanation with be given about the asset lifecycle 240L described in FIG. 2B. The asset goes through a lifecycle starting in the source tier, moving through the deployment tier, into the target tier, and then optionally back through the deployment tier to the source tier and/or to any other node or nodes in the network if required. The asset adapter methods define the steps in this lifecycle where asset type specific processing is required for the asset to continue through the lifecycle.

In the source tier, resources are discovered using the discovery asset adapter method 2100, to identify candidates for classification as assets and, through the export adapter method, to package assets together as packages. In a preferred embodiment, a package specification 1100 is created that in turn contains asset specifications 1170. The asset specification 1170 may be stored in the deployment tier until a package 1100 is scheduled for delivery.

The version asset adapter method 1660 may be used to determine the current version information of the assets 240 in the source tier. This version information may be compared with the target tier asset version information in the deployment tier to determine if assets need to be deployed from the source tier to the target tier.

The export asset adapter method 1600 may be used to obtain the actual current version of assets in the source tier that need to be distributed to the target tier. After the assets are exported, the assets are preferably moved to the deployment tier and stored in an asset cache. When exporting assets, the export asset adapter method captures the logic, data, and extended environment information 220 for an asset 240 and puts it into an asset data structure 240.

If an asset requires processing the processing may be done when the asset is stored in the asset cache or at any time before the asset is distributed to either a secondary cache in the deployment tier or the target tier. The processing is primarily performed on the asset's extended environment 220, in an attempt to translate the extended environment 220 to run in harmony with the base environment 250 in the given target tier. However, the processing process may also change the logic/data portion of the asset or both the logic/data and the extended environment portion of the asset.

An agent in the target environment requests the assets that are pending for delivery to that target tier. The target processing asset adapter method 1900 may be executed against any asset that requires targeted processing before being sent to the target tier. Target processing is intended primarily to change the Logic/Data section 210 of the asset data structure 240 in order to provide a unique asset that can create or has personalized information for the specific target in which it is being deployed. The targeting can be for an intermediate target (a server that will in turn serve many users) or a final target (a single node that will serve a single user).

When the asset is sent to the target tier, the deploy asset adapter method 1700 may be invoked to deploy the asset 240 into the computational environment, i.e., the base environment 250, in the target tier. The extended environment 220 from the asset's data structure 240 may be used to set the base environment 250 and extended environment 220 in the target tier to run the asset in a correct manner. The asset's logic and data 210 are then deployed into the base environment 250, and since the base environment 250 has been adjusted, the logic 210 will function correctly and the data 210 will be accessible.

When changes happen in the target tier that warrant synchronization, the synchronization asset adapter method 2000 may be executed to create a synchronization asset and the asset 240 may be propagated back through the deployment tier into the source tier and the source tier resource that corresponds to the synchronization asset may be synchronized with that asset.

Agent methods are now described in detail. An agent is a process or service that can be assumed to be available in an environment. For example, the EDA may be available in the source environment, the CD S/ADS may be available in the distribution environment, and the CDA may be available in the target environment. When the EDA, CDS/ADS, and CDA agents are described, it may be assumed that we are referring to a simple network topology with three distinct tiers: source, distribution, and target. If we consider an arbitrary network topology, with overlapping combinations of these tiers, then it may be advantageous to have more abstract agents to describe the functionality. Some of these preferred, more abstract agents are: Publish, Subscribe, Computational, and Caching.

These agents provide a generalized framework for distributing assets 240 over the network. The types of assets they distribute correspond with the asset adapters that are defined for the system. For much of this disclosure we refer to a set of asset adapters specific to distributing Sun's J2EE Web and enterprise applications as a non-limiting example. However, other assets, as described above, can also be distributed.

In a preferred embodiment, the common agents in the simple distribution topology are typically comprised of several agents, some common aggregations are described here. The EDA may be comprised of a publishing agent. The CDS/ADS may be comprised of a subscriber (subscription) and caching agent. The CDA may be comprised of a subscription and computational agent.

Each agent may be responsible for providing a service interface, on a network node, that other agents can access. Those other agents may be on the same node/computer (to distribute and execute assets within tiers or subdivisions of the computer) or on different nodes/computers on the network.

Figure 19D:
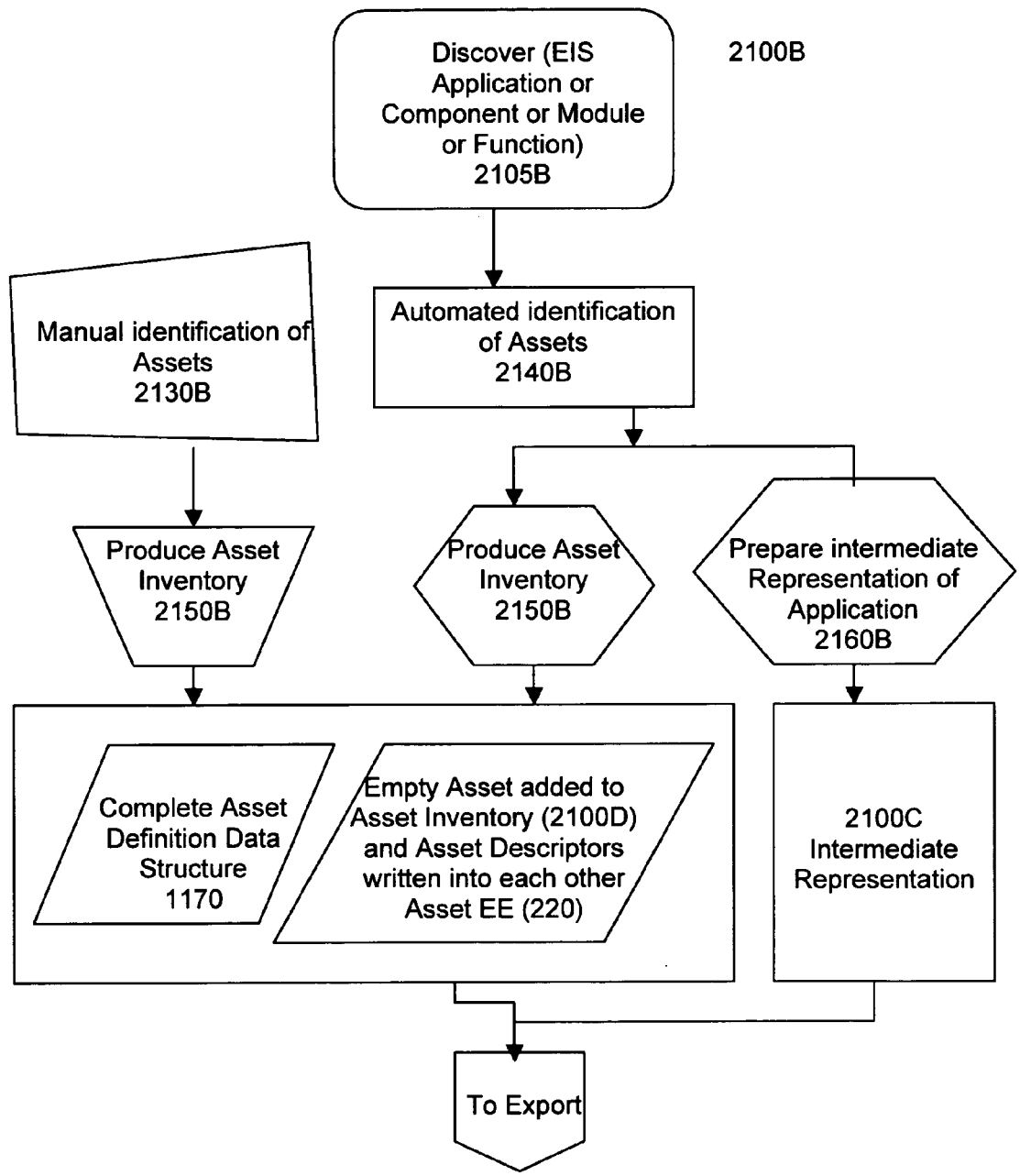
FIG. 19D is a flowchart of an alternative preferred discovery asset adapter process according to one embodiment of the present invention.

FIG. 19D is a flowchart of an alternative preferred discovery asset adapter process according to one embodiment of the present invention.

The discovery asset adapter process (discovery process) 2100B identifies member objects of one or more computer system parts 100F and establishes at least one topographical relationship among the member objects.

The discovery process 2100B starts 2105B by identifying all of the member objects.

This identification can be done manually 2130B, e.g., by a systems engineer examines the system parts 100F typically by traversing the directories of the system parts 100F, and manually produces an Asset Inventory 2150B and an Intermediate Representation 2160B.

Alternatively, in an automatic embodiment of the discovery process 2100B, a process 2140B traverses one or more computer file systems to find one or more of candidate objects of the system part 100F that are located on the computer file system. Examples of less sophisticated processes that traverse one or more computer file systems include the DIR function in Microsoft® DOS, the Microsoft® Windows® Explorer, and the LS function in the UNIX operating system. These functions are well-known but only name the objects found within the topographical scope of the parameters that are provided to these functions. These functions do not recognize or attempt to recognize any relationship among these objects other than the topographical relationship of their location. These functions are not designed to identify any objects found as being candidate member objects of any system part 100F. Therefore, these functions cannot guarantee that all of the members of any system part will be identified. Therefore, the objects identified by these functions cannot be considered candidate member objects of a subject system part 100F.

The automated identification step 2140B overcomes this difficulty by using knowledge about the specific system part 100F and the EIS system environment in an expert system designed for this purpose. For example, for an expert system to identify the candidate member objects of a common implementation of a MS-Win32 software application, the expert system, given the name of the system part 100F (for example, "Payroll" for a payroll application 108) and a root starting location in the EIS computer file system, would traverse the computer file system starting at the root location, would search for a branch of the computer file system that matched the branch of the computer file system named in the expert system's rulebase as the system part's "home" directory. The expert system would have a high expectation (expressed internally as probabilities) that objects found in the system part's "home" directory were, in fact, candidate member objects of the system part, and would add these objects to the Asset Inventory 2100D and to the intermediate representation 2100C (see below) of the system part.

Next, the expert system would traverse the computer file system to the well-known common application directories of an MS-Win32 operating system. There, the expert system would search for runnable library files (such as ".lib") or runnable runtime files (such as .dll) named in the expert system's rulebase specifically as the common application files required for correct execution of the system part (i.e. "payroll"). Next, the expert system would traverse the computer file system to locate the operating system specific configuration file directories (for example, in MS-WINNT 4.0, the "WINNT" directory), and there, would search for those configuration files and files which contained configuration entries (such as the WINNT Registry) and add those files to the Asset Inventory 2100D and to the intermediate representation 2100C. Only after all directories and computer system files named or suggested in the expert system's rulebase were examined, and all candidate member objects had been placed in the Asset Inventory 2100D and intermediate representation 2100C would the expert system report completion of its task, which is production of the Asset Inventory 2150B and production of the Intermediate Representation 2160B. Any search objectives or file acquisition requirements stated in the expert system's rulebase that the above described process failed to locate and add to the Asset Inventory 2100D and the intermediate representation 2100C would be reported to a human deployment engineer, who would finalize the production of the Asset Inventory 2150B and Intermediate Representation 2160B. Any sufficient level search result would be acceptable. In one preferred embodiment, sufficiency may be based on the goal of being able to later distribute and execute the assets in a base environment on one or more target nodes.

When the Asset Inventory 2100D and the Intermediate Representation 2100C are complete, the member objects so inventoried and identified are considered digital assets 240 members of the system part 100F. These digital assets 240 form the parts of a part-whole relationship with the system part 100F.

Alternatively, the human deployment engineer could develop additional rules to place in the expert system's rulebase so that future invocations of the expert system would succeed in locating all files and completing all searches called for in the rulebase. Although the use of an expert system for discovery of assets is believed to be new, expert system technology is well-known in the art.

Now more detail will be presented about the steps that the expert system (or the human deployment engineer) had to perform in the above described discovery process 2100B.

The Intermediate Representation 2100C may be created by placing an identifier as a node in the Intermediate Representation for each member object discovered. Before the member objects are recognized as digital assets, these identifiers are member object identifiers. Subsequent to the recognition of the member objects as digital assets 240, the member object identifiers become or are transformed into digital asset identifiers. In a preferred embodiment, the intermediate representation 2100C is a graph with nodes and edges. The digital asset identifier occupies one of the nodes of the graph. The edges represent the topographical relationship of the digital assets with respect to each other and with respect to the EIS computer file system.

The digital asset may be created from the member object, chosen as described above, by placing the member object in a logic/data section 210 of the digital asset 240 and by further creating an extended environment data structure 220 (described above) that is attached to the logic/data section 210.

As stated above, the digital asset may be placed in an asset inventory container object called the Asset Inventory 2100D.

In some embodiments, a definition of each of the digital assets may be optionally entered or completed in an asset definition data structure 1170, above. As already stated, these entries have descriptions of one or more digital asset attributes of the digital asset 240.

The member objects/digital assets are processed, as above, until the Intermediate Representation 2100C fully describes the system part 100F and the asset inventory container object (Asset Inventory) 2100D has a complete inventory of the digital assets of interest from the system part 100F. The asset definition data structure 1170 may then also be a complete list of the digital assets 240 of interest in the system part 100F.

The discovery process 2100B further stores one or more descriptors in the extended environment 220 of each digital asset after the extended environment of the digital asset is created.

In one embodiment, the descriptors include one or more common descriptors 210B that provide a unique identification of the digit asset on the network(s). These common descriptors 210B can include one or more of the following: a digital asset name of the digital asset, a unique fully qualified name of the digital asset, an address of the digital asset, and a size of the digital asset. These common descriptors are obtained from the EIS at the time the digital assets are discovered.

In one preferred embodiment, the descriptors include one or more asset dependency descriptors 220B. The asset dependency descriptors include any one or more of the following: one or more names of other digital assets on which the digital asset is dependent 222B, an asset identifier, and one or more unique fully qualified names of other digital assets on which the digital asset is dependent 222B. These fully qualified names are also obtained from the EIS.

In one preferred embodiment, the descriptors include one or more reference descriptors 260B. The reference descriptors 260B include any one or more of the following: a reference link descriptor, a reference file descriptor, and a reference directory descriptor. The reference link descriptor may provide a World Wide Web ("WWW") address that has contents used for processing of the digital asset. The reference link descriptor may also provide a WWW address that has contents used during execution of the digital asset. The reference directory descriptor provides additional address information that may be used to locate one or more of the associated digital assets. The reference file descriptor may be a unique fully qualified name of a file required for reference by the digital asset.

In one preferred embodiment, the descriptors include one or more runnable descriptors 240B that indicates that the digit asset 240 is a runnable digital asset. The runnable descriptors 240B may include a description of the EIS execution environment. For example, the runnable descriptor might be Windows NT® 4.0, Linux® version 5.0, or Solaris® version 6.1.

In one preferred embodiment, the descriptors include one or more non-runnable descriptors 242B that indicates that the digit asset is a non-runnable digital asset. The non-runnable descriptors 242B may include a description of the EIS execution environment as above.

Figure 19E:
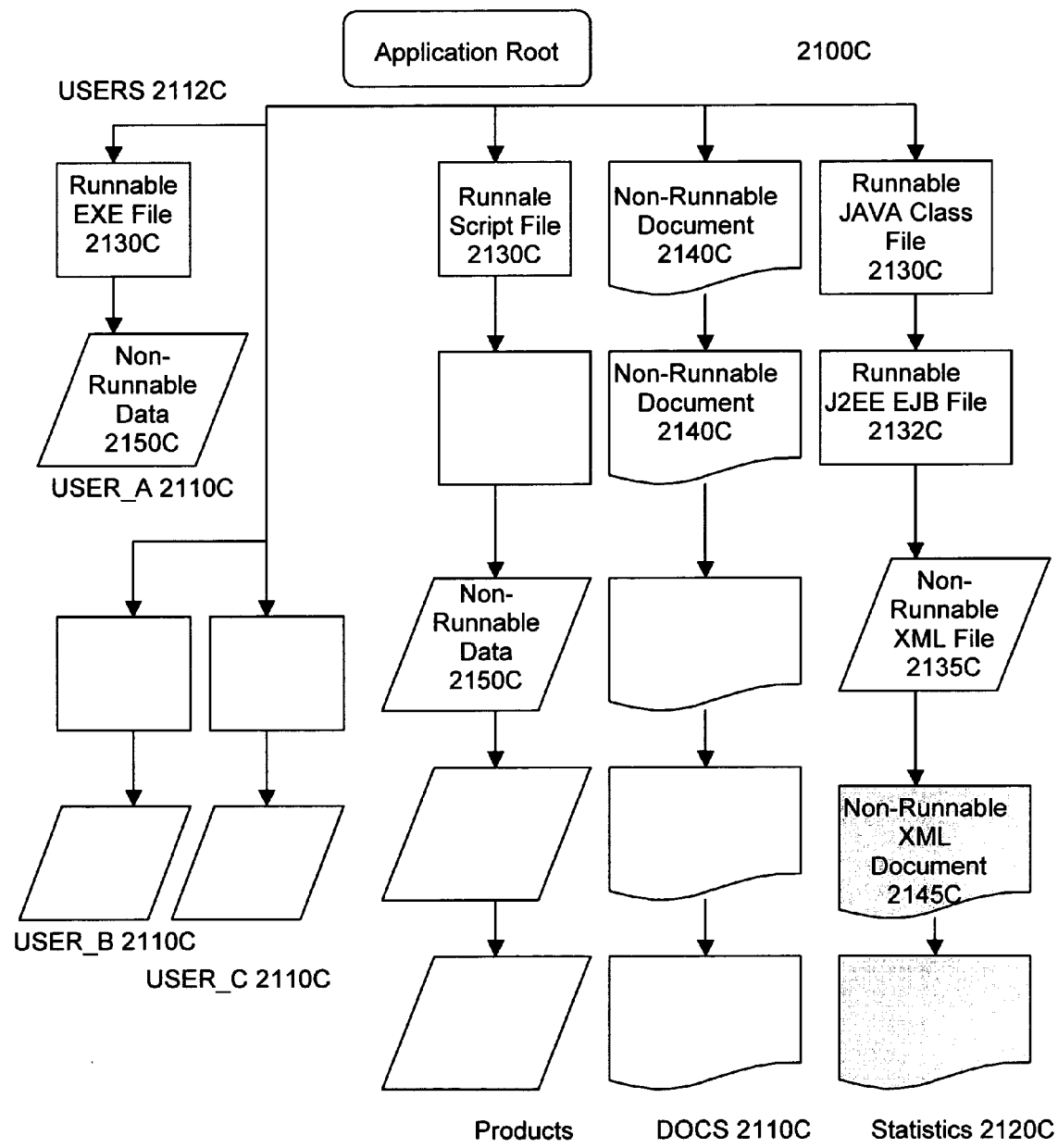
FIG. 19E is a diagram of a prior art graph structure, specifically a containment graph structure, used to establish membership relationships of digital assets according to one embodiment of the present invention.

FIG. 19E is a diagram of a prior art graph structure, specifically a containment graph structure, used to establish membership relationships of digital assets according to one embodiment of the present invention.

In the preferred embodiment, the graph structure can be used as the Intermediate Representation. For FIG. 19E, in order to provide additional detail for explanation purposes here, the nodes of FIG. 19E have been drawn to illustrate visually the different digital asset types that are the subjects of the discovery process. Further, text identifications of the digital asset type have been placed in a number of the illustrated nodes for further clarity. In practice, a graph may be represented in computer memory as a data structure, containing both node data structures and edge data structures. See well-known works by Prim, Kruskal, Dijkstra, et. al. which are herein incorporated by reference in their entirety. Well-known algorithms dictate correct methods for traversal of graphs of this type. Further, there exist well-known methods described to construct such a graph given the topological relationships discovered or examined by the discovery process as it follows the rules contained in the expert system rulebase or traverses the EIS computer file system. In 19E, as non-limiting examples of the diversity of digital assets which may be discovered, digital assets such as Runnable Script File 2130C, Non-Runnable Document 2140C, Runnable Java™ Class 2130C, Runnable J2EE EJB File 2132C, Non-Runnable XML File 2135C, Non-Runnable HTML Document 2145C, Runnable .EXE file 2130C, Non-Runnable Data File 2150C are identified. Further, the topological relationship of these digital asset types may be demonstrated for non-limiting example purposes by their respective locations in branch directories of the example computer file system, such branch directories being identified as "Users" 2112C, "Docs" 2110C, "Statistics" 2120C, etc.

Figure 19F:
FIG. 19F is a block diagram of a preferred asset inventory according to one embodiment of the present invention.

FIG. 19F is a block diagram of a preferred asset inventory according to one embodiment of the present invention. This data structure contains the assets identified by the discovery process 2100. In a preferred embodiment, the assets 240 that occupy each entry, include the logic/data sections 210, EE sections 220, and optionally the asset interface 230 of the discovered digital assets 240.

FIG. 20 is a flowchart of a publishing agent method according to one embodiment of the present invention. The publishing agent method (PAM) handles requests for the discovery 2100, versioning (see FIG. 14A), and export 1600 of assets. The PAM groups together these lifecycle steps (i.e. adapter methods) in the asset lifecycle into a single agent.

Discovery 2100 is the process of determining asset dependencies that result in the definition of a package specification 1100 by means of the export adapter method 1600. Versioning (see FIG. 14A) is the process of determining the current version of an asset against a cached asset and updating the cached asset if it is out of date. Export 1600 is the process of taking the various elements that constitute an asset and packaging those elements into a data structure.

In step 2205, the PAM receives a request to discover the assets that are used in one or more applications. An initial asset may be specified to begin the discovery process, then the dependent assets are discovered until the PAM reaches a terminating condition.

In step 2210, the PAM receives a request for the current version information for specific assets. The PAM looks to assets in the local environment to determine the version information.

In one embodiment, the PAM uses the time stamp associated with the asset as the version information.

In step 2215, the PAM receives a request for a data structure containing assets. A list of assets accompanies the request. The PAM exports the current version assets from the local environment into a data structure. The PAM returns the data structure to the caller.

In a preferred embodiment, the PAM splits the data structure into smaller pieces that may be of a more appropriate size for sending over a network.

Note that the PAM may run steps 2205, 2210, and 2215 in any order depending on how the requests of the PAM are received. In addition, the PAM may omit one or more of these steps. Essentially, the PAM is a convenient way of grouping these asset life cycle steps that typically occur in the source tier. Therefore, a set of asset requests can be sent to the PAM and the PAM, a single agent, will perform the necessary discovery, versioning, and exporting that is normally required at the source.

Note that the PAM can be considered as a package 100 of assets 240 distributable, and with a life cycle, of its own. By distributing the PAM package of assets to any given source, that source will be enabled to discover, version, and/or export assets as required.

Figure 21:
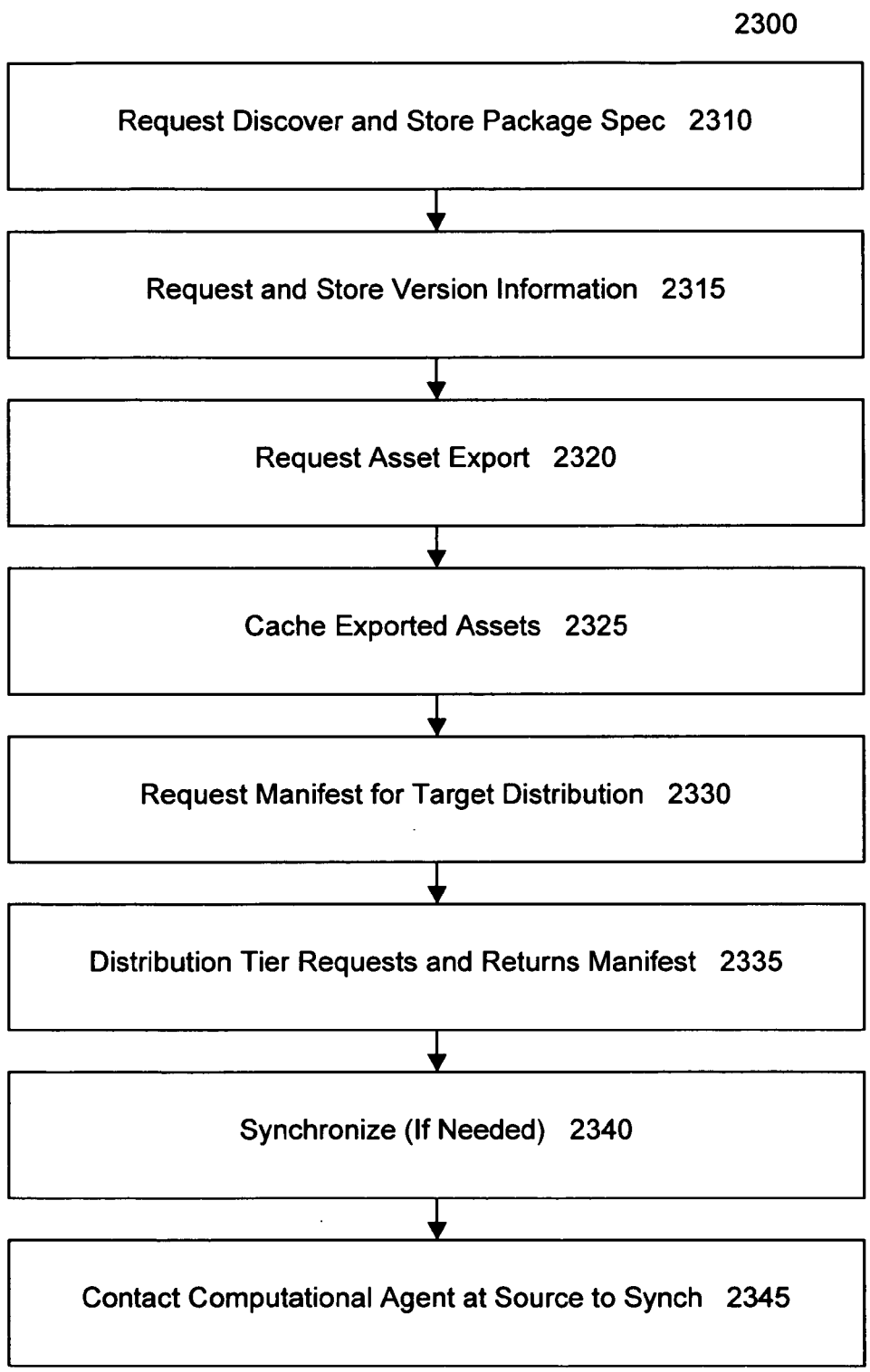
FIG. 21 is a flowchart of a subscriber agent (SA) method according to one embodiment of the present invention.

FIG. 21 is a flowchart of a subscriber agent (SA) method according to one embodiment of the present invention. The subscriber agent method (SAM) 2300 may be responsible for an adjustment asset lifecycle step, supporting bridged computational environments (proxy capabilities, below), and dispatching requests between other agents.

The SA supports the adjustment asset lifecycle step by logging and reporting the interaction between all of the agents that contact the SA.

The SA can provide the proxy capabilities described in the computational bridging adapter method. When requests are sent to the SA, those requests are routed to the source computational environment. See computational agent below. When responses to a proxy request are returned from the source computational environment, the response may be sent to the target computational environment, a computational agent running on the target.

The SA also can coordinate the transfer of assets and information between the publishing agent and caching agent. The SA performs this functionality for discovery, versioning, and exporting.

The SA also can provide the transfer of assets and information between the source and target environments for synchronization.

The SA also can coordinate the transfer of assets information between the caching agent and computational agent. The SA performs this functionality for deployment and synchronization.

Note that the SA can be considered as a package 1100 of assets 240 distributable, and with a life cycle, of its own. By distributing the SA package of assets to any given source, CDS/ADS, general server, and/or client/node will be enabled to communicate with and process requests from other SA's, and coordinate the transfer of assets and information, as required.

In step 2315, the SA may be instructed, by the CDS/ADS, to request that the asset versioning method (FIG. 14A) be executed by the source publisher agent 2200. The resulting version information from the versioning process may be stored in the distribution tier.

In step 2320, the SA may be instructed, by the CDS/ADS, to request that the asset exporting method 1600 be executed by the source publisher agent 2200.

In step 2325, the assets resulting from the exporting process 1600 in step 2320 are sent to the caching agent 2500 on the same node as the SA so that they can be stored in one or more of the asset caches.

In step 2330, an SA, typically in the target environment, requests 1400 a manifest 1452 detailing the assets to be distributed to the target environment from the SA in the distribution tier.

In step 2335, the SA in the distribution tier requests the manifest 1452 detailing the assets to be distributed to the target environment from the distribution cache and returns it to the requesting SA in the target environment.

In step 2340, the SA, typically in the target environment, may be optionally requested to synchronize 2000 an asset. The SA proceeds to conspire with the SA in the distribution tier to forward the synchronization asset.

In step 2345, the SA in the distribution tier contacts the computational agent 2400 in the source environment and sends the synchronization asset to that agent for synchronization.

Note that the SA can be considered as a package 1100 of assets 240 distributable, and with a life cycle, of its own. By distributing the SA package of assets to any given source, CDS/ADS, general server, and/or client/node will be enabled to communicate with and process requests from other SA's, and coordinate the transfer of assets and information, as required.

Figure 22:
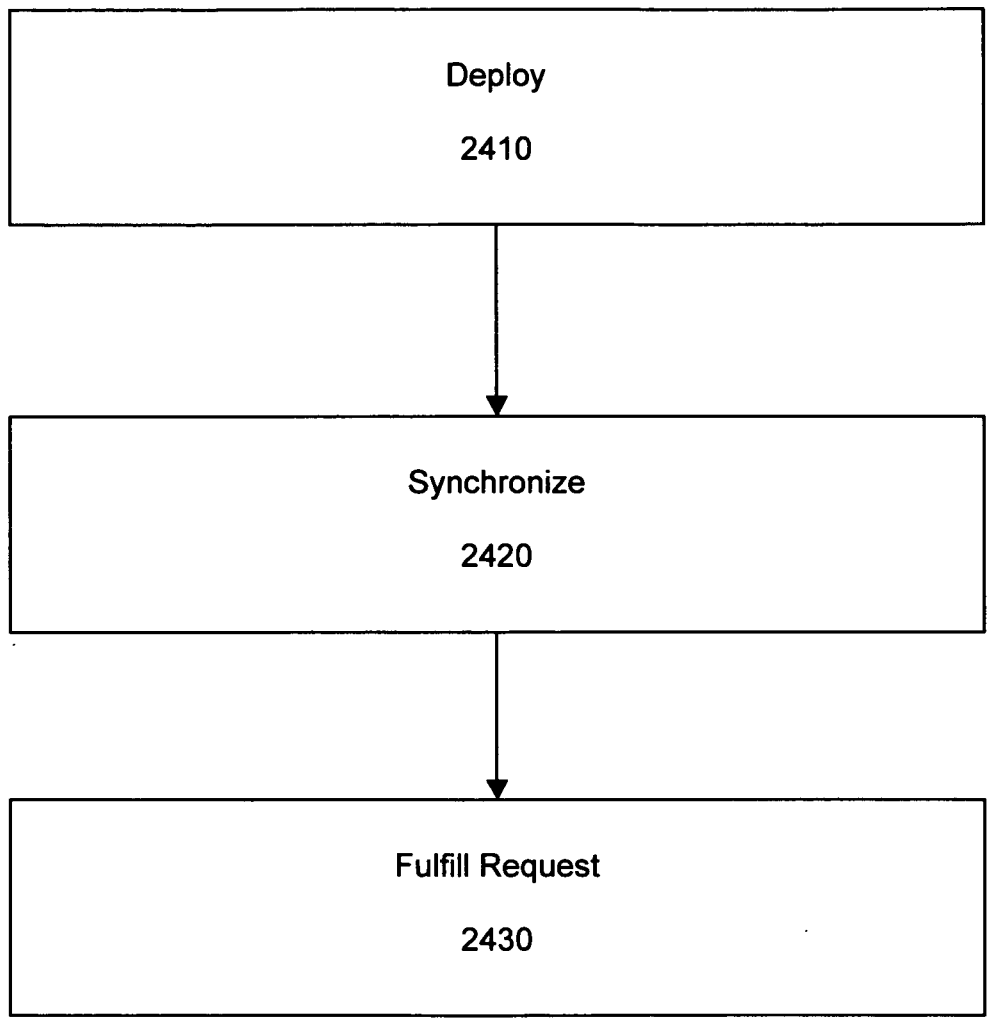
FIG. 22 is a flowchart of a computational agent method according to one embodiment of the present invention.

FIG. 22 is a flowchart of a computational agent method according to one embodiment of the present invention. The computational agent method (CA) may be responsible for providing the functionality involved with deployment of assets into a computational environment, and generating synchronization assets for other environments.

Additionally, the CA enables the installation of the base environment 250 as described in FIG. 24 below.

The computational agent 2400 also may be responsible for providing the computational environment for assets. The stewardship of the environment involves providing the services that the assets need, either directly or by proxy. In the case that a service is needed but not available, the CA initiates the distribution of the asset 240 with the appropriate extended environment 220 that is needed.

In step 2410, the CA 2400, typically in the target environment, may be requested to deploy 1700 an asset 240 or set of assets. The CA directs the request to the deployment asset adapter 1700, which performs the actual processing.

In step 2420, the CA 2400 in the source environment may be optionally requested to synchronize 2000 an asset that the subscription agent 2300 forwards from the target environment. The CA selects the proper synchronization asset adapter 2000 to complete the synchronization. Typical this sychronization is done in a way specific to each asset type.

In step 2430, the CA 2400 in either the source environment or distribution tier either fulfills or forwards a request for execution. If the CA has the asset 240 that can fulfill the request, the CA runs the request against the asset, returning the result to the caller, which may be the target environment or a subscription agent 2300 that is forwarding a request. If the CA does not have an asset to fulfill the request, it calls the subscription agent, typically on the same node, in order to forward the request to another CA. In the case that requests reach the CA in the source environment, the requests are made directly against the resources in that environment.

Note that the CA can be considered as a package 1100 of assets 240 distributable, and with a life cycle 240L, of its own. By distributing the CA package of assets to any given source, CDS/ADS and/or general server will be enabled to process, deploy, synchronize, and cache assets, as required.

Figure 23:
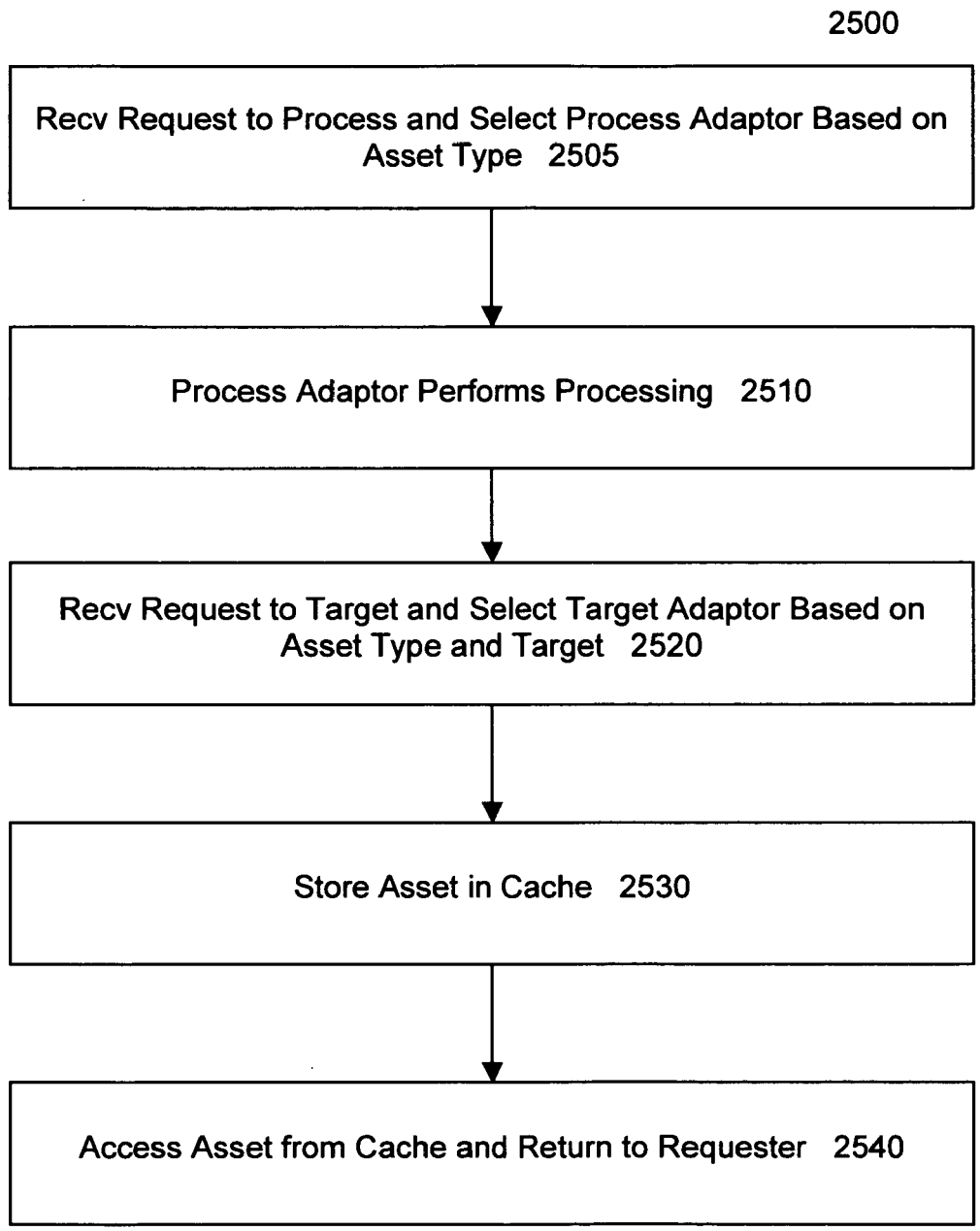
FIG. 23 is a flowchart of a caching agent method according to one embodiment of the present invention.

FIG. 23 is a flowchart of a caching agent method according to one embodiment of the present invention. The caching agent method CAM) 2500 is responsible for the processing and targeted processing of assets. These functions allow the cached assets to be processed for distribution.

The processing functionality is a general transformation that would be performed on an asset, possibly for normalization. Normalization would allow the asset to be stored in a neutral format, being of some advantage to the distribution process. Neutral formats typical involve changes to the extended environment 220 to make the extended environment 220 less specific than the source environment and enabling the extended environment to execute more easily with a variety of base environments 250 in the target environments. An example or a Session Bean (SB) or entity bean (EB) where the source format could be a first application server and the target format could be a second application server, a neutral format would be one specified by, e.g., strictly adhering to, the J2EE specification.

The targeted processing function recognizes the need to transform the asset for the specific target environment for which it is targeted. This recognition may be a result of the package specification 1100 indicating that a give asset should be targeted at a specific target. This information may be given in the other field 1179A in the respective asset definition data structure 1170. The information need for each of the specific target is given in a specification (node specification). In a preferred embodiment, this is a list of name/value pairs with a token label accompanied by a substitution value for each pair.

The CAM also can be responsible for creating and maintaining an asset cache.

In step 2505, the CAM may be requested to perform targeted processing (the processing need for the asset to execute on a specific target) an asset or set of assets. The CAM directs the request to the processing asset adapter 1800, which performs the actual targeted processing. In a preferred embodiment, this targeted processing occurs after the asset is cashed to reduce overhead of storing a targeted asset for each different type of target. However, targeted processing could be performed before caching.

In step 2510, the CAM may be requested to perform processing 1800 on one or more assets. The CAM forwards the request to the processing asset adapter 1800, which performs the processing.

In step 2520, the CAM may be requested to perform targeted processing on one or more assets. The CAM forwards the request to the targeted processing asset adapter 1900, (in a preferred embodiment residing on the distribution server), which performs the targeted processing specific for the respective target.

In step 2530, the CAM may be requested to store an asset in the asset cache. In a preferred embodiment, the CAM performs the functionality that is required to store the asset, and manage the cache, including: deleting old assets, updating database tables, and notifying the proper subsystems that a change has occurred in the asset cache.

In step 2540, the CAM may be requested, via a manifest, to read assets from the asset cache and return those assets to the caller.

Figure 24:
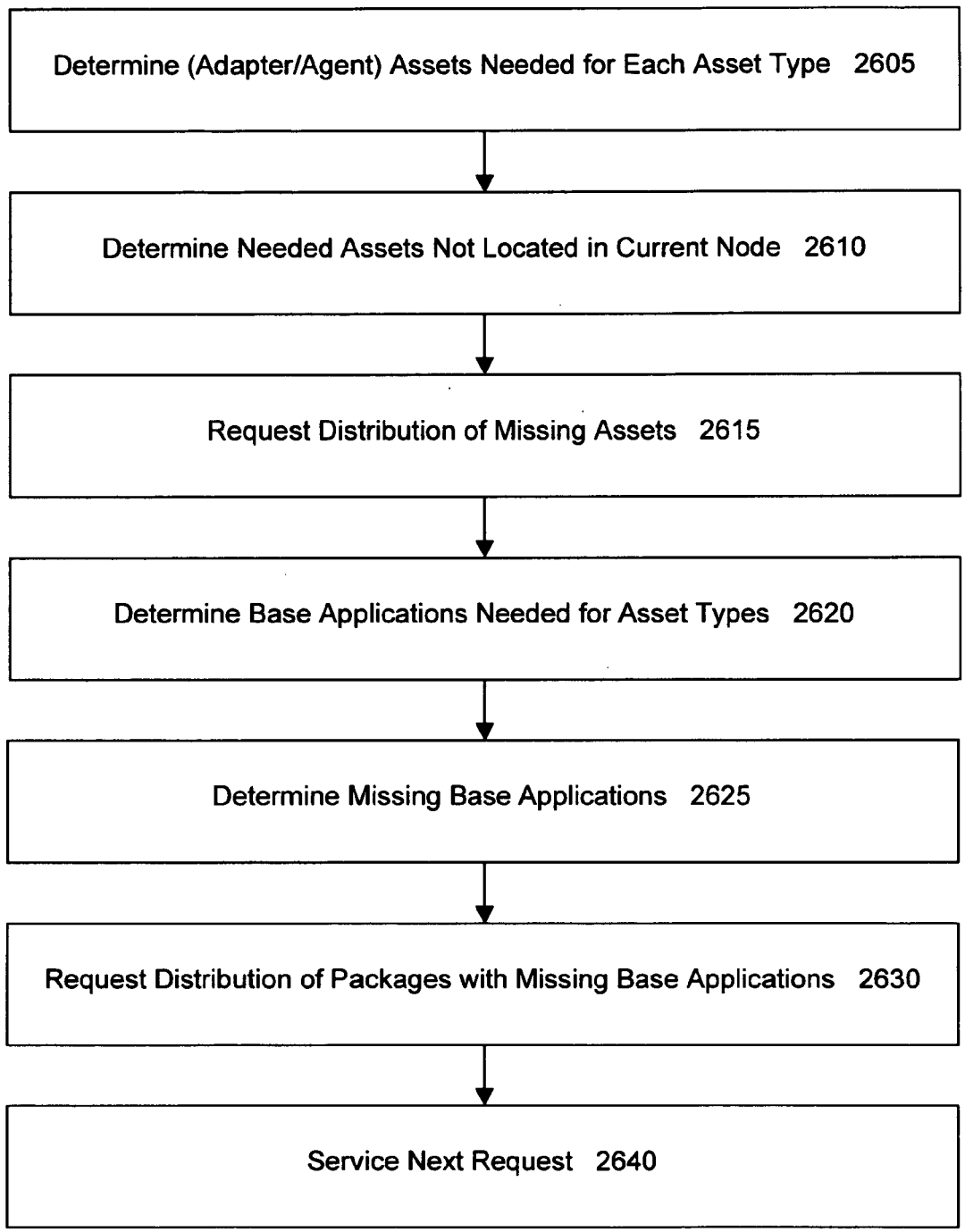
FIG. 24 is a flowchart of an asset distribution process according to one embodiment of the present invention.

FIG. 24 is a flowchart of an asset distribution process according to one embodiment of the present invention. In a preferred embodiment, the CDS/ADS stores assets corresponding to the following asset classes: applications, asset adapters and agents (see below) and base environment. While these three classes of assets enable different functionality, they are each seen by the CDS/ADS as being assets 240 (or packages 1100 of assets 240) as described in this document. The difference between these asset classes centers around the context each of these classes is intended to support.

The assets associated with the application comprise the actual application elements or assets 240 that are distributed by the CDS/ADS. The application assets are "first class" assets in the entire system. Typically, these assets (assets used in applications and/or sub applications) are the major workload for the distribution server, CDS/ADS, and agents, e.g. EDA and CDA.

In addition, the asset adapters and agents (e.g. asset packaging 1300, client deployment process 1400, node registration 1500, versioning 1660, export 1600, client deployment 1700, process 1800, target 1900, synchronize 2000, discover 2100, adjustment 2100, publishing 2200, subscriber 2300, computational 2400, caching 2500, system asset distribution 2600, streaming 2700, bridging 2800, QoS 2900, and any other process that distributes and/or changes assets) can be themselves assets 240, and can be distributed and processed to provide the necessary asset lifecycle functionality in the source tier, distribution tier, and target tier. In a preferred embodiment, the EDA, CDS/ADS, and CDA are intelligent enough to determine the type of asset for each step in the asset lifecycle, but they defer the actual asset operations to the individual asset adapter. The actual asset adapters are themselves applications, therefore, in some preferred embodiments, they have package 1100 and asset specifications 1175 defined that allow them to be distributed. In these cases, the asset adapters can be loaded on demand, as the EDA, CDS/ADS, and CDA need to process each individual asset.

The base environment represents those assets that are needed and are within which the other assets 240 run—for example: a Web server for static content assets (SC), a servlet engine for JSPs (JSP), a Java™ Runtime Environment for Java™ class assets (JB), an application server for the EJB assets (SB and EB), and a DBMS for the data assets (RD, ED, and EB). Each of the servers that make up the base environment themselves can be applications, preferably Java™ applications, allowing them to be defined in package 1100 and asset specifications 1175 for distribution. The Java™ runtime environment is a native application that is dependent on the operating system in the target environment, and is distributed using standard installation programs, which are widely available. The CDA is distributed by the boot-strap process described below.

There are dependencies between these different asset classes. There exists an implicit relationship between the asset types and the corresponding asset adapters, as described above. If an asset of a certain type is going to be distributed, the asset adapter for that asset type needs to be distributed before the dependent asset to the particular location (e.g. tier) of the network. An example would be a static content asset type would need a static content asset adapter in order to perform any of the distribution functionality on the asset, for example at the CDS/ADS.

There exists an implicit relationship between the asset types and the base environment 250. If an asset type is going to be deployed, it requires a certain runtime environment. The base environment assets are distributed in order to provide this environment. For example, a JSP asset would require the assets that comprise the Web server and servlet engine to be installed in the target computational environment before the asset could be expected to run the asset in that environment. In some embodiments, these base environments 250 are pre-installed. In other embodiments, the base environments 250 are distributed as one or more base environment 250 assets 240 prior to their being used. The base environment 250 assets 250 could also be distributed to required locations on the network by alternate, well-known network distribution techniques.

In some embodiments, one or more asset adapters and/or agents are considered part of the base environment 250. For example, in the CDS/ADS system process adapters, target adapters, and/or subscriber agents can be part of the base environment 250 and could be distributed or pre-installed at the CDS/ADS.

In step 2605, the distribution agent (DA), more specifically the EDA (at the source), CDS/ADS (at the distribution level), or CDA (at the target/client), determines which asset adapters are needed for the asset types that have been discovered. The asset types are specified in the asset specification 1175.

In step 2610, the DA determines if those asset adapters are in the local environment, e.g. the target/node. The local environment contains a predefined configuration data structure indicating the asset adapters that are in the local environment. In a preferred embodiment, the data structure would be a properties file. For the adapters that are not in the local environment the process proceeds to step 2615.

In step 2615, the DA requests the packages 1100 associated with the asset adapters not located in the local environment for immediate distribution to the current node. These asset adapters come from the asset adapter asset cache, or, in a preferred embodiment, the system asset cache on the CDS/ADS. Note that assets that are not in the local environment might include later versions (see versioning 1660) of the respective asset 240.

Examples of asset adapters include: SC, JB, SB, EB, RD, & ED which correspond to the respective asset types on which these asset adapter operate.

In step 2620, the DA determines which base applications are needed for the asset types associated with the assets that are defined to be used at a particular computer on the network. The asset types are specified in the asset specification 1175 located in the respective environment. For example, one or more client/nodes would subscribe to a particular service. The clients would have different operating systems/platforms. The service, along with the client platform/environment, would determine the set of assets and the set of adapters/agents required. These assets 240 would be pre-installed and/or distributed to the client from the CDS/ADS (or other proxy servers). As a further example, the CDS/ADS would need all the adapters necessary to process, target, etc. all of the combined target assets that would need to be distributed.

In step 2625, the DA determines if those base environment 250 assets in the base environment are needed in the local environment. (In embodiments where the assets required in the base environment are fixed and known, this step 2625 can be omitted.) The local environment contains a predefined configuration data structure indicating the base environment Assets that are in the local environment. In a preferred embodiment, the data structure would be a properties file. For the base applications that are not in the local environment the process proceeds to step 2630.

In step 2630, the DA requests the packages 1100 associated with the base environment not located in the local environment for immediate distribution to the current node.

These base environment assets come from the base environment asset cache (typically on the target), or, in a preferred embodiment, the system asset cache on the CDS/ADS.

Examples of base environment 250 include, but are not limited to: Web server, servlet engine, EJB container, DBMS, and CDS/ADS.

In optional step 2640, the DA would continue on to perform whatever operations were in progress before the check of the asset adapters and base environment 250was performed. In general, the DA or agents like this, e.g. the EDA (source/EIS), the CDS/ADS (at any distribution server), and the CDA (client/target), perform these functions on any network system on any tier of the network so that the systems have the required adapters to process their assets and the required local base environments to deploy their assets. As described above, these assets can be dynamically changing as the move across the network tiers during their life cycle 240L.

In a preferred embodiment, the DA would be able to bootstrap its entire environment. One notable exception would be base environment 250 that have specialized installation requirements that cannot be supported by the asset adapters. An example of a non-distributable application would be a DBMS that changes operating system registry entries.

Asset streaming reduces the transmission of duplicate data. Frames are defined as complete assets. Deltas are the difference between two versions of an asset. One can incrementally apply the deltas against a prior frame to create a complete asset for the new version associated with the delta(s) of that asset. Therefore, the complete new version of the asset does not have to be distributed, but only the deltas that exist between the older (prior) version and the new version. Potentially, asset updating/streaming reduces the bandwidth for data transmission and offers opportunities for merging synchronization assets.

In some preferred embodiments, the distribution system performs optimizations to decrease the redistribution of assets to targets or distribution servers. For example when an asset has changed, often the difference between the old asset and the new asset is only a small difference. The streaming asset provides the additional optimization of identifying the parts of an asset 240 that have changed and, therefore, the parts that only need to be sent. By decreasing the amount of information that is sent, the distribution can utilize less bandwidth and increase the amount of network throughput for other applications. Streaming assets represents a major conceptual shift in the distribution of applications and data across tiers of a network.

For Web-based applications, streaming can greatly reduce the amount of redundant data that is sent across the network. For example, an online brokerage application would want to supply up-to-date portfolio information and order status information to their customers. With existing technologies, the users would poll the server repeatedly to gain this information. The server would be overloaded at peak times when everyone would want to know his or her portfolio status. The online brokerage would need to increase the network and EIS resources to make their systems available under these circumstances, although this scenario is not representative of their normal user load. Asset based distribution would decrease the interaction with the servers at the EIS of the online brokerage. Only the changed data would be sent down to the user, the static content, dynamic content, and EJBs would be located on the user's PC, or local server. The amount of sent data is greatly reduced between the EIS and the user, and the EIS performs far less processing because it doesn't have to generate the Web page. The streaming asset goes one step further, assuring that only the data that has changed is sent to the client. If only the pricing data has changed, that is all that is transferred to the user. If a small part of a single JSP has changed, only that small change is sent to the user.

By combining streaming assets with QoS 2900 capabilities (below), the CDS/ADS is able to support streaming media such as voice and video.

Figure 25A:
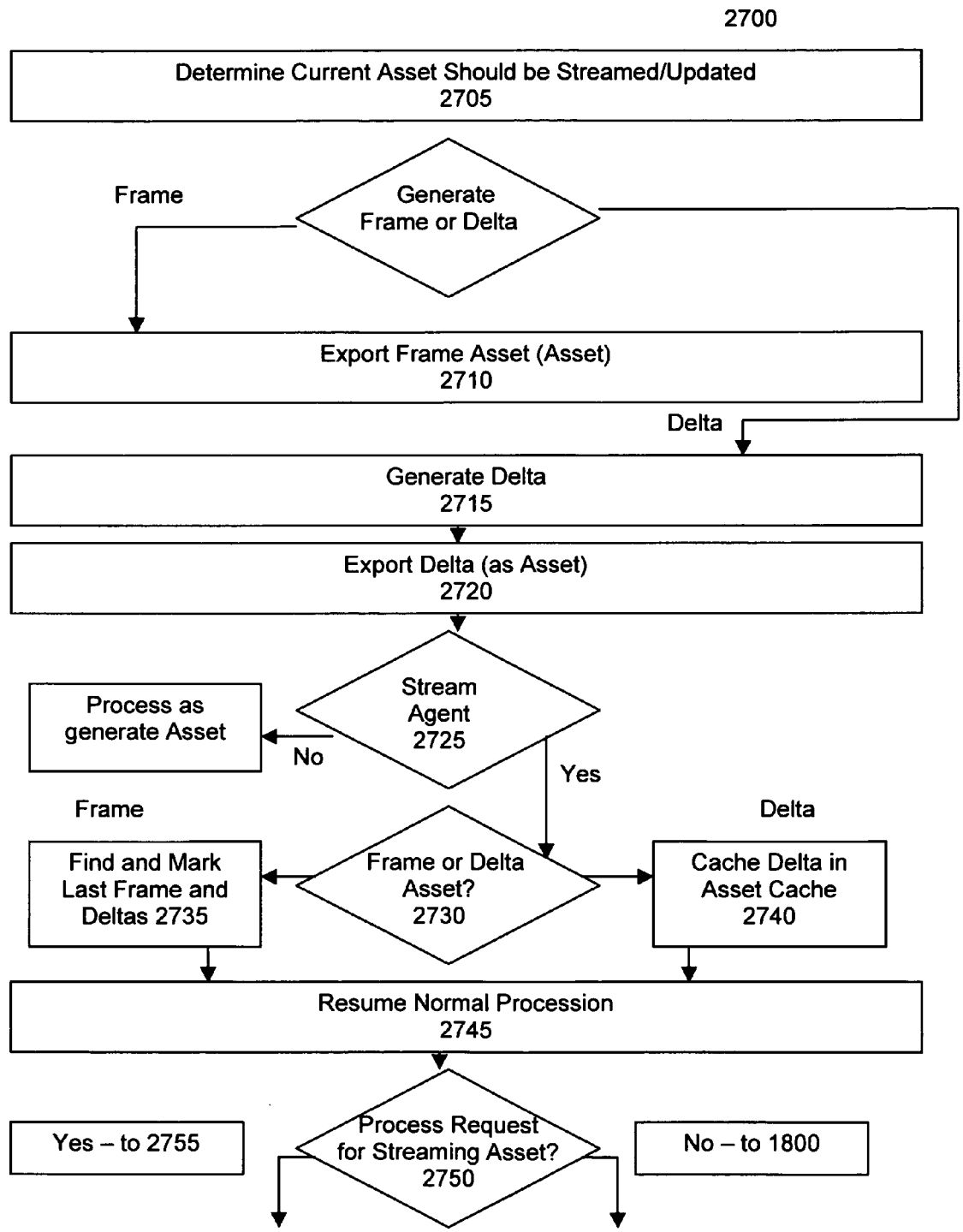
FIGS. 25A–25C are a flowchart of a streaming process according to one embodiment of the present invention.
Figure 25B:
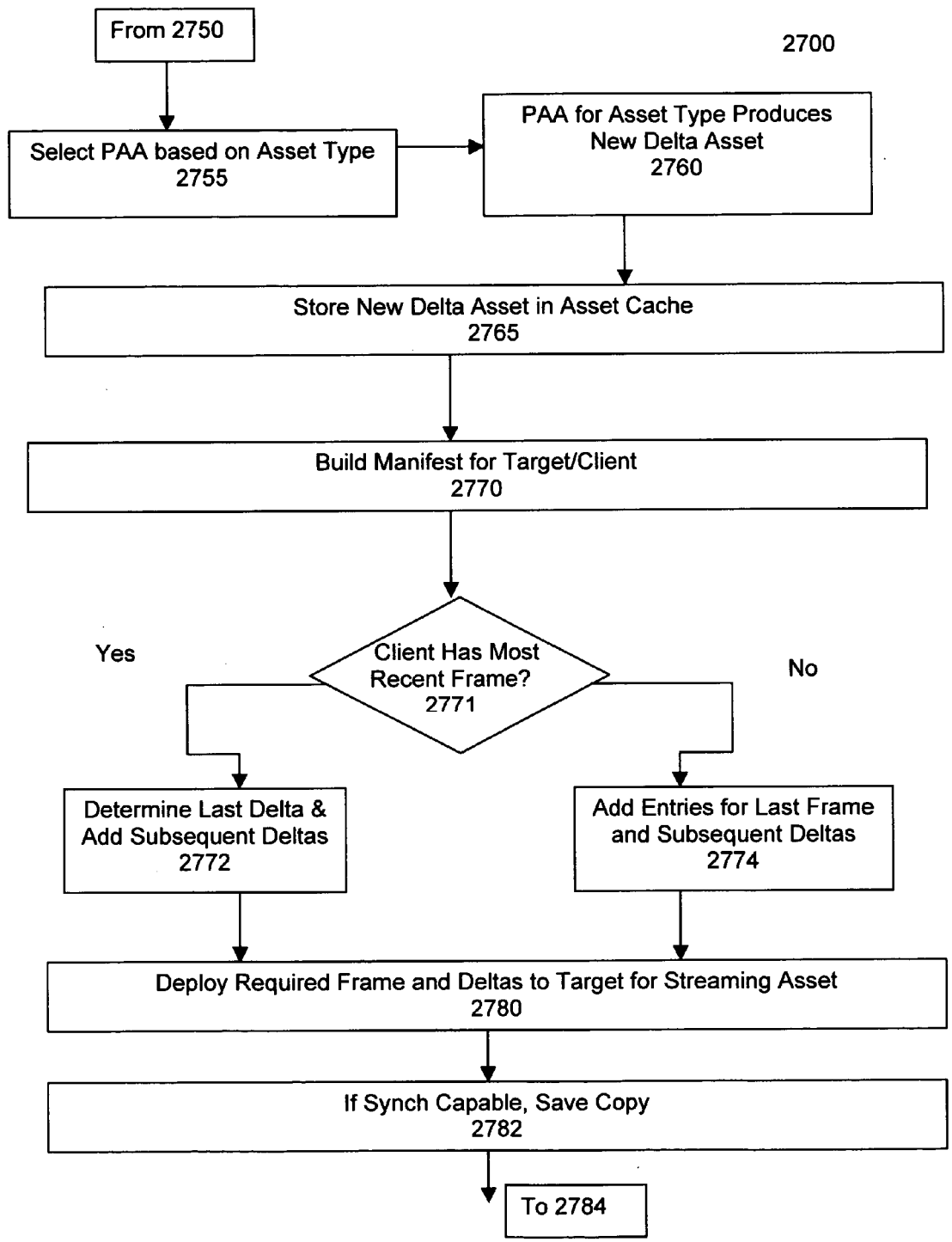
Figure 25C:
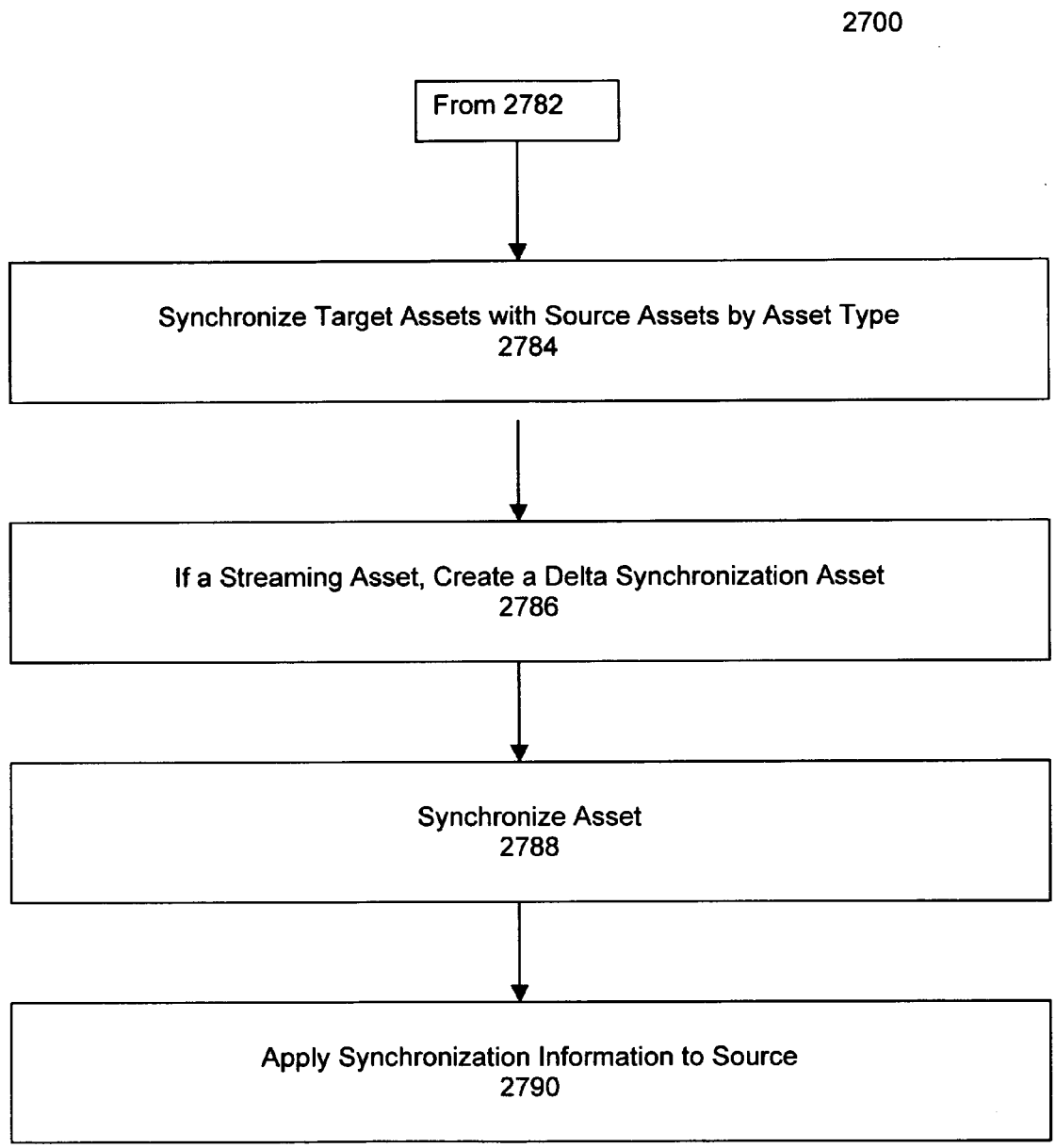

FIGS. 25A–25C are a flowchart of a streaming process according to one embodiment of the present invention. In a preferred embodiment, the steps of this process 2700 are an optimized supplement to steps and methods described elsewhere in this document.

In step 2705, the Export Asset Adapter (EAA) determines that the asset specification indicates that the current asset should be treated as a streaming asset. The EAA then performs a test 2707 based on the asset type to determine if a frame or delta needs to be generated. On an asset-by-asset basis, this is done to determine the differences between a prior asset, e.g. located on a client, and a current asset (latest version) typically located on the source/EIS. In a preferred embodiment, a copy of the prior asset is retained at the source/EIS to facilitate this test/comparison. If a frame needs to be generated, the EAA continues to step 2710. If a delta needs to be generated, the EAA continues to step 2715.

For example, if the asset type is an EB, ED or RD, the EAA would query the data and based on the amount of data that has changed, would either generate a frame or a delta.

In step 2710, the EAA continues to export the asset as it normally would in the export asset adapter method 1600. The frame asset can be considered the same as the asset described in the other methods, and treated in the same manner. The EAA indicates that the asset is a frame asset by setting a value in the asset data structure 1175 to indicate this state.

In step 2715, the EAA creates a delta for the asset. A previous copy of the asset may be compared with the current asset. The difference between these two assets is the delta that will be used to create the delta asset. The resulting delta asset represents the changes that would need to be applied in the target environment that has had all the previous deltas applied to the last frame.

For example, if the asset type is EB, ED or RD, the EAA would query the data from the source database and would either generate the delta. In one embodiment, the EAA would generate a version of the last asset by applying the deltas against the last frame. The EAA would then perform a row-wise (record—wise) differentiation between the last asset and the current data. Then a (table) column-wise differentiation would be applied. (Difference or comparisons functions are well-known.)

In step 2720, the EAA continues to export the asset as it normally would in the export asset adapter method 1600. The delta asset may be treated the same as the asset described in the other methods, and treated in the same manner (e.g. sent to the CDS/ADS). The EAA indicates that the asset is a delta asset by setting a value in the asset data structure 1175 to indicate this state.

In step 2725, the CDS/ADS receives an asset and determines whether it is a streaming asset or a normal asset. If it is normal, the CDS/ADS continues with normal operations, i.e., process 2700 terminates. If the asset is a streaming asset, the CDS/ADS continues to step 2730.

In step 2730, the CDS/ADS determines whether the asset is a frame or delta. If the asset is a frame, the CDS/ADS goes to step 2735. If the asset is a delta, the CDS/ADS proceeds to step 2740.

In step 2735, the CDS/ADS finds deltas and last frame for the asset in the asset cache and marks them for removal. The CDS/ADS then caches the current frame asset and proceeds to step 2745.

In step 2740, the CDS/ADS caches the delta asset in the asset cache and proceeds to step 2745.

In step 2745, the CDS/ADS resumes normal operations as if the asset was not a streaming asset.

In step 2750, the CDS/ADS receives a request to process an asset. If the asset is a streaming asset, the CDS/ADS proceeds to step 2755. Otherwise the CDS/ADS proceeds to process the asset as described in the process asset method 1800.

In step 2755, the CDS/ADS selects the Processing Asset Adapter (PAA) based on asset type. The CDS/ADS requests that the PAA create the complete asset by applying the deltas to the frame asset in order of creation then proceeds to step 2760.

In step 2760, the PAA applies the differential algorithm for that asset type against the processed asset to produce a new delta. In a preferred embodiment, the PAA would create a frame asset if the combination of the new delta and the existing deltas for the asset are larger than the frame.

In step 2765, the CDS/ADS stores the new delta asset in the asset cache.

In step 2770, the CDS/ADS builds a manifest for a target/client that includes a streaming asset. If 2771 the client has the most recent frame asset, the method continues onto step 2772, otherwise the method goes to step 2774.

In step 2772, the CDS/ADS determines the last delta that the client has received, and adds the subsequent deltas for that asset to the manifest. The method continues to step 2780.

In step 2774, the CDS/ADS adds entries for the last frame and subsequent deltas for the specified asset.

In step 2780, if the EAA is deploying a streaming asset, it deploys the frame and/or deltas into the target environment. For different asset types, the application of the delta file has different meanings. Overall, the application of the delta is similar to replacing the existing asset.

In step 2782, if the asset is registered with synchronization capabilities, the EAA saves a copy of the asset for later comparison.

In step 2784, the CDA is requested to synchronize target assets with source assets. The CDA selects the appropriate Synchronization Asset Adapter (SAA) for the specific asset type. If the asset is classified as a streaming asset, the method proceeds to step 2786

In step 2786, the SAA creates a delta for the asset. A previous copy of the asset, created in step 2782, is compared with the current asset. The difference between these two assets is the delta that will be used to create the delta synchronization asset. The resulting delta synchronization asset represents the changes that would need to be applied in the source environment that has had all the previous deltas applied to the last frame that was sent.

In step 2788, the SAA continues to synchronize the asset as it normally would in the synchronize asset adapter method 2000. The delta asset is treated the same as the asset described in the other methods, and treated in the same manner (e.g. sent to the CDS/ADS). The SAA indicates that the asset is a delta asset by setting a value in the asset data structure 1175 to indicate this state.

In a preferred embodiment, the CDS/ADS might coalesce deltas from multiple targets before sending those deltas onto the source. This would reduce the processing in the source environment and also reduce network traffic.

In step 2790, the SAA applies the synchronization information (e.g. LD 210 and/or EE 220) in the synchronization asset 240 of the source environment. If the asset is a streaming asset, the frames and deltas are applied to the source environment.

Figure 26:
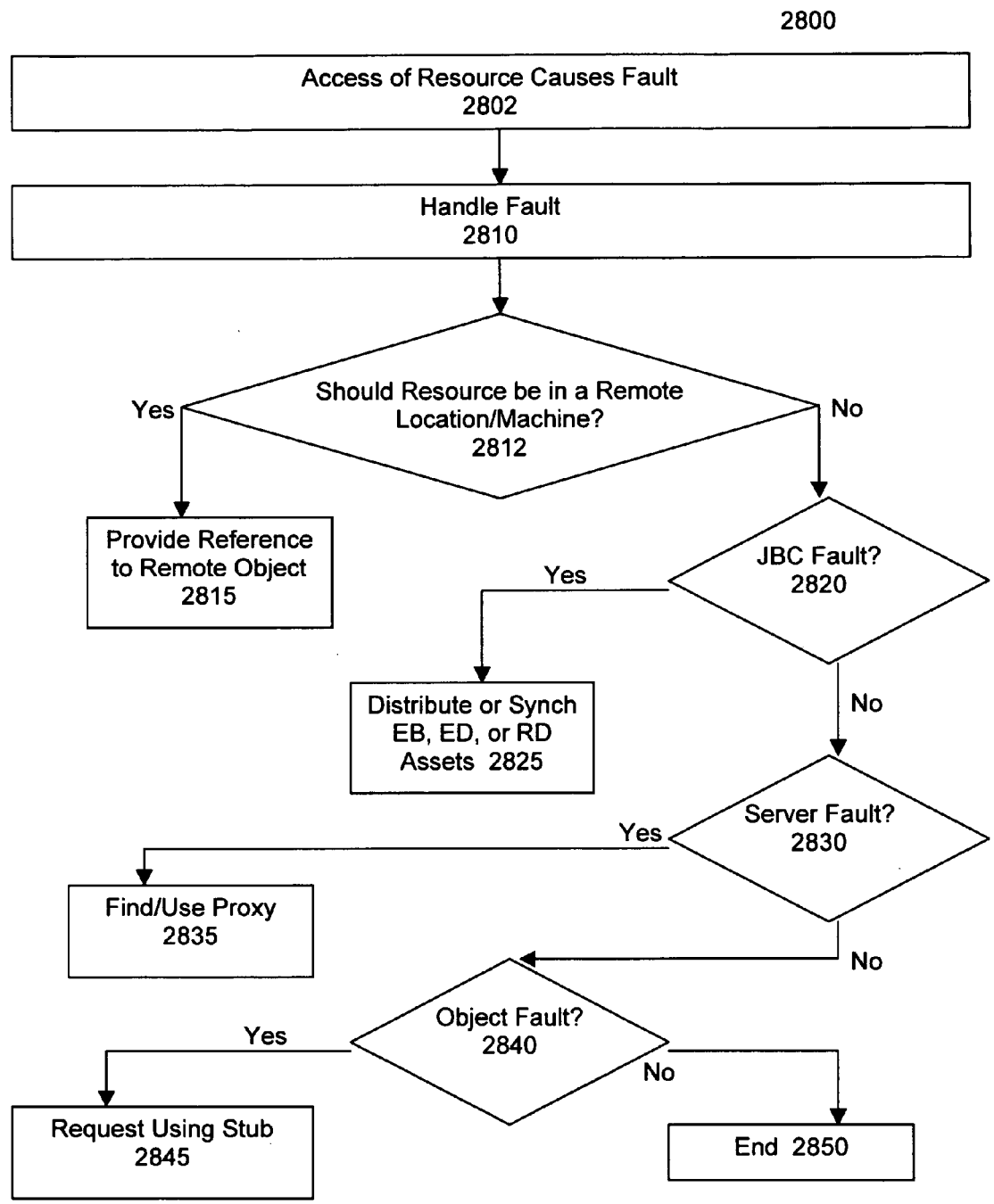
FIG. 26 presents the Bridged Computational Environment (BCE) capability of the DIS technology according to one embodiment of the present invention.

FIG. 26 presents the Bridged Computational Environment (BCE) capability of the DIS technology according to one embodiment of the present invention. BCE provides the runtime capability to maintain communication between runnable application parts. The communication can be maintained through a variety of mechanisms, including but not limited to: redirection, server proxy, object proxy, and API proxy. The BCE maintains efficient communication between runnable application parts s that have been distributed in was beyond the intention of their design.

In step 2805, a method within a deployed asset attempts to access a resource that will cause a fault. If the resource is in the J2EE API, the method proceeds to step 2810.

In step 2810, the J2EE API fault is handled. If 2812 the fault is in a resource that has been defined in the JDNI that should be accessed on a remote machine, the method proceeds to step 2815. Otherwise, the method proceeds to step 2820.

In step 2815, the JNDI implementation in the target environment has determined that the entry that is being looked up exists on a remote source or intermediate target other that the current computational environment. The reference to the remote object is provided to the requester.

For example, it would be beneficial to have a lookup for an object in the target environment, maintain the semblance of the target environment from which it came. An EJB on the target could use lookup mechanisms that are appropriate for the source environment, but not for the target environment. The BCE would provide the bridging back to the source environment or intermediate target environment, giving the local object the impression that it is running in the source environment.

In one embodiment, the lookup could be into a flat file that is edited when an asset is deployed to the local environment, and that asset needs to have a reference to a remote object. In a preferred embodiment, the lookup information would be persistent in a database table in the target environment.

In step 2820, the method determines if a JDBC fault has occurred. If a JDBC fault has occurred, the method continues to step 2825. Otherwise, the method continues to step 2830.

In step 2825, the method triggers the immediate distribution or synchronization of EB, ED, or RD assets.

For example, when an application program attempts to perform a database operation on a particular table, the actual changes to the table would be routed to the source or intermediate target environment.

In step 2830, the method determines if a server fault has occurred. A server fault occurs when a reference to an object on a server is attempted, and the server is registered as needing to have a proxy connection made to it. If so, the method proceeds to step 2835. Otherwise the method proceeds to step 2840.

In step 2835, the method looks up which CDS/ADS can proxy the request for the server being requested. The method then proceeds to utilize the CDS/ADS to proxy the communication to the server.

In one embodiment, the server would either be on the CDS/ADS or in the source environment.

For example, a CDS/ADS would have the capability to proxy IIOP requests to a server in the source environment behind a firewall. The proxy server on the CDS/ADS would handle the HTTP tunneling of the IIOP traffic to conform to the firewall specification for allowable traffic.

In step 2840, the method determines if an object fault has occurred. An object fault occurs when a request is made on an object that is a stub of the actual object. The stub acts as a proxy for the object, sending the request to the actual object. The actual object would typically reside in either a source environment or on an intermediate target. If an object fault has occurred, the method continues to step 2845. Otherwise the method continues to step 2850 where process 2800 ends.

In step 2845, the method executes the request using the stub object. The stub object, in turn, calls either into the source environment or to an intermediate target. In either of these environments exists the actual object that can fulfill the request. The actual object fulfills the request and the stub returns any result to the caller object.

Please note that the fulfillment of requests using a proxy object is well-known in the prior art, especially middleware systems. The mechanism of a stub object fulfilling requests differs here in that the middleware environment did not intend to have these specific object interactions happening on the client or even an intermediate target. The capability to perform this request proxy behavior in a distributed fashion is only partially handled, if at all, by exiting middleware technology.

In an alternate embodiment, a check is made to determine if an asset adapter will handle this fault and a proxy request or redirection is performed to access the source asset. A proxy object accepts the request, calls the CDS/ADS, which in turn calls the EDA on the source, which performs the call within the source environment, and returns the result to the CDS/ADS, which returns the result to the CDA, and the CDA returns the result to the proxy object, the proxy object returns the results to the caller.

In a preferred embodiment, the package specification for different asset types also includes the capability to translate the directory entries for those asset types. In some cases, the directory entry would be a pointer to a reference to a resource in the EIS. The reference would need to be translated into a reference to a resource local to the target environment or to some intermediate target environment. A third possibility is that the reference would need to be translated to a server on the EIS, the resource may be accessed in a different way when outside the EIS (i.e. firewall traversal).

Note, the package can be incomplete, not defining all the assets that make up the call graph. In this case, the base environment on the target environment bridges the calls that attempt to access resources and code in the source environment.

Additional note, the package can be split into two or more packages. These packages can be deployed in different target environments. The base environment bridges the calls that attempt to access resources and code outside its node.

Figure 27:
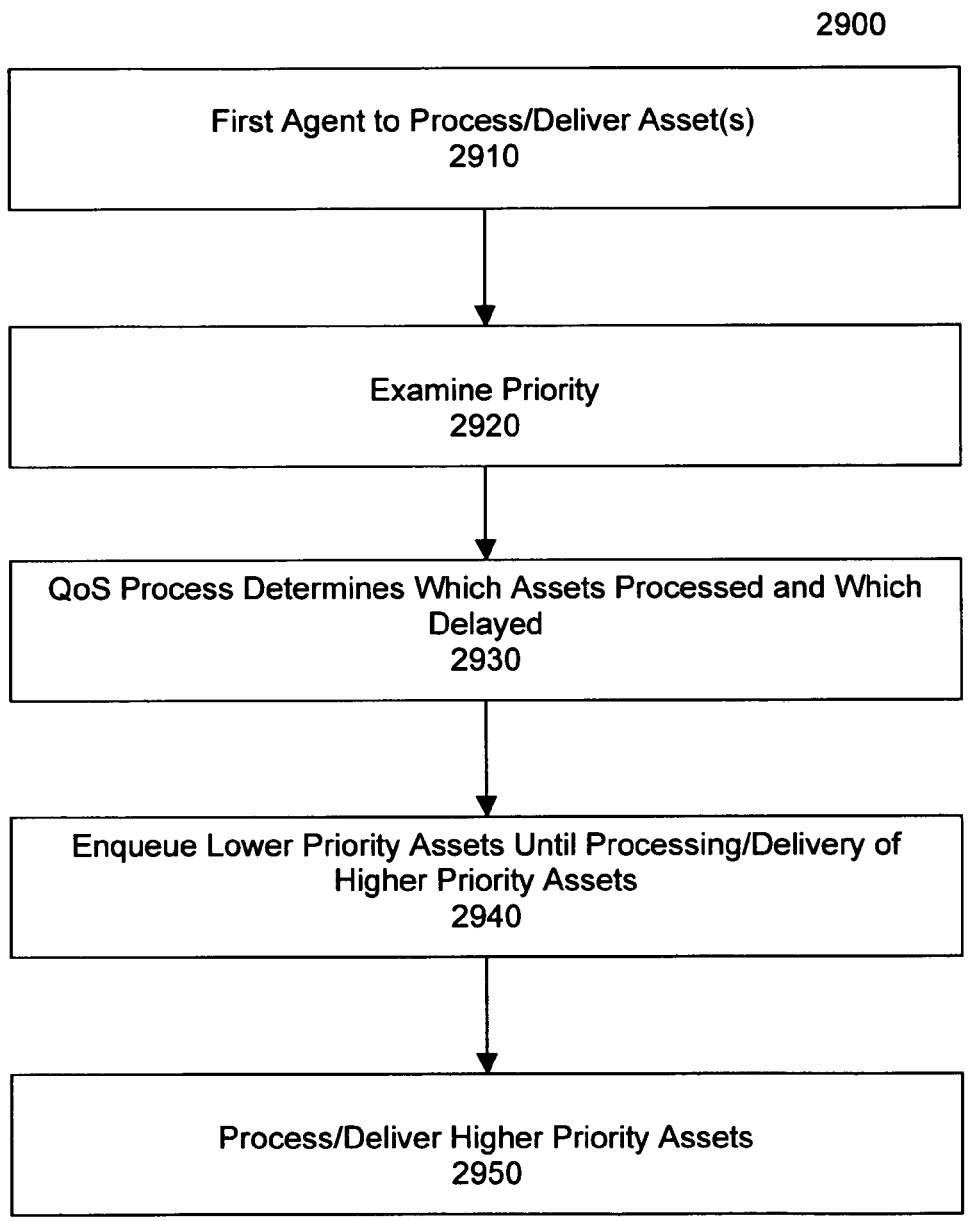
FIG. 27 describes the capability of the DIS to assign, measure, enforce, and report Quality of Service (QoS) functionality throughout the DIS system according to one embodiment of the present invention.
Figure 28A:
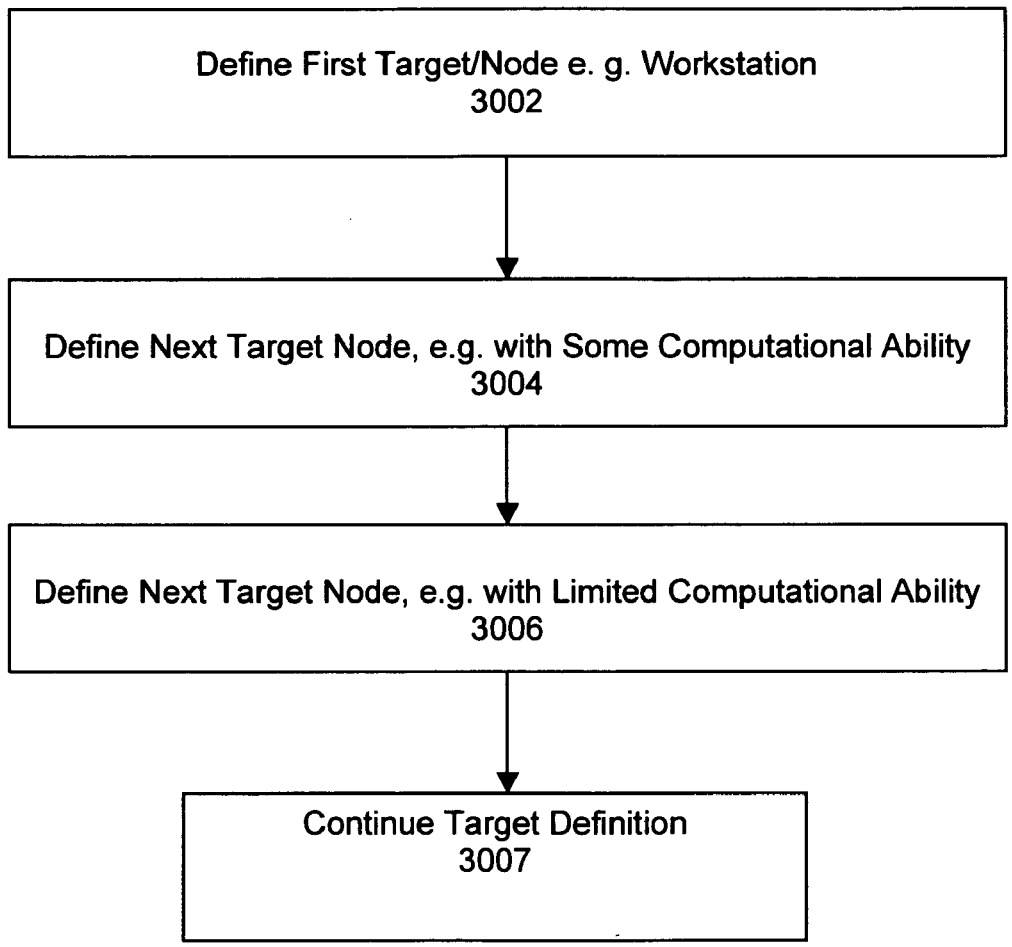
FIG. 28A is a flow chart of some example steps used by target/client nodes in the present asset distribution architecture.
Figure 28B:
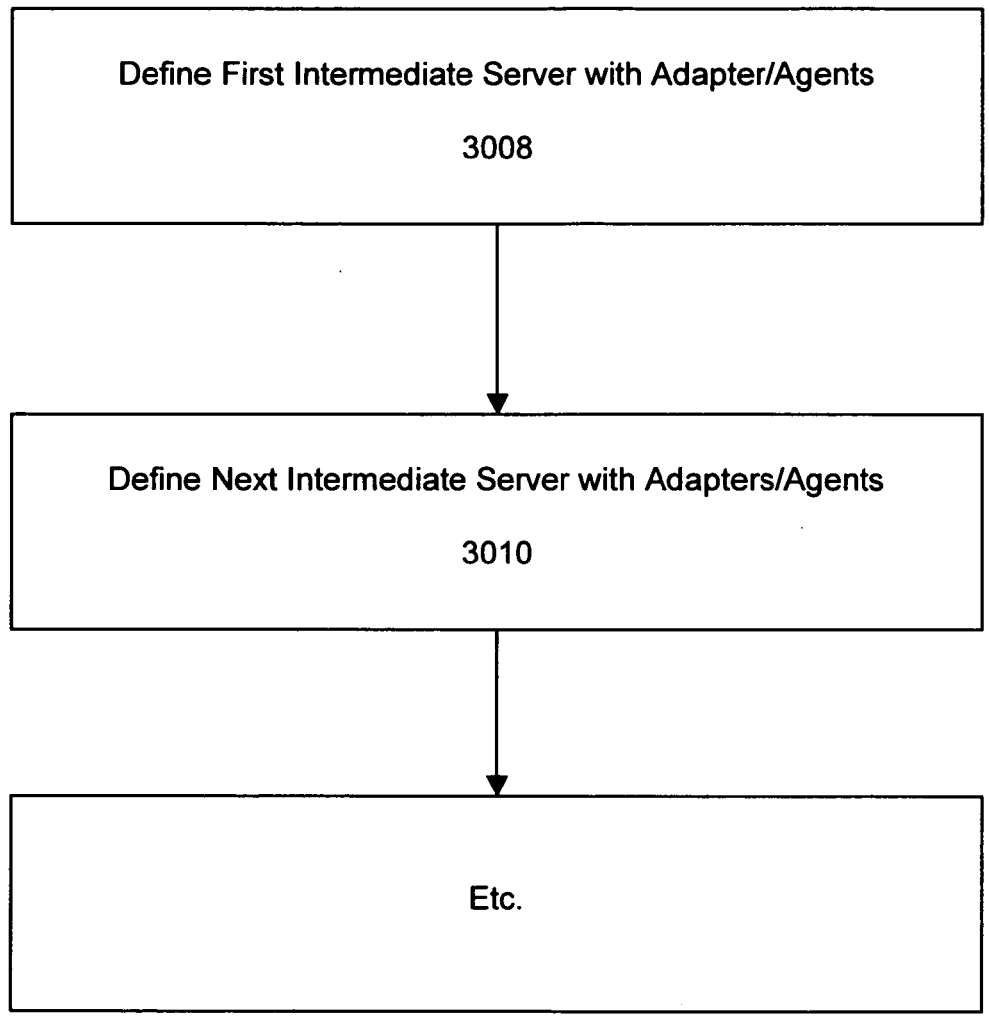
FIG. 28B is a flow chart of some preferred example steps performed by a server in the present asset distribution architecture.
Figure 28C:
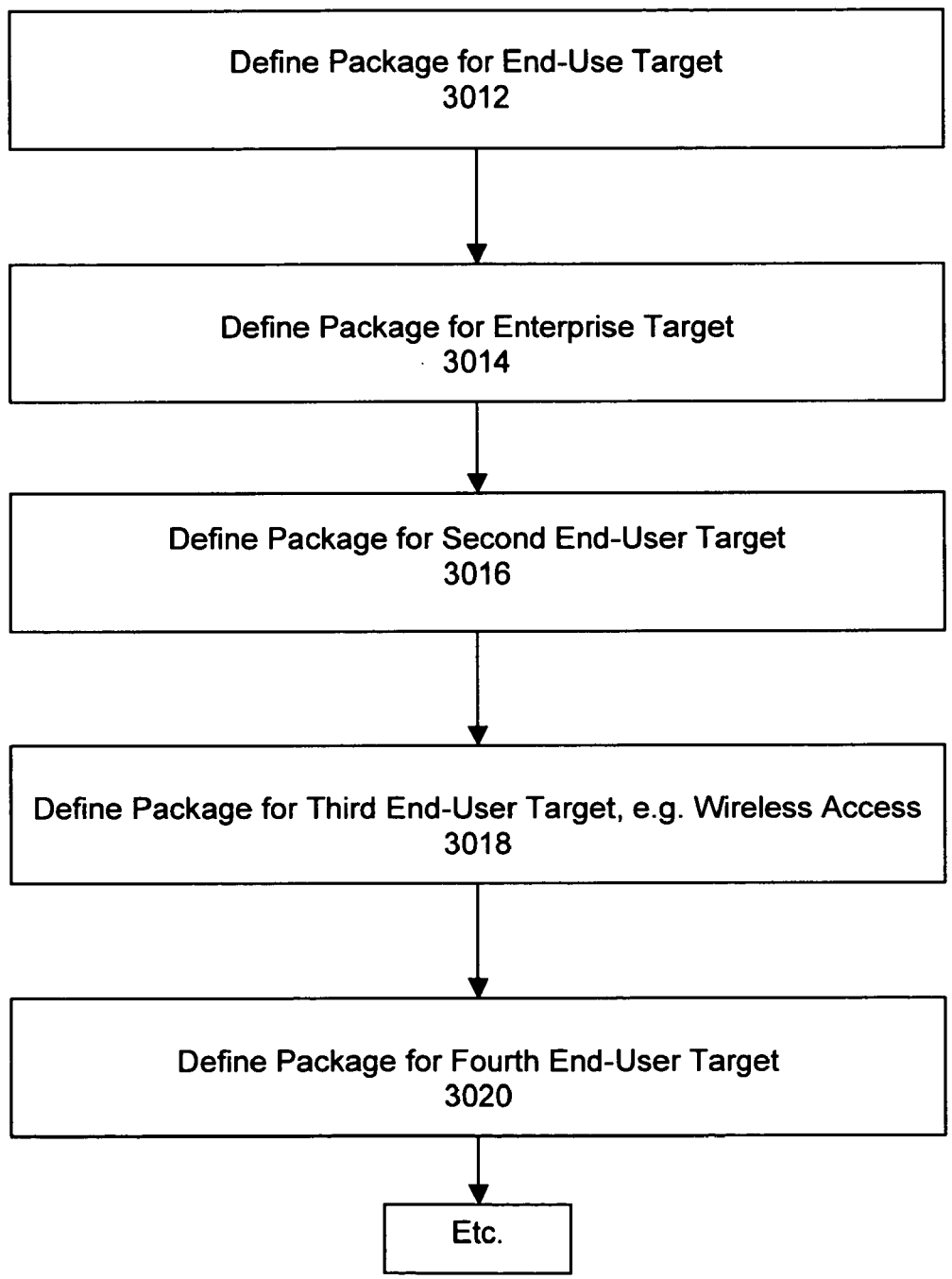
FIG. 28C is a flow chart of some preferred example steps used in package/application definition and distribution.
Figure 28D:
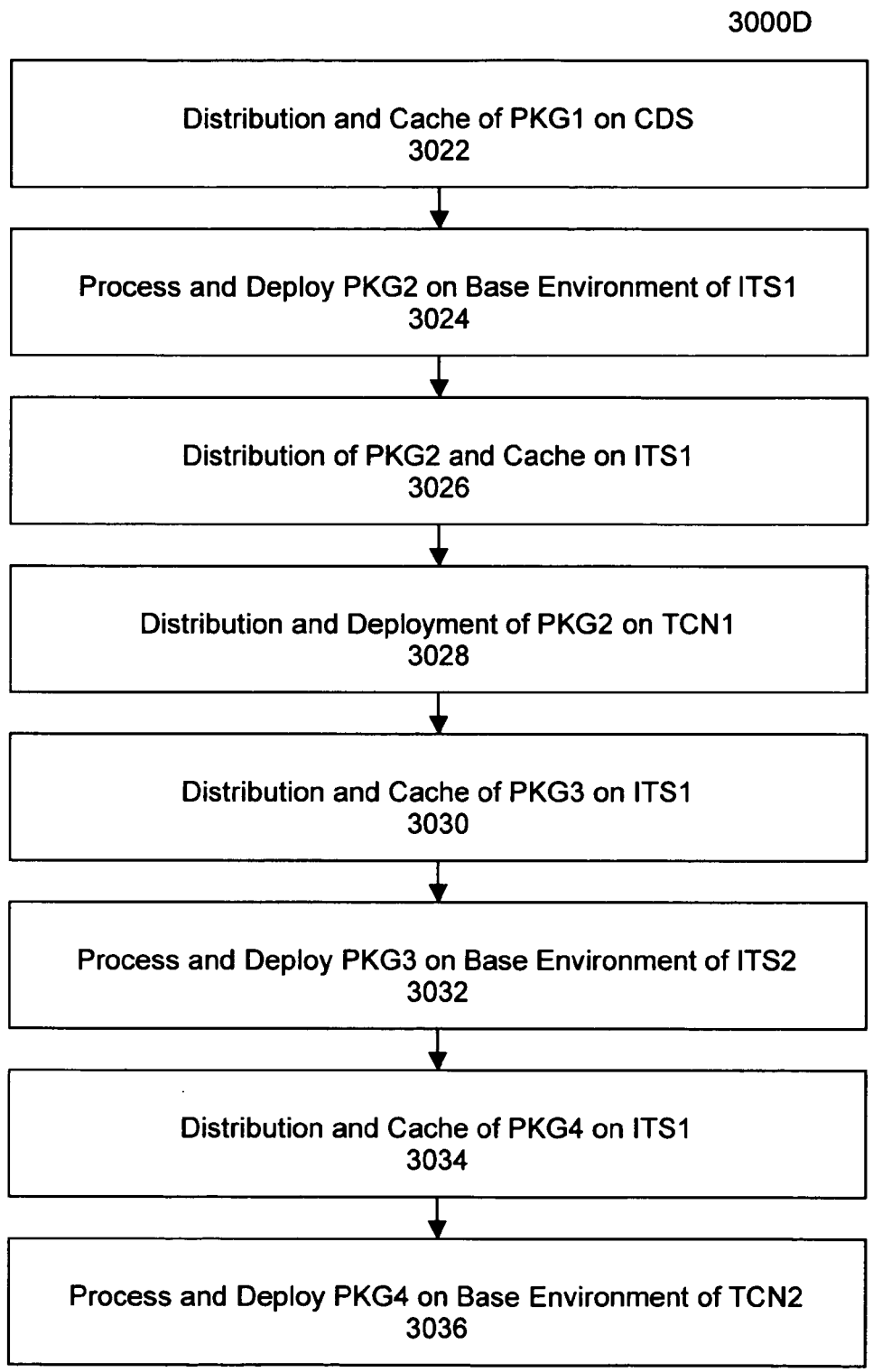
FIG. 28D is a flow chart of some preferred example steps in asset distribution to computational environments and caches.
Figure 28E:
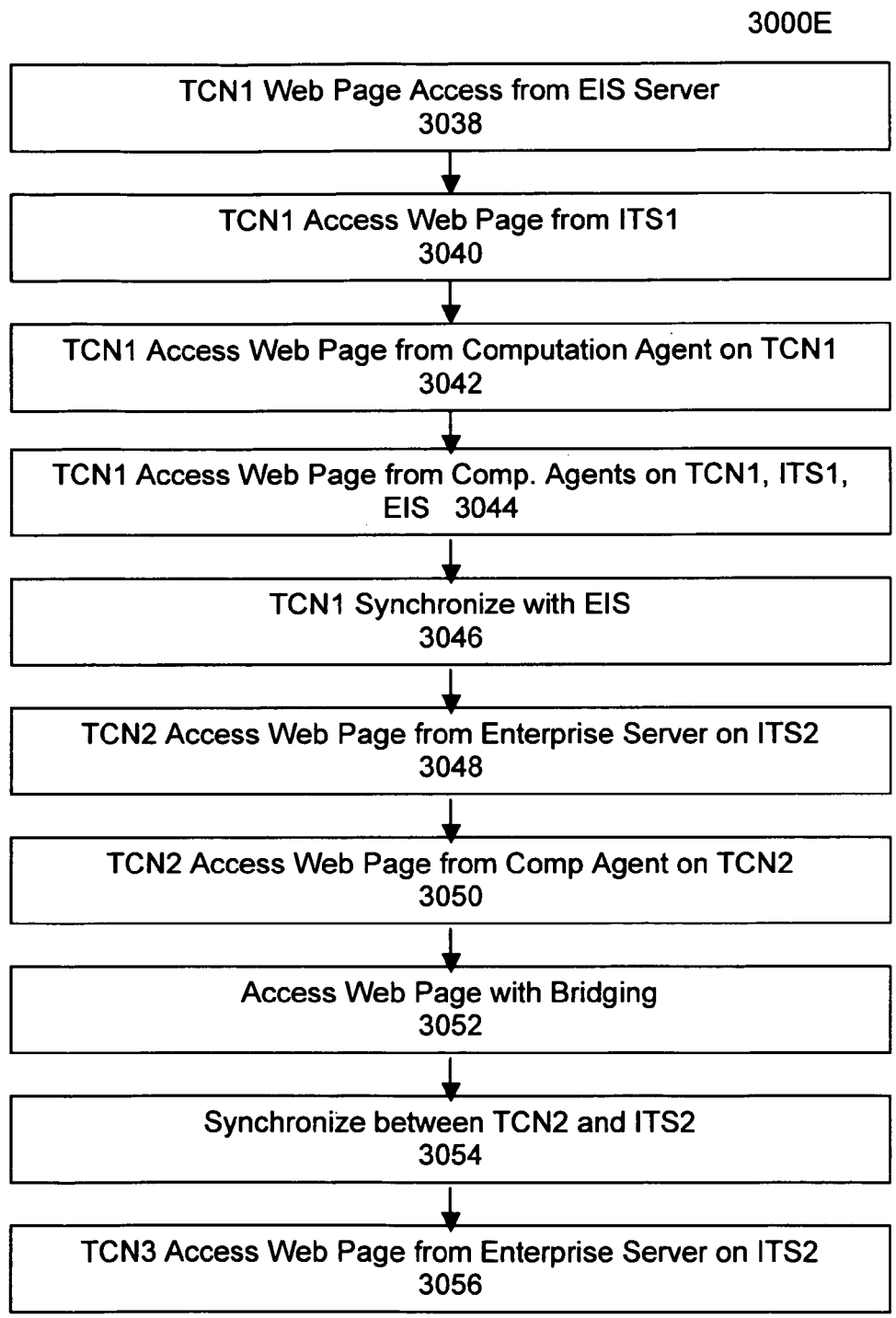
FIG. 28E is a flow chart of some preferred example steps showing asset execution in a distributed manner across network tiers.
Figure 28F:
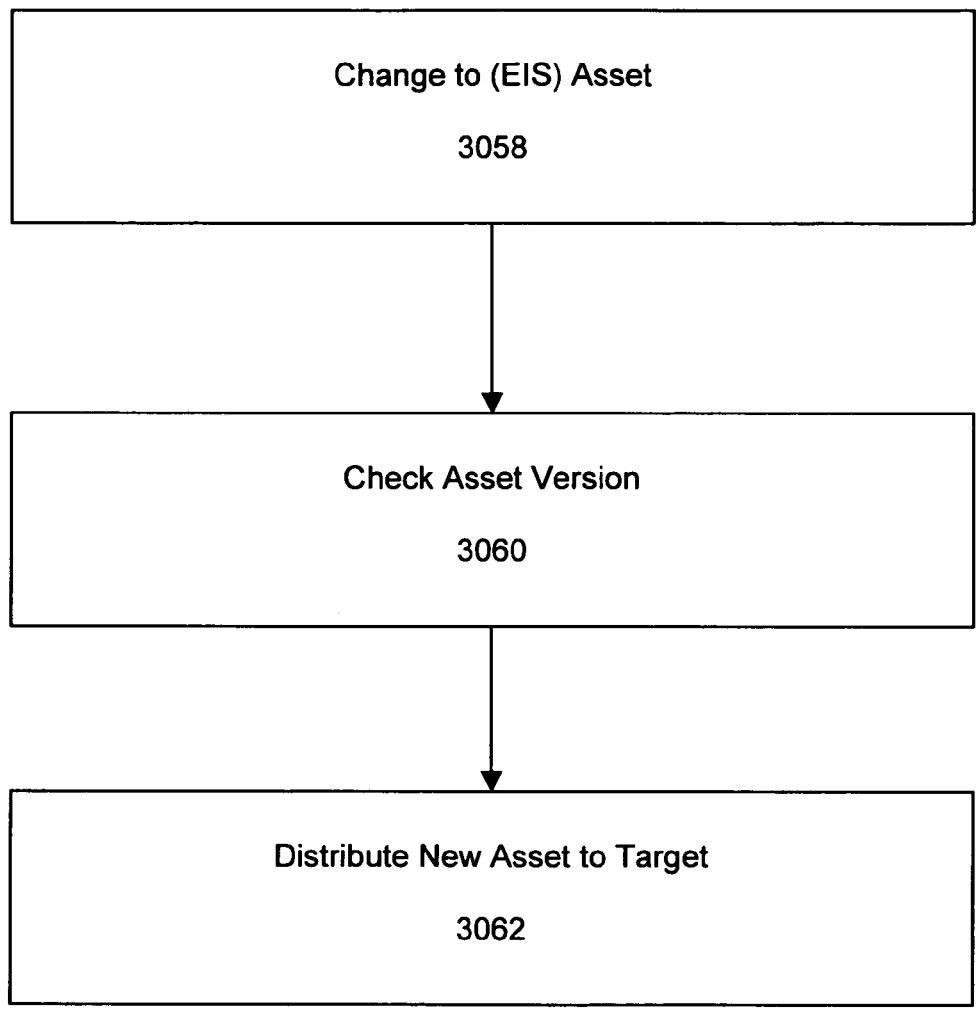
FIG. 28F is a flow chart of some preferred example steps showing distribution of current assets.

Quality of Service (QoS) in the system of FIG. 27 (Distributed Internet Services—DIS) refers to the capacity to route the distribution of assets in a variable manner throughout the network. Certain assets are deemed higher priority or more secure than other assets. Those privileged assets are routed differently than other assets.

In the case of priority, the privileged asset would preempt the processing of normal assets, be routed ahead of lower priority assets, and/or execute with a higher priority in computational environments.

In the case of security, the privileged asset would be sent over a more secure channel, encrypted in the cache, and/or stored in the computational environment in a secured manner.

For example, two users are competing for the same Internet resources, yet there is no differentiation between these users or their uses of the Internet. The casual user is streaming MP3 file and chatting with friends in a chat room. The corporate user is attempting to conduct research while preparing a report for a meeting the next morning. There is limited bandwidth available, and each user is awarded bandwidth in the same manner, at the same priority. The casual user is using several Internet applications simultaneously with a fragmented interest in each application. The corporate user is focused on one application at a time, finding the needed information and moving onto the next task. If these applications utilized the QoS capabilities in the DIS, the casual user could have assets delivered at a lower priority than the corporate user. The assets for the corporate user would preempt the casual user's assets as each is being distributed. Use of intermediate computational environments would favor the processing for the corporate user over the casual user. The corporate user's traffic can be monitored and the corporate user can be charged according to a different service level agreement than the casual user.

QoS capabilities work best when resource contention is handled in a consistent manner. In a preferred embodiment, the DIS handles network interaction from the source to the target, a complete end-to-end solution. In this way, DIS provides a QoS capability on top of other protocols. And as the number of applications using those sub-protocols decreases, the DIS applications enjoy a more effective QoS functionality.

FIG. 27 describes the capability of the DIS to assign, measure, enforce, and report Quality of Service (QoS) functionality throughout the DIS system according to one embodiment of the present invention. One of the objectives of QoS is to improve performance for higher priority applications by queuing and scheduling data as it is sent over a network. DIS keeps track of the QoS requirements and capabilities end-to-end: on the source tier, distribution tier, and target tier. The QoS requirements for assets are matched up to the QoS capabilities of the system to provide this functionality. The agents each participate in supporting the QoS capabilities by queuing traffic and scheduling the delivery of that traffic. As assets move through the system, they are either given space on a queue or space on a network connection (bandwidth).

Part of the QoS capabilities of DIS is routing the distribution of assets in a variable manner throughout the network. Certain assets are deemed higher priority or more secure than other assets. Those privileged assets are routed differently than other assets.

In the case of priority, the privileged asset would preempt the processing of normal assets, be routed ahead of lower priority assets, and execute with a higher priority in computational environments. This is accomplished by queuing the lower priority assets and delivering the higher-priority assets. The priority of an asset might be designated in the Other field (770 of FIG. 5).

In the case of security, the privileged asset would be sent over a more secure channel, encrypted in the cache, and/or stored in the computational environment in a secured manner.

In step 2910, an agent is about to process a set of assets or deliver those assets to another agent.

In step 2920, the agent examines the priority field, e.g. 1179, of the asset specification 1170 for the assets it is attempting to process or deliver to another agent.

In step 2930, the agent applies a quality of service algorithm to the prioritized list to determine which assets should be assigned resources on the delaying queue (step 2940), and which assets should be processed/delivered (step 2950).

In step 2940, lower priority assets are enqueued until the processing/delivery of higher priority assets is completed. As this method proceeds, the lower priority assets are either raised in priority by the QoS algorithm, or they are the highest priority for some round of evaluation.

In step 2950, higher priority assets are processed and/or delivered to other agents.

Note that Service Level Agreements (SLAs) are the contracts guaranteeing network capabilities. QoS enables the fulfillment of these SLA guarantees.

Also note, QoS is typically provided by differentiating data packets on a network. The data packets are correlated back to an application. The correlation allows the packets to be handled differently on the network. The correlation is done as an afterthought to provide QoS.

Note, DIS differs from the prior art by coupling the applications with an infrastructure that is aware of the different resources that constitute those applications. QoS granularity now can go beyond the data packets associated with an application. For example, QoS can be based on the DBMS data, moving the data at a higher priority than the other resources that make up an application.

Note, integration with metrics gathering software and hardware helps establish the resource loading and capabilities. Integration with the network devices (load balancers, switches, routers, network adapters, hubs) provides a connection between application and data packet handling.

Figure 29:
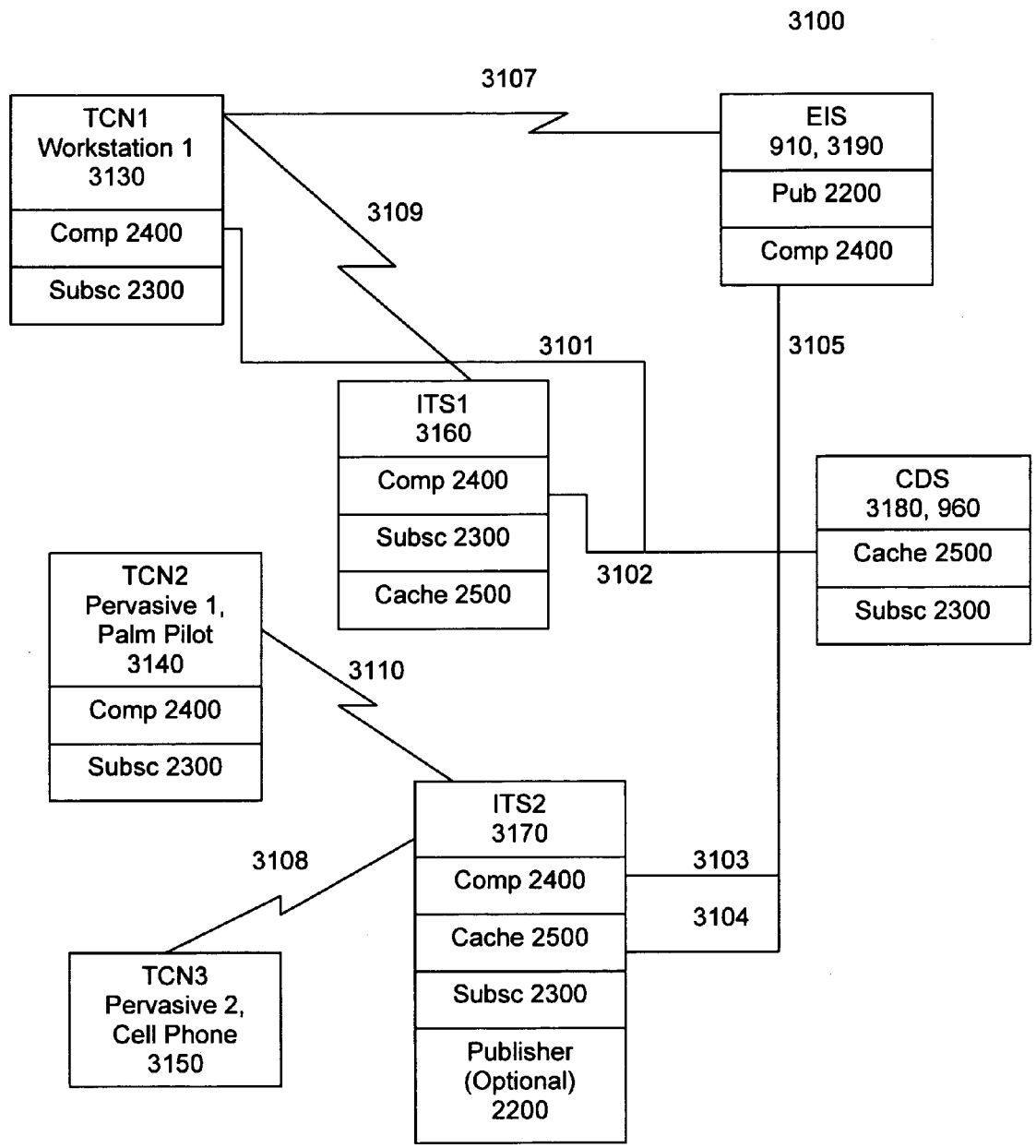
FIG. 29 is a block diagram of a general system according to one embodiment of the present invention being used in various business situations.
Figure 30A:
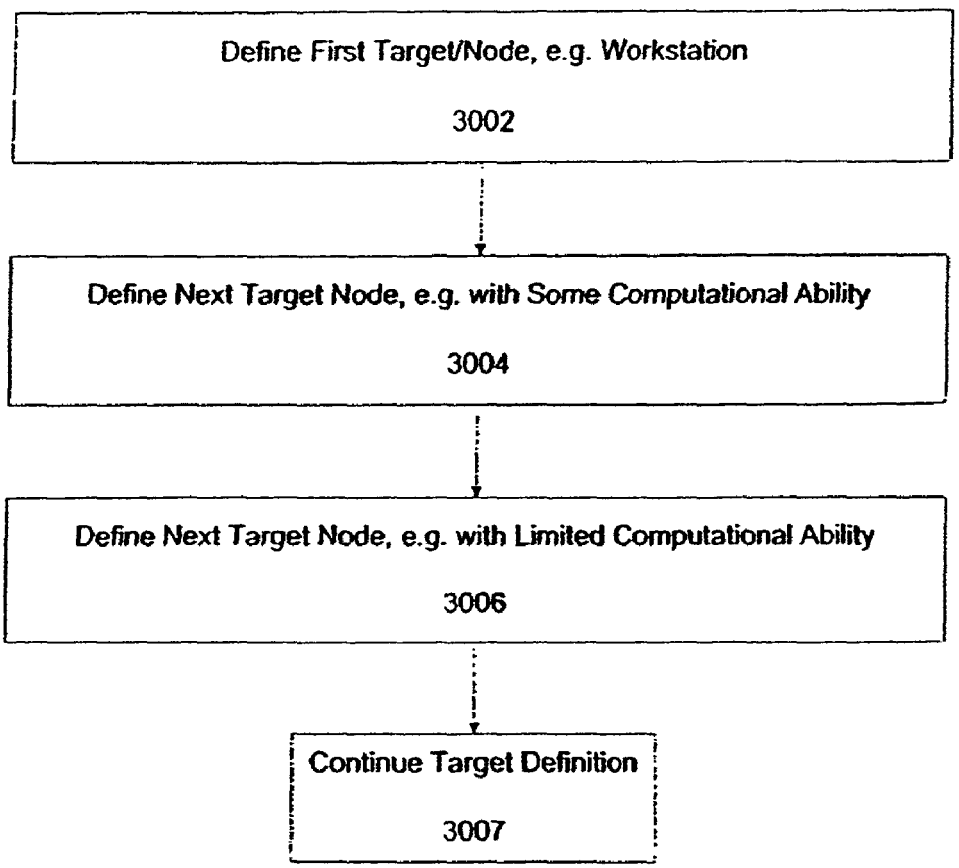
Figure 30B:
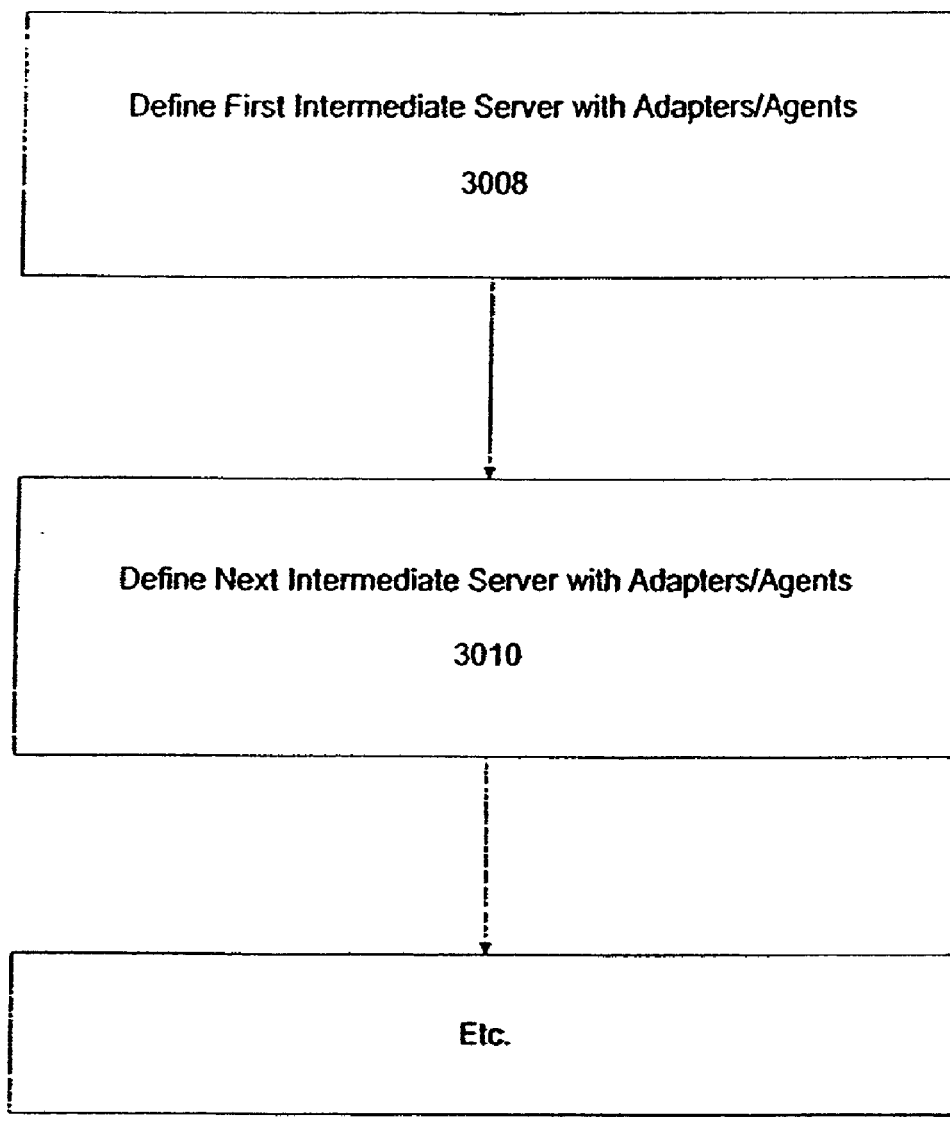
Figure 30C:
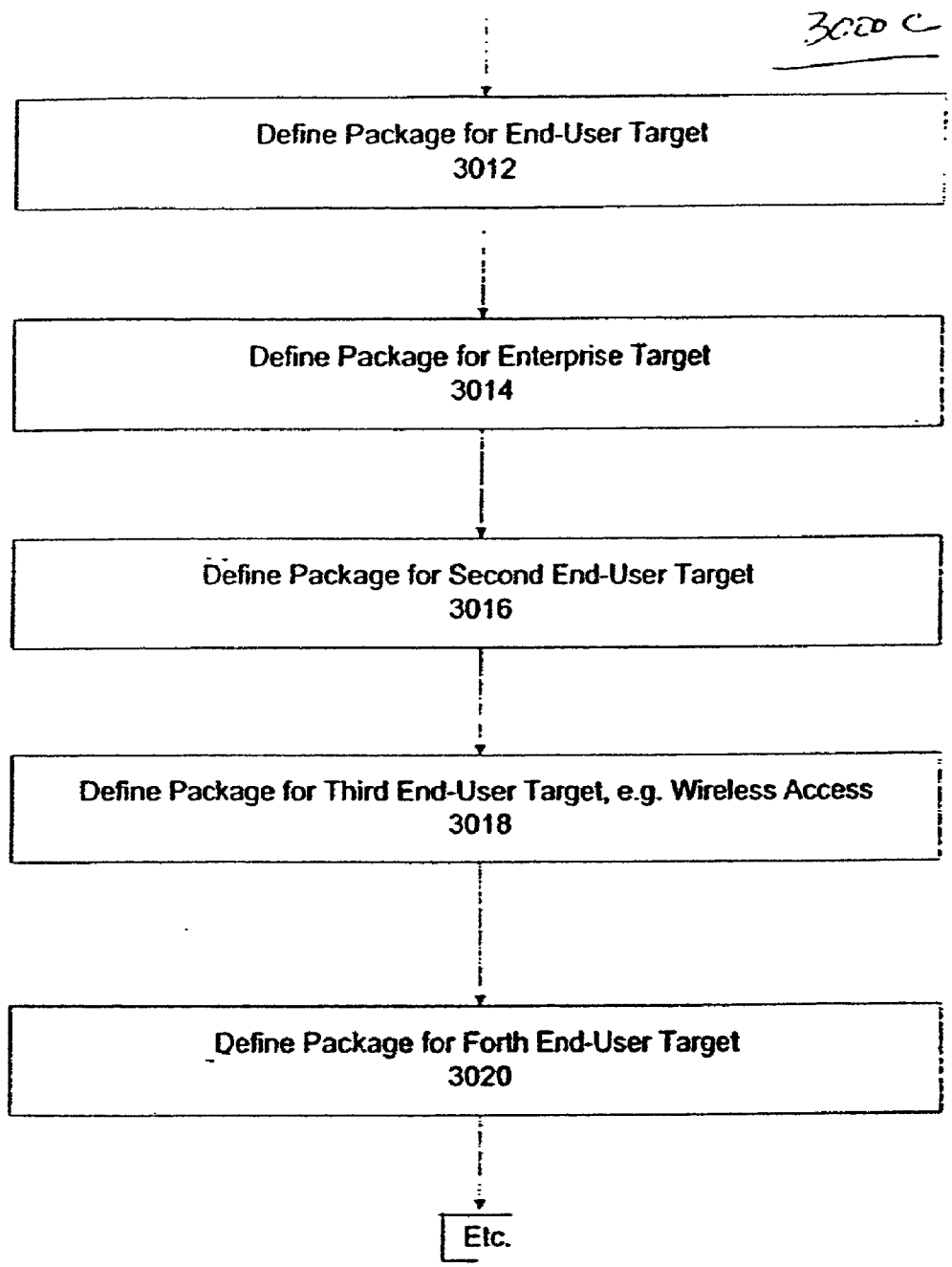
Figure 30D:
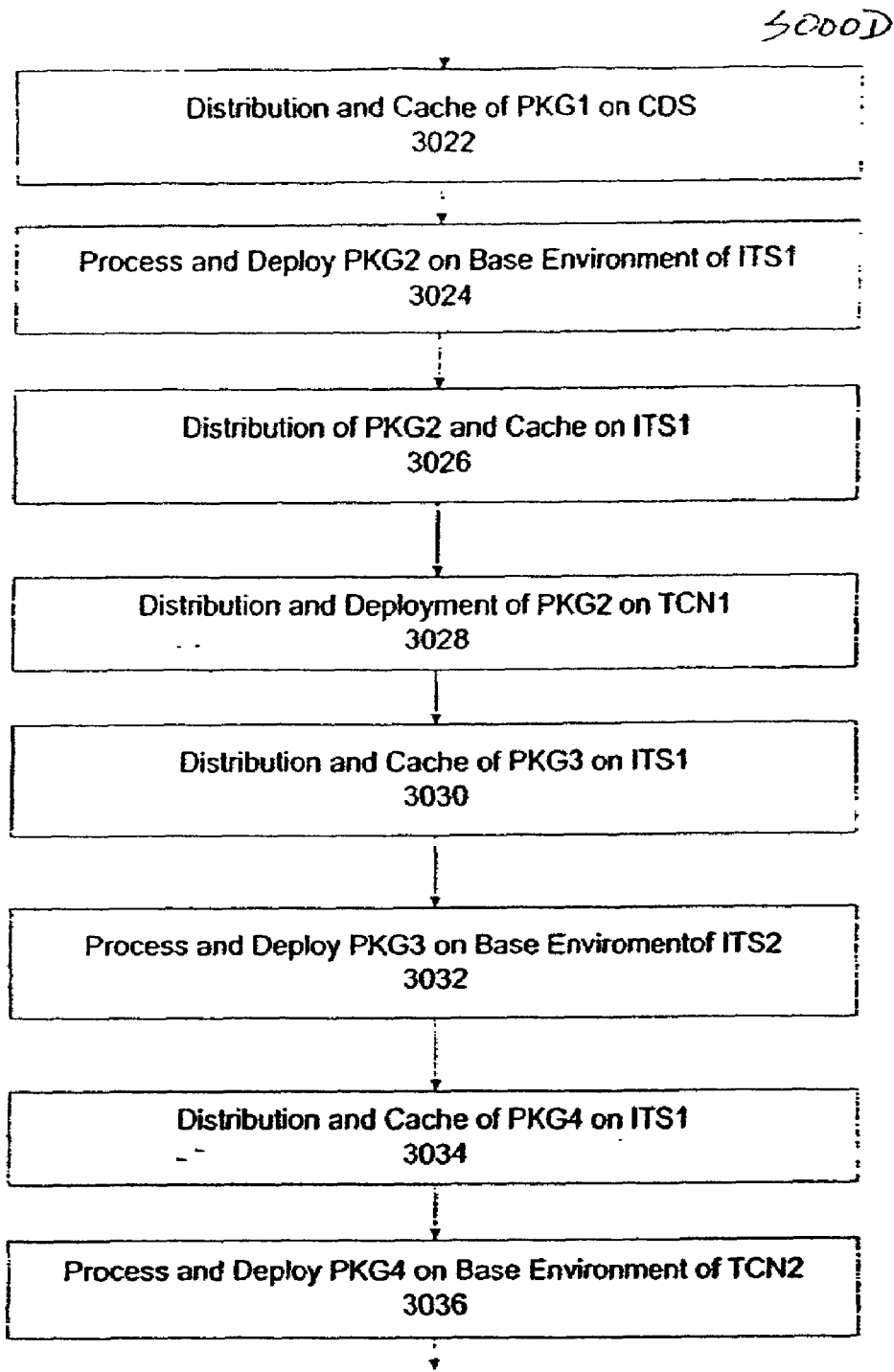
Figure 30E:
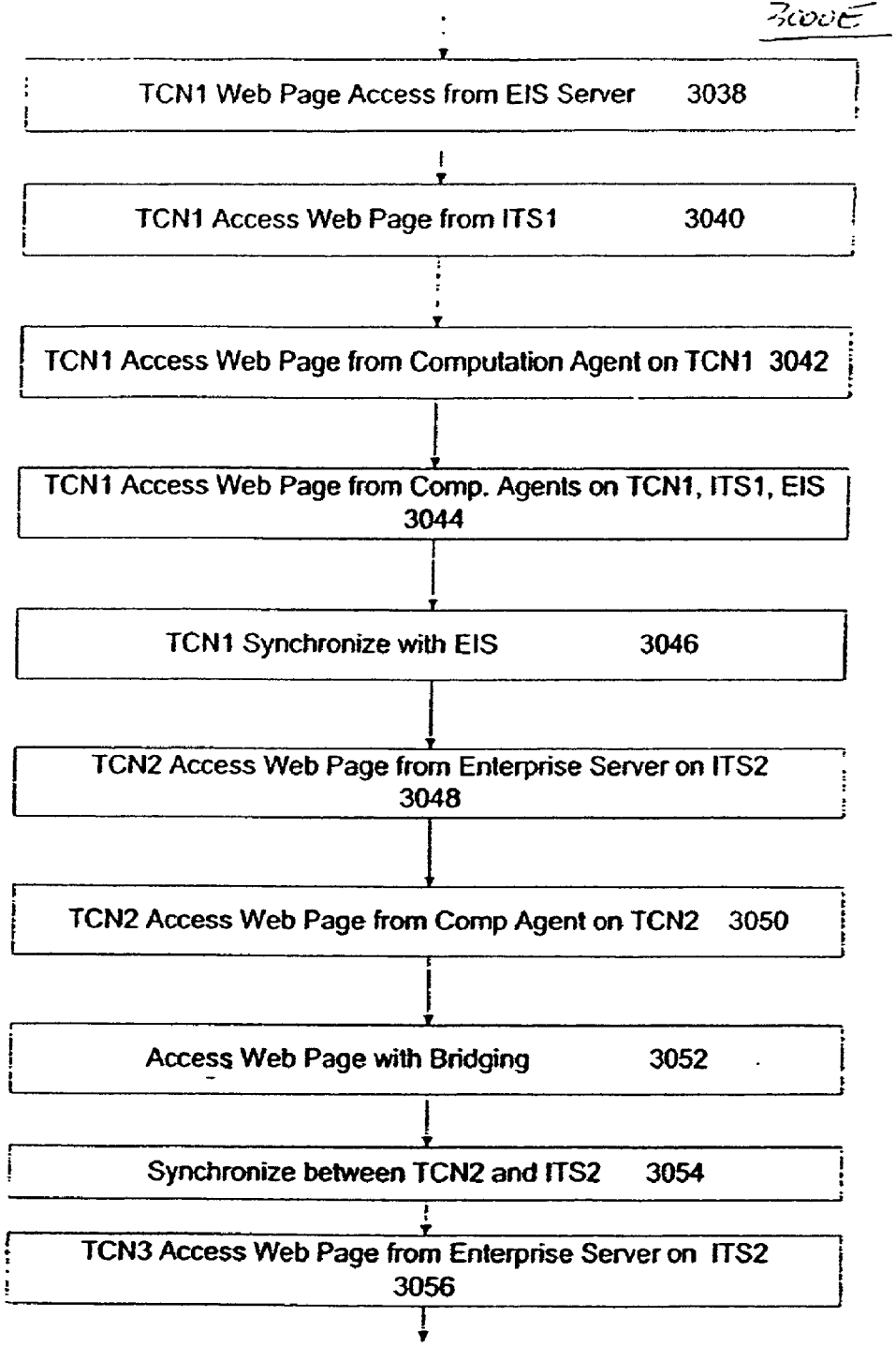
Figure 30F:
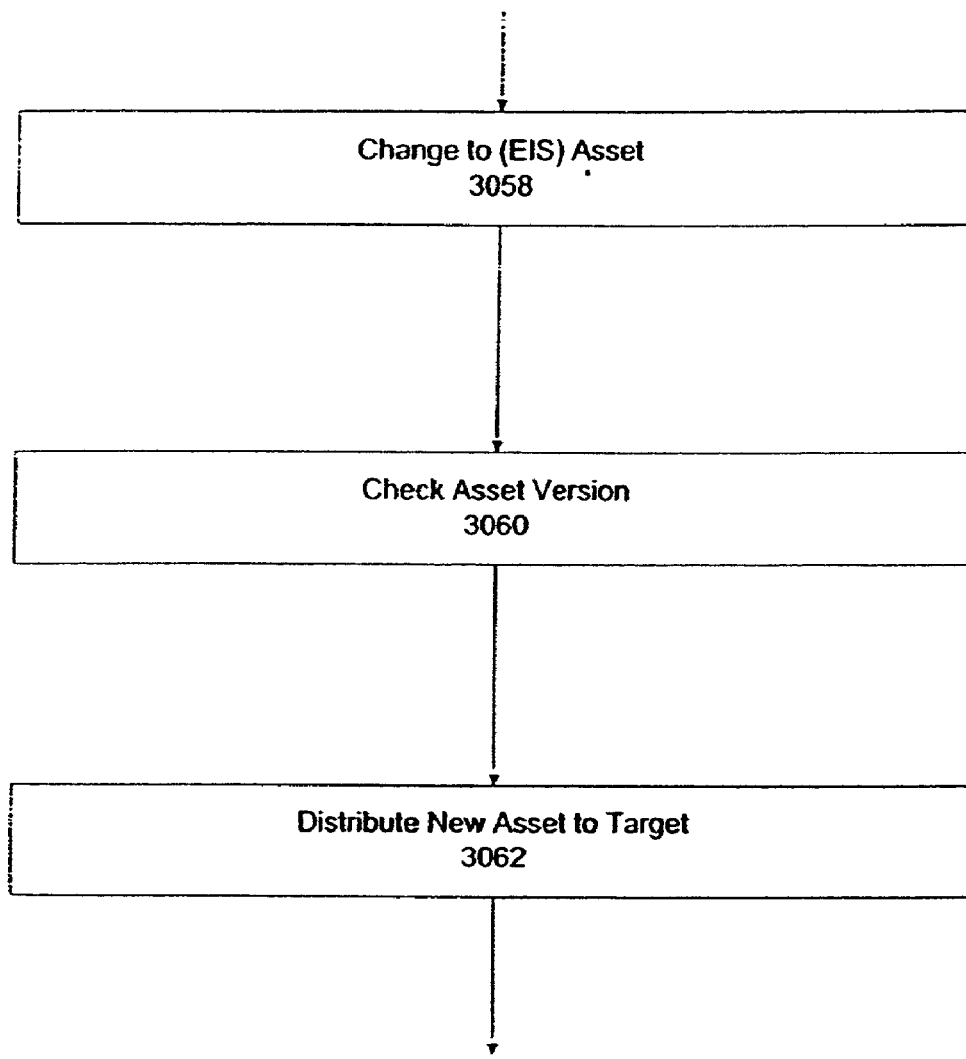

FIG. 29 is a block diagram 3100 of a general system according to one embodiment of the present invention being used in various business situations. The system has one or more nodes 3130 connected to an optional intermediate target server (ITS1) 3160. This ITS1 could cache assets 240 used by a large number of client/target/nodes 3130, e.g. individual users in a large office building. Alternatively, a second ITS2 3170 could be located in a different physical location that happens to be close to a first pervasive device 3140 like a palm pilot, cell phone, or other device that has connection to the network 3110, e.g. by a radio, infrared, connection. A second pervasive device 3150 is connected to the network directly 3108, e.g. through any general connection like an internet service provider (ISP) and does not connect through an ITS (3160, 3170) One or more CDS/ADSs 3180 are connected to the network 3105 as well as one or more sources/EISs (910, 3190).

In one embodiment, the EIS has a publish 2200 agent, the CDS/ADS 3180 has a subscriber 2300 and caching 2500 agent, and the ITS 3160 has a computational 2400 and subscriber 2300 agent (and alternatively a cache agent 2500).

Referring back to FIGS. 28A–28F.

Steps 3002 to 3006 of block diagram 3000A below describe examples of target and client nodes.

In step 3002, a deployment engineer or automated process defines the client workstation using a client node registry specification, sent to the subscriber agent 2300 on the CDS/ADS (960, 3180). The first client node is defined as TCN1 3130, and is a workstation within a small enterprise. TCN1 has the DIS subscriber 2300 and computational 2400 agents installed.

In step 3004, a deployment engineer or an automated process defines a wireless appliance client. This second client node may be defined as TCN2 3140, and is a Palm Pilot that is able to connect to the Internet over a wireless connection 3110. The Palm Pilot is capable of running the minimal application server on a Java™ virtual machine. The subscriber 2300 and computational 2400 agents are installed on the TCN2 3140 to provide the ability to distribute assets to the TCN2, and run those assets once they are deployed 1700 into the base environment 250 on TCN2 3140.

In step 3006, a deployment engineer or an automated process defines a wireless appliance client that is meant to have limited resources. This third client node is defined as TCN3 3150, a device with limited function, e.g., a Digital PCS Phone with limited Web browser capabilities. TCN3 is heavily reliant on a point-of-presence in order to connect to a network, and can only be used to browse content. In this example, TCN3 does not have a Java virtual machine—this means that it only acts as a Web client. None of the Distributed Internet Services (DIS) 900 agents (2200, 2300, 2400, and 2500) are deployed to TCN3 3150.

Step 3007 continues to define other target nodes that may be on the network, as above.

Steps 3008 and 3010 of block diagram 3000B below describe two example intermediate target servers.

In step 3008, a deployment engineer or an automated process defines an intermediate server 3160 to be used within the same small enterprise as TCN1 3130. The first intermediate server is defined as ITS1 3160, and is a server within a small enterprise that is intended to run part or all of a Web application for one or more client nodes 3130 within the small enterprise. The subscriber 2300, computational 2400, and (optional) caching 2500 agents are installed on ITS1 3160.

In step 3010, a deployment engineer or an automated process defines an intermediate server to be used as both a point of presence for TCN3 3150 and as a CDS/ADS for TCN2 3140. The second intermediate server is defined as ITS2 3170. In a preferred embodiment, the ITS2 3170 can be a leased server resource provided by Application Service Provider (ASP) or ISP vendors with the DIS subscriber 2300, (optional) publisher 2200, computational 2400, and caching 2500 agents.

Other servers can be defined in a similar manner.

Note that when the deployment engineer or automated process defines a client and/or a server, this definition can be done by providing the defined computer with agents, e.g., subscription 2300, computation 2400, and/or cache 2500. These agents can be provided using the DIS and distributed these agents as packages of assets 240.

Steps 3012 to 3020 of block diagram 3000C below describe definition of packages/applications as they are distributed across tiers of the network.

In step 3012, a package is defined for the end-user target environment such as TCN1 3130 and ITS1 3160, to enable the distribution of an optimal number of assets 240. For example, 20% of the application assets 240 that represents 80% of the time spent in the application by the average user are distributed to the target. The deployment engineer creates the package specification 1100 explicitly, or employs the discover process 2100 to identify and characterize the execution of the application in the EIS (900, 3190).

In step 3014, a package 1100, PKG1 is defined for enterprise target environments such as ITS1 3160. PKG1 1100 defines an application (sub applications) that can support partial distribution of the application. As an example, some of the Web pages will be generated by the computational agent 2400 on ITS1, some of the Web pages will be generated back in the EIS.

In step 3016, a package is defined, PKG2 1100 is defined for end-user target environments such as TCN1 3130. PKG2 defines an application that can support partial distribution of the application (sub applications). As an example, some of the Web pages will be generated by the computational agent 2400 on TCN1 3130, some of the Web pages will be generated back in the EIS.

In step 3018, a package is defined, PKG3 1100 is defined for wireless access points such as ITS2 3170. The wireless access point, ITS2, is a server in a close proximity to the wireless device (3140, 3150). The intention with PKG3 is for assets to execute within the computational agent 2400 on ITS2 3170.

In step 3020, a package is defined, PKG4 1100 is defined for wireless devices such as TCN2 3140. The wireless device, TCN2, is connected 3110 to the Internet, through the wireless access point ITS2. The intention with PKG4 is for assets 240 to execute both within the computational agent 2400 on TCN2 3140 and within the computational agent 2400 on ITS2.

Similar steps are performed to define other end-user targets.

Steps 3022 to 3036 of block diagram 3000D below describe various preferred ways assets 240 are distributed to computational environments and secondary caches across the tiers of the network.

In step 3022, the CDS/ADS initiates the distribution (1200, 1300) based on the schedule defined for package PKG1 1100. The subscription agent 2300 in the CDS/ADS requests version information from the publishing agent 2200 in the EIS. The version information is compared with the version information for assets 240 already delivered to ITS1, as described above. If there are assets 240 that have not been delivered, the subscription agent 2300 on the CDS/ADS requests those assets from the publishing agent 2200 on the EIS. The publishing agent 2200 exports the requested assets and returns them to the subscription agent 2300 on the CDS/ADS. The subscription agent 2300 on the CDS/ADS requests that the caching agent 2500 on the CDS/ADS store the assets.

The caching agent 2500 on the CDS/ADS performs processing on all the new assets in the asset cache.

In step 3024, the subscription agent 2300 on ITS1 queries the subscription agent 2300 on CDS/ADS 3180 for new assets/PKG1 1100. The caching agent 2500 on ITS1 performs any targeted processing 1900 on the assets 240 that are to be delivered to TCN1. TCN1 requests that the computational agent 2400 on ITS1 deploy the assets 240 into the base environment 250 on TCN1.

In step 3026, do the same as steps 3022 and 3024, except for PKG2 1100 into the asset cache on ITS1.

In step 3028, the subscription agent 2300 on TCN1 queries the subscription agent 2300 on ITS1 for new assets 240, e.g. PKG2 1100. New assets, associated with PKG2 1100, are distributed down 1400 by the subscription agent 2300 on ITS1 to the subscription agent 2300 on TCN1. The subscription agent 2300 on TCN1 requests that the computational agent 2400 on TCN1 deploy 1700 the assets into the base environment 250.

In step 3030, similar to step 3022 and 3024, except for PKG3 1100 into the asset cache on CDS/ADS.

In step 3032, similar to step 3024, except PKG3 1100 replaces PKG2 and ITS2 replaces ITS1.

In step 3034, similar to step 3022 and 3024, except for PKG4 is relayed from the CDS/ADS 3180 asset cache, into the asset cache on ITS2.

In step 3036, similar to step 3024, except for PKG4 from ITS2 cache into computational environment on TCN2.

Steps 3038 to 3056 of block diagram 3000E below discuss various ways that assets are executed in a distributed manner across tier of the network.

In step 3038, TCN1 may access a Web page that is generated on the EIS server. This is the same as normal Web applications today, and is still available to use, when using DIS, when appropriate.

In step 3040, TCN1 may access a Web page from the small enterprise server ITS1. TCN1 would only need a Web browser to access the application in this method over a standard client/server communication connection 3107.

In step 3042, TCN1 may access a Web page from the computational agent on TCN1. In this case, no part of the application would be running over the network connections. This is because the assets 240 in the Web page were distributed over connection 3101 and processed as described above.

In step 3044, TCN1 would access a Web page that was generated by assets that are running on the computational agents TCN1, ITS1, and the EIS. Note that these agents all work together to maintain the communication between these assets and a combination of assets in these environments, up to and including all the assets are used to generate a single Web page, e.g., using the bridge process explained above.

In step 3046, changes may occur in the computational environment on TCN1 that need to be synchronized in the EIS. The computational agent 2400 on TCN1 identifies the synchronization asset and requests, through connection 3101 that the subscription agent 2300 on CDS/ADS synchronize 2000 the asset 240. The subscription agent 2300 on the CDS/ADS requests that the computational agent 2400 on the EIS synchronizes the synchronization asset.

In step 3048, TCN2 may access a Web page from the small enterprise server ITS2. TCN2 would only need a Web browser to access the application in this method. This is a standard known Web page server connection 3110. However the assets used to create the small enterprise server on ITS2 were distributed from the EIS (900, 3190) over connections 3103 and 3104 using the agents as described above.

In step 3050, TCN2 may access a Web page from the computational agent on TCN2. In this case, no part of the application would be running over the network connections. This is because the assets 240 in the Web page were distributed over connection 3110 and processed as described above.

In step 3052, similar to 3044 but only bridging computation between TCN2 & ITS2.

In step 3054, similar to 3046 but between TCN2 & ITS2.

In step 3056, TCN3 3150 may access a Web page from the small enterprise server ITS2. TCN3 would only need a Web browser to access the application in this method using a well-known Web page server connection 3108. However, the assets 240 in the Web page were distributed over connection 3103 and 3104 and processed as described above.

Steps 3058 through 3062 of block diagram 3000F below describe distribute of current versions of assets.

In step 3058, some outside process changes one or more assets on the EIS.

In step 3060, the CDS/ADS subscription agent 2300 requests that the EIS publishing agent 2200 checks the versions of assets on EIS.

In step 3062, the CDS/ADS determines if any assets have changed in PKG1 . . . PKG4, if so the new asset(s) is distributed (1200, 1300, and 1400) to the appropriate target environment and asset cache.

FIG. 18 is the flow chart of the CDS/ADS process asset adapter method/process (PAM) according to one embodiment of the present invention. The PAM defines the process of creating a version of the asset that is appropriate for the target's (e.g. client) base environment. The version created may have been designed to execute on a source environment that is different than the base environment. In a preferred embodiment, a logic/data layer and/or extended environment layer of a digital asset is translated in such a way that it can allow the digital asset to perform its functions in the target's base environment. In some preferred embodiments, the digital assets are components like Enterprise Java Beans (EJBs).

For a more detailed description of this invention, and other inventions related to this invention, see the documents incorporated by reference above.

FIG. 19 is a flow chart of a target processing asset adapter method 1900 that is executed on the CDS/ADS tier against any digital asset, (typically cached in the CDS/ADS cache) that requires targeted processing before being sent to the target tier according to one embodiment of the present invention. Target processing is intended primarily to change the Logic/Data layer of the asset data structure in order to provide a unique asset that can create or has personalized information for one or more specific targets on the target tier on which the digital asset is being deployed. In some embodiments, a targeting process adapter 1900 can target to an intermediate target (a server that will in turn server many users) or a final target (a single node that will serve a single user).

In several embodiments, the digital asset that has been processed into a processed asset before being targeted 1900. Processed digital assets can have a changed Logic/Data layer. Also, the processed asset could have a changed extended environment layer. Sometimes, the process adapter can change both parts. In other cases, neither the Logic/Data layer nor the extended environment will be changed. The processed asset is typically stored in the CDS/ADS cache.

When the asset is sent to the target tier, the deploy asset adapter method 1700 is invoked to deploy the asset into the computational environment, i.e., the base environment, in the target tier. The extended environment from the asset's data structure is used to set the base environment and extended environment in the target tier to run the asset in a correct manner. The asset's logic and data are then deployed into the base environment, and since the environment has been adjusted, the logic will function correctly and the data will be accessible.

FIG. 19 is a flow chart of the CDS/ADS target asset adapter method (TAM) according to one embodiment of the present invention. The TANI defines the process of creating a targeted data structure from any number of assets based on the asset type and other asset information. The process 1900 selects the appropriate target asset adapter (TAA), the implementation specific construct for this adapter method, based on the asset type and tasks the adapter with creating a data type appropriate targeted for distribution to a particular client node.

The process method is typically a process that needs to be done an asset for all respective target environments that are registered for the package(s) that contain the respective digital asset. The target method is processing that is required for an asset for one or more particular target/client that is registered for the respective asset.

In some preferred embodiments, the TAM 1900 targets digital assets that are in a "neutral format" and stored on the CDS/ADS. The neutral format is a format between a proprietary format of a source and a proprietary format of a target for a given asset type. For example for an EJB would be in the neutral format when the EE of the asset has neither the proprietary parts of the source environment or the proprietary parts of the target environment. For instance, J2EE deployment descriptors have proprietary sections that may be vendor specific yet still have other sections with a standard (e.g. publicly defined) representation, as well.

In step 1905 of the TAM 1900, the CDS/ADS determines if the asset type is either RD (Reference Data) or ED (Entity Data). If the asset is one of these types, the CDS/ADS tasks the appropriate TAA to perform step 1910.

In step 1910, the TAA retrieves a "where clause" specified in the asset data structure, typically in the extended environment layer. The TAA then does a token replacement operation on the "where clause". In a preferred embodiment, the token replacement is a basic string replacement operation, retrieving the replacement value from the node specification corresponding to the targeted node. The TAA proceeds to step 1915.

In step 1915, the TAA runs a query on the table specified in the asset data structure using the "where clause" from step 1910. The TAA proceeds to step 1920.

In step 1920, the CDS/ADS takes the records returned from the TAA in step 1915 and puts the records into a simple data structure. The CDS/ADS then puts the data structure into the LD layer of the asset and returns the asset to the asset cache.

For example, an asset of type Reference Data (RD) might need to be targeted for each client node. The RD's "where clause" would have tokens that need to be replaced using information in the node's registry. The asset adapter would perform an SQL query using the transformed where clause. The data resulting from this query would be placed in the LD layer of the asset. The asset would then be placed back into the asset cache.

Another example of the TAA would be for the Entity Data (ED) asset type. The asset specification might indicate that a targeted query has to be performed for each target client node. For the case of an eCommerce application, the ED adapter might query the status of the current orders for an individual customer. The data would then be distributed to that client. If the client's name were John Smith, only the order status information would be downloaded to John Smith. He would receive his order status information, and no one else's. Likewise, other clients would not receive John Smith's order status information. The query is specific to John Smith and is performed when the John Smith's client node is ready to receive the information.

The WHERE clause of the SELECT statement would be something like:
  WHERE first_name=#fname AND last_name=#lname and the node specification would be something like:
  fname=John
  lname=Smith and the resulting targeted WHERE clause would look like:
  WHERE first_name="John" AND last_name="Smith"

and, the targeting could be further indirected through a directory service:
  fname=ldap.corp_central.employee.fname
  lname=ldap.corp_central.employee.lname where the directory service would resolve the token from some centralized, possibly Single Sign-On, directory service.

When changes happen in the target tier that warrant synchronization, the synchronization asset adapter method 2000 (see FIG. 20 below) is executed to create a synchronization asset that is propagated back through the deployment/distribution tier (optionally) and then into the source tier. The source tier resource (asset) that corresponds to the synchronization asset is synchronized with the information in the synchronization asset.

FIG. 20 is a flow chart of the synchronize asset adapter method (SAM) according to one embodiment of the present invention. One function of the SAM 2000 is to move a "synchronization asset" from one or more targets to one or more sources. (A synchronization asset is an asset that is moved from a target environment to a source environment.)

The SAM typically defines the process by which one or more source environments can be synchronized with the target environment. However, note that in a general case, synchronization can be used to update information, e.g. changes in assets, on any node in the network—including server nodes or other target nodes. Synchronization can also be used to update assets in the CDS/ADS server (or target and/or EIS nodes performing a distribution function) so that the updated assets in turn can be distributed to other nodes of the network. While, the description below refers to moving information "back" to a source environment in order to update the respective source environment, synchronization can be used to move required information any where on the network to any given network node to provide new information and/or updated information without loss of generality.

Note that in some embodiments, the synchronization process could be the export process 1600 with the source and target roles reversed. However, a preferred embodiment uses synchronization process 2000 for synchronization.

The first step of synchronization process 2000 involves the target environment creating a synchronization asset. In a preferred embodiment, the synchronization asset is subsequently moved to the CDS/ADS, then onto the source environment. The source environment is synchronized with the synchronization asset. Synchronization means that the source environment will be changed to reflect a change in one or more of the target environments.

In step 2010, an external process (e.g., in the base environment of one or more targets or any other processes external to the CDS/ADS) calls the CDA. These external processes indicate that a synchronization should happen. The SAM proceeds to step 2020. The call includes argument data that the CDA will pass on to the synchronization asset adapter (SAA) in a hidden fashion. The SAA is an implementation of the SAM 2000 for a particular respective asset type. See step 2020.

For example, the asset specification, e.g., for an ED type may have argument data that indicates that a synchronization should happen every time that a database record in the table corresponding to the ED is changed. The client DBMS would be notified when the ED was deployed into the target/client environment in which this event needs to occur. The client DBMS would then call the CDA when the database record had changed, passing arguments to indicate the asset type, ED, and arguments that allow the SAA (for the respective ED) to know how to build the synchronization asset (or the change in information).

Other synchronization triggers can include any combination of the following: a timer that would indicate a time frequency at which the synchronization would happen, a batch trigger that would start the synchronization based on a certain number of changes or the size of changes, a trigger based on navigation in the user interface of the application, a trigger based on a certain number of changes being made in one or more database tables, a trigger based on the connectivity of the remote target node.

In step 2020, the CDA selects the appropriate synchronization asset adapter (SAA) for the asset type indicated by the caller of the process. The CDA passes the hidden arguments to the SAA, which proceeds to step 2030.

In step 2030, the SAA determines if the asset type is ED or EB. If not, the method ends, if so, the method proceeds to step 2040.

In step 2040, the SAA determines which table is associated with the asset by examining the arguments. The SAA then retrieves the synchronization information from the client environment for the respective asset. In the case of an ED or EB, the retrieval information constitutes the insertion, deletion, and updating of database records which constitute the changes that the data has undergone at client since being deployed into the client target environment for this respective asset.

In step 2050, the SAA contacts the CDS/ADS, and transfers the asset data structure to the CDS/ADS. For example, this part of the SAA, running on the client environment, can update the LD and/or the EE layers of the respective asset to convert the asset to a synchronization asset.

In step 2060, the CDS/ADS determines which (source) EIS node is associated with the asset. The CDS/ADS does this by retrieving data from the asset specification, e.g. machine location. Note that this step, the SAA (i.e. step 2060) in this example is running on the CDS/ADS.

In step 2070, the CDS/ADS initiates a connection to the appropriate EDA on the EIS (source) node determined in step 2060, and sends the synchronization asset 240S to the EDA/source node.

In step 2080, the EDA examines the asset data structure 240S to determine the asset type. The EDA then selects the appropriate synchronization asset adapter (SAA) 2000 for that asset type. Note that this SAA is running on the source node/EIS.

In step 2090, the SAA determines if the asset type is ED or EB. If not, the method ends, if so, the method proceeds to step 2095.

In step 2095, the SAA applies the synchronization information (e.g. LD 210 and/or EE layer) in the synchronization asset of the source environment. Since this is an ED or EB, the changes involve the insertion, deletion, and updating of database records against the source database for the respective asset.

In one embodiment, the synchronization for data assets, ED & EB, are achieved by recording the SQL queries that are applied to the database table. The queries are recorded in a data structure that is written to a file. The file can then be transferred to the database server node, via one or more CDS/ADS nodes. Once the file is on the (source) EIS node with the database table where the data originated, the SQL queries are applied to the database table. If the database table has been partitioned well, the queries will synchronize the sub-partition of the table to the state of the table on the client node.

In alternative embodiments, the source node can be updated with the entire synchronization asset or with just the necessary changes that are to be made to the respective asset.

The routing of the data from the client node to the EIS node is achieved due to the CDS/ADS nodes keeping the routing information for the data. When it comes time to synchronize the data, the CDS/ADS nodes know where the originally received data came from and the CDS/ADS sends the data back through those respective nodes.

Note that the SAM/SAA 2000 is a process that is typically distributed over several tiers of the network. The SAM/SAA provides processing support for the synchronization asset on its "life cycle" journey back to the source (EIS) node. On this journey the synchronization asset carries information reflecting the changes made to the associated asset deployed on its respective remote client environment. These changes are then updated at the source.

In a preferred embodiment, the SAM/SAA 2000 can combine synchronization assets from multiple targets/clients into a "coalesced synchronization asset" that in sent by itself back to the source (EIS). In this manner, changes for many assets deployed over many client/targets can be updated at the source/EIS by processing the single coalesced synchronization asset. This can decrease throughput requirements to the source (increasing speed) and decrease processing at the EIS.

In an alternative embodiment, the EE has one or more EIS server dependencies descriptors. The EIS server dependencies descriptors identify an EIS execution environment required on the EIS in order to ensure correct utilization of the digital asset on the EIS. The EIS execution environment is that set of EIS systems 105F, EIS sub-systems 106F, EIS applications 108, EIS sub-applications 110F, EIS components 120F, EIS modules 130F, and EIS functions 140F that the digital asset requires on the EIS in order to ensure correct utilization of the digital asset on the EIS. The EIS server dependencies descriptors can be used to ensure that digital assets that reside on the EIS will be correctly synchronized with digital assets deployed to one or more of the target systems, e.g., the EIS server dependencies are used to locate the source.

Examples of EIS server dependencies include one or more of the following: EIS operating systems (in rare cases), EIS database management systems (DBMS), EIS servers, EIS application servers, EIS web application servers, one or more accounting, enterprise resource planning (ERP) systems, customer relationship management (CRM) systems, business to business (B2B) systems (e.g., supply chain management, etc.), business to customer (B2C) system (e.g. order fulfillment systems, electronic shopping systems, etc.), and one or more message oriented middleware applications. Specific EIS server dependencies include one or more of the following: one or more Oracle DBMS, one or more Sybase DBMS, and one or more DB2 DBMS.

FIG. 24 is a flow chart of a computational agent method according to one embodiment of the present invention. The computational agent method (CA) is responsible for providing the functionality involved with deployment of assets into a computational environment, and generating synchronization assets for other environments.

In step 2420, the CA 2400 in the source environment is optionally requested to synchronize 2000 an asset that the subscription agent 2300 forwards from the target environment. The CA selects the proper synchronization asset adapter 2000 to complete the synchronization. Typical this synchronization is done in a way specific to each asset type.

Asset streaming reduces the transmission of duplicate data. Frames are defined as complete assets. Deltas are the difference between two versions of an asset. One can incrementally apply the deltas against a prior frame to create a complete asset for the new version associated with the delta(s) of that asset. Therefore, the complete new version of the asset does not have to be distributed, but only the deltas that exist between the older (prior) version and the new version. Potentially, asset updating/streaming reduces the bandwidth for data transmission and offers opportunities for merging synchronization assets.

In step 2780, if the EAA is deploying a streaming asset, it deploys the frame and/or deltas into the target environment. For different asset types, the application of the delta file has different meanings. Overall, the application of the delta is similar to replacing the existing asset.

In step 2782, if the asset is registered with synchronization capabilities, the EAA saves a copy of the asset for later comparison.

In step 2784, the CDA is requested to synchronize target assets with source assets. The CDA selects the appropriate Synchronization Asset Adapter (SAA) for the specific asset type. If the asset is classified as a streaming asset, the method proceeds to step 2786

In step 2786, the SAA creates a delta for the asset. A previous copy of the asset, created in step 2782, is compared with the current asset. The difference between these two assets is the delta that will be used to create the delta synchronization asset. The resulting delta synchronization asset represents the changes that would need to be applied in the source environment that has had all the previous deltas applied to the last frame that was sent.

In step 2788, the SAA continues to synchronize the asset as it normally would in the synchronize asset adapter method 2000. The delta asset is treated the same as the asset described in the other methods, and treated in the same manner (e.g. sent to the CDS/ADS). The SAA indicates that the asset is a delta asset by setting a value in the asset data structure to indicate this state.

In a preferred embodiment, the CDS/ADS might coalesce deltas from multiple targets before sending those deltas onto the source. This would reduce the processing in the source environment and also reduce network traffic.

In step 2790, the SAA applies the synchronization information (e.g. LD and/or EE layer) in the synchronization asset of the source environment. If the asset is a streaming asset, the frames and deltas are applied to the source environment.

Asset streaming reduces the transmission of duplicate data over the network. For the purposes of this description, frames are defined as complete digital assets. Deltas are the difference between two versions of a particular digital asset. Accordingly, one can incrementally apply the deltas against a prior frame (prior version of the digital asset) to create a complete, new version of the digital asset for a set of delta(s) associated with the respective digital asset. Therefore, the complete new version of the digital asset does not have to be distributed, but only the deltas that exist between the older (prior) version and the new version. Distribution of these deltas to create newer versions of digital assets from older versions of digital assets is called "streaming." Potentially, digital asset updating/streaming reduces the bandwidth for data transmission and offers opportunities for merging synchronization assets.

In some preferred embodiments, the distribution system performs optimizations to decrease the redistribution of assets to targets or distribution servers. For example when a digital asset has changed, often the difference between the old asset and the new asset is only a small difference. The streaming asset provides the additional optimization of identifying the parts of an asset that have changed and, therefore, the parts that only need to be sent. By decreasing the amount of information that is sent, the distribution can utilize less bandwidth and increase the amount of network throughput for other applications. Streaming assets represents a major conceptual shift in the distribution of applications and data across tiers of a network.

For web-based applications, streaming can greatly reduce the amount of redundant data that is sent across the network. For example, an online brokerage application would want to supply up-to-date portfolio information and order status information to their customers. With existing technologies, the users would poll the server repeatedly to gain this information. The server would be overloaded at peak times when everyone would want to know his or her portfolio status. The online brokerage would need to increase the network and EIS resources to make their systems available under these circumstances, although this scenario is not representative of their normal user load. Asset based distribution would decrease the interaction with the servers at the EIS of the online brokerage. Only the changed data would be sent down to the user, the static content, dynamic content, and EJBs would be located on the user's PC, or local server. The amount of sent data is greatly reduced between the EIS and the user, and the EIS performs far less processing because it doesn't have to generate the web page. The streaming asset goes one step further, assuring that only the data that has changed is sent to the client. If only the pricing data has changed, that is all that is transferred to the user. If a small part of a single Java Server Page (JSP) has changed, only that small change is sent to the user.

By combining streaming assets with QoS 2900 capabilities, the CDS/ADS is able to support streaming media such as voice and video.

Also, through the transfer of video delivery algorithms to the domain of digital asset distribution, this system is able to achieve significant efficiencies. In particular, digital assets representing text files or relational data are streamed to their destination based upon the amount of change the digital asset has undergone since it was previously sent. This allows for a stream of changes to be sent instead of repeatedly sending redundant data.

An asset distribution system is expected to have a larger amount of information traveling through it than a typical distribution system would. This is due, in part, to the broader applicability of the technology. Handling the distribution on the application layer, the digital asset distribution system is able to determine the minimal amount of data to send to each individual target.

FIG. 27 is a flow chart of a streaming process according to one embodiment of the present invention. In a preferred embodiment, the steps of this process 2700 are an optimized supplement to steps and methods described elsewhere in this document.

In step 2705, the Export Asset Adapter (EAA) determines that the asset specification indicates that the current asset should be treated as a streaming asset. The EAA then performs a test 2707 based on the asset type to determine if a frame or delta needs to be generated. On an asset-by-asset basis, this is done to determine the differences between a prior asset, e.g. located on a client, and a current asset (latest version) typically located on the source/EIS. In a preferred embodiment, a copy of the prior asset is retained at the source/EIS to facilitate this test/comparison. If a frame needs to be generated, the EAA continues to step 2710. If a delta needs to be generated, the EAA continues to step 2715.

For example, if the asset type is an EB, ED or RD, the EAA would query the data and based on the amount of data that has changed, would either generate a frame or a delta.

In step 2710, the EAA continues to export the asset as it normally would in the export asset adapter method 1600. The frame asset can be considered the same as the asset described in the other methods, and treated in the same manner. The EAA indicates that the asset is a frame asset by setting a value in the asset data structure to indicate this state.

In step 2715, the EAA creates a delta for the asset. A previous copy of the asset is compared with the current asset. The difference between these two assets is the delta that will be used to create the delta asset. The resulting delta asset represents the changes that would need to be applied in the target environment that has had all the previous deltas applied to the last frame.

For example, if the asset type is EB, ED or RD, the EAA would query the data from the source database and would either generate the delta. In one embodiment, the EAA would generate a version of the last asset by applying the deltas against the last frame. The EAA would then perform a row-wise (record–wise) differentiation between the last asset and the current data. Then a (table) column-wise differentiation would be applied. (Difference or comparisons functions are well known.)

In step 2720, the EAA continues to export the asset as it normally would in the export asset adapter method 1600. The delta asset is treated the same as the asset described in the other methods, and treated in the same manner (e.g. sent to the CDS/ADS). The EAA indicates that the asset is a delta asset by setting a value in the asset data structure to indicate this state.

In step 2725, the CDS/ADS receives an asset and determines whether it is a streaming asset or a normal asset. If it is normal, the CDS/ADS continues with normal operations 2726, i.e., process 2700 terminates. If the asset is a streaming asset, the CDS/ADS continues to step 2730.

In step 2730, the CDS/ADS determines whether the asset is a frame or delta. If the asset is a frame, the CDS/ADS goes to step 2735. If the asset is a delta, the CDS/ADS proceeds to step 2740.

In step 2735, the CDS/ADS finds deltas and last frame for the asset in the asset cache and marks them for removal. The CDS/ADS then caches the current frame asset and proceeds to step 2745.

In step 2740, the CDS/ADS caches the delta asset in the asset cache and proceeds to step 2745.

In step 2745, the CDS/ADS resumes normal operations as if the asset was not a streaming asset.

In step 2750, the CDS/ADS receives a request to process an asset. If the asset is a streaming asset, the CDS/ADS proceeds to step 2755. Otherwise the CDS/ADS proceeds to process the asset as described in the process asset method 1800.

In step 2755, the CDS/ADS selects the Processing Asset Adapter (PAA) based on asset type. The CDS/ADS requests that the PAA create the complete asset by applying the deltas to the frame asset in order of creation then proceeds to step 2760.

In step 2760, the PAA applies the differential algorithm for that asset type against the processed asset to produce a new delta. In a preferred embodiment, the PAA would create a frame asset if the combination of the new delta and the existing deltas for the asset are larger than the frame.

In step 2765, the CDS/ADS stores the new delta asset in the asset cache.

In step 2770, the CDS/ADS builds a manifest for a target/client that includes a streaming asset. If 2771 the client has the most recent frame asset, the method continues onto step 2772, otherwise the method goes to step 2774.

In step 2772, the CDS/ADS determines the last delta that the client has received, and adds the subsequent deltas for that asset to the manifest. The method continues to step 2780.

In step 2774, the CDS/ADS adds entries for the last frame and subsequent deltas for the specified asset.

In step 2780, if the EAA is deploying a streaming asset, it deploys the frame and/or deltas into the target environment. For different asset types, the application of the delta file has different meanings. Overall, the application of the delta is similar to replacing the existing asset.

In step 2782, if the asset is registered with synchronization capabilities, the EAA saves a copy of the asset for later comparison.

In step 2784, the CDA is requested to synchronize target assets with source assets. The CDA selects the appropriate Synchronization Asset Adapter (SAA) for the specific asset type. If the asset is classified as a streaming asset, the method proceeds to step 2786.

In step 2786, the SAA creates a delta for the asset. A previous copy of the asset, created in step 2782, is compared with the current asset. The difference between these two assets is the delta that will be used to create the delta synchronization asset. The resulting delta synchronization asset represents the changes that would need to be applied in the source environment that has had all the previous deltas applied to the last frame that was sent.

In step 2788, the SAA continues to synchronize the asset as it normally would in the synchronize asset adapter method 2000. The delta asset is treated the same as the asset described in the other methods, and treated in the same manner (e.g. sent to the CDS/ADS). The SAA indicates that the asset is a delta asset by setting a value in the asset data structure 1175 to indicate this state.

In a preferred embodiment, the CDS/ADS might coalesce deltas from multiple targets before sending those deltas onto the source. This would reduce the processing in the source environment and also reduce network traffic.

In step 2790, the SAA applies the synchronization information (e.g. LD and/or EE layer) in the synchronization asset of the source environment. If the asset is a streaming asset, the frames and deltas are applied to the source environment.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method for deploying an asset into a base environment of a target node, the target node being connected to a multi-tiered network through a network connection, comprising the steps of:
    organizing a package according to a package boundary, the package including:
        at least two assets, each asset being a component of an application and having an asset type defined by an asset boundary and at least two asset layers including a logic/data layer and an extended environment layer; and
        a base environment associated with said at least two assets;
    wherein the package boundary may be determined by the asset boundary of at least one asset in the package;
    determining if at least one asset type is at least one of a session bean type and an entity bean type;
    translating the asset(s) to deploy on a target node with a different base environment than the base environment associated with the asset(s);
    distributing the package over the multi-tiered network to the target node; and
    inserting at least one enterprise Java bean implementation class associated with the translated asset(s) into a target archive in the base environment of the target node.

2. The method according to claim 1, wherein the target archive further includes at least one other enterprise Java bean implementation class.

3. The method according to claim 1, further including storing at least one stub and skeleton associated with the enterprise Java bean implementation class in the target archive.

4. The method according to claim 1, further including storing at least one client deployment descriptor located in the extended environment of the asset in the target archive.

5. The method according to claim 1, further comprising the step of:
    determining whether a target table exists in at least one memory of the target node, the target table being associated with the asset type.

6. The method according to claim 5, wherein the target table does exist and further comprising the step of:
    storing an asset table data, in the target table.

7. The method according to claim 5, wherein the asset is an enterprise bean having at least one asset table specified in the logic/data portion of the asset, the asset table having asset table data.

8. The method according to claim 7, wherein the target table does not exist and further comprising the steps of:
    creating the target table; and
    storing an asset table data, located in the asset, in the target table.

9. The method according to claim 8, wherein said creating the target table includes:
    using a target table specification, located in the extended environment portion of the asset, to create the target table.

10. The method according to claim 1, further comprising the steps of:
    determining if the asset type of the asset is not a session bean type or an entity bean type;
    determining if the asset type of the asset is at least one of a reference data type and an entity data type; and
    determining whether a target table exists in at least one memory of the target node, the target table being associated with the asset type.

11. The method according to claim 10, wherein at least one data structure of the asset is stored in the target table.

12. The method according to claim 10, wherein the target table does not exist and further comprising the steps of:
    creating the target table; and
    storing at least one data structure of the asset in the target table.

13. The method according to claim 10, further comprising the steps of:
    writing an entry in a target database table, the entry indicating that at least one data structure in the asset was stored on at least one memory of the target node.

14. The method according to claim 1, further comprising the step of:
    determining if said deploying should occur based on a scheduled deployment time, the scheduled deployment time being at, or before, a current time.

15. A method for deploying an asset into a base environment of a target node, the target node being connected to a multi-tiered network through a network connection, comprising the steps of:
    organizing a package according to a package boundary, the package including:
        at least two assets, each asset being a component of an application and having an asset type defined by an asset boundary and at least two asset layers including a logic/data layer and an extended environment layer; and
        a base environment associated with said at least two assets;
    wherein the package boundary may be determined by the asset boundary of at least one asset in the package;
    determining if at least one asset type is at least one of a static content type, a Java server page type, and a Java bean type;
    translating the asset(s) to deploy on a target node with a different base environment than the base environment associated with the asset(s);
    distributing the package over the multi-tiered network to the target node; and
    copying at least one file specified in a data structure of the translated asset(s) into a memory location on the target node corresponding to the asset type.

16. The method according to claim 15, further comprising the steps of:
    determining if the asset type of the asset is not a static content type, a Java server page type, or a Java bean type; and
    determining if the asset type of the asset is at least one of a plurality of secondary asset types.

17. The method according to claim 16, wherein the memory location is associated with the asset type of the asset.

18. A node environment, the node environment being connected to a multi-tiered network through a network connection, comprising:
- means for organizing a package according to a package boundary, the package including:
  - at least two assets, each asset being a component of an application and having an asset type defined by an asset boundary and at least two asset layers including a logic/data layer and an extended environment layer; and
  - a base environment associated with said at least two assets;

wherein the package boundary may be determined by the asset boundary of at least one asset in the package;
- means for determining if an asset type of an asset is at least one of a session bean type and an entity bean type; and
- means for translating the asset(s) to deploy on a target node with a different base environment than the base environment associated with the asset(s);
- means for distributing the package over the multi-tiered network to a target node; and
- means for inserting at least one enterprise Java bean implementation class associated with the translated asset(s) into a target archive in the base environment of a target node.

19. The node environment according to claim 18, further comprising:
- means for storing, on at least one memory of a target node system, at least one of an EJB implementation class, stubs and skeletons associated with an EJB implementation class, and a target deployment descriptor located on the extended environment of the asset.

20. A storage medium for storing instructions adapted to be executed by a processor to perform the steps of:
- organizing a package according to a package boundary, the package including:
  - at least two assets, each asset being a component of an application and having an asset type defined by an asset boundary and at least two asset layers including a logic/data layer and an extended environment layer; and
  - a base environment associated with said at least two assets;

wherein the package boundary may be determined by the asset boundary of at least one asset in the package;
- determining if at least one asset type is at least one of a session bean type and an entity bean type;
- translating the asset(s) to deploy on a target node with a different base environment than the base environment associated with the asset(s);
- distributing the package over the multi-tiered network to the target node; and
- inserting at least one enterprise Java bean implementation class associated with the translated asset(s) into a target archive in the base environment of the target node.

21. A method for deploying an asset to a multi-tiered network node, comprising:
- organizing a package according to a package boundary, the package including:
  - at least two assets, each asset being a component of an application and having an asset type defined by an asset boundary and at least two asset layers including a logic/data layer and an extended environment layer; and
  - a base environment associated with said at least two assets;

wherein the package boundary may be determined by the asset boundary of at least one asset in the package;
- determining at least one asset type associated with the asset(s);
- selecting a target deployment asset adapter associated with the asset(s);
- translating the asset(s) to deploy on a target node with a different base environment than the base environment associated with the asset(s);
- distributing the package over the multi-tiered network to the node;
- inserting at least one implementation class associated with the translated asset(s) into a base environment associated with the node; and
- inserting an altered target deployment descriptor of the translated asset(s) into the base environment.

22. The method according to claim 21, wherein the asset is at least one of a session bean asset and an entity bean asset.

23. The method according to claim 21, wherein the asset is at least one of an entity bean asset, a reference data asset, and an entity data asset.

24. The method according to claim 23, wherein the asset includes an associated data structure having a table specification.

25. The method according to claim 24, further comprising:
- determining whether a database table associated with the table specification exists in the base environment; and
- creating the database table if the database table does not exist.

26. The method according to claim 25, further comprising importing data from the data structure into the database table.

27. The method according to claim 26, further comprising exporting the data from the data structure into a system database table.

28. The method according to claim 21, wherein the implementation class is an enterprise Java bean implementation class.

29. The method according to claim 28, further comprising:
- inserting at least one of an enterprise Java bean stub and an enterprise Java bean skeleton into the base environment.

30. The method according to claim 29, wherein the at least one implementation class, enterprise Java bean stub, and enterprise Java bean skeleton is inserted into an archive in the environment.

31. A computer-readable medium that stores instructions for deploying an asset to a multi-tiered network node, the instructions adapted to be executed by a processor to perform the steps of:
- organizing a package according to a package boundary, the package including:
  - at least two assets, each asset being a component of an application and having an asset type defined by an asset boundary and at least two asset layers including a logic/data layer and an extended environment layer; and
  - a base environment associated with said at least two assets;

wherein the package boundary may be determined by the asset boundary of at least one asset in the package;
- determining an at least one asset type associated with the asset(s);

selecting a target deployment asset adapter associated with the asset;

translating the asset(s) to deploy on a target node with a different base environment than the base environment associated with the asset(s);

distributing the package over the multi-tiered network to the node;

inserting at least one implementation class associated with the translated asset(s) into a base environment associated with the node; and inserting an altered target deployment descriptor of the translated asset(s) into the base environment.

32. The computer-readable medium according to claim 31, wherein the asset is at least one of a session bean asset and an entity bean asset.

33. The computer-readable medium according to claim 32, wherein the implementation class is an enterprise Java bean implementation class.

34. The computer-readable medium according to claim 33, further comprising inserting at least one of an enterprise Java bean stub and an enterprise Java bean skeleton into the base environment.

35. The computer-readable medium according to claim 34, wherein the at least implementation class, enterprise Java bean stub, and enterprise Java bean skeleton is inserted into an archive in the base environment.

36. The computer-readable medium according to claim 31, wherein the asset is at least one of an entity bean asset, a reference data asset, and an entity data asset.

37. The computer-readable medium according to claim 36, wherein the asset includes an associated data structure having a table specification.

38. The computer-readable medium according to claim 37, further comprising instructions adapted to be executed by the processor to perform the steps of:

determining whether a database table associated with the table specification exists in the base environment; and creating the database table if the table does not exist.

39. The computer-readable medium according to claim 38, further comprising instructions adapted to be executed by the processor to perform the step of:

importing data from the data structure into the database table.

40. The computer-readable medium according to claim 39, further comprising instructions adapted to be executed by the processor to perform the step of:

exporting the data from the data structure into a system database table.

41. A system for synchronizing an asset on a multi-tiered network, comprising:

a processor;

a port coupled to the processor; and a memory, coupled to the processor, storing instructions adapted to be executed by the processor to:

organize a package according to a package boundary, the package including:

at least two assets, each asset being a component of an application and having an asset type defined by an asset boundary and at least two asset layers including a logic/data layer and an extended environment layer; and a base environment associated with said at least two assets;

wherein the package boundary may be determined by the asset boundary of at least one asset in the package;

determine at least one asset type associated with the asset(s);

select a client deployment adapter associated with the asset(s);

translate the asset(s) to deploy on a target node with a different base environment than the base environment associated with the asset(s);

distribute the package over the multi-tiered network to the node;

insert at least one implementation class associated with the translated asset(s) into a base environment associated with the node; and insert an altered target deployment descriptor of the translated asset(s) into the base environment.

42. The system according to claim 41, wherein the asset is at least one of a session bean asset and an entity bean asset.

43. The system according to claim 42, wherein the implementation class is an enterprise Java bean implementation class.

44. The system according to claim 43, further comprising inserting at least one of an enterprise Java bean stub and an enterprise Java bean skeleton into the base environment.

45. The system according to claim 44, wherein the at least implementation class, enterprise Java bean stub, and enterprise Java bean skeleton is inserted into an archive in the base environment.

46. The system according to claim 41, wherein the asset is at least one of an entity bean asset, a reference data asset, and an entity data asset.

47. The system according to claim 46, wherein the asset includes an associated data structure having a table specification.

48. The system according to claim 47, further storing instructions adapted to be executed by the processor to perform the steps of:

determining whether a database table associated with the table specification exists in the base environment; and creating the database table if the table does not exist.

49. The system according to claim 48, further storing instructions adapted to be executed by the processor to perform the step of:

importing data from the data structure into the database table.

50. The system according to claim 49, further storing instructions adapted to be executed by the processor to perform to perform the step of:

exporting the data from the data structure into a system database table.

* * * * *